US008031051B2

(12) United States Patent
Tsukamoto

(10) Patent No.: US 8,031,051 B2
(45) Date of Patent: Oct. 4, 2011

(54) PRIVACY PROTECTION METHOD, DEVICE FOR TRANSMITTING IDENTIFIER FOR PRIVACY PROTECTION, PRIVACY PROTECTION SYSTEM AND PROGRAM, AND MONITORING SYSTEM

(75) Inventor: Yutaka Tsukamoto, Kyoto (JP)

(73) Assignee: Mieko Ishii, Okayama (JP)

(*) Notice: Subject to any disclaimer, the term of this patent is extended or adjusted under 35 U.S.C. 154(b) by 1521 days.

(21) Appl. No.: 10/581,726

(22) PCT Filed: Dec. 7, 2004

(86) PCT No.: PCT/JP2004/018182
§ 371 (c)(1), (2), (4) Date: Jun. 5, 2006

(87) PCT Pub. No.: WO2005/057482
PCT Pub. Date: Jun. 23, 2005

(65) Prior Publication Data
US 2007/0143853 A1 Jun. 21, 2007

(30) Foreign Application Priority Data
Dec. 8, 2003 (JP) ................................. 2003-408568
Jun. 21, 2004 (JP) ................................. 2004-182180

(51) Int. Cl.
*H04Q 5/22* (2006.01)

(52) U.S. Cl. .................. 340/10.1; 340/10.51; 340/572.1
(58) Field of Classification Search ................. 340/10.1, 340/10.2, 572.4, 10.4, 10.41, 40.42, 10.5, 340/10.51, 10.52, 572.1; 455/41.2
See application file for complete search history.

(56) References Cited

U.S. PATENT DOCUMENTS 5,673,034 A * 9/1997 Saliga .......................... 340/5.26
5,959,568 A * 9/1999 Woolley .......................... 342/42
7,373,109 B2 * 5/2008 Pohja et al. .................. 455/41.2
(Continued)

FOREIGN PATENT DOCUMENTS

JP 5-158957 A 6/1993
(Continued)

OTHER PUBLICATIONS

Ari Juels et al., "Squealing Euros: Privacy Protection in RFID-Enabled Banknotes", In: R. Wright, ed., Financial Cryptography '03, Spring-Verlag, 2003, p. 17.
(Continued)

*Primary Examiner* — Edwin Holloway, III
(74) *Attorney, Agent, or Firm* — Westerman, Hattori, Daniels & Adrian, LLP

(57) ABSTRACT

To prevent privacy invasion performed according to a proper identifier which has been read.
A pseudo-RFID transmission device for transmitting a pseudo identifier (RFID) for disturbing an invader is provided to an individual user. When an RFID transmission instruction is received from a tag reader (SA1), a variable type pseudo RFID different from the one which has been transmitted previously is transmitted (SA3 to SA5) and different RFID is transmitted each time for the same person. The respective pseudo RFID transmission devices are grouped into a plurality of types, so that the pseudo RFID transmission devices belonging to the same group transmit their variable type pseudo RFID while increasing the possibility to transmit common pseudo RFID accorded with one another. An area is specified for each group and the respective pseudo RFID transmission devices are provided to individual users, so that the same RFID may be transmitted for the same person.

26 Claims, 64 Drawing Sheets

U.S. PATENT DOCUMENTS

| | | | | |
|---|---|---|---|---|
| 2002/0116274 | A1* | 8/2002 | Hind et al. | 705/23 |
| 2004/0222878 | A1* | 11/2004 | Juels | 340/10.1 |

FOREIGN PATENT DOCUMENTS

| | | | |
|---|---|---|---|
| JP | 8-162996 | A | 6/1996 |
| JP | 2002-104617 | A | 4/2002 |
| JP | 2002-511985 | A | 4/2002 |

OTHER PUBLICATIONS

Stephen A. Weis, "Security and Privacy in Radio-Frequency Identification Devices", Masters Thesis, MIT, May 2003, pp. 40-42.

International Search Report mailed Mar. 29, 2005 of International Application PCT/JP2004/018182.

* cited by examiner

FIG.2

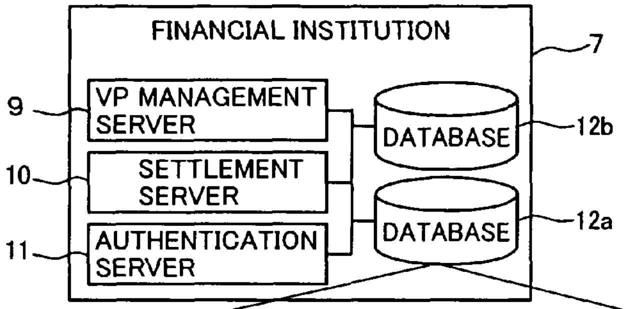

| RP | | | | | VP | | |
|---|---|---|---|---|---|---|---|
| NAME | ADDRESS | AUTHENTICATION KEY | PUBLIC KEY | ACCOUNT NUMBER | TRAP INFORMATION | PRIVATE INFORMATION | ADDRESS |
| TARO | ○△× | KNT | KPT | 8824 | FIRST TRAP INFORMATION | FIRST PRIVATE INFORMATION | □×○ |
| JIRO | ×○× | KNJ | KPJ | 9017 | SECOND TRAP INFORMATION | SECOND PRIVATE INFORMATION | △○○ |
| | | | | | THIRD TRAP INFORMATION | THIRD PRIVATE INFORMATION | △○○ |
| HANAKO | ○△○ | KNH | KPH | 2534 | FOURTH TRAP INFORMATION | FOURTH PRIVATE INFORMATION | △×× |
| ⋮ | ⋮ | ⋮ | ⋮ | ⋮ | ⋮ | ⋮ | ⋮ |

FIG.3

| | | | | | |
|---|---|---|---|---|---|
| FIRST TRAP INFORMATION | SITE NAME | ABC | MTT | MEC | --------- |
| | NAME | B13P | E(B13P) | $E^2$(B13P) | --------- |
| | PUBLIC KEY | KPB | KPB′ | KPB″ | --------- |
| | E-MAIL ADDRESS | ○□×△× | △△△△△ | △△△△△ | --------- |
| | VIRTUAL ACCOUNT NUMBER | 2503 | E(2503) | $E^2$(2503) | --------- |
| | VIRTUAL CREDIT NUMBER | 9145 | E(9145) | $E^2$(9145) | --------- |
| SECOND TRAP INFORMATION | SITE NAME | AMZ | RAK | ASK | --------- |
| | NAME | NPXA | E(NPXA) | $E^2$(NPXA) | --------- |
| | PUBLIC KEY | KPN | KPN′ | KPN″ | --------- |
| | E-MAIL ADDRESS | ××○△□ | △△△△△ | △△△△△ | --------- |
| | VIRTUAL ACCOUNT NUMBER | 3541 | E(3541) | $E^2$(3541) | --------- |
| | VIRTUAL CREDIT NUMBER | 3288 | E(3288) | $E^2$(3288) | --------- |
| ⋮ | ⋮ | ⋮ | ⋮ | ⋮ | |

FIG.4

| | PRIVATE INFORMATION A | PRIVATE INFORMATION B | -------- |
|---|---|---|---|
| FIRST PRIVATE INFORMATION | ○○△+$D_{KS}$(○○△) | ××△+$D_{KS}$(××△) | -------- |
| SECOND PRIVATE INFORMATION | △○○+$D_{KS}$(△○○) | △××+$D_{KS}$(△××) | -------- |
| THIRD PRIVATE INFORMATION | ○△○+$D_{KS}$(○△○) | ×△×+$D_{KS}$(×△×) | -------- |
| FOURTH PRIVATE INFORMATION | △○△+$D_{KS}$(△○△) | △×△+$D_{KS}$(△×△) | -------- |
| ⋮ | ⋮ | ⋮ | |

| VP NAME | ARTICLE KEEP INFORMATION | E-MAIL ADDRESS | CUSTOMER MANAGEMENT INFORMATION |
|---|---|---|---|
| B13P | ARTICLE FROM COMPANY ABC KEPT,UNSETTLED | ○□×△× | --------------- |
| E(B13P) | ARTICLE FROM COMPANY MTT KEPT,SETTLED | △△△△△ | --------------- |
| $E^2$(NPXA) | ARTICLE FROM COMPANY MEC KEPT,UNSETTLED | △△△△△ | --------------- |
| ⋮ | ⋮ | ⋮ | ⋮ |

| VP NAME | TRAP TYPE RFID | TRADER NAME |
|---|---|---|
| B13P | abc,hij,amz,rak,・・・ | ABC,HIJ,AMZ・・・ |
| E(B13P) | mtt | MTT |
| $E^2$(B13P) | mec | MEC |
| $E^3$(B13P) | ktt | KTT |
| ⋮ | ⋮ | ⋮ |

| R | 0～39 | 40～54 | 55～69 | 70～84 | 85～99 |
|---|---|---|---|---|---|
| RFID | 820493176 | 730854709 | 813926081 | 791405731 | 835406912 |

(b)

| R | 0～39 | 40～54 | 55～69 | 70～84 | 85～99 |
|---|---|---|---|---|---|
| RFID1 | 831709281 | 793102792 | 814358231 | 840526390 | 751052891 |
| RFID2 | 779203980 | 809132041 | 849137655 | 789182509 | 850021934 |
| RFID3 | 839093127 | 749084765 | 788015233 | 850139767 | 802049344 |
| RFID4 | 740980346 | 808645210 | 779288401 | 750561234 | 766104988 |

(c)

| R | 0～39 | 40～54 | 55～69 | 70～84 | 85～99 |
|---|---|---|---|---|---|
| RFID1 | 799804511 | 717950841 | 899893020 | 879010300 | 700913561 |
| RFID2 | 779203980 | 709130241 | 749182655 | 889121509 | 750021214 |
| RFID3 | 839093127 | 849048765 | 888062233 | 750161767 | 702049319 |
| RFID4 | 740980346 | 708642510 | 879264401 | 850561202 | 856104923 |

| COMMON PSEUDO RFID | SALES AREA |
|---|---|
| 820493176 | CHIYODA-KU |
| 809207321 | SHINJUKU-KU |
| 831902845 | SHIBUYA-KU |
| ⸾ | ⸾ |
| 798091320 | UKYO-KU |

(b)

| COMMON PSEUDO RFID | SALES AREA |
|---|---|
| 779203980<br>839093127<br>740980346 | CHIYODA-KU |
| 810391562<br>781529055<br>808892177 | SHINJUKU-KU |
| ⸾ | ⸾ |
| 788718955<br>845590329<br>822770945 | UKYO-KU |

| CUSTOMER NAME | POINT NUMBER | ADDRESS | E-MAIL ADDRESS | VIRTUAL ACCOUNT NUMBER |
|---|---|---|---|---|
| E(B13P) | 19018 | □×○ | △△△△△ | E(2503) |
| E(NPXA) | 30937 | △○○ | △△△△△ | E(3541) |
| ⋮ | ⋮ | ⋮ | ⋮ | ⋮ |

FIG.40
(a)
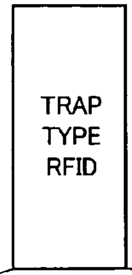
| VP NAME | TRAP TYPE RFID | TRADER NAME |
|---|---|---|
| B13P | abc,hij,amz,rak・・・ | ABC,HIJ,AMZ・・・ |
| EKSB (NAME OF EACH SITE) | mtt | MTT |
| | mec | MEC |
| | ktt | KTT |
| | ⋮ | ⋮ |
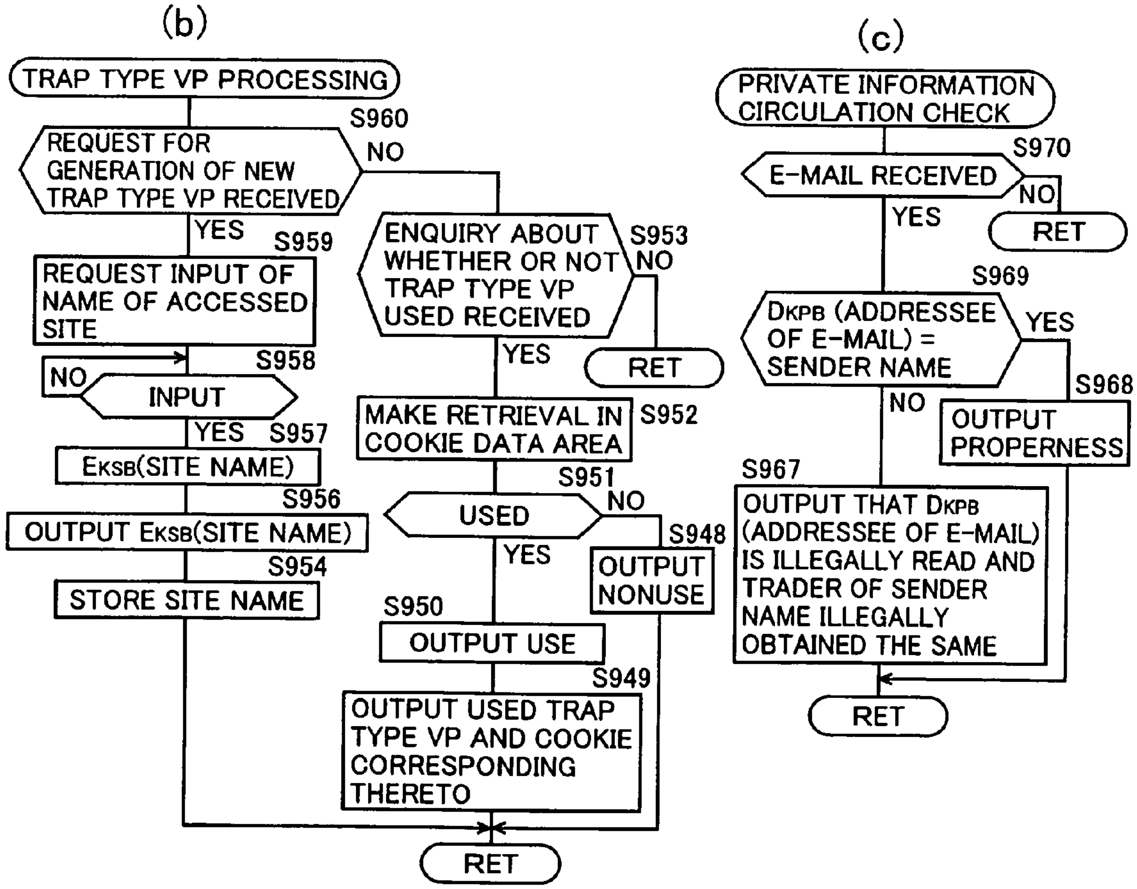

FIG.42

| RFID | PRODUCER | INTERMEDIATE DISTRIBUTION TRADER | RETAIL STORE | PURCHASER PAGE | | |
|---|---|---|---|---|---|---|
| 892013960 | http//www.sato | http//www.kanei | http//www.daimaru | B13P | • • • | • • • |
| 892013961 | | | | NPXA | • • • | • • • |
| 892013962 ∫ 892014560 | | | | I9X3 | • • • | • • • |
| 892014561 ∫ 892014801 | http//www.isida | | http//www.hansin | | | |
| 892014802 ∫ 892014990 | http//www.kato | http//www.mitui | | | | |

FIG.51
(a)
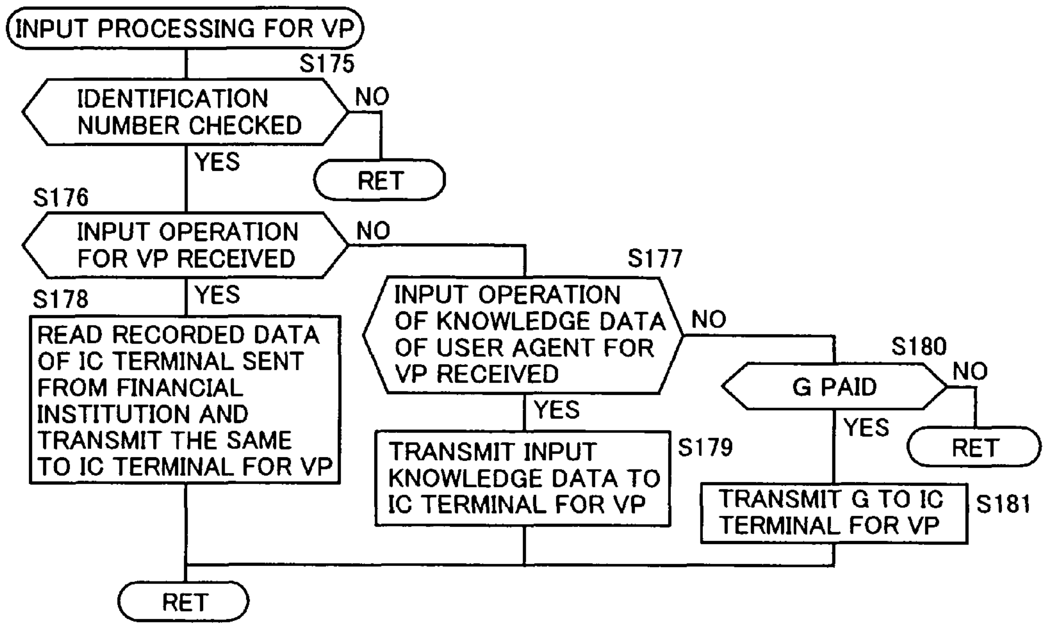
(b)
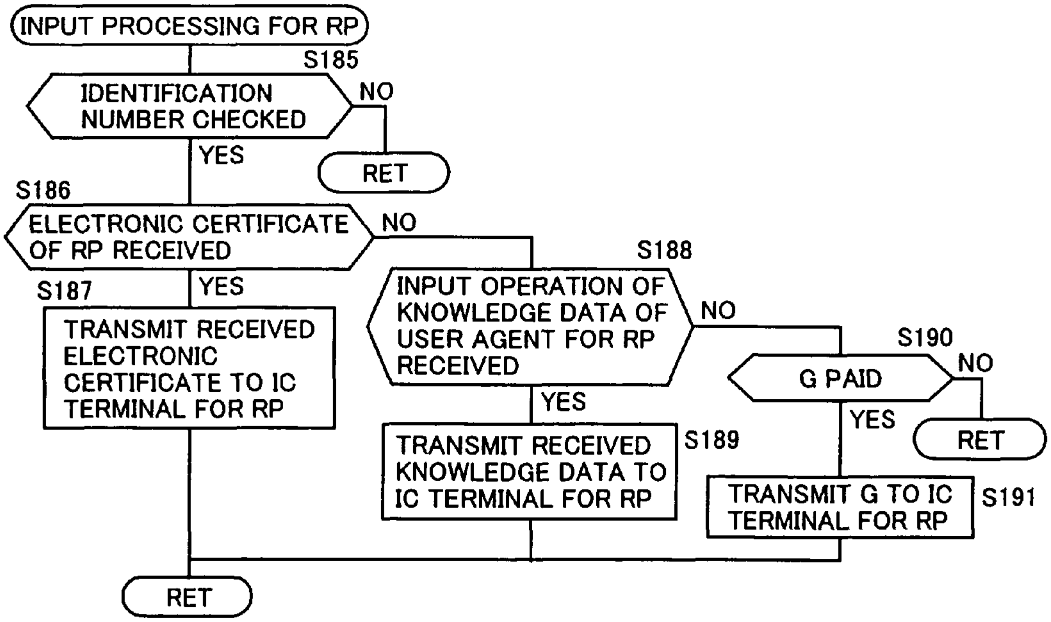

| KEY SPECIFYING NUMBER | KEY (KN) | E-MAIL ADDRESS | MAIL BOX |
|---|---|---|---|
| 12345 | KN1 | ○□×△× | ………… |
| 12346 | KN2 | ××○△□ | ………… |
| ⋮ | ⋮ | ⋮ | ⋮ |
| 92103 | KNI | △×△○□ | ………… |

PRIVACY PROTECTION METHOD, DEVICE FOR TRANSMITTING IDENTIFIER FOR PRIVACY PROTECTION, PRIVACY PROTECTION SYSTEM AND PROGRAM, AND MONITORING SYSTEM

TECHNICAL FIELD

The present invention relates to a privacy protection method, a privacy protection system and a device for transmitting an identifier for privacy protection, for monitoring an invasion of privacy performed by reading an proper identifier such as RFID (Radio Frequency Identification) transmitted from an IC tag (an RFID tag), for example, and on the basis of this proper identifier.

BACKGROUND TECHNIQUE

In order to manage an article in a distribution stage of the article manufactured by a maker, shipped to an intermediate distribution trader such as a wholesaler and thereafter and thereafter delivered a retail store, there is made a proposal of affixing an RFID tag to the article (for example, Patent Literature 1).

In this background technique, a tag reader reads an RFID stored in the RFID tag affixed to the article on important positions in the distribution stage such as at the time of shipment from the maker, at the time of delivery to the intermediate distribution trader and at the time of delivery to the retail store, checks whether or not this RFID is a normally registered proper one and monitors whether or not the article is correctly distributed.

Further, there is proposed a method of performing automatic settlement by, when a purchaser packs articles provided with RFID tags purchased in a retail store such as a department store and passes through a passage gate of the retail store with the bag, for example, making communication between a tag reader provided on the passage gate and the RFID tags affixed to the purchased articles, automatically inferring the prices of the respective articles on the basis of the RFIDs transmitted from the RFID tags, calculating the total sum thereof and using a credit card or the like possessed by the purchaser (for example, refer to Patent Literature 2).

Patent Literature 1: Japanese Patent Laying-Open No. 2002-104617.

Patent Literature 2: Japanese Patent Laying-Open No. 5-158957.

DISCLOSURE OF THE INVENTION

Problems to be Solved by the Invention

Thus, RFID tags affixed to various articles automatically transmit stored RFIDs in response to an RFID transmission request from a tag reader, whereby it follows that, when an article is a regularly worn and carried one such as clothes, glasses, a ring, ear rings or a wristwatch, for example, an RFID is transmitted from an RFID tag of the article worn by a personal user in response to an RFID transmission request from the tag reader also after this article is purchased by the personal user. Consequently, such a possibility results that the privacy of the personal user is invaded.

When performing the aforementioned automatic settlement, for example, it follows that an RFID is transmitted also from an RFID tag affixed to a purchased article worn by a purchaser in response to an RFID transmission request from the tag reader.

Consequently, when Alice who is a certain personal user purchases an Iwata belt (maternity belt) in the maternity department of the dress floor of a department store A, performs automatic settlement by making a tag reader read an RFID tag affixed to this article, thereafter purchases a pair of matching teacups for the use of a married couple in the tableware department and performs automatic settlement by making the tag reader read RFID tags affixed to these articles, for example, it follows that an RFID tag affixed to a purchased article regularly carried by the personal user Alice is also read. When the RFID of the RFID tag is 123456, for example, it is detected that the same person regularly carrying the article of the RFID tag transmitting the RFID of 123456 has purchased the Iwata belt (maternity belt) and has also purchased the pair of matching teacups, and it is assumable that this personal user has probably got pregnant before marriage.

When she has also performed point addition processing through a point card of the department store A in the automatic settlement utilizing the RFIDs of the RFID tags, further, personal specifying information such as the personal name (Alice), the address and the E-mail address user-registered when the point card has been newly issued are ascertained, and it is found out that the person regularly carrying the RFID tag transmitting the aforementioned RFID 123456 is Alice.

When the personal specifying information such as the personal name, the address and the Email address and proper identification information (RFIDs or the like) transmitted from this person are linked with each other once and that prepared by adding the aforementioned private information of the purport that she has got pregnant before marriage to the linked personal specifying information is leaked and distributed through illegal channels, the following serious problem related to privacy arises:

For example, when an individual (Alice) goes out while wearing a transmitter (RFID tag or the like) transmitting the aforementioned leaked proper identification information and browses around a bookshop, a CD shop, a department store and the like, for example, the worn identifier transmitter (RFID tag or the like) is read in the places she goes and the aforementioned leaked private information is retrieved on the basis of the proper identification information (RFID or the like), it follows that a large quantities of junk mails (spams) such as an electronic mail about books related to sex during pregnancy, an electronic mail about music CDs suitable for the period of pregnancy and an electronic mail about toys for a baby and direct mails are delivered.

In order to prevent such a problem, it is conceivable to switch the RFID transmission function of an RFID tag affixed to an article to an inoperable state at the time of purchasing the article so that no RFID is transmitted from the article also when the consumer wears the purchased article.

In this structure, however, such inconvenience results that various services cannot be enjoyed through the RFID transmitted from the RFID tag affixed to the purchased article. As service utilizing the RFID of the RFID tag of the purchased article, such an operation that the consumer accesses a server registering detailed information of this article with classification every RFID transmitted from the RFID tag of the article by transmitting the code of the RFID for retrieving and obtaining article information corresponding to this RFID, for example, or provision of new-version software information if the article is a personal computer or the like, for example, is conceivable.

In order to let the consumer enjoy such service through the RFID, it is conceivable that the consumer himself/herself brings the RFID tag affixed to the purchased article into a transmission stop state and into an RFID guard state through a portable telephone or the like, for example, so that the state can be switched to an RFID guard cancel state such as an RFID transmittable state or the like. When the consumer is enabled to switch the RFID tag to a transmission state (RFID guard cancel state) or a transmission stop state (RFID guard state) through an operation or the like, however, there is such a possibility that the consumer (personal user) forgets to bring the tag into the transmission stop state (RFID guard state) at a time for bringing the same into the transmission stop state (RFID guard state). In this case, it follows that the aforementioned privacy invasion problem arises.

Further, such mode switching cannot be performed unless the personal user purchases an operating apparatus such as a new portable telephone having an operating function for switching the RFID tag affixed to the purchased article to the transmission stop state or the transmittable state, and there is such a possibility that the RFID tag of the purchased article is regularly in the RFID transmission state, i.e., in a state where the aforementioned privacy invasion problem regularly arises in the case of the personal user having no operating apparatus having a mode switching function.

Further, if RFID tags hereafter come into wide use and tag readers are set everywhere, it follows that the aforementioned privacy problem frequently arises everywhere and movement of the personal user is chased by chasing the RFID of the same code.

The present invention has been thought out in consideration of such actual circumstances, and an object thereof is to prevent an invasion of privacy performed by reading an proper identifier and on the basis of the proper identifier.

Means for Solving the Problems

The present invention according to claim 1 is a privacy protection method for preventing an invasion of privacy performed by reading an proper identifier and on the basis of the proper identifier, including:

an identifier guard step of bringing an proper identifier of a radio identifier transmitter affixed to an article purchased and thereby possessed by a personal user into an identifier guard state not readable by a stranger according to the intention of the personal user;

an identifier generation step of generating an identifier for disturbing a privacy invader with a privacy protection identifier transmitter possessed by the said personal user;

a transmission step of transmitting the said identifier generated through the said identifier generation step from the said privacy protection identifier transmitter when receiving an identifier transmission request; and a reading step of rendering the identifier of the said radio identifier transmitter in the identifier guard state readable according to the intension of the personal user, wherein the said identifier generation step includes a variable type identifier generation step capable of generating an identifier different from a precedently transmitted identifier.

The present invention according to claim 2 is a privacy protection method for preventing an invasion of privacy performed by reading an proper identifier of a radio identifier transmitter affixed to an article purchased and thereby possessed by a personal user and on the basis of the proper identifier, including:

an identifier generation step of generating an identifier for disturbing a privacy invader with a privacy protection identifier transmitter possessed by the said personal user; and a transmission step of transmitting the said identifier generated through the said identifier generation step from the said privacy protection identifier transmitter when receiving an identifier transmission request, wherein the said identifier generation step includes an adjusted identifier generation step for generating an adjusted identifier so adjusted that an identifier transmitted from the said personal user possessing the said privacy protection identifier transmitter is identical to an identifier transmitted from a stranger in response to the identifier transmission request, for causing such a different person identical identifier transmission phenomenon that identical identifiers are transmitted even in case of transmission from different persons.

The present invention according to claim 3 is a privacy protection method for preventing an invasion of privacy performed by reading an proper identifier and on the basis of the proper identifier, including:

a provision step of providing privacy protection identifier transmitters to a plurality of personal users, wherein the said privacy protection identifier transmitters include:

identifier generation means generating an identifier for disturbing a privacy invader; and transmission means transmitting the said identifier generated by the said identifier generation means when receiving an identifier transmission request, the said identifier generation means includes variable type identifier generation means capable of generating an identifier different from a precedently transmitted identifier, the said variable type identifier generation means is capable of generating a common identifier according with an identifier transmitted from the said privacy protection identifier transmitter possessed by a person different from persons possessing the said privacy protection identifier transmitters generating and transmitting identifiers with the said variable type identifier generation means, the said plurality of privacy protection identifier transmitters are classified into a plurality of groups formed by privacy protection identifier transmitters transmitting the said common identifier in a higher frequency as compared with an identifier of a stranger and having the said common identifier varying with groups, and the said provision step specifies an area every group and provides the said privacy protection identifier transmitters belonging to the said group to the personal users.

The present invention according to claim 4 is a privacy protection method for preventing an invasion of privacy performed by reading an proper identifier and on the basis of the proper identifier, including:

a provision step of providing a privacy protection identifier transmitter to a plurality of personal users, wherein the said privacy protection identifier transmitter includes:

identifier generation means generating an identifier for disturbing a privacy invader, and transmission means transmitting the said identifier generated by the said identifier generation means when receiving an identifier transmission request, the said identifier generation means includes variable type identifier generation means capable of generating an identifier different from a precedently transmitted identifier, and the said variable type identifier generation means is capable of generating a common identifier according with an identifier transmitted from a privacy protection identifier transmitter possessed by a person different from a person possessing the privacy protection identifier transmitter generating the identifier with the said variable type identifier generation means, for simultaneously transmitting a previously set prescribed number of identifiers from a privacy protection transmitter provided to a certain personal user through the said provision step, and simultaneously transmitting a plurality of identifiers of a number larger than the said prescribed number from a privacy protection identifier transmitter provided to another personal user different from the said certain personal user through the said provision step and generating another identifier, excluding the said prescribed number of identifiers, included in the said plurality of identifiers as the said common identifier.

The present invention according to claim 5 is a device for transmitting an identifier for privacy protection for preventing an invasion of privacy performed by reading an proper identifier and on the basis of the proper identifier, including:

variable type identifier generation means, which is means disturbing a privacy invader and generating an identifier for privacy protection, capable of generating an identifier different from a precedently transmitted identifier; and transmission means transmitting an identifier generated by the said variable type identifier generation means when receiving an identifier transmission request.

The present invention according to claim 6 is characterized in that, in addition to the structure of the invention according to claim 5, the said variable type identifier generation means generates the said identifier in the range of identifiers transmitted by the respective ones of radio identifier transmitters affixed to the respective ones of already sold articles.

The present invention according to claim 7 is characterized in that, in addition to the structure of the invention according to claim 4 or 6, the said transmission means transmits the same identifier as a precedently transmitted identifier when receiving an identifier transmission request again within a prescribed time from precedent identifier transmission.

The present invention according to claim 8 is characterized in that, in addition to the structure of the invention according to any of claims 5 to 7, the said variable type identifier generation means is capable of generating an identifier so adjusted that an identifier transmitted from a person possessing the privacy protection identifier transmitter generating the identifier with the said variable type identifier generation means accords with an identifier transmitted from a stranger, who is a person different from the said person, possessing a privacy protection identifier transmitter.

The present invention according to claim 9 further includes communication means communicating with a privacy protection identifier transmitter of a stranger in addition to the structure of the invention according to claim 8, the said variable type identifier generation means includes identifier storage means storing an identifier, the said communication means includes:

transmission means communicating with the said privacy protection identifier transmitter of the stranger and transmitting the said identifier stored in the said identifier storage means to the said privacy protection identifier transmitter of the stranger, receiving means receiving an identifier transmitted from the said privacy protection identifier transmitter of a stranger, and shared identifier storage means storing the identifier received by the said receiving means in the said identifier storage means and sharing the same identifier with the said stranger, and the said variable type identifier generation means generates the said identifier adjusted to accord with the identifier transmitted from the stranger by reading the shared identifier stored in the said identifier storage means through the said shared identifier storage means when receiving an identifier transmission request.

The present invention according to claim 10 is characterized in that, in addition to the structure of the invention according to claim 9, the said communication means, whose communicable communication limit range for transmitting/receiving and exchanging mutual identifiers is set within 20 meters, communicates with the privacy protection identifier transmitter of a stranger entering the area of the said communicable communication limit range and exchanges mutual identifiers with each other.

The present invention according to claim 11 is characterized in that, in addition to the structure of the invention according to claim 9 or 10, the said communication means has inhibition means inhibiting performance of exchange of the said identifiers with the privacy protection identifier transmitter of a stranger with whom communication has been already made for transmitting/receiving and exchanging the said identifiers again within a prescribed period.

The present invention according to claim 12 is characterized in that, in addition to the structure of the invention according to any of claims 9 to 11, the said communication means has a telephone function and exchanges mutual identifiers with the privacy protection identifier transmitter of a stranger making communication by telephone, and the said variable type identifier generation means generates an identifier adjusted to accord with an identifier transmitted from the said stranger by reading an exchanged identifier stored in the said identifier storage means when receiving an identifier transmission request.

The present invention according to claim 13 is characterized in that, in addition to the structure of the invention according to any of claims 9 to 12, the said communication means has an electronic mail function, transmits an identifier stored in the said identifier storage means to the privacy protection identifier transmitter of a stranger along with transmission of an electronic mail, and receives an identifier transmitted from the privacy protection identifier transmitter of the stranger along with receiving of an electronic mail and stores the same in the said identifier storage means, and the said variable type identifier generation means generates an identifier adjusted to accord with the identifier transmitted from the said stranger by reading the identifier, transmitted from the privacy protection identifier transmitter of the stranger, stored in the said identifier storage means when receiving an identifier transmission request.

The present invention according to claim 14 is characterized in that, in addition to the structure of the invention according to any of claims 5 to 13, the said transmission means is capable of simultaneously transmitting a plurality of identifiers of a number larger than a prescribed number of identifiers simultaneously transmitted from the privacy protection identifier transmitter of a stranger, and the said variable type identifier generation means generates an identifier, excluding the said prescribed number of identifiers, included in the said plurality of identifiers as the said common identifier.

The present invention according to claim 15 further includes, in addition to the structure of the invention according to any of claims 5 to 14:

identifier guard means bringing an proper identifier of a radio identifier transmitter affixed to an article purchased and thereby possessed by a personal user into an identifier guard state not readable by a stranger according to the intention of the said personal user, and read means rendering the identifier of the said radio identifier transmitter in the identifier guard state readable according to the intention of the personal user.

The present invention according to claim 16 is characterized in that, in addition to the structure of the invention according to claim 15, the said identifier guard means transmits proper identification information for person in question authentication, lets the said radio identifier transmitter authenticate the same and switches to an identifier transmission stop state transmitting no identifier unless the person in question is confirmable, and the said read means brings an identifier into a transmittable state after transmitting the said proper identification information and making the said radio identifier transmitter perform the person in question authentication.

The present invention according to claim 17 is a privacy protection method for preventing an invasion of privacy performed by reading an proper identifier and on the basis of the said proper identifier, including:

a registration processing step of performing processing of registering information allowing specification of correspondence between a pseudonym created for acting as an anonymous user by giving the pseudonym in order to protect the privacy of a personal user and the said personal user in a prescribed institution having the duty of confidentiality;

an electronic certificate issuing step of issuing an electronic certificate for the said anonymous user;

an address setting step for setting the address of the said anonymous user to an address different from that of the personal user corresponding to the said pseudonym;

a user registration step of registering as the said anonymous user by registering information of the said pseudonym when performing user registration to a prescribed trader;

a transmission step of transmitting an identifier from a privacy protection identifier transmitter possessed by the said personal user when receiving an identifier transmission request; and pseudonym identifier storage means storing a pseudonym identifier corresponding to the said trader registering the said pseudonym through the said user registration step, for reading the said pseudonym identifier corresponding to the said trader from the said pseudonym identifier storage means and transmitting the same in the said transmission step when transmitting the said identifier to the said trader registering the said pseudonym.

The present invention according to claim 18 reads, in addition to the structure of the invention according to claim 17, the said pseudonym identifier from the said pseudonym identifier storage means and transmits the same through the said transmission step when receiving an operation of the personal user for transmitting the said pseudonym identifier also when it is not the case of transmitting the said identifier to the said trader registering the said pseudonym.

The present invention according to claim 19 is a privacy protection system for preventing an invasion of privacy performed by reading an proper identifier and on the basis of the said proper identifier, including:

registration processing means performing processing of registering information allowing specification of correspondence between a pseudonym created for acting as an anonymous user by giving the pseudonym in order to protect the privacy of a personal user and the said personal user in a prescribed institution having the duty of confidentiality;

user registration means for registering as the said anonymous user by registering information of the said pseudonym when performing user registration to a prescribed trader;

transmission means transmitting an identifier from a privacy protection identifier transmitter possessed by the said personal user when receiving an identifier transmission request; and pseudonym identifier storage means storing a pseudonym identifier corresponding to the said trader registering the said pseudonym through the said user registration means, wherein the said transmission means reads the said pseudonym identifier corresponding to the said trader from the said pseudonym identifier storage means and transmits the same when transmitting the said identifier to the said trader registering the said pseudonym.

The present invention according to claim 20 is a device for transmitting an identifier for privacy protection for preventing an invasion of privacy performed by reading an proper identifier and on the basis of the said proper identifier, including:

pseudonym identifier storage means storing, when a personal user acts as an anonymous user by giving a pseudonym to a prescribed trader, a pseudonym identifier corresponding to the said trader; and transmission means, which is means transmitting an identifier when receiving an identifier transmission request, reading the said pseudonym identifier corresponding to the said trader from the said pseudonym identifier storage means and transmitting the same when transmitting the said identifier to the said trader.

The present invention according to claim 21 is characterized in that, in addition to the structure of the invention according to claim 20, the said transmission means reads the said pseudonym identifier from the said pseudonym identifier storage means and transmits the same when receiving an operation of the personal user for transmitting the said pseudonym identifier also when it is not the case where the personal user transmits the said identifier to the said trader to which the pseudonym is given.

The present invention according to claim 22 is characterized in that, in addition to the structure of the invention according to claim 20 or 21, the said prescribed trader is a store selling articles, the said pseudonym identifier storage means stores a pseudonym identifier corresponding to the said store registered as an anonymous user in user registration following issuance of a point card in the said store, and the said transmission means reads the said pseudonym identifier from the said pseudonym identifier storage means and transmits the same when receiving an identifier transmission request for reading, at a time of performing automatic settlement for paying for the price of an article inferred through an proper identifier transmitted from a radio identifier transmitter affixed to the said article purchased in the said store, the said proper identifier of the said radio identifier transmitter.

The present invention according to claim 23 is characterized in that, in addition the structure of the invention according to any of claims 20 to 22, the said pseudonym identifier storage means stores different pseudonym identifiers in correspondence to a plurality of the said traders respectively, and the said transmission means selects, in response to the one to which the pseudonym is given by the personal user among the said plurality of traders, the said pseudonym identifier corresponding to the said trader to which the pseudonym is given from the said pseudonym identifier storage means and transmits the same.

The present invention according to claim 24 is a program for preventing an invasion of privacy performed by reading an proper identifier and on the basis of the said proper identifier, for making a computer provided on a privacy protection identifier transmitter function as:

variable type identifier generation means, which is means generating a privacy protection identifier for disturbing a privacy invader, capable of generating an identifier different from a precedently transmitted identifier; and transmission means transmitting the identifier generated by the said variable type identifier generation means when receiving an identifier transmission request.

The present invention according to claim 25 is characterized in that, in addition to the structure of the invention according to claim 24, the said variable type identifier generation means generates the said identifier in the range of identifiers transmitted from the respective ones of radio identifier transmitters affixed to already sold articles respectively.

The present invention according to claim 26 is characterized in that, in addition to the structure of the invention according to claim 24 or 25, the said transmission means transmits the same identifier as a precedently transmitted identifier when receiving an identifier transmission request again within a prescribed time from precedent identifier transmission.

The present invention according to claim 27 is characterized in that, in addition to the structure of the invention according to any of claims 24 to 26, the said variable type identifier generation means is capable of generating an identifier so adjusted that an identifier transmitted from a person possessing the privacy protection identifier transmitter generating an identifier with the said variable type identifier generation means accords with an identifier transmitted from a stranger, who is a person different from the said person, possessing a privacy protection identifier transmitter.

The present invention according to claim 28 is characterized in that, in addition to the structure of the invention according to claim 27, the said variable type identifier generation means includes identifier storage means storing an identifier, for communicating with the said privacy protection identifier transmitter of the stranger and making the said privacy protection identifier transmitter of the stranger transmit the said identifier stored in the said identifier storage means while receiving the identifier transmitted from the said privacy protection identifier transmitter of the stranger and making the said identifier storage means store the same for sharing the same identifier as the said stranger, and the said variable type identifier generation means generates an identifier adjusted to accord with the said identifier transmitted from the stranger by reading the said shared identifier stored in the said identifier storage means when receiving an identifier transmission request.

The present invention according to claim 29 makes, in addition to the structure of the invention according to claim 27 or 2, the computer function as inhibition means inhibiting re-performance of exchange of the said identifier with a privacy protection identifier transmitter of a stranger with whom communication has been already made for transmitting/receiving and exchanging the said identifier within a prescribed period.

The present invention according to claim 30 exchanges, in addition to the structure of the invention according to any of claims 27 to 29, mutual identifiers with a privacy protection identifier transmitter of a stranger making communication by telephone, wherein the said variable type identifier generation means generates an identifier adjusted to accord with an identifier transmitted from the said stranger by reading an exchanged identifier stored in the said identifier storage means when receiving an identifier transmission request.

The present invention according to claim 31 transmits, in addition to the structure of the invention according to any of claims 27 to 30, the identifier stored in the said identifier storage means to a privacy protection identifier transmitter of a stranger along with transmission of an electronic mail while receiving an identifier transmitted from the privacy protection identifier transmitter of the stranger along with receiving of an electronic mail and letting the said identifier storage means store the same, and the said variable type identifier generation means generates an identifier adjusted to accord with the said identifier transmitted from the stranger by reading the identifier transmitted from the privacy protection identifier of the stranger stored in the said identifier storage means when receiving an identifier transmission request.

The present invention according to claim 32 is characterized in that, in addition to the structure of the invention according to any of claims 24 to 31, the said transmission means is capable of simultaneously transmitting a plurality of identifiers of a number larger than a prescribed number of identifiers simultaneously transmitted from the privacy protection identifier transmitter of a stranger, and the said variable type identifier generation means generates another identifier, excluding the said prescribed number of identifiers, included in the said plurality of identifiers as the said identifier adjusted to accord with the said identifier transmitted from the stranger.

The present invention according to claim 33 further includes, in addition to the structure of the invention according to any of claims 24 to 32, a program making the computer function as:

identifier guard means bringing an proper identifier of a radio identifier transmitter affixed to an article purchased and thereby possessed by a personal user into an identifier guard state not readable by a stranger according to the intension of the said personal user; and read means rendering the identifier of the said radio identifier transmitter in the identifier guard state readable according to the intention of the personal user.

The present invention according to claim 34 is characterized in that, in addition to the structure of the invention according to claim 33, the said identifier guard means transmits proper identification information for person in question authentication, lets the said radio identifier transmitter authenticate the same and switches to an identifier transmission stop state transmitting no identifier unless the person in question is confirmable, and the said read means brings an identifier into a transmittable state after transmitting the said proper identification information and making the said radio identifier transmitter perform the person in question authentication.

The present invention according to claim 35 is a monitoring system monitoring leakage of private information, including:

partner specifying mail address generation processing means, which is means generating an proper mail address to be used for a specific mail partner for exchanging electronic mails, performing processing for generating a partner specifying mail address allowing inference of information specifying the said mail partner; and monitor means inferring, when the mail address of a sendee of an electronic mail transmitted from a sender is the said partner specifying mail address generated by the said partner specifying mail address generation processing means, information specifying the said mail partner corresponding to the said partner specifying mail address and monitoring whether or not the said inferred information specifying the mail partner and information of the sender of the said electronic mail accord with each other.

The present invention according to claim 36 is characterized in that, in addition to the structure of the invention according to claim 35, the said partner specifying mail address generation processing means performs processing for generating the said partner specifying mail address by encrypting data including mail partner specifying information for specifying the said mail partner, and the said monitor means monitors whether or not the said mail partner specifying information and the information of the sender of the said electronic mail accord with each other by decoding the said partner specifying mail address and extracting the said mail partner specifying information.

The present invention according to claim 37 is characterized in that, in addition to the structure of the invention according to claim 36, the said partner specifying mail address generation processing means performs processing of generating the said partner specifying mail address by encrypting data specifying the mail address of the person in question intending to exchange electronic mails with the said mail partner and data specifying the mail address of the said mail partner, and the said monitor means performs processing of specifying the mail address of the said mail partner by decoding the said partner specifying mail address and monitoring whether or not the said mail address and the mail address of the sender of the said electronic mail accord with each other for storing the said electronic mail in a mail box corresponding to the said mail address of the person in question specified by decoding the said partner specifying mail address when the mail addresses accord with each other as a result of monitoring.

The present invention according to claim 38 is a monitoring system for monitoring and preventing a spam, including:

partner specifying mail address generation processing means, which is means generating an proper mail address to be used for a specific mail partner for exchanging electronic mails, performing processing for generating a partner specifying mail address allowing inference of information specifying the said mail partner; and monitor means inferring, when the mail address of a sendee of an electronic mail transmitted from a sender is the said partner specifying mail address generated by the said partner specifying mail address generation processing means, information specifying the said mail partner corresponding to the said partner specifying mail address and monitoring whether or not the said inferred information specifying the mail partner and information of the sender of the said electronic mail accord with each other.

The present invention according to claim 39 is characterized in that, in addition to the structure of the invention according to claim 38, the said partner specifying mail address generation processing means performs processing for generating the said partner specifying mail address by encrypting data including mail partner specifying information for specifying the said mail partner, and the said monitor means monitors whether or not the said mail partner specifying information and the information of the sender of the said electronic mail accord with each other by decoding the said partner specifying mail address and extracting the said mail partner specifying information.

The present invention according to claim 40 is characterized in that, in addition to the structure of the invention according to claim 39, the said partner specifying mail address generation processing means performs processing of generating the said partner specifying mail address by encrypting data specifying the mail address of the person in question intending to exchange electronic mails with the said mail partner and data specifying the mail address of the said mail partner, and the said monitor means performs processing of specifying the mail address of the said mail partner by decoding the said partner specifying mail address and monitoring whether or not the said mail address and the mail address of the sender of the said electronic mail accord with each other for storing the said electronic mail in a mail box corresponding to the said mail address of the person in question specified by decoding the said partner specifying mail address when the mail addresses accord with each other as a result of monitoring.

The present invention according to claim 41 further includes, in addition to the structure of the invention according to any of claims 38 to 40, prevention means preventing transmission of the said electronic mail when the said inferred mail partner specifying information and the information of the sender of the said electronic mail do not accord with each other as a result of monitoring by the said monitor means.

The present invention according to claim 42 is a privacy protection method for monitoring an invasion of privacy performed by reading an proper identifier related to a personal user and on the basis of the proper identifier, including:

an identifier guard step of bringing an proper identifier of a radio identifier transmitter affixed to an article purchased and thereby possessed by the personal user into an identifier guard state not readable by a stranger according to the intension of the said personal user;

a mail address notification processing step of performing, when the said personal user notifies his/her mail address to a prescribed trader as a customer or a user, processing of generating a notification mail address, which is a new notification mail address for the said trader, allowing inference of information specifying the said trader and notifying the same to the said trader;

a notified trader identifier generation step of generating a notified trader identifier corresponding to the notified trader to which the said notification mail address is notified through the said mail address notification processing step;

a transmission step of transmitting the said notified trader identifier, identical every time, generated through the said notified trader identifier generation step when transmitting an identifier to the said notified trader in response to an identifier transmission request while transmitting the said notified trader identifier when receiving an operation of the personal user for transmitting the said notified trader identifier also in a case of transmitting an identifier to a person other than the said notified trader;

an electronic mail transmission step for transmitting an electronic mail transmitted from a sender to a sendee according to a specified mail address; and a monitoring step of inferring information specifying the said notified trader corresponding to the said notification mail address when the mail address of the sendee of the electronic mail transmitted through the said electronic mail transmission step is the said notification mail address notified through the said mail address notification processing step for monitoring whether or not the said inferred information specifying the notified trader and the information of the sender of the said electronic mail accord with each other.

The present invention according to claim 43 is a privacy protection system for monitoring an invasion of privacy performed by reading an proper identifier related to a personal user and on the basis of the proper identifier, including:

mail address notification processing means performing, when the said personal user notifies his/her mail address to a prescribed trader as a customer or a user, processing of generating a notification mail address, which is a new notification mail address for the said trader, allowing inference of information specifying the said trader and notifying the same to the said trader;

notified trader identifier generation means generating a notified trader identifier corresponding to the notified trader to which the said notification mail address is notified through the said mail address notification processing means;

transmission means transmitting the said notified trader identifier, identical every time, generated by the said notified trader identifier generation means when transmitting an identifier to the said notified trader in response to an identifier transmission request while transmitting the said notified trader identifier when receiving an operation of the personal user for transmitting the said notified trader identifier also in a case of transmitting an identifier to a person other than the said notified trader; and monitor means inferring information specifying the said notified trader corresponding to the said notification mail address when the mail address of a sendee of an electronic mail transmitted from a sender is the said notification mail address notified through the said mail address notification processing means for monitoring whether or not the said inferred information specifying the notified trader and the information of the sender of the said electronic mail accord with each other.

The present invention according to claim 44 is characterized in that, in addition to the structure of the invention according to claim 43, the said mail address notification processing means includes encryption generation means generating the said notification mail address by encrypting data including notified trader specifying information for specifying a notified trader to which the mail address is notified, and the said monitor means includes:

decoding means decoding the notification mail address of the electronic mail transmitted from the sender, and determination means determining whether or not the said notified trader specifying information included in data decoded by the said decoding means and information of the sender of the said electronic mail accord with each other.

The present invention according to claim 45 is characterized in that, in addition to the structure of the invention according to claim 43 or 44, the said notified trader is a store selling articles, the said mail address notification processing means performs processing of generating a notification mail address corresponding to the said store in user registration following issuance of a point card in the said store and notifying the same, and the said transmission means transmits the said notified trader identifier corresponding to the said store at a time of performing automatic settlement according to a price of an article inferred through an proper identifier transmitted from a radio identifier transmitter affixed to the said article purchased in the said store when receiving an identifier transmission request for reading the said proper identifier of the said radio identifier transmitter.

The present invention according to claim 46 is a device for transmitting an identifier for privacy protection for preventing an invasion of privacy performed by reading an proper identifier related to a personal user and on the basis of the proper identifier, including:

notified trader identifier generation means generating a notified trader identifier corresponding to a notified trader, for which prescribed trader the said personal user generates a new notification mail address as a customer or a user for notifying the same to the said trader; and transmission means transmitting the said notified trader identifier, identical every time, generated by the said notified trader identifier generation means when transmitting an identifier to the said notified trader in response to an identifier transmission request while transmitting the said notified trader identifier when receiving an operation of the personal user for transmitting the said notified trader identifier also in a case of transmitting an identifier to a person other than the said notified trader.

EFFECTS OF THE INVENTION

According to the present invention described in claim 1, the proper identifier of the radio identifier transmitter affixed to the article purchased and thereby possessed by the personal user can be brought into the identifier guard state not readable by a stranger according to the intention of the personal user, and it is possible to prevent such inconvenience that the proper identifier of the radio identifier transmitter affixed to the purchased article is read by the stranger and an invasion of privacy is caused on the basis thereof to the utmost. Further, the identifier of the radio identifier transmitter in the identifier guard state is rendered readable according to the intention of the personal user, whereby it is possible to read the proper identifier of the radio identifier transmitter affixed to the purchased article at a necessary time when the personal user intends to receive service etc. through the identifier for enjoying the service etc.

When an identifier transmission request is received, in addition, it is possible to generate and transmit an identifier for disturbing a privacy invader with the privacy protection identifier transmitter possessed by the personal user and a variable type identifier capable of generating an identifier different from a precedently transmitted identifier can be generated, whereby respective radio identifier readers etc. can be brought into states reading different identifiers also when the identifier transmitted from the same person is read by the respective ones of radio identifier readers etc. set in a plurality of places, so that it is possible to camouflage that this is the same person and an invasion of privacy can be prevented to the utmost.

According to the present invention described in claim 2, the common identifier so adjusted that the identifier transmitted from the said personal user possessing the said privacy protection identifier transmitter is identical to an identifier transmitted from a certain stranger other than this personal user is generated in response to an identifier transmission request, and the different person identical identifier transmission phenomenon can be caused so that identical identifiers are transmitted even in case of transmission from different persons. When the privacy protection identifier transmitter capable of causing such a different person identical identifier transmission phenomenon is widespread among personal users, such reliability of determination that the sender of an identical identifier is the same person when the identical identifier is received cannot be kept for a malicious privacy invader determining that it is the same person upon according between an identifier read at a certain spot and another identifier read at another spot and intending to illegally collect and make bad use of private information of the same person. Thus, a privacy invading action based on the determination of the same person can be upset from the premise, and it is possible to effectively protect the privacy of the personal user.

Even if a great majority of personal users walk outdoors or the like while possessing purchased articles and keeping the same in a state transmitting proper identifiers from radio identifier transmitters affixed thereto, further, a disturbing effect capable of, even if the same identifier transmitted from the radio identifier transmitter affixed to an article possessed by the same person is read by the malicious privacy invader in a plurality of places, reducing such reliability that it is the same person is expectable due to spreading of this privacy protection identifier transmitter capable of transmitting the common identifier among partial users, and it is possible to also protect the privacy of a personal user not possessing this privacy protection identifier transmitter to the utmost.

According to the invention described in claim 3, the privacy protection identifier transmitters are provided to the plurality of personal users, and the privacy protection identifier transmitters are capable of generating variable type identifiers capable of generating identifiers different from precedently transmitted identifiers, and are so formed that variable type identifiers transmitted from privacy protection identifier transmitters possessed by persons different from each other respectively include common identifiers according with each other. Consequently, such a phenomenon (different person identical identifier transmission phenomenon) can be caused that the said common identifiers, which are identifiers transmitted from different persons, i.e., identifiers according with each other are transmitted. When the privacy protection identifier transmitters capable of causing this different person identical identifier transmission phenomenon are widespread among personal users, such reliability of determination that the sender of an identical identifier is the same person when the identical identifier is received cannot be kept for a malicious privacy invader determining that it is the same person upon according between an identifier read at a certain spot and another identifier read at another spot and intending to illegally collect and make bad use of private information of the same person. Thus, a privacy invading action based on the determination of the same person can be upset from the premise, and it is possible to effectively protect the privacy of the personal user.

Even if a great majority of personal users walk outdoors or the like while possessing purchased articles and keeping the same in a state transmitting proper identifiers from radio identifier transmitters affixed thereto, further, a disturbing effect capable of, even if the same identifier transmitted from the radio identifier transmitter affixed to an article possessed by the same person is read by the malicious privacy invader in a plurality of places, reducing such reliability that it is the same person is expectable due to spreading of this privacy protection identifier transmitter capable of transmitting the common identifier among partial users, and it is possible to also protect the privacy of a personal user not possessing this privacy protection identifier transmitter to the utmost.

In addition, the plurality of privacy protection identifier transmitters are classified into the groups which are groups of the privacy protection identifier transmitters transmitting the said common identifiers in a higher frequency as compared with other identifiers and having the common identifiers varying with the groups, and the privacy protection identifier transmitters belonging to each group are provided to personal users while specifying an area every group. Consequently, such a tendency results that persons in each area generate and transmit common identifiers, the aforementioned different person identical identifier transmission phenomenon can be caused between the personal users in each area to the utmost, and the aforementioned disturbing effect on the malicious privacy invader can be more effectively attained.

According to the present invention described in claim 4, the privacy protection identifier transmitter is provided to the plurality of personal users, and the privacy protection identifier transmitter is capable of generating a variable type identifier capable of generating an identifier different from a precedently transmitted identifier and is so formed that variable type identifiers transmitted from privacy protection identifier transmitters possessed by persons different from each other respectively include common identifiers according with each other. Consequently, such a phenomenon (different person identical identifier transmission phenomenon) can be caused that the said common identifiers, which are identifiers transmitted from different persons, i.e., identifiers according with each other are transmitted. When the privacy protection identifier transmitters capable of causing this different person identical identifier transmission phenomenon are widespread among personal users, such reliability of determination that the sender of an identical identifier is the same person when the identical identifier is received cannot be kept for a malicious privacy invader determining that it is the same person upon according between an identifier read at a certain spot and another identifier read at another spot and intending to illegally collect and make bad use of private information of the same person. Thus, a privacy invading action based on the determination of the same person can be upset from the premise, and it is possible to effectively protect the privacy of the personal user.

Even if a great majority of personal users walk outdoors or the like while possessing purchased articles and keeping the same in a state transmitting proper identifiers from radio identifier transmitters affixed thereto, further, a disturbing effect capable of, even if the same identifier transmitted from the radio identifier transmitter affixed to an article possessed by the same person is read by the malicious privacy invader in a plurality of places, reducing such reliability that it is the same person is expectable due to spreading of this privacy protection identifier transmitter capable of transmitting the common identifier among partial users, and it is possible to also protect the privacy of a personal user not possessing this privacy protection identifier transmitter to the utmost.

In addition, a privacy protection identifier transmitter provided to a certain personal user simultaneously transmits a previously set prescribed number of identifiers while a privacy protection identifier transmitter provided to another personal user different from the said certain personal user simultaneously transmits a plurality of identifiers of a number larger than the aforementioned prescribed number, and another identifier, excluding the prescribed number of identifiers, included in the plurality of identifiers is generated and transmitted as the aforementioned common identifier. Consequently, even if a radio identifier transmitter affixed to a purchased article carried by a personal user is in a state regularly transiting an identifier, the aforementioned different person identical identifier transmission phenomenon can be caused.

In other words, when a personal user in such a state that radio identifier transmitters affixed to purchased belongings transmit proper identifiers possesses a privacy protection identifier transmitter transmitting an identifier, it follows that both of the radio identifier transmitters affixed to the purchased belongings and the privacy protection identifier transmitter transmit identifiers to result in a state simultaneously transmitting a plurality of identifiers. A part of the plurality of identifiers is a variable type, and another part becomes an unchanging fixed type. In other words, such a phenomenon (prescribed number in multiple identifier variable type phenomenon) is caused that only a prescribed number of ones among a plurality of identifiers read respectively become different variable type identifiers while others become genuine proper identifiers transmitted from radio identifier transmitters affixed to carried articles and become identical identifiers when identifiers are read in a plurality of places. Consequently, such inconvenience results that it is found out that this is the same person when this prescribed number in multiple identifier variable type phenomenon is caused.

Therefore, the present invention provides a minority identifier transmission type privacy protection identifier transmitter simultaneously transmitting the said prescribed number of identifiers to a personal user in such a state that radio identifier transmitters affixed to purchased belongings transmit proper identifiers, and provides a majority identifier transmission type privacy protection identifier transmitter simultaneously transmitting a plurality of identifiers of a number larger than the said prescribed number to a personal user in such a state that no proper identifier is read by a stranger from purchased belongings, for example. Consequently, it follows that the former personal user simultaneously transmits the prescribed number of identifiers and the proper identifiers transmitted from the radio identifier transmitters of the carried purchased belongings while the latter personal user simultaneously transmits identifiers larger in number than the identifiers transmitted from the former personal user, and another identifier, excluding the number (prescribed number) of identifiers transmitted from the former personal user, included in the large number of identifiers is generated and transmitted as the aforementioned common identifier. Thus, in the case of the former personal user, such a phenomenon (prescribed number in multiple identifier variable type phenomenon) is caused that only the said prescribed number of ones among a plurality of identifiers read respectively become different variable type identifiers while others become genuine proper identifiers transmitted from radio identifier transmitters affixed to carried articles and become identical identifiers when identifiers are read in a plurality of places. In the latter user possessing the majority identifier transmission type privacy protection identifier transmitter, on the other hand, the prescribed number in multiple identifier variable type phenomenon is caused as well since another identifier, excluding the said prescribed number of identifiers, included in the plurality of transmitted identifiers is generated and transmittable as the aforementioned common identifier. Further, this phenomenon is caused between different persons.

Thus, even if the aforementioned prescribed number in multiple identifier variable type phenomenon is caused, this is not necessarily caused in the same person but is caused also between different persons, so that it is possible to reduce reliability of the assumption that it is the same person by the malicious privacy invader based on the prescribed number in multiple identifier variable type phenomenon and privacy can be protected to the utmost.

According to the present invention described in claim 5, the privacy protection identifier transmitter possessed by the personal user can generate and transmit an identifier when receiving an identifier transmission request while the same can generate a variable type identifier capable of generating an identifier different from a precedently transmitted identifier, whereby each radio identifier reader or the like can be brought into a state reading a different identifier even if an identifier transmitted from the same person is read by the respective ones of radio identifier readers or the like set in a plurality of places, so that it is possible to camouflage that this is the same person and an invasion of privacy can be prevented to the utmost.

According to the present invention described in claim 6, a variable type identifier is generated and transmitted in the range of identifiers transmitted from the respective ones of radio identifier transmitters affixed to the respective ones of already sold articles in addition to the effect of the invention described in claim 5, whereby the transmitted identifier cannot be distinguished from an identifier transmitted from a radio identifier transmitter affixed to an already purchased article of a consumer and it is possible to prevent such inconvenience that the transmitted identifier is found out as an identifier for disturbing a privacy invader to the utmost.

According to the present invention described in claim 7, the transmission means transmits the same identifier as the precedently transmitted identifier when receiving an identifier transmission request again within a prescribed time from precedent identifier transmission in addition to the effect of the invention described in claim 5 or 6, whereby the same identifier is transmitted even if a system of continuously transmitting an identifier transmission request a plurality of times and continuously reading the identifier a plurality of times is employed for improving reliability of a reading system in an identifier reader or the like so that inconvenience resulting from different identifiers continuously read a plurality of times can be prevented to the utmost. Even if an operation of continuously transmitting an identifier transmission request a plurality of times and continuously reading the identifier is performed similarly to the above in order to check whether it is a variable type identifier or an proper identifier transmitted from a genuine radio identifier transmitter, further, it is possible to prevent such inconvenience that it is found out that this is a variable type identifier to the utmost.

According to the present invention described in claim 8, the identifier so adjusted that the identifier transmitted from the person possessing the privacy protection identifier transmitter accords with the identifier transmitted from the stranger, who is the person different from this person, possessing the privacy protection identifier transmitter is constituted to the privacy protection identifier transmitter in addition to the effect of the invention described in any of claims 5 to 7. Consequently, such a phenomenon (different person identical identifier transmission phenomenon) can be caused that mutually according identifiers which are identifiers transmitted from different persons are transmitted. When the privacy protection identifier transmitter capable of causing this different person identical identifier transmission phenomenon is widespread among personal users, such reliability of determination that the sender of an identical identifier is the same person when the identical identifier is received cannot be kept for a malicious privacy invader determining that it is the same person upon according between an identifier read at a certain spot and another identifier read at another spot and intending to illegally collect and make bad use of private information of the same person. Thus, a privacy invading action based on the determination of the same person can be upset from the premise, and it is possible to effectively protect the privacy of the personal user.

Even if a great majority of personal users walk outdoors or the like while possessing purchased articles and keeping the same in a state transmitting proper identifiers from radio identifier transmitters affixed thereto, further, a disturbing effect capable of, even if the same identifier transmitted from the radio identifier transmitter affixed to an article possessed by the same person is read by the malicious privacy invader in a plurality of places, reducing such reliability that it is the same person is expectable due to spreading of this privacy protection identifier transmitter capable of transmitting the common identifier among partial users, and it is possible to also protect the privacy of a personal user not possessing this privacy protection identifier transmitter to the utmost.

The effect of the invention described in claim 9 makes communication between privacy protection identifier transmitters to share the same identifier as a stranger in addition to the effect of the invention described in claim 8. When an identifier transmission request is received, the shared identifier storage means reads the shared identifier stored in the said identifier storage means, thereby generating and transmitting the identifier adjusted to accord with the said identifier transmitted from the stranger. Consequently, the aforementioned different person identical identifier transmission phenomenon can be caused by generating and transmitting the common identifier in a relatively reliable method of mutually making communication and transmitting/receiving identifiers.

According to the present invention described in claim 10, the communicable communication limit range for transmitting/receiving and exchanging mutual identifiers is set within 20 meters for mutually making communication with a privacy protection identifier transmitter entering the area of the communicable communication limit range and exchanging identifiers in addition to the effect of the invention described in claim 9, whereby it follows that mutual identifiers are exchanged between personal users positioned in the relatively short distance range within 20 meters, persons positioned relatively approximate to each other enter a state capable of sharing and transmitting common identifiers, the aforementioned different person identical identifier transmission phenomenon can be caused between personal users positioned in the short distance range to the utmost, and the aforementioned disturbing effect on the malicious privacy invader can be more effectively attained.

According to the present invention described in claim 11, re-exchange of identifiers with a privacy protection identifier transmitter of a stranger already making communication and exchanging identifiers within a prescribed period can be prevented in addition to the effect described in claim 9 or 10, and it is possible to prevent waste of re-exchanging identifiers with a partner already exchanging identifiers within a prescribed period.

According to the present invention described in claim 12, the communication means has the telephone function and exchanges mutual identifiers with a privacy protection identifier transmitter of a stranger making communication by telephone in addition to the effect of the invention described in any of claims 9 to 11, whereby the aforementioned different person identical identifier transmission phenomenon can be caused by generating and transmitting the identifier adjusted to accord with the identifier transmitted from the stranger.

According to the present invention described in claim 13, the communication means has the electronic mail function for exchanging mutual identifiers by transmitting the identifier stored in the identifier storage means to the privacy protection identifier transmitter of the stranger along with transmission of the electronic mail and receiving the identifier transmitted from the privacy protection identifier transmitter of the stranger along with receiving of the electronic mail and storing the same in the identifier storage means in addition to the effects of the invention described in claims 9 to 12, whereby the aforementioned different person identical identifier transmission phenomenon can be caused by generating and transmitting the common identifier by a relatively reliable method.

According to the present invention described in claim 14, the privacy protection identifier transmitter provided to the certain personal user simultaneously transmits the previously set prescribed number of identifiers while the privacy protection identifier transmitter provided to another personal user different from the said certain personal user simultaneously transmits the plurality of identifiers of the number larger than the said prescribed number, and another identifier, excluding the said prescribed number of identifiers, included in the plurality of identifiers is generated and transmitted as the said common identifier in addition to the effect of the invention described in any of claims 5 to 13. Consequently, the aforementioned different person identical identifier transmission phenomenon can be caused even in such a state that a stranger can read an proper identifier from a purchased article possessed by a personal user.

In other words, when a personal user in such a state that radio identifier transmitters affixed to purchased belongings transmit proper identifiers possesses a privacy protection identifier transmitter transmitting an identifier, it follows that both of the radio identifier transmitters affixed to the purchased belongings and the privacy protection identifier transmitter transmit identifiers to result in a state simultaneously transmitting a plurality of identifiers. A part of the plurality of identifiers is a variable type, and another part becomes an unchanging fixed type. In other words, such a phenomenon (prescribed number in multiple identifier variable type phenomenon) is caused that only a prescribed number of ones among a plurality of identifiers read respectively become different variable type identifiers while others become genuine proper identifiers transmitted from radio identifier transmitters affixed to carried articles and become identical identifiers when identifiers are read in a plurality of places. Consequently, such inconvenience results that it is found out that this is the same person when this prescribed number in multiple identifier variable type phenomenon is caused.

Therefore, the present invention provides a minority identifier transmission type privacy protection identifier transmitter simultaneously transmitting the said prescribed number of identifiers to a personal user in such a state that radio identifier transmitters affixed to purchased belongings transmit proper identifiers, and provides a majority identifier transmission type privacy protection identifier transmitter simultaneously transmitting a plurality of identifiers of a number larger than the said prescribed number to a personal user in such a state that no proper identifier is read by a stranger from purchased belongings, for example. Consequently, it follows that the former personal user simultaneously transmits the prescribed number of identifiers and the proper identifiers transmitted from the radio identifier transmitters of the carried purchased belongings while the latter personal user simultaneously transmits identifiers larger in number than the identifiers transmitted from the former personal user, and another identifier, excluding the number (prescribed number) of identifiers transmitted from the former personal user, included in the large number of identifiers is generated and transmitted as the aforementioned common identifier. Thus, in the case of the former personal user, such a phenomenon (prescribed number in multiple identifier variable type phenomenon) is caused that only the said prescribed number of ones among a plurality of identifiers read respectively become different variable type identifiers while others become genuine proper identifiers transmitted from radio identifier transmitters affixed to carried articles and become identical identifiers when identifiers are read in a plurality of places. In the latter user possessing the majority identifier transmission type privacy protection identifier transmitter, on the other hand, the prescribed number in multiple identifier variable type phenomenon is caused as well since another identifier, excluding the said prescribed number of identifiers, included in the plurality of transmitted identifiers is generated and transmittable as the aforementioned common identifier. Further, this phenomenon is caused between different persons.

Thus, even if the aforementioned prescribed number in multiple identifier variable type phenomenon is caused, this is not necessarily caused in the same person but is caused also between different persons, so that it is possible to reduce reliability of the assumption that it is the same person by the malicious privacy invader based on the prescribed number in multiple identifier variable type phenomenon and privacy can be protected to the utmost.

According to the present invention described in claim 15, the proper identifier of the radio identifier transmitter affixed to the article purchased and thereby possessed by the personal user can be brought into the identifier guard state not readable by a stranger according to the intention of this personal user in addition to the effect of the invention described in any of claims 5 to 14, for preventing such inconvenience that the proper identifier of the radio identifier transmitter affixed to the purchased article is read by the stranger to result in privacy invasion based on the same to the utmost. Further, the identifier of the radio identifier transmitter in the identifier guard state is rendered readable according to the intention of the personal user, whereby it is possible to read the proper identifier of the radio identifier transmitter affixed to the purchased article at a necessary time when the personal user intends to receive service etc. through the identifier for enjoying the service etc.

According to the present invention described in claim 16, the identifier guard means transmits the proper identification information for the person in question authentication, lets the radio identifier transmitter authenticate the same and switches to the identifier transmission stop state transmitting no identifier unless the person in question is confirmable and the read means brings the identifier into the transmittable state after transmitting the proper identification information and making the radio identifier transmitter perform the person in question authentication in addition to the effect of the invention described in claim 15, whereby the identifier of the radio identifier transmitter can be reliably brought into a guarded state and only the person in question subjected to the person in question authentication can bring the radio identifier transmitter into the identifier transmittable state for improving security.

According to the present invention described in claim 17, the electronic certificate for the anonymous user creating the pseudonym and acting with the pseudonym is issued for protecting the privacy of the personal user, whereby the anonymous user can become the subject of transaction such as purchase and sale by presenting the issued electronic certificate. Further, the address of the anonymous user is set to the address different from that of the personal user corresponding to this pseudonym, whereby it is also possible to prevent such inconvenience that which personal user corresponds to which anonymous user is found out through the address to the utmost. In addition, anonymous information is registered as the anonymous user when performing user registration to the prescribed trader, whereby it is possible to act as the anonymous user by giving the pseudonym to the trader for performing transaction such as purchase and sale with the trader while protecting the privacy of the personal user himself/herself and enjoying service etc. by the user registration.

When the trader reads the identifier transmitted from the anonymous user while he/she acts as the anonymous user with respect to the trader registering the pseudonym, on the other hand, there is such a possibility that the trader stores the identifier in association with the anonymous information of the anonymous user. Thus, the trader has an advantage of reading identification information transmitted from a moving anonymous user on important positions, collecting/analyzing the locus of movement and storing customer information thereby effectuating marketing or the like, for example. If the user transmits the same identifier when acting as the anonymous user and also when acting as a normal personal user, however, there is such a possibility that which anonymous user is which normal personal user is found out through the identifier. According to the present invention, the pseudonym identifier storage means stores the pseudonym identifier corresponding to the trader registering the pseudonym so that the pseudonym identifier corresponding to the trader is read from the pseudonym identifier storage means and transmitted when the identifier is transmitted to the trader registering the pseudonym, whereby the pseudonym identifier can be distinguished from the identifier transmitted from the normal personal user, and such inconvenience that which anonymous user is which normal personal user is found out through the identifier can be prevented to the utmost.

According to the present invention described in claim 18, the pseudonym identifier can be read from the pseudonym identifier storage means and transmitted when receiving an operation of the personal user for transmitting the pseudonym identifier also when it is not the case of transmitting the identifier to the trader registering the pseudonym, in addition to the effect of the invention described in claim 17. Consequently, when a direct mail or an electronic mail is sent from the trader receiving the pseudonym identifier to the pseudonym corresponding to the pseudonym identifier, it is provable that the anonymous information has been illegally sold to the trader having sent the mail from the trader user-registering the pseudonym, and it is possible to monitor illegal selling of the private information.

According to the present invention described in claim 19, the anonymous information is registered as the anonymous user when performing user registration to the prescribed trader, whereby it is possible to act as the anonymous user by giving the pseudonym to the trader, for enjoying service etc. by the user registration while protecting the privacy of the personal user himself/herself.

When the trader reads the identifier transmitted from the anonymous user while he/she acts as the anonymous user with respect to the trader registering the pseudonym, on the other hand, there is such a possibility that the trader stores the identifier in association with the anonymous information of the anonymous user. Thus, the trader has an advantage of reading identification information transmitted from a moving anonymous user on important positions, collecting/analyzing the locus of movement and storing customer information thereby effectuating marketing or the like, for example. If the user transmits the same identifier when acting as the anonymous user and also when acting as a normal personal user, however, there is such a possibility that which anonymous user is which normal personal user is found out through the identifier. According to the present invention, the pseudonym identifier storage means stores the pseudonym identifier corresponding to the trader registering the pseudonym so that the pseudonym identifier corresponding to the trader is read from the pseudonym identifier storage means and transmitted when the identifier is transmitted to the trader registering the pseudonym, whereby the pseudonym identifier can be distinguished from the identifier transmitted from the normal personal user, and such inconvenience that which anonymous user is which normal personal user is found out through the identifier can be prevented to the utmost.

According to the present invention described in claim 20, the pseudonym identifier storage means stores the pseudonym identifier corresponding to the said trader when the personal user acts as the anonymous user by giving the pseudonym to the prescribed trader, so that the pseudonym identifier corresponding to the trader is read from the pseudonym identifier storage means and transmitted in the case of transmitting the identifier to the said trader when receiving an identifier transmission request. When the trader reads the identifier transmitted from the anonymous user acting as the anonymous user to the trader, there is such a possibility that the trader stores the identifier in association with the anonymous information of the anonymous user. Thus, the trader has an advantage of reading identification information transmitted from a moving anonymous user on important positions, collecting/analyzing the locus of movement and storing customer information thereby effectuating marketing or the like, for example. If the user transmits the same identifier when acting as the anonymous user and also when acting as a normal personal user, however, there is such a possibility that which anonymous user is which normal personal user is found out through the identifier. According to the present invention, the pseudonym identifier storage means stores the pseudonym identifier corresponding to the said trader so that the pseudonym identifier corresponding to the trader is read from the pseudonym identifier storage means and transmitted when the identifier is transmitted to the said trader, whereby the pseudonym identifier can be distinguished from the identifier transmitted from the normal personal user, and such inconvenience that which anonymous user is which normal personal user is found out through the identifier can be prevented to the utmost.

According to the present invention described in claim 21, the pseudonym identifier can be read from the pseudonym identifier storage means and transmitted when receiving an operation of the personal user for transmitting the pseudonym identifier also in such a case that the personal user does not transmit the said identifier to the trader to which the pseudonym is given in addition to the effect of the invention described in claim 20. Consequently, when a direct mail or an electronic mail is sent from the trader receiving the pseudonym identifier to the pseudonym corresponding to the pseudonym identifier, it is provable that the anonymous information has been illegally sold to the trader having sent the mail from the trader to which the pseudonym is given by the personal user, and it is possible to monitor illegal selling of the private information.

According to the present invention described in claim 22, it is possible to act as the anonymous user for performing article purchase or the like at the store by registering at the store as the anonymous user in the user registration following issuance of the point card in addition to the effect of the invention described in claim 20 or 21, for enjoying service of point provision while protecting the privacy of the personal user. Further, the pseudonym identifier is read from the pseudonym identifier storage means and transmitted when receiving an identifier transmission request for reading the said proper identifier of the radio identifier transmitter at the time of performing automatic settlement for paying for the price of the article inferred through the proper identifier transmitted from the radio identifier transmitter affixed to the article purchased at the store, whereby it is possible to prevent such inconvenience that which anonymous user is which normal personal user is found out through the identifier to the utmost while being capable of performing automatic settlement.

According to the present invention described in claim 23, the pseudonym identifier storage means stores the pseudonym identifiers different from each other in correspondence to the plurality of said traders respectively and the transmission means selects the pseudonym identifier corresponding to the trader to which the pseudonym is given from the pseudonym identifier storage means and transmits the same in response to the one to which the pseudonym is given by the personal user among the plurality of traders in addition to the effects of the invention described in claims 20 to 22, whereby it is possible to use pseudonym identifiers varying with traders.

According to the present invention described in claim 24, the privacy protection identifier transmitter possessed by the personal user can generate and transmit the identifier for disturbing the privacy invader when receiving an identifier transmission request while it is possible to generate the variable type identifier capable of generating an identifier different from a precedently transmitted identifier, whereby respective radio identifier readers etc. can be brought into states reading different identifiers also when the identifier transmitted from the same person is read by the respective ones of radio identifier readers etc. set in a plurality of places, so that it is possible to camouflage that this is the same person and an invasion of privacy can be prevented to the utmost.

According to the present invention described in claim 25, the variable type identifier is generated and transmitted in the range of the identifiers transmitted from the respective ones of the radio identifier transmitters affixed to the respective ones of the already sold articles in addition to the effect of the invention described in claim 24, whereby the transmitted identifier cannot be distinguished from an identifier transmitted from a radio identifier transmitter affixed to an already purchased article of a consumer and it is possible to prevent such inconvenience that the transmitted identifier is found out as an identifier for disturbing a privacy invader to the utmost.

According to the present invention described in claim 26, the transmission means transmits the same identifier as the precedently transmitted identifier when receiving an identifier transmission request again within the prescribed time from the precedent identifier transmission in addition to the effect of the invention described in claim 24 or 25, whereby the same identifier is transmitted even if a system of continuously transmitting an identifier transmission request a plurality of times and continuously reading the identifier a plurality of times is employed for improving reliability of a reading system in an identifier reader or the like so that inconvenience resulting from different identifiers continuously read a plurality of times can be prevented to the utmost. Even if an operation of continuously transmitting an identifier transmission request a plurality of times and continuously reading the identifier is performed similarly to the above in order to check whether it is a variable type identifier or an proper identifier transmitted from a genuine radio identifier transmitter, further, it is possible to prevent such inconvenience that it is found out that this is a variable type identifier to the utmost.

According to the present invention described in claim 27, the privacy protection identifier transmitter transmits the identifier so adjusted that the identifier transmitted from the person possessing the privacy protection identifier transmitter generating the identifier with the variable type identifier generation means accords with the identifier transmitted from a stranger, who is a person different from the person, possessing the privacy protection identifier transmitter in addition to the effect of the invention described in any of claims 24 to 26. Consequently, such a phenomenon (different person identical identifier transmission phenomenon) can be caused that identifiers, which are identifiers transmitted from different persons, according with each other are transmitted. When the privacy protection identifier transmitters capable of causing this different person identical identifier transmission phenomenon are widespread among personal users, such reliability of determination that the sender of an identical identifier is the same person when the identical identifier is received cannot be kept for a malicious privacy invader determining that it is the same person upon according between an identifier read at a certain spot and another identifier read at another spot and intending to illegally collect and make bad use of private information of the same person. Thus, a privacy invading action based on the determination of the same person can be upset from the premise, and it is possible to effectively protect the privacy of the personal user.

Even if a great majority of personal users walk outdoors or the like while possessing purchased articles and keeping the same in a state transmitting proper identifiers from radio identifier transmitters affixed thereto, further, a disturbing effect capable of, even if the same identifier transmitted from the radio identifier transmitter affixed to an article possessed by the same person is read by the malicious privacy invader in a plurality of places, reducing such reliability that it is the same person is expectable due to spreading of this privacy protection identifier transmitter capable of transmitting the common identifier among partial users, and it is possible to also protect the privacy of a personal user not possessing this privacy protection identifier transmitter to the utmost.

The effect of the invention described in claim 28 makes communication between privacy protection identifier transmitters for transmitting/receiving mutually stored identifiers and exchanging the mutual identifiers in addition to the effect of the invention described in claim 27. When receiving an identifier transmission request, the identifier adjusted to accord with the identifier transmitted from the stranger is transmitted. Consequently, the aforementioned different person identical identifier transmission phenomenon can be caused by the relatively reliable method of mutually making communication and exchanging identifiers.

According to the present invention described in claim 29, identifiers can be exchanged again with the privacy protection identifier transmitter of a stranger already making communication and exchanging identifiers within the prescribed period, and it is possible to prevent waste of re-exchanging identifiers with a partner already exchanging identifiers within a prescribed period in addition to the effect described in claim 27 or 28.

According to the present invention described in claim 30, the communication means has the telephone function for exchanging mutual identifiers with the privacy protection identifier transmitter of the stranger making communication by telephone in addition to the effect of the invention described in any of claims 27 to 29, whereby the aforementioned different person identical identifier transmission phenomenon can be caused by generating and transmitting the common identifier by a relatively reliable method.

According to the present invention described in claim 31, the communication means has the electronic mail function for exchanging mutual identifiers by transmitting the identifier stored in the identifier storage means to the privacy protection identifier transmitter of the stranger along with transmission of the electronic mail and receiving the identifier transmitted from the privacy protection identifier transmitter of the stranger along with receiving of the electronic mail and storing the same in the identifier storage means in addition to the effects of the invention described in claims 27 to 30, whereby the aforementioned different person identical identifier transmission phenomenon can be caused by generating and transmitting the common identifier by a relatively reliable method.

According to the present invention described in claim 32, the privacy protection identifier transmitter provided to the certain personal user simultaneously transmits the previously set prescribed number of identifiers while the privacy protection identifier transmitter provided to another personal user different from the said certain personal user simultaneously transmits the plurality of identifiers of the number larger than the said prescribed number, and another identifier, excluding the said prescribed number of identifiers, included in the plurality of identifiers is generated and transmitted as the said common identifier in addition to the effect of the invention described in any of claims 24 to 31. Consequently, the aforementioned different person identical identifier transmission phenomenon can be caused even in such a state that a stranger can read an proper identifier from a purchased article possessed by a personal user.

In other words, when a personal user in such a state that radio identifier transmitters affixed to purchased belongings transmit proper identifiers possesses a privacy protection identifier transmitter transmitting an identifier, it follows that both of the radio identifier transmitters affixed to the purchased belongings and the privacy protection identifier transmitter transmit identifiers to result in a state simultaneously transmitting a plurality of identifiers. A part of the plurality of identifiers is a variable type, and another part becomes an unchanging fixed type. In other words, such a phenomenon (prescribed number in multiple identifier variable type phenomenon) is caused that only a prescribed number of ones among a plurality of identifiers read respectively become different variable type identifiers while others become genuine proper identifiers transmitted from radio identifier transmitters affixed to carried articles and become identical identifiers when identifiers are read in a plurality of places. Consequently, such inconvenience results that it is found out that this is the same person when this prescribed number in multiple identifier variable type phenomenon is caused.

Therefore, the present invention provides a minority identifier transmission type privacy protection identifier transmitter simultaneously transmitting the said prescribed number of identifiers to a personal user in such a state that radio identifier transmitters affixed to purchased belongings transmit proper identifiers, and provides a majority identifier transmission type privacy protection identifier transmitter simultaneously transmitting a plurality of identifiers of a number larger than the said prescribed number to a personal user in such a state that no proper identifier is read by a stranger from purchased belongings, for example. Consequently, it follows that the former personal user simultaneously transmits the prescribed number of identifiers and the proper identifiers transmitted from the radio identifier transmitters of the carried purchased belongings while the latter personal user simultaneously transmits identifiers larger in number than the identifiers transmitted from the former personal user, and another identifier, excluding the number (prescribed number) of identifiers transmitted from the former personal user, included in the large number of identifiers is generated and transmitted as the aforementioned common identifier. Thus, in the case of the former personal user, such a phenomenon (prescribed number in multiple identifier variable type phenomenon) is caused that only the said prescribed number of ones among a plurality of identifiers read respectively become different variable type identifiers while others become genuine proper identifiers transmitted from radio identifier transmitters affixed to carried articles and become identical identifiers when identifiers are read in a plurality of places. In the latter user possessing the majority identifier transmission type privacy protection identifier transmitter, on the other hand, the prescribed number in multiple identifier variable type phenomenon is caused as well since another identifier, excluding the said prescribed number of identifiers, included in the plurality of transmitted identifiers is generated and transmittable as the aforementioned common identifier. Further, this phenomenon is caused between different persons.

Thus, even if the aforementioned prescribed number in multiple identifier variable type phenomenon is caused, this is not necessarily caused in the same person but is caused also between different persons, so that it is possible to reduce reliability of assumption that it is the same person by the malicious privacy invader based on the prescribed number in multiple identifier variable type phenomenon According to the present invention described in claim 33, the proper identifier of the radio identifier transmitter affixed to the article purchased and thereby possessed by the personal user can be brought into the identifier guard state not readable by a stranger according to the intention of this personal user in addition to the effect of the invention described in any of claims 24 to 32, for preventing such inconvenience that the proper identifier of the radio identifier transmitter affixed to the purchased article is read by the stranger to result in privacy invasion based on the same to the utmost. Further, the identifier of the radio identifier transmitter in the identifier guard state is rendered readable according to the intention of the personal user, whereby it is possible to read the proper identifier of the radio identifier transmitter affixed to the purchased article at a necessary time when the personal user intends to receive service etc. through the identifier for enjoying the service etc.

According to the present invention described in claim 34, the identifier guard means transmits the proper identification information for the person in question authentication, lets the radio identifier transmitter authenticate the same and switches to the identifier transmission stop state transmitting no identifier unless the person in question is confirmable and the read means brings the identifier into the transmittable state after transmitting the proper identification information and making the radio identifier transmitter perform the person in question authentication in addition to the effect of the invention described in claim 33, whereby the identifier of the radio identifier transmitter can be reliably brought into a guarded state and only the person in question subjected to the person in question authentication can bring the radio identifier transmitter into the identifier transmittable state for improving security.

According to the present invention described in claim 35, information specifying the mail partner inferred from the partner specifying mail address of the electronic mail and the information of the sender of the electronic mail are so compared with each other that it is confirmable that both do not accord with each other when the private information of the partner specifying mail address used for the mail partner is leaked and a person illegally obtaining the private information transmits the electronic mail to the partner specifying mail address as the private information, and it is possible to ascertain that there is a high possibility that the private information has been leaked from the inferred mail partner and that there is a high possibility that the sender of the electronic mail has illegally obtained the leaked private information.

According to the present invention described in claim 36, the mail partner specifying information can be inferred from the data of the partner specifying mail address itself, and it is possible to prevent such inconvenience that the quantity of registration data of mail partner specifying information in a case of notifying the partner specifying mail address to a large number of partners respectively becomes enormous as compared with a method of registering corresponding mail partner specifying information every partner specifying mail address, for example.

According to the present invention described in claim 37, the mail address of the person in question can also be extracted by decoding the partner specifying mail address for monitoring, whereby convenience is improved.

According to the present invention described in claim 38, the information specifying the mail partner inferred from the partner specifying mail address of the electronic mail and the information of the sender of the electronic mail are so compared with each other that it is confirmable that both do not accord with each other when a person other than the mail partner to which the partner specifying mail address has been notified transmits the electronic mail to the partner specifying mail address, for preventing transmission of the improper electronic mail.

According to the present invention described in claim 39, the mail partner specifying information can be inferred from the data of the partner specifying mail address itself, and it is possible to prevent such inconvenience that the quantity of registration data of mail partner specifying information in a case of notifying the partner specifying mail address to a large number of partners respectively becomes enormous as compared with a method of registering corresponding mail partner specifying information every partner specifying mail address, for example.

According to the present invention described in claim 40, the mail address of the person in question can also be extracted by decoding the partner specifying mail address for monitoring, whereby convenience is improved.

According to the present invention described in claim 41, receipt of a junk mail can be reliably prevented by the prevention means According to the present invention described in claim 42, the personal user generates the notification mail address, which is a new notification mail address for the trader, allowing inference of the information specifying the trader and notifies the same to the trader when notifying his/her mail address to the prescribed trader. Then, he/she generates the notified trader identifier corresponding to the notified trader and transmits the same notified trader identifier to the notified trader to which the notification mail address has been notified every time while bringing the proper identifier of the radio identifier transmitter affixed to the article possessed by the personal user into the identifier guard state not readable by a stranger according to the intention of the personal user. Even if the notification mail address notified to the notified trader and the notified trader identifier transmitted to the notified trader are linked with each other and the private information is leaked in this state, it is possible to infer from which notified trader his/her private information has been leaked in the following manner:

The aforementioned notified trader identifier is transmitted when receiving an operation of the personal user for transmitting the aforementioned notified trader identifier also in a case of transmitting an identifier to a person other than the aforementioned notified trader in response to an identifier transmission request. When the person receiving the notified trader identifier retrieves leaked private information on the basis of the notified trader identifier, infers the corresponding private information and transmits an electronic mail to the personal user on the basis of the aforementioned notification mail address included in the private information, information specifying the notified trader to which the notification mail address has been notified can be inferred from the notification mail address since this notification mail address is the mail address for the notified trader newly generated as that for the aforementioned notified trader. Whether or not the information specifying the inferred notified trader and the information of the sender transmitting the electronic mail accord with each other is monitored so that it is clarified that there is a high possibility that the sender of the electronic mail has transmitted the electronic mail on the basis of the private information leaked from the aforementioned notified trader when the informations do not accord with each other.

Which notified trader has a high possibility of leaking the private information is proved by such monitoring through according property checking between the sender of the electronic mail and the notification mail address of the electronic mail, while it is provable that there is a high possibility that the sender having transmitted the electronic mail has obtained the leaked private information to transmit the electronic mail. Thus, an effect of inhibiting transmission of the electronic mail through the leaked private information can be expected.

According to the present invention described in claim 43, the personal user generates the notification mail address, which is a new notification mail address for the trader, allowing inference of the information specifying the trader and notifies the same to the trader when notifying his/her mail address to the prescribed trader. Then, he/she generates the notified trader identifier corresponding to the notified trader and transmits the same notified trader identifier to the notified trader to which the notification mail address has been notified every time, when receiving an identifier transmission request. Even if the notification mail address notified to the notified trader and the notified trader identifier transmitted to the notified trader are linked with each other and the private information is leaked in this state, it is possible to infer from which notified trader his/her private information has been leaked in the following manner:

The aforementioned notified trader identifier is transmitted when receiving an operation of the personal user for transmitting the aforementioned notified trader identifier also in a case of transmitting an identifier to a person other than the aforementioned notified trader in response to an identifier transmission request. When the person receiving the notified trader identifier retrieves leaked private information on the basis of the notified trader identifier, infers the corresponding private information and transmits an electronic mail to the personal user on the basis of the aforementioned notification mail address included in the private information, information specifying the notified trader to which the notification mail address has been notified can be inferred from the notification mail address since this notification mail address is the mail address for the notified trader newly generated as that for the aforementioned notified trader. Whether or not the information specifying the inferred notified trader and the information of the sender transmitting the electronic mail accord with each other is monitored so that it is clarified that there is a high possibility that the sender of the electronic mail has transmitted the electronic mail on the basis of the private information leaked from the aforementioned notified trader when the informations do not accord with each other.

Which notified trader has a high possibility of leaking the private information is proved by such monitoring through according property checking between the sender of the electronic mail and the notification mail address of the electronic mail, while it is provable that there is a high possibility that the sender having transmitted the electronic mail has obtained the leaked private information to transmit the electronic mail. Thus, an effect of inhibiting transmission of the electronic mail through the leaked private information can be expected.

According to the present invention described in claim 44, the aforementioned notification mail address is generated by encrypting the data including the notified trader specifying information for specifying the notified trader to which the mail address is notified, and the notification mail address of the electronic mail transmitted from the sender is decoded for performing according property checking by determining whether or not the notified trader specifying information included in the decoded data and the information of the sender of the electronic mail accord with each other in monitoring by according property checking of the sender of the electronic mail and the notification mail address, in addition to the effect of the present invention described in claim 43. Consequently, the notification mail address of the transmitted electronic mail itself includes the notified trader specifying information specifying the notified trader for according property checking, the notified trader specifying information can be easily obtained by decoding, and the according property checking can be easily performed.

According to the present invention described in claim 45, the notified trader identifier corresponding to the store is transmitted when receiving an identifier transmission request for reading the proper identifier of the radio identifier transmitter at the time of performing automatic settlement according to the price of the article inferred through the proper identifier transmitted from the radio identifier transmitter affixed to the article purchased at the store to which user registration has been performed following issuance of the point card, whereby the aforementioned monitoring by according property checking is enabled when an electronic mail based on the private information leaked from the sore is transmitted, while the automatic settlement can be performed.

According to the present invention described in claim 46, the notified trader identifier is transmitted when receiving an operation of the personal user for transmitting the notified trader identifier also in the case of transmitting the identifier to a person other than the notified trader in response to an identifier transmission request. When a person receiving the notified trader identifier retrieves leaked private information on the basis of the notified trader identifier, infers the corresponding private information and transmits an electronic mail to the personal user on the basis of the aforementioned notification mail address included in the private information, information specifying the notified trader to which the notification mail address has been notified can be inferred from the notification mail address since this notification mail address is the mail address for the notified trader newly generated as that for the aforementioned notified trader. Whether or not the information specifying the inferred notified trader and the information of the sender transmitting the electronic mail accord with each other is monitored so that it is clarified that there is a high possibility that the sender of the electronic mail has transmitted the electronic mail on the basis of the private information leaked from the aforementioned notified trader when the informations do not accord with each other.

Which notified trader has a high possibility of leaking the private information is proved by such monitoring through according property checking between the sender of the electronic mail and the notification mail address of the electronic mail, while it is provable that there is a high possibility that the sender having transmitted the electronic mail has obtained the leaked private information to transmit the electronic mail. Thus, an effect of inhibiting transmission of the electronic mail through the leaked private information can be expected.

BEST MODES FOR CARRYING OUT THE INVENTION

An embodiment of the present invention is now described in detail with reference to the drawings. FIG. 1, showing a network system utilizing the broadband, is a block diagram showing the overall outline. The system is so constituted that a credit card issuing company group 4, a member store contract company group 5, a receiving station 42, a member store group 6, a supplier group S, an NM group (a new middleman group) 48, an electronic administration group 49, an XML store 50, a contents provider group 51, a signal 52, a gateway 53 connected to a portable telephone network 54, the Internet I, a user's house 47, an authentication station group 46, a convenience store group 2, a company group 45, a data center 44, a life support center 8, a broadcast station 41, a financial institution group 7 etc. can transmit/receive information through a broadband/large capacity relay network 43. Referring to the figure, numeral 40 denotes a satellite (satellite) employed for relaying broadcasting waves from the broadcast station 41 and sending the waves to the receiving station 4.

The credit card issuing company group 4 is a card issuing group exhibiting a function as an issuer when settling accounts by SET (Secure Electronic Transaction), for example. The member store contract company group 5 is a company consisting of a financial institution or the like contracting with the member store group 6 constituting an electronic mail or the like, and an institution functioning as an acquirer in SET. The supplier group S denotes an article maker or the like, and an institution providing articles and information. The NM group 48 is a service trader mediating between the supplier group S and a consumer (a natural person or a corporate body) for supporting consumer's consuming action such as shopping, for example. While a conventional middleman such as a wholesaler or a trading company supports sales of the supplier group, this NM group 48 is different in a point that the same supports purchase (supports consuming action) of the consumer. More specifically, a service provider storing preference information, purchase history information, access history information to a Web site etc. of the consumer as a database and recommending article information etc. suitable for the consumer on the basis of stored profile information (private information) of the consumer for helping the consuming action of the consumer corresponds to this NM group 48.

The electronic administration group 49 is formed by bringing administration of a city office, a tax office or central government agencies, for example, into an electronic state. The XML store 50 denotes a database storing data by a unified data structure according to XML while providing prescribed data to a data requester at need. The XML store 50 stores various types of private information of the user and a user agent (including knowledge data for the agent). The XML store 50 is constituted to be capable of providing necessary data when accessed by the financial institution group 7 or the user while performing person in question authentication and keeping security. The contents provider group 51 denotes a trader group providing various contents such as images, characters, sounds etc. through the network. The signal 52 for traffic control is also connected to the broadband/large capacity relay network 43 and constituted to be remote-controllable.

The system is so constituted that radio waves of a browser phone (portable telephone) 30 are transmitted to the base station 55 connected to the portable telephone network 45 to be capable of accessing the financial institution group 7, the member store group 6, the NM group 48, the electronic administration group 49, the XML store 50, the contents provider group 51 etc. through the base station 55, the portable telephone network 45, the gateway 53 and the broadband/large capacity relay network 43. A vehicle 56 is also constituted to be capable of accessing various service providers and various institutions through the base station 55, the portable telephone network 54, the gateway 53 and the broadband/large capacity relay network 54.

The authentication station group 46 is an institution issuing an electronic certificate to a desirer for issuance of the electronic certificate after performing person in question authentication. The data center 44 denotes an institution storing and managing various data distributed from the broadcast station 41 by radio. In order to transmit large capacity data when the user requests transmission of prescribed information to the member store group 6, the supplier group S, the NM group 48, the electronic administration group 49, the contents provider group 51 or the like, the data center 44 temporarily stores data distributed by these respective institutions and service providers so that the broadcast station 41 distributes the data by radio when a prescribed day comes and the receiving station 42 distributes the received data to prescribed users through the broadband/large capacity relay network 43.

Numeral 8 denotes the life support center. This life support center 8 is an institution collecting private information of the user and providing a service of recommending dreams, a life plan, a type of occupation, hobbies etc. suitable for the user on the basis of the private information and recommending member stores (including new middlemen) providing various articles and information necessary for implementing these.

Referring to FIG. 1, portions shown by double lines denote a wireless LAN, a CATV, a satellite, an xDSL (digital subscriber line), FTTH (fiber to the home) etc.

According to this embodiment, not only the authentication station group 46 but also the financial institution group 7 issues an electronic certificate. Referring to FIG. 1, numeral 19 denotes an IC terminal carried by the user, which stores the profile information (private information) of the user etc. as described later.

FIG. 2 is an explanatory diagram for illustrating the financial institution 7. The financial institution 7 comprises a VP management server 9, a settlement server 10, an authentication server 11 and databases 12*a* and 12*b*. The VP management server 11 is a server for managing a virtual person (hereinafter simply referred to as "VP") as a virtual person. The VP denotes a virtual person, acting on a network, not existing in the actual world, and denotes a virtual person created for allowing a real person (hereinafter simply referred to as "RP") who is a real person in the actual world to pretend to be the VP and act as the VP when acting on the network. Further, the RP may pretend to be the VP and act as the VP not only when acting on the network but also when acting in the actual world, as described later.

The VP management server 9 has a function of deciding prescribed information such as the name and the address of the VP and storing the data of the VP in the database 12*a* when receiving a birth request for the VP from the RP as described later. This VP management server 9 also has a function of creating and issuing an electronic certificate for the VP. When the VP takes legal action such as buying and selling or settlement, it is possible to individually take the legal action as the virtual person by transmitting this electronic certificate to the other party.

The authentication server 11 has a function of creating and issuing an electronic certificate for the RP. The settlement server 10 set in the financial institution 7 has a function of performing processing for not only settling accounts with electronic money or a debit card by the RP but also settling accounts with electronic money or a debit card as the VP.

The database 12*a* stores data related to the RP and the VP. The database 12*b* stores data for managing sites (traders) connected to the broadband/large capacity relay network 43 and the Internet I.

As shown in FIG. 2, the database 12*a* stores the name, the address, an authentication key KN, a public key KT, an account number etc. of the RP as the data for the RP. The authentication key is a key for performing person in question authentication by a common key cipher system when the RP accesses the financial institution 7. The public key is a key employed for a public key cipher system, and a key paired with a secret key. The account number denotes the number of an account opened by the RP in this financial institution 7.

Trap information is information for setting a trap (trap) for deducing the criminal when a site (trader) collects private information and illegally circulates the same. When the VP transfers his/her private information to a certain trader (first transferee), for example, he/she employs a name specific to the first transferee. In other words, the VP has a plurality of types of his/her names and uses the same every site (trader). Such a VP name is referred to as a trap type VP name for convenience. When a direct mail or an E-mail is sent from a trader in this case, the addressee of the mail must be the trap type VP name. If the site (trader) sending the mail is a site (trader) different from the first transferee deduced from the trap type VP name and exceeds disclosure tolerance (circulation tolerance) of the transferred private information of his/hers, it follows that the private information has been illegally disclosed (circulated) by the first transferee. Thus, it is possible to deduce the first transferee performing illegal circulation (illegal disclosure) from the trap type VP name.

Referring to FIG. 2, Jiro has double information, i.e., second trap information, third trap information, second private information and third private information. Jiro registers these double types of information in the financial institution 7 in order to act as these two VPs when acting on the network. The address of the VP denotes the address of a convenience store 2 desired by the RP or near to the address of the RP, as described later. Consequently, it follows that an article electronically shopped by the VP is delivered to the convenience store 2 which is the address of the VP. The RP can pretend to be the VP, go to the convenience store 2 and receive the delivered article. Thus, it is possible to prevent such inconvenience that the association between the VP and the RP is revealed with the clue of the address.

FIG. 3 shows the details of the trap information shown in FIG. 2. Each trap information of the first trap information, the second trap information, . . . includes a name (trap type VP name), a public key, an E-mail address, a virtual account number and a virtual credit number every site name (trader name). When the VP accesses a site name (trader name) ABC, for example, he/she employs B13P which is his/her real name, employs a public key KPB' paired with the VP's secret key KSB, employs ○□X ΔX which is the VP's real E-mail address, employs 2503 which is the VP's real account number and employs 3288 which is the VP's real credit number.

When accessing a site name (trader name) MTT (when performing a automatic settlement shown in FIG. 30 in MTT), on the other hand, the VP employs E(B13P) created by encrypting the real name of the VP with the VP's secret key once as the name of the trap type VP. As the secret key, he/she employs $E_{KSB}$(KSB) created by encrypting the VP's real secret key KSB with the VP's real secret key KSB once. The database 12*a* stores the public key KPB for this secret key $E_{KSB}$(KSB). As the E-mail address, he/she employs an E-mail address ΔΔΔΔΔ opened by the financial institution 7 for the trap type VP. As the account number, he/she employs E(2503) created by encrypting the VP's real account number with the VP's real secret key once as a virtual account number. As to the credit number, he/she employs E(3288) created by encrypting the VP's real credit number with the VP's real secret key once.

When accessing a site name (trader name) MEC (when performing a automatic settlement shown in FIG. 30 in MEC), further, he/she employs E2(B13P) created by encrypting the VP's real name with the VP's secret key twice as the trap type VP name.

When the VP acts on the network etc., with the trap type VP name E2(B13P), he/she employs a twice encrypted secret key E2KSB(KSB) created by encrypting the secret key KSB with the secret key KSB twice. The public key paired with the twice encrypted secret key is KPB". As to the E-mail address, he/she employs ΔΔΔΔΔ opened by the financial institution 7 as the E-mail address for the trap type VP. As to the virtual account number, he/she employs E2(2503) created by encrypting the VP's real account number with the secret key twice. As to the credit number, he/she employs a virtual credit number E2(3288) created by encrypting the VP's real credit number with the VP's secret key twice.

Thus, the number of times for encrypting the trap information varies with the site name. Private information provided to the site (the trader) finally returns to the possessor of the private information in the form of an E-mail or a direct mail. The aim of this trap information is to be capable of tracing the criminal setting a trap through the feedback loop of this private information and illegally circulating the private information. In other words, the trap information is employed for the opposite of a tracking type cookie for tracing the user on the net.

FIG. 4 is a diagram illustrating the private information of the VP shown in FIG. 2. Each private information of the first private information, the second private information, the third private information, . . . is constituted by collecting a plurality of types of private information of private information A, private information B, . . . For example, the private information A includes the age, the sex, the occupation, the annual income etc., and the private information B is information related to the VP's preferences.

As shown in FIG. 4, a digital signature is assigned to each private information with the secret key KS of the financial institution 7. As to the private information A of the first private information, for example, $D_{KS}$(○○Δ) which is a digital signature is assigned to the private information of ○○Δ itself.

As to each private information stored in this database 12*a*, the financial institution 7 checks trueness/falseness thereof, stores only the correct one in the database 12*a* and assigns the digital signature for authenticating the correctness.

FIG. 5 is a diagram showing the structure of the XML store 50. A database 72 and a server 71 controlling the same are set in the XML store 50. The server 71 also has a function of performing person in question authentication on a person accessing the XML store 50 and controlling his/her access.

The database 72 stores data expressed in XML. The contents of the data include B13P, for example, which is the VP's name and a VP user agent (including knowledge data) as VP information, a site name (a trader name) such as ABC, for example, an electronic certificate issued to a VP accessing the site(the trader), private information of the VP, the privacy policy of this site(this trader), a digital signature DKSB (private information+policy) assigned by this VP to both information and a digital signature DKSA (private information+policy) assigned by this site (this trader) ABC as site (trader)

information, an encryption count "0" as trap information and ○□XΔX which is the VP's E-mail address. When the VP accesses the site name (the trader name) MTT, further, the data include an electronic certificate issued to the trap type VP accessing the site name (the trader name) MTT, private information provided by the trap type VP to the site (the trader), the privacy policy of the site (the trader), the digital signature of the trap type VP and the digital signature of the site (the trader) for both information, an encryption count "1" as the trap information and the E-mail address.

Also as to information of another VP whose name is NPXA, the database 72 stores items similar to the above. This database 72 stores data in the aforementioned items for an extremely large number of VPs.

As to the site name (the trader name) ABC, the VP employs information not encrypted once as the trap information as described with reference to FIG. 3, and hence the encryption count stored in the database 72 is also "0". As to the site name MTT, the VP employs the information encrypted once as the trap information as described with reference to FIG. 4, and hence the encryption count stored in the database 72 is also "1".

The aforementioned VP user agent denotes self-contained software operating for the VP who is the user. This VP user agent is constituted by a mobile agent to be movable through the network.

Each data shown in FIGS. 2 to 5 may be stored in each database in an encrypted state. Thus, the data cannot be decoded even if the same is stolen, and hence reliability in security is improved. If the VP (including a trap type VP) takes unpardonable illegal action (action against the criminal law, for example) on the network, for example, the VP may be retrieved from the database 12*a* or the like in response to a request or the like from a prescribed institution (police or the like, for example) for deducing the RP corresponding to the VP and providing the address, the name etc. of the RP to the prescribed institution (police or the like, for example) making the request.

FIG. 6 is a diagram showing the structure of the convenience store 2. A database 75, a server 74 connected thereto and a terminal 73 connected to the server are set in the convenience store 2. The database 75 stores the names of VPs (including trap type VPs) having the address in this convenience store along with article keep information, E-mail addresses, customer management information etc. in association with these names respectively.

When an article purchased by the VP of B13P is delivered to this convenience store 2, the database 75 stores "article from ABC company kept, unsettled" in the storage area for B13P as article keep information. This term unsettled denotes such a state that B13P has purchased the article through the network but not paid therefor.

The database 75 stores E-mail addresses in the column of E-MAIL ADDRESS in correspondence to the respective VPs. B13P is not a trap type VP, and hence the database 75 stores ○□XΔX which is the VP's real E-mail address.

Also for E(B13P) who is a trap type VP, the database 75 stores "article from MTT company kept, settled", for example, as article keep information. E(B13P) is a trap type VP, and hence the database 75 stores an E-mail address opened in the financial institution 7 for the trap type VP.

When a customer coming to the convenience store 2 for receiving an article as a VP (including a trap type VP) keeps the article with respect to a VP (including a trap type VP) registered in this convenience store 2, the server 74 performs processing for delivering the article to the VP (including a trap type VP), as described later.

The convenience store 2 provides not only the keeping service for articles but also a keeping service for direct mails for the VPs. This is because the VPs have the address in the convenience store 2 and the direct mails addressed to the VPs are sent to the convenience store 2.

FIG. 7 is a front elevational view showing the browser phone 30 as an exemplary terminal employed by the user. The browser phone 30 comprises a microcomputer 199. This microcomputer 199 comprises a CPU (Central Processing Unit) 197, an I/O port 198, a ROM 195, an EEPROM 194 and a RAM 196. This browser phone 30 comprises a USB (Universal Serial Bus) port, and is so constituted that an IC terminal 19R, 19V or 19I can be inserted in the USB port. The IC terminal 19R is an IC terminal for the R. The IC terminal 19V is an IC terminal for the VP. The IC terminal 19I, storing data and a program for the VP issued by the financial institution, is delivered to the user as described later, and it follows that the browser phone 30 stores the data and software stored in the IC terminal 19I when the delivered IC terminal 191I is inserted into the USB port of the browser phone 30. The respective IC terminals 19R, 19V and 19I may be constituted of IC cards.

FIG. 8 is an explanatory diagram for illustrating the IC terminal 19V for the VP. The IC terminal 19V for the VP is constituted to be attachable/detachable to/from a USB port 18 of the browser phone 30 as described above, so that information can be transferred/received to/from the browser phone 30 when inserted into the USB port 18, to be usable.

An LSI chip 20 is built in the IC terminal 19V for the VP. This LSI chip 20 is provided with a CPU 24 serving as a control center, a ROM 25 storing operation programs for the CPU 24, a RAM 22 serving as a work area of the CPU 24, an EEPROM 26 capable of electrically erasing stored data, a coprocessor 23, an I/O port 21 for inputting/outputting data from/to the exterior etc., which are connected with each other through a bus.

The EEPROM 26 stores Mondex (including reload sum data), which is a program for electronic money, other various application software programs, an electronic certificate issued for the VP, an identification number and a trap type RFID. This trap type RFID is an RFID stored for transmitting, when the user acts as a trap type VP, an RFID corresponding to the trap type VP. This is described later in more detail.

Further, the IC terminal 19V for the VP has a function as the user agent for the VP, and stores various knowledge data such as debit card information, credit card information, the name and the address of the VP, the E-mail address of the VP, the public key KP and the secrete key KS of the VP, the authentication key KN of the RP,-the age, the occupation etc. of the VP, various preference information of the VP, the family structure of the VP, etc. as knowledge data for the user agent.

The IC terminal 19R for the RP also has a structure substantially similar to that of the IC terminal 19V for the VP shown in FIG. 8. As to the point of difference, the contents of knowledge data for the user agent recorded in an EEPROM 26 are different. More specifically, the EEPROM 26 stores the name and the address of the RP in place of the name and the address of the VP, the E-mail address of the RP in place of the E-mail address of the VP, the public key and the secret key of the RP in place of the public key and the secret key of the VP, the age, the occupation etc. of the RP in place of the age, the occupation etc. of the VP, various preference information of the RP in place of the various preference information of the VP, and the family structure of the RP in place of the family structure of the VP. It stores no trap type RFID.

When the family of the RP corresponding to the VP creates VPs, the family structure of the VP is constituted by data such as the names, the addresses, the ages etc. of the created VPs. In other words, it follows that the storage area for the family structure of this VP stores data of the family of the VP corresponding to the family of the RP, i.e., a virtual family.

FIG. 9 is a diagram showing the details of the trap type RFID shown in FIG. 8. A storage area of the trap type RFID stores the trap type RFID corresponding to the VP name every VP name. If the VP registers a trap type VP name E(B13P) when creating a point card or the like as the VP at a trader NTT such as a mass marketer, for example, he/she transmits mtt which is a trap type RFID corresponding to E(B13P) from the browser phone (portable telephone) 30 when taking action such as shopping at this trader. Therefore, the trap type RFID is stored in correspondence to each trap type VP. If he/she transmits mtt which is the trap type RFID corresponding to E(B13P) from the browser phone (portable telephone) 30 when taking action such as shopping in the trader MTT while transmitting the same mtt from the browser phone (portable telephone) 30 when taking action such as shopping in a trader MEC registering a trap type VP name $E^2$(B13P), for example, it may be found out that E(B13P) and $E^2$(B13P) are the same person through the RFID mtt. In order to prevent such inconvenience, the transmitted RFID is varied with every trader.

If he/she transmits mtt which is the trap type RFID corresponding to E(B13P) from the browser phone (portable telephone) 30 when taking action such as shopping in the trader MTT while transmitting mtt when taking action such as shopping in a retail store AMPM registering no private information such as the VP name and an electronic mail or a direct mail is sent to E(B13P) from the retail store AMPM later, for example, it follows that the private information of E(B13P) has been illegally distributed from the trader MTT to the retail store AMPM. Such illegal selling can be monitored.

The EEPROMs 26 of the IC terminals 19V and 19R may store only the public keys KP, the secret keys KS, the authentication keys KN and the identification numbers so that all other information is stored in the KML store 50 and can be retrieved and utilized at need. Further, encryption or decoding with the public keys KP and the secret keys KS may be performed not by the IC terminals 19V and 19R themselves but by the browser phone 30 or a personal computer 30' described later. In this case, it is necessary to output the public keys KP and the secret keys KS to the browser phone 30 or the personal computer 30' described later.

FIG. 10 is a block diagram showing the outline of the function of a portable 1. Referring to FIG. 4, the portable 1 is in the form of a ring, for example, and in a form easily wearable on the body of the user. The portable 1 is hereinafter referred to as an ID ring 1. The ID ring 1 is regularly worn in principle also during bathing or when going to sleep, whereby loss or robbery can be prevented. An RFID tag 1*a* for security is provided on the ID ring 1, and this RFID tag 1*a* includes a logic (CPU) 100 for controlling the whole of the RFID tag 1*a*, a read-only memory (ROM: Read Only Memory) 101 for storing encrypted RFID, a random access memory (RAM: Random AcceSS Memory) 102 necessary at a time of execution in the logic 100, an electrically erasable programmable read-only memory (EEPROM: electrically erasable programmable read-only memory) 103, loop antennas 107*a* and 107*b* for receiving electric waves employed for a power source and transmitting/receiving signals, a power control part 106 for generating power from the received electric waves employed for the power source, a modulation/demodulation part 105 for demodulating a received signal and modulating a signal to be transmitted and an input/output control part 104 for controlling signal input/output in/from the modulation/demodulation part 105. The logic 100, the ROM 101, the RAM 102, the EEPROM 103 and the input/output control part 104 are connected with each other through a data bus 108 respectively.

The logic 100 controls the ROM 101, the RAM 102, the EEPROM 103 and the input/output control part 104, and executes various processing described later.

The ROM 101 stores an RFID affixed to the RFID tag la to be distinguished from another RFID tag 1*a*. The RFID is stored in a stage where the RFID tag 1*a* is manufactured or in a stage before issued to the user, and not erased thereafter.

The EEPROM 103 stores a password for person in question authentication transmitted from the browser phone 30. The browser phone 30 transmits the password when the RFID tag 1*a* is temporarily brought into a transmission stop state and thereafter brought into a state capable of restarting transmission as described later, so that the transmitted password is collated with a password previously stored in the EEPROM 103 and the RFID tag 1*a* is switched to a state capable of transmitting the RFID only when it is determined that the passwords accord with each other.

The input/output control part 104 is controlled by the CPU 100, for transmitting/receiving information through the modulation/demodulation part 105 and the loop antenna 107*a*. Thus, the RFID tag 1*a* is capable of making radio communication with a scanner (RFID tag reader/writer) 201. A technique similar to communication in a case of employing a non-contact type IC card is employed for the communication between the RFID tag 1*a* and the scanner 201. Therefore, detailed description thereof is not repeated here.

A large capacity capacitor 110 is connected to the loop antenna 107, so that this loop antenna 107*b* receives the electric waves employed for the power source and stores power in the capacitor 110. When transmission of the electric waves employed for the power source is stopped, the power stored in this capacitor 110 is supplied to the power control part 106 so that the RFID tag 1*a* can continuously operate for a prescribed time (about 10 seconds, for example).

FIG. 11 is a flow chart showing a control operation of the logic (CPU) 100 of the RFID tag 1*a* shown in FIG. 10. First, a determination is made as to whether or not an RFID transmission instruction has been received through SA1, to wait until receiving the same. When the tag reader generates the electric waves for the power source so that the logic 100 is operable while power is generated in the loop antenna 107*a* by electrostatic induction and the loop antenna 107*a* receives the RFID transmission instruction transmitted from the tag reader in this state, a determination of YES is made through SA1 to advance to SA2, for making determination as to whether or not 5 seconds have elapsed from precedent RFID transmission. If 5 seconds have not elapsed, processing of transmitting the same one as precedently transmitted RFID is performed through SA10. If 5 seconds have elapsed, the control advances to SA3 to perform processing of reading (extracting) a count value R of a random counter from the EEPROM 103. This random counter is a counter for generating a code of a pseudo RFID at random, and numeric data is updated through SA7 to SA9 described later.

Then, the control advances to SA4, for performing processing of referring to a table on the basis of the extracted count value R and inferring the pseudo RFID. FIG. 12 shows tables referred to through SA4. FIG. 12 shows tables of RFID tags 1*a* sold in Chiyoda-Ku, Tokyo-To (see FIG. 13), and (a) is a table stored in a single transmission type RFID tag 1*a* transmitting a single RFID at a time. FIG. 12(*b*) and (*c*) are tables stored in multiple transmission type RFID tags simultaneously transmitting a plurality of (four, for example) pseudo RFIDs. A plurality of types of such multiple transmission type RFID tags are manufactured and sold. FIG. 12(*b*) and (*c*)

show tables stored in two types of RFID tags 1*a* among the same. The multiple transmission type RFID tags are so formed that three pseudo RFIDs 2 to 4 among four pseudo RFIDs 1 to 4 retrieved when the extracted value (random number) of the random counter is in the range of 0 to 39 are mutually common codes and only one RFID 1 is mutually different, as understood from FIG. 12(*b*) and (*c*). Further, four pseudo RFIDs 1 to 4 retrieved when the extracted value (random number) of the random counter is in the ranges other than 0 to 39 are inconsistent codes different from each other. On the other hand, single transmission type RFID tags are also manufactured/sold in a plurality of types, so that pseudo RFIDs retrieved when the extracted value (random number) of the random counter is in the range of 0 to 39 are mutually common codes while pseudo RFIDs retrieved when the extracted value (random number) of the random counter is in the ranges other than 0 to 39 are inconsistent codes different from each other.

The aforementioned random counter is added/updated by "1" through SA7 and thereafter a determination is made through SA8 as to whether or not the value thereof has been at least 100, and processing of setting the value of the random counter to "0" is performed through SA9 if the value has been at least 100. Consequently, the random counter is so formed as to count up from 0 again after counting up from 0 and counting up to 99 which is the upper limit thereof, and when this random counter extracts numeric data, it follows that an arbitrary value (random number) in the range of 0 to 99 is extracted. In the case of the single transmission type RFID tag 1*a* storing the table of FIG. 12(*a*), the table is referred to on the basis of the extracted count value (random number) R, and it follows that a pseudo RFID of 820493176 is inferred through SA4 if the extracted value R of the random counter is a value in the range of 0 to 39, for example. If the extracted value of the random counter R is a numerical value in the range of 55 to 69, for example, it follows that a pseudo RFID of 813926081 is inferred through SA4. Similarly, in the case of the multiple transmission type RFID tag 1*a* storing the table shown in FIG. 12(*b*), it follows that pseudo RFIDs of 814358231, 849137655, 788015233 and 779288401 are inferred through SA4 if the extracted value of the random counter R is a numerical value in the range of 55 to 69, for example. In the case of the multiple transmission type RFID tag 1*a* storing the table shown in FIG. 12(*c*), it follows that pseudo RFIDs of 700913561, 750021214, 702049319 and 856104923 are inferred through SA4 if the extracted value of the random counter R is a numerical value in the range of 85 to 99, for example.

Then, the control advances to SA5, for performing processing of transmitting the inferred pseudo RFID from the loop antenna 107*a*.

It follows that the respective ones of single transmission type RFID tags 1*a* transmit the common pseudo RFID of 820493176 with a probability of 40% (see FIG. 12(*a*)), and transmit mutually inconsistent pseudo RFIDs of the pseudo RFID of 730854709, the pseudo RFID of 813926081, the pseudo RFID of 791405731, 8305406912 and the like with a probability of 15% respectively. Consequently, when a plurality of personal users wear such RFID tags 1*a*, it follows that the pseudo RFID (hereinafter referred to as "common pseudo RFID") of 820493176 having the highest transmission probability of 40% is frequently transmitted although pseudo RFIDs consisting of random codes are transmitted every time. Consequently, if RFIDs read by tag readers set on a plurality of different places are accidentally RFIDs of the same code, the RFIDs can be originally determined as the RFID transmitted from the same person, while there also arises such a possibility (different person identical identifier transmission phenomenon) that, even if the same RFID is received in a plurality of places, it is the said common pseudo RFID transmitted by different persons when a plurality of personal users possess the RFID tags 1*a*. Consequently, it follows that, even if the same RFID is received in a plurality of places, it is not necessarily the same person, and an assumption of a malicious RFID receiver on the same person can be disturbed for protecting the privacy of the personal user.

In the case of only the single transmission type RFID tag 1*a* storing the table shown in FIG. 12(*a*), the aforementioned disturbing effect is effectively attained when the personal user possessing the RFID tag 1*a* has absolutely no other RFID tag or brings a possessed one into an RFID transmission stop state. When RFID tags affixed to a plurality of articles worn by the personal user respectively transmit RFIDS, however, it follows that the RFID tag 1*a* transmits a random pseudo RFID while the RFID tags affixed to the articles possessed by the personal user transmit the same RFIDs every time if an RFID transmission instruction is issued from a tag reader in the state possessing the single transmission type RFID tag 1*a*. Consequently, when the same person transmits a plurality of RFIDs to a tag reader set on a certain place, thereafter moves to another place and transmits a plurality of RFIDs to a tag reader set there, such a phenomenon (one in multiple identifier variable type phenomenon) is caused that one among the plurality of RFIDs is different and all the remaining ones are identical to each other. However, all RFIDs may accidentally accord with each other once in a great while. Consequently, when simultaneously receiving a plurality of RFIDs and one RFID among the same is different and all the remaining ones accord with each other or all RFIDs accord with each other, such inconvenience takes place that the user is assumed to be the same person.

Therefore, not only the single transmission type RFID tag 1*a* storing the table shown in FIG. 12(*a*) but also the multiple transmission type RFID tags 1*a* storing the tables shown in FIGS. 12(*b*) and (*c*) are manufactured and sold to be widespread among personal users.

More specifically, the aforementioned multiple transmission type RFID tags 1*a* are rendered widespread for a personal user bringing RFID tags affixed to purchased belongings into a transmission stop state or the like so that no RFIDs are read by a stranger from his/her belongings. On the other hand, the aforementioned single transmission type RFID tag 1*a* is provided to a personal user from whom the stranger can read RFIDs of purchased articles. In the case of the former personal user, such a phenomenon (one among plural identifiers variable type phenomenon) is caused that one pseudo RFID is transmitted at random while genuine RFIDs are simultaneously transmitted from RFID tags affixed to belongings, as described above. In the case of the latter personal user, on the other hand, a plurality of (four in FIG. 12) pseudo RFIDs 1 to 4 are transmitted at random. However, the common pseudo RFIDs 2 to 4 and one different RFID 1 are transmitted between the personal users with the probability of 40%, as described above. While this phenomenon is the same phenomenon as the aforementioned one among plural identifiers variable type phenomenon, it follows that this one among plural identifiers variable type phenomenon is caused between different persons. Consequently, it follows that such reliability of assumption that it is the same person is reduced for a malicious receiver if the one among plural identifiers variable type phenomenon is caused, and it follows that an invasion of privacy based on the assumption of the same person is upset from the premise.

Referring again to FIG. 11, a determination is made as to whether or not voltage reduction takes place through SA6. This is to determine whether or not a voltage supplied to the logic 100 is reduced since the power stored in the capacitor 110 is reduced while transmission of the electric waves for power is stopped and the RFID tag 1*a* operates with the power stored in the large-capacity capacitor 110. When determining that the voltage is reduced, the control advances to SA10*a* so that the EEPROM 103 stores the count value R of the random counter at the present time and this operation of the pseudo RFID tag thereafter stops. The count value R of the random counter stored through SA10*a*is read (extracted) through SA3. While the power for the power source is supplied or the capacitor 110 sufficiently supplies power after the power for the power source stops, on the other hand, a determination of NO is made through SA6 and it follows that addition/update processing of the random counter subsequent to SA7 is executed.

FIG. 13 is an explanatory diagram showing an exemplary area specifying system of grouping the aforementioned plurality of types of pseudo RFID tags 1*a* and selling articles while specifying an area every group. FIG. 13(*a*) shows exemplary area specification of the single transmission type RFID 1*a* storing the table of FIG. 12(*a*), and FIG. 13(*b*) is a diagram showing exemplary area specification of the multiple transmission type RFID tags 1*a* shown in FIG. 12(*b*) and (*c*).

A single transmission type RFID tag 1*a* belonging to a group capable of transmitting 820493176 as the common pseudo RFID is sold in Chiyoda-Ku, Tokyo-To, as shown in FIG. 13(*a*). Further, a single transmission type RFID 1*a* belonging to a group transmitting 809207321 belonging to another group as the common pseudo RFID is sold in Shinjuku-Ku, Tokyo-to. In addition, a single transmission type RFID tag 1*a* belonging to a group transmitting 798091320 as the common pseudo RFID is sold in Ukyo-Ku, Kyoto-Shi, for example.

In the case of the multiple transmission type RFID tags 1*a*, on the other hand, a multiple transmission type RFID tag 1*a* belonging to a group simultaneously transmitting three types of common pseudo RFIDs of 779203980, 839093127 and 740980346 is sold in Chiyoda-Ku, Tokyo-To, as shown in FIGS. 12(*b*) and (*c*). Further, a multiple transmission type RFID tag 1*a* belonging to a group transmitting 788718955, 845590329 and 822770945 belonging to another group as the common pseudo RFIDs is sold in Ukyo-Ku, Kyoto-Shi.

The area specifying selling method is not restricted to that selling the RFID tag 1*a* belonging to the group corresponding to the area in the area but a method of displaying a used area (Chiyoda-Ku, Shinjuku-Ku, Ukyo-Ku or the like, for example) in selling so that the personal user selects and purchases the tag while observing the display of the area in which he/she intends to use the tag is also available.

Thus, the tags are provided to personal users while specifying areas so that RFID tags 1*a* belonging to the same group having according common pseudo RFIDs are used in the same area to the utmost, and such a tendency arises that identical common pseudo RFIDs are easily transmitted in the same area so that a malicious privacy invader can be effectively disturbed.

FIG. 14 is a flow chart for illustrating the operation of the browser phone 30. RFID tag switching processing is performed through S95*a*. This processing is processing of switching an RFID tag affixed to a purchased article worn by a personal user to a transmission stop state (identifier guard state) or a transmission restarting state. Pseudo mode processing is performed through S95*b*. This processing is processing of providing the browser phone 30 with a pseudo RFID transmission function of the aforementioned RFID tag 1*a* for security. Trap mode processing is performed through S95*c*. This processing is processing for transmitting a pseudo RFID corresponding to the trap type VP when the personal user performs automatic settlement or the like as the aforementioned trap type VP. RFID transmission processing is performed through S95*d*. This processing is processing for transmitting the RFID from the browser phone 30 when receiving an RFID transmission request from a tag reader. The browser phone determines whether or not the same is in an IC terminal use mode through S95. The browser phone 30 is constituted to be switchable between an IC terminal use mode not operating unless at least either the IC terminal 19R for the RP or the IC terminal 19V for the VP is connected to the USB port and an IC terminal nonuse mode operable without connecting the IC terminal. The browser phone advances to S96 for performing other processing if the same is not in the IC nonuse mode while advancing to S98 if the same is in the IC terminal use mode for determining whether or not the IC terminal 19V for the VP is connected, advances to S98 if the same is in the IC terminal use mode for determining whether or not the IC terminal 19V for the VP is connected, advances to S98 if the same is not connected for determining whether or not the IC terminal 19R for the RP is connected, and the control advances to S99 if the same is not connected, i.e., if neither IC terminal is connected, for displaying a warning about nonuse of the IC terminal and thereafter returns to S95.

If the IC terminal 19V for the VP is connected, on the other hand, the control advances to S100 for performing automatic settlement processing. This processing is described later on the basis of FIG. 31. Then, point card registration processing is performed through S100*a*. This is processing for making a trader such as a department store newly issue a point card. Then, the control advances to S101, for performing VP birth request processing. Then, the browser phone advances to S102, for performing input processing for VP. Then, the browser phone advances to S103 for performing settlement processing for the VP.

Then, the control advances to S580, for performing private information registration processing. This private information registration processing is processing of the browser phone 30 corresponding to the registration processing of the VP management server 9 shown in FIG. 18(*b*). The browser phone performs processing of first performing person in question authentication processing on the VP and transmitting the private information of the VP to the VP management server 9 of the financial institution 7 and making the same registered in the database 12*a* on condition that the VP management server 9 has confirmed person in question authentication.

Then, the control advances to S582 for performing confirmation processing for the private information. This processing is processing performed between the VP management server 9 of the financial institution 7 and the browser phone 30. The browser phone performs processing of first making person in question authentication as the VP and then confirming his/her private information stored in the database 12*a*. If there is an error as a result of confirmation or the private information has been changed due to house-moving or change of occupation, on the other hand, the browser phone transits the change information to the VP management server 9 of the financial institution 7 through S582.

FIG. 15 is a flow chart showing a subroutine program of the RFID tag switching processing shown in S95*a*. A determination is made as to whether or not an OFF-switching operation has been made through SB1. The control advances to SB2 if no switching operation has been made, for determining whether or not an ON-switching operation has been made. This subroutine program is ended if no operation has been made.

When the browser phone 30 performs the OFF-switching operation for bringing the RFID tag affixed to the purchased article possessed by the personal user into a transmission stop state, on the other hand, a determination of YES is made through SB1 to advance to SB3, for transmitting a password from the browser phone 30 to the RFID tag affixed to the purchased article. The RFID tag stores the transmitted password. Then, the browser phone 30 transmits an OFF-mode instruction according to SB4. The RFID tag receiving the same is switched to a state not transmitting the stored RFID. Thus, the RFID tag enters an identifier guard state not readable by a stranger according to the intention of the personal user. As another example of this identifier guard state, the RFID tag may be covered with aluminum foil or the like so that the RFID cannot be read by the stranger. Alternatively, the personal user may carry an apparatus transmitting disturbance waves or the like disturbing reading of the RFID from the RFID tag for transmitting the disturbance waves or the like when receiving an RFID read request from a tag reader so that the RFID cannot be read. Then, the browser phone 30 transmits a transmission instruction to the RFID tag according to SB5. Then, the control advances to SB6, for determining whether or not the RFID has been received. Since the OFF-mode instruction has already been transmitted according to SB4, the RFID tag affixed to the purchased article possessed by the personal user transmits no RFID in general. Therefore, a determination of NO is made through SB6 and the browser phone 30 displays OFF-mode switching completion through SB7. If the wave situation is inferior or some receiving error is transmitted and the RFID affixed to the purchased article possessed by the personal user is not switched to the transmission stop state although the OFF-mode instruction has been transmitted through SB4, however, a determination of YES is made through SB6 to advance to SB8, and the browser phone 30 displays an error.

When the RFID tag affixed to the purchased article possessed by the personal user enters the RFID transmission stop state and the browser phone 30 thereafter performs the ON-switching operation for switching the same to the transmission restarting state again, a determination of YES is made through SB2 to advance to SB9, for transmitting a password for person in question authentication. The RFID tag affixed to the purchased article of the personal user receiving this password collates the same with a stored password and makes a determination as to whether or not the passwords accord with each other for performing person in question authentication. Then, the browser phone 30 transmits a NO-mode instruction according to SB12. The RFID tag affixed to the purchased article receiving the same receives the ON-mode instruction on condition that the person in question authentication has been confirmable through the aforementioned collation of the passwords, to be switched to a state capable of transmitting the RFID.

Then, the browser phone 30 transmits an RFID transmission instruction according to SB11. Then, a determination is made as to whether or not the RFID has been received through SB12. If the person in question authentication can be properly recognized and the ON-mode instruction is received, the RFID is transmitted from the RFID affixed to the purchased article. In this case, a determination of YES is made through SB12 to advance to SB13, so that the browser phone 30 makes an ON-mode switching completion display. If the person in question authentication has not been confirmable or receiving of electric waves of the RFID transmission instruction has failed, on the other hand, the RFID tag affixed to the purchased article transmits no RFID. In this case, a determination of NO is made through SB12 to advance to SB8, so that the browser phone 30 displays an error.

FIG. 16 is a flow chart showing the operation of the RFID tag affixed to the purchased article possessed by the personal user. A determination is made as to whether or not the password has been received through SC1 to advance to SC2 when no password has been received for determining whether or not an RFID transmission instruction has been received, and the control returns to SC1 when no instruction has been received. When the browser phone 30 transmits the password according to SB3 or SB9 in an intermediate stage of circulation of this loop SC1→SC2→SC1, a determination of YES is made through SC1 to advance to SC3. At SC3, a determination is made as to whether or not the OFF-mode instruction has been received, to advance to SC4 when no instruction has been received for determining whether or not the ON-mode instruction has been received and the control returns to SC3 when no instruction has been received. When the browser phone 30 transmits the OFF-mode instruction according to SB4 in an intermediate stage of circulation of this loop SC3→SC4→SC3, a determination of YES is made through SC3 to advance to SC5 for performing processing of storing the received password, and processing of switching to an OFF-mode is performed through SC6 to return to SC1. Thus, the RFID tag affixed to the purchased article is switched to the transmission stop state transmitting no stored RFID.

When the browser phone 30 transmits the ON-mode instruction according to SB10, on the other hand, a determination of YES is made through SC4 to advance to SC7, for performing processing of performing person in question authentication by determining whether or not the received password and the already stored password accord with each other. It follows that the person in question authentication cannot be confirmed and the control returns to SC1 if the passwords do not accord with each other, while it is determined that the person in question authentication has been confirmable to advance to SC8 for performing processing of switching to an ON-mode if the passwords accord with each other. Thus, the RFID tag affixed to the purchased article is switched to a state capable of transmitting the stored RFID.

When the browser phone 30 has issued the RFID transmission instruction or the tag reader has issued the RFID transmission instruction through SB5 or SB11, a determination of YES is made through SC2 to advance to SC9, for determining whether or not in the ON-mode, i.e., a mode capable of transmitting the stored RFID. The control returns to SC1 if not in the ON-mode, while the control advances to SC10 if in the ON-mode, for performing processing of transmitting the stored RFID.

FIG. 17 is a flow chart showing processing operations of the VP management server 9 shown in FIG. 2. The server determines whether or not a birth request for a VP has been received through a step S1. When the customer (user) manipulates the browser phone 30 and makes a birth request for a VP, the server advances to S1*a* for performing proof processing for a legal institution. This proof processing is processing for proving that the financial institution 7 is a legal institution managing the VP, and processing for preventing others from illegal action of pretending to be the financial institution 7. This processing is described later with reference to FIG. 24(*b*). Then, the server advances to S2 for transmitting a request for input of the name and the address of the RP to the browser phone 30. Then, the server advances to S3 for determining whether or not the name and the address of the RP have been sent back from the browser phone 30, and waits until the same are sent back.

When the RP who is the user inputs and transmits his/her name and address from the browser phone 30, the server makes a determination of YES through S3 and advances to S4, for performing processing of generating a random number R and transmitting the same to the browser phone 30 as challenge data. When the user makes a birth request for the VP, he/she inserts the IC terminal 19V for the VP into the USB port 18 of the browser phone 30. When the random number R is transmitted from the VP management server 9 in this state, he/she inputs the random number in the IC terminal 19V for the VP. Then, the IC terminal 19V for the VP performs processing of encrypting the input random number R with the authentication key KN of the RP therein and outputs the result of this encryption to the browser phone 30. The browser phone 30 transmits response data I which is the output encrypted data to the VP management server 9. Then, the server makes a determination of YES through S5 and advances to S6, for performing processing of decoding the received response data I, i.e., processing of calculating $D_{KN}$ (I), with the authentication key KN of the RP. Then, the server advances to S7, for determining whether or not the random number R generated through S4 is equal to $D_{KN}$(I).

The control advances to S9 when the birth requestor for the VP is a normal RP stored in the database 12 of the financial institution 7 since KN(I), while the control advances to S8 when a stranger pretends to be the RP stored in the database 12 and makes the birth request for the VP since R is not equal to $D_{KN}$(I), for transmitting access rejection to the browser phone 30 and returning to S1.

When making a determination of YES through S7, on the other hand, the server advances to S9 for determining whether or not a desired convenience store has been input. If there is a particularly desired convenience store as to the convenience store providing the address for the born VP, the RP making the birth request for the VP inputs the same in the browser phone 30 and transmits the same to the VP management server 9. In this case, the server makes a determination of YES through S9, advances to S10, stores the information of the input convenience store and thereafter advances to S10. If no desired convenience store has been input, on the other hand, the server advances to S11, retrieves a convenience store near to the address of the RP, stores the convenience store and thereafter advances to S12.

At S12, the server decides the name of the VP, the address of the convenience store which is the address of the VP, the E-mail address of the VP etc. Then, the server advances to S13 for transmitting a transmission request for the public key of the VP to the browser phone 30. Then, the server advances to S14, determines whether or not the public key KP has been sent back, and waits until the same is sent back. The browser phone 30 receiving the transmission request for the public key of the VP outputs a public key output request to the connected IC terminal 19V for the VP. Then, the IC terminal 19V for the VP outputs the stored public key KP for the VP to the browser phone 30 as described later. The browser phone 30 sends back the output public key KP for the VP to the VP management server 9. Then, the server makes a determination of YES through S14 and advances to S15 for performing processing of storing the name, the address, the public key KP and the E-mail address of the VP in the database 12 in association with the RP.

Then, the server advances to S16, for performing processing of creating an electronic certificate for the VP and registering the same in the XML store 50. This electronic certificate certifies that the VP is a normal VP whose association with the RP is registered in a third-party institution such as the financial institution 7. Then, the server advances to S17, for performing processing of sending the IC terminal 19I storing the name of the VP, the address of the convenience store, the name of the convenience store, the E-mail address and the electronic certificate to the RP. Then, the server advances to S18 for performing processing of transmitting the name and the E-mail address of the VP and the name of this financial institution 7 to the convenience store of the address decided at S12. Then, the server advances to S19 for performing proof processing for a legal institution. This proof processing for the legal institution is the same processing as the aforementioned one at S1*a*. Then, the server returns to S1.

In the present invention, "electronic certificate for a pseudonym" is a concept including a certificate issued by a prescribed institution (financial institution 7), having the duty of confidentiality, registering information capable of specifying the association between a user and a pseudonym (VP name) employed by this user for proving that the user employing said pseudonym is a user registered in this prescribed institution. Therefore, this is a concept including not only a general digital ID employed for person in question confirmation but also all electronic certificates with which the said prescribed institution certifies that this user is a user registered in this prescribed institution with respect to the user employing said pseudonym. For example, this is a concept including a simple certificate to which only a digital signature by said prescribed institution is assigned with respect to the pseudonym employed by the user and a message indicating that the pseudonym is registered in said prescribed institution.

When making a determination of NO through S1, the server advances to S400 in FIG. 18(*a*). The server performs private information registration processing at S400, then performs private information confirmation processing through S402, performs collation and circulation check processing for the private information through S403, performs sale alternation processing for the private information through S404, performs mail transfer and circulation check processing through S405, and returns to S1. The site (trader) provided with the private information from the user needs to confirm whether or not the contents of the provided private information are really correct. Therefore, the VP management server 9 of the financial institution 7 accepts the private information from the user, checks whether or not the private information is correct private information, and registers only correct private information in the database 12*a*. The server performs this processing through S400.

If the VP is frequently utilized on the network, on the other hand, there is an apprehension of such inconvenience that a trader collecting detailed private information of both the RP and the VP thoroughly accords the private information with each other, deduces the RP name and the VP name having according private information and predicts the RP corresponding to the VP. When registering the private information in the database 12*a*, therefore, it is necessary to register the same while eliminating (or changing) private information such as the name of the user's place of employment, the name of his/her place of duty or his/her position, with which the RP can be specified. The server performs such processing through S400.

On the other hand, the user possessing the private information needs to monitor whether or not his/her private information is circulated with correct contents and correct the same to correct contents if erroneous. Therefore, the server performs private information confirmation processing through S402 so that the user can check trueness/falseness of his/her private information registered in the database 12*b*.

When the user limits the public range (circulation range) of his/her private information and provides the private information to the trader (site), he/she needs to monitor whether or not the public range (circulation range) is kept. The trader provided with the private information needs to confirm whether or not this private information is correct information as described above. Therefore, the server performs the processing of S403 so that the site (trader) can collate the possessed private information with the private information of the database 12*a* registering correct private information while it is possible to check the circulation tolerance for the collated private information possessed by the trader and check whether or not the same is correctly circulated.

The user needs to obtain some services or money as the compensation for the provision of the private information. Therefore, the server performs private information sale alternation through S404. The trap type VP sets his/her E-mail address at the address opened for the trap type VP in the financial institution 7 as the trap type VP in the financial institution 7 as described with reference to FIG. 3, and hence an E-mail addressed to the trap type VP is sent to the E-mail address opened for the trap type VP in the financial institution 7. Therefore, it is necessary to transfer the sent E-mail to the E-mail address of the corresponding VP. The server performs this processing through S405. At this time, the E-mail sent from the trader is addressed to the trap type VP, and hence the server also performs processing of deducing the site (the trader) corresponding to the trap type VP (see FIG. 3), checking whether or not this is an E-mail from a site (a trader) within the circulation tolerance for the private information of the trap type VP if this is not an E-mail from the deduced site (trader) and performing circulation check.

FIG. 18(*b*) is a flow chart showing a subroutine program of the private information registration processing at S400. This private information registration processing is processing performed when the user registers the private information as the VP.

The browser phone 30 receiving the random number R encrypts the random number R once with the secret key for the VP stored in the IC terminal 19V for the VP connected to this browser phone 30 and generates response data I. The browser phone transmits the response data I to the VP management server 9 of the financial institution 7.

The server determines whether or not a registration request for the private information has been received from the user through S410, and terminates this subroutine program if no request has been received. If receiving the registration request, the server advances to S411 for performing legal institution proof processing. Then, the control advances to S412 for requesting input of the name of the VP, and determines whether or not the same has been input through S413. When the same is input, the control advances to S414 for performing processing of generating a random number R and transmitting the same to the user making the registration request as challenge data. The server advances to S415, determines whether or not the response data I has been received from the user, and waits until receiving the same. The server advances to S416 in a stage receiving the same, for performing processing of retrieving the public key KP of the VP from the database 12*a* and generating $D_{kp}(I)$ by encrypting the received response data I with the public key KP.

Then, the control advances to S417 for determining whether or not the challenge data R and $D_{kp}(I)$ are equal to each other. If the same are not equal to each other, it follows that no person in question authentication for the user could be performed, and the server advances to S422 for performing processing of registration rejection. When making a determination of YES through S417, the control advances to S418 for performing processing of issuing a request for input of private information desired to be registered to the user making the registration request. Then, the server advances to S419, determines whether or not the same has been input, and waits until the same is input. The control advances to S420 in a stage receiving the input, for checking trueness/falseness of the private information to be registered.

The server makes this trueness/falseness check by accessing the XML store 50 and making collation check when the private information of the corresponding user is registered, or by accessing the city office or the like included in the electronic administration group 49 and making collation check with private information registered therein, for example. If such collation check by mechanical retrieval is insufficient, an investigator of the financial institution 7 makes corroborative investigation for checking trueness/falseness.

Then, the control advances to S421 for determining whether or not the information is correct as a result of the trueness/falseness check for advancing to S422 and performing processing of registration rejection if the same is not correct while advancing to S423 for determining whether or not this is private information specifying the RP if the same is correct. If the private information of the VP to be registered includes private information such as the name of the user's place of employment, the name of his/her place of duty or his/her position, for example, with which the RP can be specified and the server registers the same as such, there is an apprehension that the third party predicts which VP corresponds to which RP from the registered information. The private information registered in this database 12*a* can be recognized by the site (trader) through S403 or S404. Consequently, there is an apprehension that the site (trader) predicts the association between the RP and the VP.

Therefore, the server determines whether or not this is private information specifying the RP through S423 for advancing to S425 if this is not predictable private information, while advancing to S424 if this is private information having the apprehension of prediction for performing processing of manipulating the private information and thereafter advancing to S425. The server manipulates the place of duty to "certain major electric maker" if the same is MEC, for example, or manipulates the position to "director", for example, when the same is a managing director, for example.

At S425, the server performs processing of assigning a digital signature of this final institution to the private information and registering the same every user name. Consequently, the database 12*a* registers the data shown in FIG. 4.

FIG. 19 is a flow chart showing a subroutine program of the trap information registration processing shown in S401. The server performs legal institution proof processing through S430, and issues a request for input of the VP name to the VP making a registration request for trap information through S431. Then, the server advances to S432, determines whether or not the VP making the registration request has input his/her VP name and issues the request of S431 until he/she inputs the same. Then, the control advances to S433 for performing processing of generating a random number R and transmitting the same to the VP who is the registration requestor as challenge data. The server determines whether or not response data I has been received through S434.

The VP who is the registration requestor receiving the transmitted challenge data R encrypts the challenge data R with his/her secret key for generating the response data I and transmits the same to the VP management server 9 of the financial institution 7. Then, the control advances to S435 for performing processing of retrieving the public key KP of the VP making the registration request from the database 12*a* and decoding the received response data I with the public key KP. When the server determines whether or not the challenge data R is equal to $D_{kp}(I)$ through S436 and the former is not equal to the latter, it means that the VP cannot be defined as the person in question as a result of authentication, and the server notifies registration rejection to the VP through S437. If the server makes a determination of YES through S436 and could confirm that the VP is the person in question as a result of authentication, on the other hand, the control advances to S438 for performing processing of transmitting a transmission request for trap information to the VP.

The server determines whether or not the VP has transmitted the trap information to be registered through S439, and waits until the same is transmitted. The control advances to S440 in a stage of transmission, for performing processing of storing the transmitted trap information in the database 12*a*. This trap information is stored in a storage area corresponding to the VP who is the registration requestor. Then, the control advances to S441 for performing such processing that the financial institution 7 generates an electronic signature for the trap information and registers an electronic certificate therefor in the XML store 50. Consequently, the database 72 of the XML store 50 stores the electronic certificate as described with reference to FIG. 5.

This electronic certificate may be stored in the IC terminal 19V of the VP making the registration request in place of storage in the XML store 50. However, the trap information varies with every Web site accessed by the VP or every trader such as a department store at which the VP has registered himself/herself as the VP (trap type VP) and acquired a newly issued point card, and it consequently follows that the electronic certificate also varies with every Web site (every trader) and a problem of storage capacity arises if a large number of electronic certificates are stored in the IC terminal 19V. According to this embodiment, therefore, the XML store 50 registers the electronic certificates in order to overcome the problem of storage capacity. If the storage capacity of the IC terminal 19V is extremely large, the IC terminal 19V may store all or most of the electronic certificates issued by the financial institution 7.

FIG. 20 is a flow chart showing a subroutine program of the mail transfer and circulation check shown in S405. The server determines whether or not the site (trader) has sent a mail through S541. Consequently, it follows that the E-mail from the site (the trader) is sent with the E-mail address opened for the trap type VP in the financial institution 7.

If there is a mail transmitted to the E-mail address opened for the trap type VP in the financial institution 7, the VP management server 9 makes a determination of YES through S514. Consequently, the control advances to S515 for performing processing of deducing the site name (trader name) corresponding to the addressee included in the received E-mail from the database 12*a*. The database 12*a* stores the name of the VP and the name of the site (the trader) accessed by the VP in association with each other, as described with reference to FIG. 4. Through this association, the server performs the processing of deducing the corresponding site name (trader name) from the addressee of the mail.

Then, the server determines whether or not the deduced site name (trader name) and the name of the site (the trader) sending the E-mail accord with each other through S516. While the former and the latter must originally accord with each other, a site (a trader) illegally obtaining illegally circulated private information may send an E-mail to the possessor of private information if the private information is illegally circulated. In this case, the deduced site name (trader name) and the name of the site (the trader) sending the mail do not accord with each other.

When the deduced site name and the name of the site sending the mail do not accord with each other, the server cannot immediately conclude that the private information has been illegally circulated. The site may have approval from the user who is the possessor of the private information as to that the private information may be circulated within certain constant circulation tolerance when providing the private information to the site. Therefore, the control advances to S522 for performing processing of retrieving the corresponding private information in the XML store and checking whether or not the E-mail sender is included in the circulation tolerance set in the policy so that the control advances to S517 when determining that the same is included through S523 while the control advances to S519 when determining that the same is not included.

The server performs processing of adding/updating the value of illegally obtained private information by "1" in association with the name of the site (the trader) sending the E-mail at S519, and performs processing of adding/updating the value of illegally distributed private information by "1" in association with the site name (the trader name) deduced through S515 through S520. Then, the server performs processing of notifying that the private information has been illegally handled and the detailed data thereof to the corresponding user through S521.

When determining that the private information has not been illegally circulated, on the other hand, the control advances to S517 for performing processing of deducing the mail address of the user corresponding to the addressee of the E-mail, and performs processing of transferring an E-mail to the deduced address through S518.

FIG. 21 is a flow chart showing processing operations of the authentication server 11 shown in FIG. 2. First, the server determines whether or not a request for issuance of an electronic certificate has been received from the RP through S25, and waits until receiving the request. When the RP who is the user transmits a request for issuance of the electronic certificate for the RP from the browser phone 30 to the authentication server 11, the control advances to S26 for performing processing of transmitting a request for transmission of the address, the name and the public key of the RP to the browser phone 30. Then, the server advances to S27 for determining whether or not the address, the name and the public key of the RP are sent back from the browser phone 30, and waits until the same are sent back. The control advances to S28 in a stage receiving the same, for performing processing of creating the electronic certificate for the RP and transmitting the same to the browser phone 30. Then, the server advances to S29 for performing processing of storing the address, the name and the public key KP of the RP in the database 12*b* and returns to S25.

FIGS. 22 to 24 are flow charts showing processing operations of the settlement server 10 shown in FIG. 2. The server determines whether or not a request for creation of a bank account number of the RP has been received, advances to S39 if no request has been received for determining whether or not a request for creation of a bank account number of the VP has been received, advances to S40 if no request has been received for determining whether or not a request for issuance of a debit card has been received, advances to S40 if no request has been received for determining whether or not a settlement request has been received, and returns to S35 if no request has been received.

When the user goes to the financial institution 7 and makes a request for opening the bank account of the RP so that a request for creation of the bank account number of the RP is input in the process of the cycle of this loop of S35 to S41, the control advances to S36 for requesting input of the address, the name etc. of the RP, the control advances to S38 if the same are input for performing processing of creating the bank account of the RP and storing the same in the database 12*a* while notifying the same to the RP, and returns to S35.

If the user goes to the financial institution 7 and makes a request for opening the bank account of the VP so that a request for creation of the bank account number of the VP is input, the server advances to S42 for requesting input of the address, the name etc. of the VP and the address, the name etc. of the RP. The user manually inputs the information from a keyboard, or connects the IC terminal 19R for the RP or the IC terminal 19V for the VP to the settlement server 10 for automatically inputting these data. When the data are input, the control advances to S44 for confirming whether or not the correspondence between the RP and the VP is proper by making retrieval in the database 12*a*.

If the correspondence between the RP and the VP is not proper, the server advances to S51 for notifying that the correspondence is improper and returns to S35. If the correspondence between the RP and the VP is proper, on the other hand, the server advances to S45 for performing processing of creating the bank account of the VP and storing the same in the database 12*a* while sending the bank account to the RP corresponding to the VP and thereafter returns to S35.

When the user goes to the financial institution 7 and makes a request for issuance of a debit card so that a request for issuance of the debit card is input, the server makes a determination of YES through S40 and advances to S46 for making a request for input of the account number, the name and an identification number. When the user requests issuance of a debit card for the RP, he/she inputs the bank account number, the name and the identification number of the RP. When the user desires a request for issuance of a debit card for the VP, on the other hand, he/she inputs the bank account number of the VP, the name of the VP and the identification number of the VP. The user connects the IC terminal 19R for the RP or the IC terminal 19V for the VP to the settlement server 10 for automatically inputting these data.

When these data are input, the control advances to S48 for performing processing of storing the input data in the database 12*a* and issuing the debit card. Then, the server advances to S49 for performing processing of transmitting data storing the issued debit card to the IC terminal for the RP or the IC terminal for the VP and returns to S35.

If a settlement request is transmitted to the settlement server 10, the server makes a determination of YES through S41, advances to S50, performs settlement processing and thereafter returns to S35.

FIG. 23 is a flow chart showing a subroutine program of the settlement processing at S50 shown in FIG. 22. The settlement request includes a remittance request for partially remitting funds in the bank account to the IC terminal 19R for the RP or the IC terminal 19V for the VP, a request for settlement with the debit card, and a payment request for a credited sum from the credit card issuing company in a case of settling accounts with the credit card. First, the server determines whether or not a request for remittance to the IC terminal 19R or 19V has been received through S55, advances to S57 if no request has been received for determining whether or not a request for settlement with the debit card has been received, advances to S58 if no request has been received for determining whether or not a payment request has been received from the credit card issuing company, advances to S554 if no request has been received for performing enquiry processing from the credit card issuing company, and thereafter performs other processing through S59 for terminating this subroutine program.

When the user transmits a request for partially remitting the funds to the IC terminal 19R for the RP or the IC terminal 19V for the VP from the browser phone 30 or the like to the settlement server 10, the server makes a determination of YES through S55, advances to S56 for performing legal institution proof processing and thereafter advances to S60. At S60, the server performs processing of transmitting a request for input of the name to the browser phone 30 or the like. The browser phone 30 receiving this request transmits an output request for the name to the connected IC terminal 19R or 19V. Then, the connected IC terminal 19R or 19V transmits the name to the browser phone 30, and the browser phone 30 transmits the transmitted name to the settlement server 10. Then, the server makes a determination of YES through S61 and advances to S62 for performing processing of generating a random number R and transmitting the same to the browser phone 30 as challenge data.

The browser phone 30 receiving the random number R-transmits the random number R to the connected IC terminal 19R or 19V, as described later. If the IC terminal receiving the random number R is the IC terminal 19R for the RP, the IC terminal encrypts R with the stored authentication key KN for generating response data I and outputs the same to the browser phone 30. The browser phone 30 transmits the output response data I to the settlement server 10. If the IC terminal receiving the random number R is the IC terminal 19V for the VP, on the other hand, the IC terminal encrypts the received random number R with the stored public key KP for generating response data I and outputs the same to the browser phone 30. The browser phone 30 transmits the output response data I to the settlement server 10.

When the response data I is transmitted, the server makes a determination of YES through S63, advances to S64 for determining whether or not the name input in response to S60 is that of the RP and advances to S65 if the name belongs to the RP for performing processing of retrieving the authentication key KN of the RP from the database 12 and decoding the received response data I with the authentication key KN, i.e., processing of generating $D_{KN}(I)$. Then, the server advances to S66 for determining whether or not R is equal to $D_{KN}(I)$. While R must be equal to $D_{KN}(I)$ if the user making the request for remittance to the IC terminal is a proper user registered in the database 12, R does not accord with $D_{KN}(I)$ if such illegal action has been taken that a person pretends to be the user registered in the database 12 to partially remit the funds of the bank account. In this case, the control advances to S79 for performing processing of sending back improperness to the browser phone 30 and terminates the subroutine program.

If R is equal to $D_{KN}(I)$, on the other hand, the control advances to S67 for performing processing of transmitting an input request for the charged sum to the browser phone 30, and the control advances to S69 when the browser phone 30 transmits the charged sum for performing processing of subtracting the charged sum G from the account of the RP and transmitting G to the browser phone 30 and terminates the subroutine program.

When the user makes remittance to the IC terminal 19V for the VP as the VP, he/she employs the real name of the VP. If the input name is the real name of the VP, the server makes a determination of NO through S64 so that the control advances to S85 of FIG. 24(*a*). At S85, the server performs processing of retrieving the public key KP of the VP from the database 12 and decoding the received response data I with the public key KP, i.e., processing of generating $D_{KP}$(I). Then, the server advances to S86 for determining whether or not R is equal to $D_{KP}$(I). If the person making the remittance request takes illegal action of pretending to be the VP registered in the database 12 and making remittance, it follows that the server makes a determination of NO through S86 and advances to S79 for sending back improperness to the browser phone 30. If making a determination of YES through S86, on the other hand, the server advances to S87 for performing processing of transmitting an input request for the charged sum G to the browser phone 30, advances to S89 if the browser phone 30 transmits the charged sum G for performing processing of subtracting G from the bank account of the VP and transmitting G to the browser phone 30 and thereafter terminates the subroutine program.

When the user performs a debit card use operation in order to settle accounts with the debit card, he/she transmits a debit card use request to the settlement server 10, which in turn makes a determination of YES through S57 and advances to S56 for performing legal institution proof processing. Then, the server advances to S70 for transmitting a request for input of the identification number and card information to the browser phone 30 of the user. If the browser phone 30 transmits the identification number of the debit card and the debit card information to the settlement server 10, the control advances to S72 for determining whether or not the transmitted data are proper, and advances to S79 if the same are improper.

If the data are proper, on the other hand, the server advances to S73 and waits for input of a used sum G. When the user inputs the used sum G and the same is transmitted to the settlement server 10, the control advances to S74 for performing processing of retrieving the corresponding account and subtracting G while transmitting G to the browser phone 30 of the user.

If the user settles accounts according to SET with the credit card with the real name of the RP or the VP as described later, the credit card issuing company 4 (see FIGS. 1) transmits a payment request for the credit sum to the settlement server 10. If the payment request is transmitted, the server makes a determination of YES through S58 for performing legal institution proof processing of S56 and thereafter advances to S75 for waiting for input of the name and the account number of the user. When the credit card issuing company 4 transmits the name and the account number of the user, the control advances to S76 for determining whether or not the input data are proper by making retrieval in the database 12. The server advances to S79 if the data are improper, while the same advances to S77 if the data are proper for waiting for input of the charged sum G. If the credit card issuing company 4 transmits the charged sum G, i.e., the total sum of the credit sum and commission, the control advances to S78 for performing processing of subtracting G from the account and adding the same to an account G of the credit card issuing company, i.e., fund transfer processing.

If the server makes a determination of NO through S58, enquiry processing from the credit issuing company 4 is performed through S554 and thereafter the server advances to S59 for performing other processing.

FIG. 24(*b*) is a flow chart showing a subroutine program of the legal institution proof processing shown in the aforementioned S1*a*, S19 and S56. First, the server performs processing of transmitting an electronic certificate of this institution through S90. The side receiving this electronic certificate generates a random number R and transmits the random number R. Then, the server makes a determination of YES through S91 and advances to S92 for performing processing of encrypting the received random number R with the secret key KS of this institution, i.e., processing of calculating L=$E_{KS}$(R), and performs processing of sending back the calculated L.

The receiving side receiving this L can obtain R by decoding L with the public key KP of this institution in the already received electronic certificate. It is possible to check whether or not this is a legal institution by checking whether or not the R and the transmitted R are equal to each other. This is described later.

FIG. 25 is a flow chart showing a subroutine program of the enquiry processing from the credit card company shown in S554. When the VP accesses the site as the trap type VP to perform electronic shopping or the like or performs credit settlement by performing automatic settlement at a trader such as a retail store at which he/she registers himself/herself as the trap type VP, it follows that not the credit number of the VP himself/herself but an encrypted credit number obtained by encrypting the credit number of the VP himself/herself a number of times with the secret key is employed, as hereinabove described. For example, the VP accessing the site MTT as the trap type VP name E(B13P) as shown in FIG. 3 employs the virtual credit number E(3288) when making electronic shopping or the like and settling accounts on credit. The VP registers the credit number 3288 with respect to the credit card issuing company 4, but he/she does not register the encrypted credit number E(3288). When the virtual credit number E(3288) is transmitted to the credit card issuing company 4 following credit settlement, therefore, the credit card issuing company 4 cannot retrieve the virtual credit number E(3288) on its own for confirming trueness/falseness.

In this case, therefore, the credit card issuing company asks the financial institution 7 to enquire whether or not the virtual credit number is correct.

When receiving an enquiry from the credit card issuing company, the control advances to S561 for performing authentication processing similar to the aforementioned one in S561 to S568. If confirming the person in question as a result of authentication, the server makes a determination of YES through S567 and advances to S569 for transmitting an input request for enquired data to the credit card issuing company. This enquired data includes the aforementioned virtual credit number and the name of the trap type VP. When the name of this trap type VP is also input, it is possible to also enquire whether or not the name of the trap type VP and the virtual credit number correspond to each other.

When the credit card issuing company transmits the enquired data, the control advances to S571 for performing processing of making retrieval in the database 12*a* and making collation with the transmitted enquired data. Then, the server determines whether or not the transmitted enquired data is proper as a result of collation through S572, for sending back properness to the credit card issuing company through S573 if the data is proper while sending back improperness to the credit card issuing company through S574 if the data is improper as a result of collation. When sending back properness through S573, the server assigns a digital signature of the financial institution 7 indicating properness of the enquired data input through S570, and it follows that the data assigned with the digital signature is sent back to the enquiring credit card issuing company 4.

FIG. 26 is a flow chart showing a subroutine program of the pseudo mode processing of the browser phone 30 shown at S95*b* of FIG. 14. A determination is made as to whether or not it is a power supply time through SD1, and the control advances to SD2 if it is not a power supply time for determining whether or not a pseudo mode operation has been performed, to advance to SD3 if no operation has been performed for determining whether or not a pseudo mode cancel operation has been performed, to advance to SD10 if no operation has been performed.

When power is supplied to the browser phone 30, a determination of YES is made through SD1 to advance to SD4, for performing processing of displaying the type of the current mode on the browser phone 30. The browser phone 30 has three types of modes, i.e., the pseudo mode, a trap mode and a normal mode, and which mode it is at present is displayed through SD4. Then, the control advances to SD5 for determining whether or not it is the pseudo mode at present, and the subroutine program of this pseudo mode processing is ended if it is not the pseudo mode.

If it is the pseudo mode, on the on the hand, the control advances to SD6 for performing processing of transmitting a password for the person in question authentication and storing the same in the RFID tag affixed to the purchased article possessed by the personal user. Then, processing of transmitting an OFF-mode instruction to the RFID is performed through SD7. Thus, the RFID tag affixed to the purchased article enters the OFF-mode, i.e., a transmission stop mode transmitting no stored RFID as described above (see SC6). Then, the control advances to SD8 for transmitting an RFID transmission instruction to the RFID tag affixed to the purchased article, and a determination is made as to whether or not the RFID has been transmitted from the RFID tag and the same has been received through SD9. In general, no RFID is transmitted since it is after the switching to the transmission stop mode, and the control advances to SD10 for performing RFID exchange processing. If a determination is made that the RFID has been received through SD9, on the other hand, the control advances to SD11, so that the browser phone 30 displays an error.

When the personal user performs the pseudo mode operation with the browser phone 30, a determination of YES is made through SD2 to advance SD12, for performing processing of switching the browser phone 30 to the pseudo mode and thereafter advancing to SD6. If the browser phone 30 performs the pseudo mode cancel operation, on the other hand, a determination of YES is made through SD3 to advance to SD13, for performing processing of canceling the pseudo mode of the browser phone 30 and bringing the same into the normal mode.

The personal user having the browser phone 30 having this pseudo RFID transmission function may not necessarily possess the aforementioned RFID tag 1*a* for security. This is because the browser phone 30 substitutes for the RFID tag 1*a* for security.

FIG. 27 is a flow chart showing a subroutine program of the RFID exchange processing shown at SD10, which is executed in the pseudo mode. Processing of transmitting an exchange desire wave from the browser phone is performed through SE1. This exchange desire wave is an electric wave reaching only a range of 20 meters at the maximum. The range of this exchange desire wave may be rendered changeable to a change set point of 2 meters or 5 meters, for example, by a manual operation. Then, the control advances to SE2, for determining whether or not the exchange desire wave has been received from within an exchange area, i.e., the range where the exchange desire wave reaches. The control advances to SE3 when the wave has been received, for determining whether or not it is a partner (browser phone 30) already exchanged today, and this subroutine program is ended without performing the exchange processing if it is the already exchanged browser phone 30. In order to enable the determination as to whether or not it is the already exchanged partner (browser phone 30), an ID code or the like for specifying the browser phone 30 may be transmitted along with the aforementioned exchange desire wave.

If it is a partner (browser phone 30) not yet exchanging the RFID today, on the other hand, the control advances to SE4 for determining whether or not the pseudo RFID is stored. If the EEPROM 194 of the browser phone 30 stores the pseudo RFID, the control advances to SE8, for performing processing of transmitting the stored pseudo RFID (newest pseudo RFID in storage, for example) to the exchange partner browser phone 30 while receiving the pseudo RFID from the partner browser phone 30. Then, the control advances to SE9, for performing processing of shifting pseudo RFIDs already stored in the EEPROM 194 one by one toward an old storage area and erasing the oldest pseudo RFID exceeding the upper limit of storage. Then, the control advances to SE10, for performing processing of storing the received pseudo RFID in a newest storage area.

When the EEPROM 194 stores absolutely no pseudo RFIDs, on the other hand, the control advances to SE5 for performing processing of generating a random number KR for number decision and deciding the number of transmission of pseudo RFIDs. Then, the control advances to SE6, for performing processing of generating a random number IDR for deciding codes of RFIDs by the decided number for deciding and transmitting the codes of pseudo RFIDs. Then, the control advances to SE7, for performing processing of receiving the pseudo RFID from the partner and storing the same in the newest storage area.

Through this RFID exchange processing, it follows that stored pseudo RFIDs are exchanged and stored when personal users possessing browser phones 30 pass each other, for example. Consequently, personal users moving through relatively identical places exchange pseudo RFIDs and store the same as mutual common pseudo RFIDs so that the common pseudo RFIDs can be transmitted when receiving an RFID transmission request, whereby the aforementioned different person identical identifier transmission phenomenon can be caused between the personal users moving through the relatively identical places for effectively disturbing a malicious privacy invader.

FIG. 28 is a flow chart showing a subroutine program of the trap mode processing shown at S95*c* of FIG. 14. A determination is made as to whether or not a trap mode operation has been performed through SF1 to advance to SF2 if no operation has been made for determining whether or not a trap mode cancel operation has been made, and this subroutine program is ended if no operation has been performed. When the personal user performs the trap mode operation by operating his/her browser phone 30, a determination of YES is made through SF1 to advance to SF3, and the browser phone 30 is switched to the trap mode.

Then, the control advances to SF4, for performing processing of transmitting the password to the RFID affixed to the purchased article possessed by the user. Then, the control advances to SF5, for transmitting an OFF-mode instruction to the RFID. Then, an RFID transmission instruction is transmitted through SF6, and a determination is made as to whether or not the RFID has been received through SAF7. Since the OFF-mode instruction has already been transmitted through SF5, it is generally impossible that the RFID is transmitted from the RFID tag affixed to the purchased article possessed by the user. In general, therefore, a determination of YES is made through SF7 and the control advances to SF7*a*. At SF7*a*, a determination is made as to whether or not a selective trader specifying operation is performed. While the control advances to SF8 if no operation is performed, the control advances to SF7*b* if the personal user selectively specifies a partner trader to be entrapped with his/her browser phone 30, for performing processing of storing the selectively specified trader and thereafter advancing to SF8.

Then, the browser phone 30 displays trap mode switching completion through SF8. When it is determined that the RFID has been received through SF7, on the other hand, the control advances to SF9 so that the browser phone 30 displays an error.

Then, if the personal user performs the trap mode cancel operation by operating his/her browser phone 30, a determination of YES is made through SF2 to advance to SF10, for canceling the trap mode of the browser phone 30.

FIG. 29 is a flow chart showing a subroutine program of the RFID transmission processing shown at S95*d* of FIG. 14. A determination is made as to whether or not the RFID transmission instruction has been received through SG1. This subroutine program is ended if no instruction has been received. When the tag reader transmits the RFID transmission instruction, on the other hand, the browser phone 30 receives the same so that a determination of YES is made through SG1, and the browser phone 30 notifies the purport of receiving through SG2. More specifically, the browser phone 30 generates a receiving tone and shows a display indicating that it has received a wave of the RFID transmission request on a liquid crystal screen, in order to notify this.

Then, the control advances to SG3, for determining whether or not it is the pseudo mode. The control advances to SG4 if it is not the pseudo mode, for determining whether or not it is the trap mode. This subroutine program is ended if it is not the trap mode, i.e., in the case of the normal mode. In the case of the normal mode, therefore, no processing of transmitting the RFID is performed even if the RFID transmission instruction is received.

A determination of YES is made through SG3 if the browser phone 30 is in the pseudo mode so that the control advances to SG3*a*, for determining whether or not 5 seconds have elapsed from precedent RFID transmission. The control advances to SG3*b* if 5 seconds have not yet elapsed, for performing processing of transmitting an RFID of the same code as the precedently transmitted RFID. This is on the assumption that RFID transmission requests are continuously transmitted from the tag reader a plurality of times in a short period in order to improve read reliability of the tag reader, and if a pseudo RFID generated at random is transmitted every time in this case, such inconvenience takes place that the RFID is not read as a proper RFID. If 5 seconds have not yet elapsed from the precedent RFID transmission, therefore, the RFID of the same code as the precedent one is so transmitted as to prevent such inconvenience that this is found out to be the pseudo RFID. Further, such a possibility is also predicted that a tag reader continuously transmitting RFID transmission requests a plurality of times not for the purpose of improving the read reliability of the tag reader but for ascertaining whether a received RFID is a genuine RFID or a pseudo RFID is set. Also when such a type of tag reader is set, it is possible to prevent such inconvenience that this is found out to be the pseudo RFID since the RFID of the same code as the precedent one is sent back if an RFID transmission request is performed again in the range of the prescribed period (5 seconds, for example). Even if the electric waves for the power source are temporarily stopped after the first pseudo RFID is transmitted and the electric waves for the power source are thereafter (after 5 seconds, for example) transmitted again and an RFID transmission request is performed in this case, the same pseudo RFID as the precedent one can be re-transmitted since the RFID tag 1*a* is in operation with the power supplied from the capacitor 110.

If 5 seconds have elapsed from the precedent RFID transmission, a determination of YES is made through SG3*a* to advance to SG5, for determining whether or not pseudo RFIDs are stored in the EEPROM 194. The control advances to SG9 if the same are stored, for performing processing of transmitting an RFID subsequent to the precedently transmitted RFID among the stored pseudo RFIDs. If no pseudo RFIDs are stored, on the other hand, the control advances to SG6 for performing processing of generating the random number KR for number decision and deciding the number of transmission of the RFIDs, and processing of generating the random number IDR for deciding codes of RFIDs by the decided number for deciding and transmitting the codes of pseudo RFIDs is performed through SG7. Further, processing of making the EEPROM 194 store the decided pseudo RFIDs respectively is performed through SG8.

When the browser phone 30 is in the trap mode, a determination of YES is made through SG4 to advance to SG10, for determining whether or not the store name of a trader has been received. In a case of automatic settlement described later or the like, a store name signal of a sales trader is received (see SH2). When the store name of the trader is received, the control advances to SG11 for determining whether or not a trap type RFID corresponding to the received trader is stored in the IC terminal 19V for the VP (see FIGS. 8 and 9). The control advances to SG12 if the same is stored, for performing processing of transmitting the trap type RFID corresponding to the received trader. If a determination of NO is made through SG10 or SG12, on the other hand, the control advances to SG13 for performing processing of reading an RFID corresponding to the trader previously selectively specified through SF7*b* of FIG. 28 from the EEPROM 26 of the IC terminal 19V for the VP (see FIGS. 8 and 9) and transmitting the trap type RFID. When the personal user walks in a trader such as a supermarket issuing no point cards or performs automatic settlement on a purchased article in this trader and the trader transmits an RFID transmission request, for example, it follows that the trap RFID corresponding to the trader previously selectively specified through SF7*b* is transmitted. When the personal user selectively operates the trader MTT and makes the browser phone 30 store the selectively specified trader MTT through SF7*b* and an RFID transmission request is issued in a supermarket (in RIF) issuing no new point card, i.e., registering no VP, for example, it follows that mtt which is the trap type RFID corresponding to MTT is transmitted from the breiser phone 30. When the supermarket RIF transmits a direct mail or an E-mail to E(B13P) who is the trap type VP after mtt which is the trap type RFID is transmitted (see FIG. 9), it is recognized that the trader MTT has illegally distributed the private information E(B13P), the E-mail address ΔΔΔΔΔ of the trap type VP registered in the trader MTT to the supermarket RIF. Thus, the trap type RFID is so transmitted that it is possible to check whether or not the private information has been illegally distributed by checking the addressee and the sender of an E-mail or a direct mail sent later.

FIG. 30 is an explanatory diagram showing a passage state through a settlement gate in a case where a personal user purchases articles and thereafter performs automatic settlement in a trader such as a department store. A personal user 202 purchases articles at a department store (trader) 206, packs the same in a shopping bag 203, passes through a passage gate 206 for settlement and performs settlement of the purchased articles. RFID tags are affixed to the purchased articles respectively, for making communication with a tag reader/writer 201 provided on the passage gate 206. The personal user 202 possesses the browser phone 30.

A settlement server 204 and a database 205 are set in the department store (trader) 206. The settlement server 204 is electrically connected with the tag reader/writer 201 provided on the passage gate 206. The tag reader/writer 201 makes communication with the browser phone 30 possessed by the personal user 202 and the RFID tags affixed to the purchased articles stored in the shopping bag 203 of the personal user 202 when the personal user passes through the passage gate 206, and transmits data necessary for settlement to the settlement server 204. The database 205 connected to the settlement server 204 stores customer data. More specifically, it stores customer names E(B13P), E(NPXA) . . . and point numbers, addresses and E-mail addresses corresponding to the respective customer names. The addresses are an address □x○ of a convenience store of E(B13P) who is the trap type VP and Δ○○ (see FIG. 3) which is the address of a convenience store of E(NPXA), and the E-mail address is ΔΔΔΔΔ which is the E-mail address of the trap type VP established in the financial institution 7 in the case of the trap type VP (see FIG. 3). The RFID tags affixed to the purchased articles can be first brought into an RFID transmission stop state when receiving a prescribed signal (settlement completion signal, for example) from the tag reader/writer 201 at a point of time when passed through the settlement gate and settlement is completed. Before settlement completion, therefore, the same do not enter the RFID transmission stop state also when the browser phone 30 transmits an OFF-mode instruction according to SD7 or SF5.

FIG. 31 is a flow chart showing a subroutine program of the automatic settlement processing shown at S100 of FIG. 14. A determination is made as to whether or not an automatic settlement start signal has been received through SH1. If the automatic settlement start signal is transmitted from the tag reader/writer 201 to the browser phone 30 when the personal user 202 passes through the passage gate 206, a determination of YES is made through SH1 to advance to SH2, for determining whether or not a store name signal of the department store 206 which is the sales trader has been received, and waiting until receiving the same. When the store name signal is transmitted from the tag reader/writer 201 to the browser phone 30, the control advances to SH3 for determining whether or not a trap type RFID corresponding to the transmitted store name (trader name) is already stored in the IC terminal 19V for the VP. The control advances to SH5 if the same is already stored, while the control advances to SH4 if the same is not yet stored for performing processing of generating a new trap type RFID in correspondence to the transmitted store name (trader name) and making the EEPROM 26 store the IC terminal 19V for the VP.

Then, the control advances to SH5, for determining whether or not the trader of the transmitted store mane is a trader issuing and registering a point card. The control advances to SH14 if no point card is registered, while the control advances to SH6 if it is a trader issuing a point card, for performing processing of displaying the purport that both of debit settlement and credit card settlement are possible through the browser phone 30.

During the processing of SH1 to SH6, the tag reader/writer 201 makes communication with the RFID tags affixed to the respective purchased articles stored in the shopping bag 203 and transmits the respective RFIDs transmitted from the RFID tags to the settlement server 204. The settlement server 204 infers the article prices corresponding the respective transmitted RFIDs, calculates the total sum thereof and transmits the same to the tag reader/writer 201. The tag reader/writer 201 transmits the total sum to the browser phone 30 of the personal user 203.

Then, the control advances to SH7, for performing processing of receiving a paid sum. This paid sum receiving processing is performed through the transmission of the total sum (paid sum) from the tag reader 201 to the browser phone 30. Then, the control advances to SH8, for determining whether or not an input operation of settlement processing has been performed. The personal user 202 inputs settlement processing through the browser phone 30. As to the types of settlement, there are the aforementioned debit card settlement, credit card settlement and reload sum settlement. According to the reload sum settlement, settlement is performed with a sum partially paid from the remainder of the bank account of the personal user 202 to the browser phone 30 and reloaded to the browser phone 30. Then, the control advances to SH9, for performing processing of displaying the paid sum received through SH7 on the browser phone 30. Then, the control advances to SH10, for determining whether or not an OK operation for agreeing with the paid sum and performing settlement has been performed. The control advances to SH11 if no OK operation has been performed for determining whether or not a cancel operation canceling the settlement has been performed, and the control returns to SH10 if no operation has been performed. If the customer 202 inputs the OK operation by operating the browser phone 30 in an intermediate stage of circulation of this loop of SH10 and SH11, the control advances to SH13. When the personal user 202 performs the cancel operation, on the other hand, the control advances to SH12 so that a cancel signal is transmitted from the browser phone 30 to the tag reader/writer 201 for transmitting an indication of an intention for canceling purchase of the articles.

At SH13, a determination is made as to whether or not the type of the settlement input through SG8 is the reload sum settlement. The control advances to SH14 in the case of the reload sum settlement, for determining the large-small relation between the paid sum received through SH7 and the reload sum reloaded to the browser phone 30 and making a determination as to whether or not the reload sum exceeds the paid sum. If the reload sum exceeds the paid sum, an OK signal is transmitted from the browser phone 30 to the tag reader/writer 201 through SH15, and the signal is transmitted to the settlement server 204. Then, VP settlement processing is performed through SH16. FIGS. 53 to 55 show the details of this VP settlement processing. Since the reload sum settlement is performed in the case of SH16, it follows that a determination of YES is made through S249 of FIG. 22 and processing of S250 to S252*b* is performed.

Then, point card addition processing is performed through SH17. This point card addition processing is processing for adding a point number corresponding to the total sum of the purchased particles to the point card, and is shown in FIG. 32(*a*).

When a determination of NO is made through SH14, on the other hand, the control advances to SH18 for performing processing of transmitting a cancel signal from the browser phone 30 to the tag reader 201, so that the signal is transmitted to the settlement server 204. Then, the control advances to SH19, so that the browser phone 30 displays the purport that the remainder is insufficient.

If the trader for the settlement is a trader registering no point card, it follows that a determination of NO is made through SH5, the processing of reload settlement through SH14 to SH19 is performed, and neither credit settlement nor debit settlement is performed. This is because the VP information of the personal user 202 is not registered in the trader in the case of the trader registering no point card and hence it is impossible to perform credit settlement or debit settlement as the VP.

The control advances to SH20 if a determination of NO is made through SH13, for determining whether or not the input settlement processing is credit settlement. The control advances to SH22 in the case of credit settlement, so that an OK signal is transmitted from the browser phone 30 to the tag reader/writer 201 and the signal is transmitted to the settlement server 204. Then, the control advances to SH23, for performing VP settlement processing. Since this VP settlement processing at SH23 is credit settlement, it follows that a determination of YES is made through S238 of FIG. 55 and credit settlement processing of S237 to S248 is performed.

If the input settlement processing is debit settlement, a determination of NO is made through SH20 to advance to S21, so that the browser phone 30 transmits a debit settlement request signal to the tag reader/write 201 and the signal is transmitted to the settlement server 204. The settlement server 204 searches the database 200 to infer the virtual account number such as E(2503), for example, corresponding to the customer name of the settlement partner (see FIG. 30), and asks the financial institution 7 how much the remainder of the virtual account number is. If the remainder exceeds the paid sum, it transmits an OK signal to the browse phone 30 through the tag reader/writer 201. If the remainder is less than the paid sum, on the other hand, it transmits an NG signal to the browser phone 30 through the tag reader/writer 201.

In the browser phone 30, a determination is made as to whether or not the OK signal has been received through SH24, for determining whether or not the NG signal has been received through SH26 if the same has not yet been received, and returning to SH24 if the same has not yet been received.

If the tag reader/writer 201 transmits the OK signal to the browser phone 30 in an intermediate stage of the loop of SH24 and SH26, the control advances to SH25 for performing VP settlement processing. In this case, it follows that a determination of YES is made through S220 of FIG. 54(*b*) and debit settlement processing of S235 to S234 is performed since it is debit settlement.

When the tag reader/writer 201 transmits the NG signal to the browser phone 30, a determination of YES is made through SH26 to advance to SH27, so that the browser phone 30 displays NG.

FIG. 32(*a*) is a flow chart showing a subroutine program of the point card addition processing shown at SH17. Processing of transmitting the corresponding VP information is performed through SI1. This retrieves the VP registered in the trader of the settlement partner from the EEPROM 26 of the IC terminal 19V for the VP, and transmits information such as the retrieved VP name (E(B13)), for example) to the tag reader/writer 201. The tag reader/writer 201 transmits the received VP information to the settlement server 204. The settlement server 204 searches the database 205 (see FIG. 30) on the basis of the received VP name, infers a current point number 19018 if the received customer name is E(B13P), for example, and performs processing of adding the point number corresponding to the total sum of the purchased articles to the current point number. The settlement sever 204 transmits the added point number to the browser phone 30 through the tag reader/writer 201.

The browser phone 30 determines whether or not the point has been received through S12, and waits until receiving the same. When receiving the added point number from the tag reader/writer 201, the control advances to SI3 for performing processing of making the EEPROM 26 of the IC terminal 19V for the VP store the same in association with the corresponding trader (the trader of the settlement partner).

FIG. 23(*b*) is a flow chart showing a processing operation of the browser phone 30 at a time of making the trader 206 such as the department store newly issue and register a point card. A determination is made as to whether or not the personal user 202 has performed a point card registration operation with the browser phone 30 through SJ1, to advance to SJ2 if he/she has performed the operation for determining whether or not the EEPROM 26 of the IC terminal 19 for the VP stores a trap type VP already registered in the financial institution 7 but not yet employed for point card registration. The control advances to SJ3 if the answer of the determination is NO, so that the browser phone 30 displays the purport that there is no trap type VP. At this time, the personal user 202 performs processing for making the financial institution 7 generate and register a new trap type VP. If a generation request for a new trap type VP is received, the VP management server 9 of the financial institution 7 performs trap type VP processing of FIG. 37 or FIG. 40(*b*) for performing processing of generating and registering a new trap type VP.

If it is determined that trap type VPs which are regularly registered trap type VPs not yet employed for point card registration are stored through SJ2, on the other hand, the control advances to SJ4 for performing processing of selecting one from the trap type VPs and transmitting necessary information such as the address and the name thereof from the browser phone 30 to the settlement server 204 through the tag reader/writer 201. The settlement server 204 makes a determination as to whether or not new registration of a point card is performed on the basis of the received trap type VP information, and sends back the determination result to the browser phone 30 through the tag reader/writer 201.

In the browser phone 30, a determination is made as to whether or not an OK signal has been received through SH5 for determining whether or not an NG signal has been received if no signal has yet been received, and the control returns to SJ5 if no signal has yet been received. When receiving an OK signal as the determination result of the settlement server 204 in an intermediate stage of this loop of SJ5 and SJ6, a determination of YES is made through SJ5 to advance to SJ7, for determining whether or not the trader name which is a point card registration partner has been received. The settlement server 204 transmits the trader name of the store to the browser phone 30 through the tag reader/writer 201 after transmitting the OK signal. Then, a determination of YES is made through SJ7 to advance to SJ8, for performing processing of making the EEPROM 26 of the IC terminal 19V for the VP store the trap type VP in association with the received trader name.

If the determination result from the settlement server 204 is NG, on the other hand, a determination of YES is made through SJ6 to advance to SJ9, so that the browser phone 30 displays NG.

FIG. 33 is a flow chart showing settlement processing of the settlement server 204 of the sales trader 206. A determination is made as to whether or not it is a start of automatic settlement through SK1 to advance to SK2 if it is not the start of automatic settlement for determining whether or not it is a new registration request for a point card, and the control advances to SK3 if it is not the new registration request so that other processing is performed and the control returns to SK1.

When the personal user 202 passes through the passage gate 206 for settlement, a determination of YES is made through SK1 to advance to SK4, for performing instruction processing of transmitting a signal of the store name (trader name) from the settlement server 204 to the browser phone 30 through the tag reader/writer 201. Then, the control advances to SK5, for performing instruction processing for making the tag reader/writer 201 transmit a signal of an RFID transmission request. Then, the control advances to SK6 for making a determination as to whether or not RFIDs have been received, and waiting until receiving the same. The respective RFIDs transmitted from the RFID tags affixed to the respective purchased articles stored in the shopping bag 203 are read by the tag reader/writer 201 and a signal thereof is transmitted to the settlement server 204. Then, a determination of YES is made through SK6 to advance to SK7, for performing processing of retrieving RFIDs registered as sales articles of the store from among the received respective RFIDs. The database 205 of the department store (trader) 206 stores not only the customer data shown in FIG. 31 but also the respective RFIDs of the sales articles and article price data made to correspond thereto. The settlement server 204 searches the database 205 for determining whether or not the RFIDs registered in the database 205 include those according with the transmitted RFIDs, and retrieves according ones. Processing of calculating the total sum of the article prices of the according RFIDs is performed through SK8. Then, the control advances to SK9, for performing processing of transmitting the calculated total sum to the browser phone 30 through the tag reader/writer 201 as the paid sum.

Then, the control advances to SK10, for determining whether or not an OK signal has been received from the browser phone 30, while a determination is made as to whether or not a cancel signal has been received from the browser phone 30 through SK11. Settlement processing is performed through SK12 if an OK signal is transmitted from the browser phone 30 in an intermediate stage of circulation of this loop of SK10 and SK11. This processing is a processing operation of the settlement server 2024 of the sales trader corresponding to the settlement processing operation of the browser phone 30 in FIGS. 53 to 55. Then, the control advances to SK13, for performing processing of deleting the RFIDs of the sold articles from the registration of the database 205. Then, the control advances to SK14, for performing processing of calculating the addition point number corresponding to the total sum of the sold articles.

The control advances to SK15 for determining whether or not VP information has been received, and waits until receiving the same. If corresponding VP information is transmitted from the browser phone 30 according to SI1, the control advances to Sk16 for performing processing of transmitting the addition point number from the tag reader/writer 201 to the browser phone 30. Then, the control advances to SK17 for performing processing of inferring point data corresponding to the received VP from the database 205 (see FIG. 30) and adding/updating the addition point number with respect to the inferred point number and the control returns to SK1.

Then, a determination of YES is made through SK2 to advance to SK21 when receiving a new registration request for a point card, for determining whether or not the VP has been received and waiting until receiving the same. When the browser phone 30 transmits trap type VP information according to SJ4, the control advances to SK22 for performing enquiry processing as to whether or not it is a VP properly registered in the VP management server 9 of the financial institution 7. The VP management server 9 checks whether or not it is the VP properly registered in the database 12*a*, and sends back the check result to the settlement server 204 of the sales trader 206. The settlement server 204 determines whether or not the sent-back check result is proper through SK23, and performs processing of sending back NG to the browser phone 30 through the tag reader/writer 201 if it is not proper. On the other hand, the control advances to SK18 if it is proper, for performing processing of sending back an OK signal to the browser phone 30 through the tag reader/writer 201.

The control advances to SK19 for performing processing of transmitting the store name (trader name) to the browser phone 30 through the tag reader/writer 201, and processing of newly registering the VP in the database 205 as a point object customer is performed through SK22 (see FIG. 30).

Referring to FIG. 34, the IC terminal 19V for the VP performs identification number check processing through S253. Then, the IC terminal advances to S254 for performing trap type RFID processing. Then, the IC terminal advances to S255 for performing person in question proof processing. Then, the IC terminal advances to S256 for performing data input processing. Then, the IC terminal advances to S257 for performing user agent operation processing. Then, the IC terminal advances to S258 for performing reload sum use processing. Then, the IC terminal advances to S259 for performing signature processing. Then, the IC terminal performs trap type VP processing through S615. This processing is described later with reference to FIG. 37.

FIG. 35(*a*) is a flow chart showing a subroutine program of the identification number check processing shown in S253. The IC terminal determines whether or not the identification number has been input through S268 and terminates the subroutine program as such if the same has not been input. If the identification number is input, on the other hand, the IC terminal advances to S269 for performing processing of collating the input identification number with the stored identification number. Then, the IC terminal advances to S270 for determining whether or not the numbers accord with each other as a result of collation and advances to S271 if the numbers do not accord with each other for performing processing of transmitting improperness to the browser phone 30. If the numbers accord with each other, on the other hand, the IC terminal advances to S272 for sending back properness.

FIG. 35(*b*) is a flow chart showing a subroutine program of the trap type RFID processing (for the VP) shown in S254. A determination is made as to whether or not the trader name is input through S273. The browser phone 30 inputs the trader name (store name) corresponding to the trap type RFID in the IC terminal 19V for the VP (SG11, SG13 and SH3). The control advances to S274 if it is input, for determining whether or not it is a read request for the trap type RFID corresponding to the input trader name. A determination of YES is made through S274 if it is a request according to SG11 and SG13, and processing of retrieving the trap type RFID corresponding to the input trader name from among the trap type RFIDs stored in the EEPROM 26 is performed through S275. A determination is made as to whether or not the corresponding trap type RFID is stored as a result of retrieval through S276. If it is stored, processing of outputting the corresponding trap type RFID to the browser phone 30 is performed through S277. If it is determined that no corresponding trap type RFID is stored through S276, on the other hand, processing of outputting the same to the browser phone 30 is performed.

The browser phone 30 makes a determination of NO through SH3 when receiving a signal of the purport that it is not stored, and outputs an instruction for storing the trap type RFID in association with the trader name to the IC terminal 19V for the VP through SH4. The IC terminal 19V for the VP receiving the same makes a determination of YES through S273 and a determination of NO through S274, and performs processing of generating a new trap type RFID and making the EEPROM 26 store the same in association with the trader name through S278.

FIG. 35(*c*) is a flow chart showing a subroutine program of the person in question processing (for the VP) shown in S255. The IC terminal determines whether or not a random number R has been input through S280 and terminates this subroutine program if no random number has been input. The IC terminal advances to S281 if the random number R has been input, for determining whether or not it is a VP birth request time. If it is a VP birth request time, it is necessary to prove that the RP is the legal person in question with the authentication key KN of the RP, as described with reference to S6 and S151. Therefore, the IC terminal advances to S283 if it is the VP birth request time, for performing processing of encrypting the input random number R with the authentication key KN of the RP and generating I, i.e., processing of calculating $I=E_{KN}(R)$. The IC terminal performs processing of outputting the calculated I to the browser phone 30 through To 284.

If it is not the VP birth request time, on the other hand, the IC terminal makes a determination of NO through S281 and advances to S282 for performing processing of encrypting the input random number R with the secret key KS of the VP for calculating I, i.e., processing of calculating I=ESK(R) in order to prove that the VP is the legal person in question. The IC terminal performs processing of outputting the calculated I to the browser phone 30 through S248.

FIG. 36(*a*) is a flow chart showing a subroutine program of the data input processing shown in S256 and S263. The IC terminal determines whether or not data input has been made through S293. The input data includes record data of a CD-ROM recording data related to the VP created by the VP management server 9, the knowledge data of the user agent (see S179 and S189), the charged sum G (see S181 and S191) etc., as hereinabove described. When these data are input, the control advances to S294 for performing processing of storing the input data in the storage area corresponding to the input data.

FIG. 36(*b*) is a flow chart showing a subroutine program of the user agent operation processing shown in S257 and S264. The IC terminal determines whether or not a public key output request has been received through S295. When the output request for the public key has been received, the IC terminal advances to S298 for performing processing of outputting the stored public key KP. When making a determination of NO through S295, the IC terminal advances to S296 for determining whether or not an output request for debit card information has been received. If the same has been received, the IC terminal advances to S299 for performing processing of outputting the stored debit card information.

When making a determination of NO through S296, the IC terminal advances to S297 for determining whether or not an output request for credit card information has been received. If the request has been received, the IC terminal advances to S300 for performing processing of outputting the stored credit card information. Then, the IC terminal advances to S301 for performing other operation processing. This other operation processing is described later with reference to FIG. 30.

FIG. 36(*c*) is a flow chart showing a subroutine program of the reload sum use processing shown in S258 and S265. The IC terminal determines whether or not a request for remitting the charged sum G has been received through S302, and terminates this subroutine program if no request has been received. If the request has been received, the IC terminal advances to S303 for performing processing of subtracting G from the stored reload sum and advances to S304 for performing processing of sending back a payment completion signal.

FIG. 36(*d*) is a flow chart showing a subroutine program of the VP signature processing shown in S259. The IC terminal determines whether or not the message digest MD and the VP name have been input from the browser phone 30, and terminates this subroutine program if the same have not been input.

If the MD and the VP name have been input, the control advances to S998 for performing processing of generating a secret key (KS) from the input VP name. More specifically, the IC terminal 19V for the VP makes retrieval in the trap type RFID data storage area on the basis of the input VP name to deduce how many times the real name 13P (see FIG. 9) has been encrypted for the input VP name. The IC terminal encrypts the secret key of the VP with the secret key of the VP by the deduced encryption count and generates the secret key (KS).

Then, the control advances to S997 for performing processing of decoding the message digest MD with the secret key (KS) and generating a double signature. Then, the control advances to S998 for performing processing of outputting the double signature D(KS)(MD) to the browser phone 30.

FIG. 37 is a flow chart showing a subroutine program of the trap type VP processing shown in S615. The IC terminal determines whether or not a request for generation of a new trap type VP has been received through S620 and advances to S623 if no request has been received for determining whether or not there has been enquiry about whether or not the trap type VP is already used and terminating this subroutine program if no enquiry has been received.

When the browser phone 30 issues a request for generation of a new trap type VP to the IC terminal 19V for the VP according to S598, the IC terminal makes a determination of YES through S620 and the control advances to S621. At S621, the IC terminal performs processing of adding "1" to the encryption count n for the final VP name in the trap type RFID data area of the IC terminal 19V for the VP and encrypting the real name of the VP with the secret key by n+1 times for generating a new trap type VP name. In the case of FIG. 11, for example, the encryption count for the final VP name E3(B13P) in the trap type RFID area is 3, and the IC terminal performs processing of adding "1" thereto for setting the encryption count to 4 and encrypting the real name B13P of the VP four times for generating a new trap type VP name E4(B13P).

Then, the IC terminal advances to S622 for performing processing of outputting the generated trap type VP to the browser phone 30 while storing the same in a space area subsequent to the final VP name in the trap type RFID data area.

When the browser phone 30 makes enquiry about whether or not a trap type VP has already been used for the site (trader intending to perform automatic settlement in FIG. 30) to be accessed at present to the IC terminal 19V for the VP according to S590, the IC terminal makes a determination of YES through S623 and the control advances to S624. At the time of this enquiry, the browser phone 30 also transmits the name of the site (the name of the trader intending to perform automatic settlement in FIG. 30) to be accessed at present to the IC terminal 19V for the VP. At S624, the IC terminal performs processing of making retrieval in the trap type RFID data area (see FIG. 9). The control advances to S625, for determining whether or not a trap type VP name has already been used for the transmitted site name (trader name). If the site name (trader name) transmitted from the browser phone 30 is MEC, for example, it is understood that the trap type VP name E2(B13P) has already been used with reference to FIG. 9.

When determining that the trap type VP name has already been used, the control advances to S626 for outputting that the same has already been used to the browser phone 30 while performing processing of outputting the used trap type VP and trap type RFID data corresponding thereto to the browser phone 30 through S627. In the case of FIG. 9, for example, the IC terminal outputs E2(B13P) to the browser phone 30 as the trap type VP while outputting trap type RFID data mec to the browser phone 30 if the transmitted site name (trader name) is MEC.

When no trap type VP has yet been used for the site name (trader name) transmitted from the browser phone 30 as a result of retrieval in the trap type RFID area of FIG. 9, the IC terminal makes a determination of NO through S625 and the control advances to S628 for performing processing of outputting nonuse to the browser phone 30.

FIGS. 38 and 39 are flow charts for illustrating processing operations of the server 16 of the convenience store 2. The server determines whether or not the name and the E-mail address of the VP and the name of the financial institution have been received through S315, advances to S316 when the same have not been received for determining whether or not the store has kept an article purchased by the VP, advances to S317 when keeping no article for determining whether or not an article receiving operation has been made, advances to S318 if no operation has been made for performing other processing, and thereafter returns to S315.

If the settlement server 10 transmits the name and the E-mail address of the created VP and the name of the corresponding financial institution to the convenience store 2 (see S18) in the process of the cycle of this loop of S315 to S318, the server makes a determination of YES through S315, advances to S319 for performing legal institution check processing and thereafter advances to S320.

The server determines whether or not R is equal to $D_{KP}(L)$ at S320 for making a determination of NO if this is not a legal institution and advances to S321 for displaying a warning about no legal institution. If this is a legal institution, on the other hand, the server makes a determination of YES through S320 and advances to S322 for performing processing of registering received data in the database 17.

When the user has made electronic shopping, for example, as the VP, the purchased article has been delivered to the convenience store 2 set as the address of the VP and the convenience store 2 has kept the article, the server makes a determination of YES through S316 and advances to S316*a* for performing processing of storing information on keeping of the article in an address area of article keep information for the corresponding VP. At this time, the server also stores information as to whether or not payment for this article has been completed. Then, the control advances to S323 for performing processing of deducing the E-mail address of this VP and transmitting a mail stating that the article has been kept to the E-mail address. The VP can recognize that the purchased article has been delivered to the convenience store by reading the E-mail and goes to the convenience store for receiving the article.

When the user goes to the convenience store 2 as the VP and makes an operation for receiving the delivered article, the server makes a determination of YES through S317. The control advances to S324 for displaying an instruction for inserting the IC terminal 19V for the VP. The user observing the same inserts and connects his/her IC terminal 19V for the VP into and to the USB port of the terminal 73. Then, the server makes a determination of YES through S325 and advances to S326 for performing identification number check processing. The user inputs the identification number for the VP from a keyboard provided on the terminal 73. The control advances to S327 on condition that the identification number accords and is proper, for performing processing of calling the name for the VP from the connected IC terminal 19V for the VP and making retrieval in the database 17 on the basis thereof. Then, the server determines whether or not the address area for the article keep information of the corresponding VP records article keep information through S328. If there is no article keep information, the server advances to S329 for displaying that no article is kept. If there is article keep information, on the other hand, the server advances to S330 for issuing an output request for an electronic certificate to the IC terminal 19V for the VP. The IC terminal 19V for the VP receiving the request outputs the stored electronic certificate to the server 16. Then, the server makes a determination of YES through S331, advances to S332 for reading the public key KP in the output electronic certificate and performs person in question check processing through S333.

The inserted IC terminal 19V for the VP stores the electronic certificate for the real name of the VP but stores no electronic certificate for the trap type VP as hereinabove described, and the electronic certificate for the trap type VP is stored in the XML store 50. When the user makes electronic shopping or the like with the real name of the VP and the purchased article is delivered to the convenience store 2, the name of the VP called according to S327 is the real name of the VP. In this case, the IC terminal 19V for the VP can output the electronic certificate in response to the request through S330. In this case, the server makes a determination of YES through S331 and the control advances to S332. When the user makes electronic shopping with the name of the trap type VP and the purchased article is delivered to the convenience store 2, on the other hand, it follows that he/she goes to the convenience store 2 for receiving the article as the trap type VP. In this case, the name of the VP called from the IC terminal 19V for the VP through S327 is the name of the trap type VP. Consequently, the server issues an output request for the electronic certificate corresponding to the name of the trap type VP to the IV terminal 19V for the VP through S330. In this case, the IC terminal 19V for the VP outputs an instruction for getting the electronic certificate from the XML store 50.

When receiving this output, the control advances to S631 for performing processing of accessing the XML store 50 for getting the corresponding electronic certificate and thereafter the control advances to S332.

Then, the server advances to S334 for determining whether or not R is equal to $D_{KP}(I)$. In a case of an illegal pretending VP, the server makes a determination of NO through S334 and advances to S335 for displaying improperness. In a case of a proper VP, on the other hand, the control advances to S336 for displaying the number of the kept article and determines whether or not payment has been completed in relation to the article through S337 for advancing to S339 if the payment has been completed while advancing to S338 for performing settlement processing if no payment has yet been completed.

At S339, the server determines whether or not delivery of the article has been completed. The salesperson of the convenience store 2 observes the number of the kept article displayed through S336, finds out the article having the corresponding number, transfers the article to the customer and thereafter performs an article transfer completion operation. Then, the server makes a determination of YES through S339, advances to S340 for updating the address area of the database 17 for the article keep information to a state keeping no article and thereafter returns to S315.

FIG. 39(*a*) shows the identification number check processing of S326. The server displays an input instruction for the identification number through S345, advances to S347 when the user inputs the same for transmitting the input identification number to the IC terminal 19V for the VP connected to the server 16, and advances to S349 if a result of determination of propriety of the identification number is sent back from the IC terminal 19V for the VP. The server determines whether or not this is a proper result of determination at S349 for displaying improperness through S350 and returning to S315 if the same is improper while terminating this subroutine so that the control advances to S327 if the same is proper.

FIG. 39(*b*) shows the person in question check processing of S333. The server performs processing of generating a random number R and transmitting the same to the IC terminal for the VP through S355 and waits until the IC terminal for the VP sends back response data I for challenge data R. When I is sent back, the server terminates this subroutine.

FIG. 39(*c*) shows the settlement processing of S338. The server performs processing of displaying the price of the kept article through S359 and advances to S360 for determining whether or not payment is made. The server advances to S362 if no payment is made for determining whether or not a payment operation with a reload sum has been made and returns to S360 if no operation has been made. If the user pays in cash and the salesperson of the convenience store makes an operation of the payment, the server makes a determination of YES through S360 and advances to S361 for performing payment processing toward the account of the article selling company and terminating this subroutine program.

When the user performs an operation for making payment with the reload sum stored in the IC terminal 19 for the VP, on the other hand, the server makes a determination of YES through S362 and advances to S363 for performing processing of transmitting a payment request for the price G to the IC terminal 19V for the VP. Then, the server advances to S364 for determining whether or not a payment completion signal has been output from the IC terminal 19V for the VP and waits until the same is output. When receiving the payment completion signal, the server makes a determination of YES through S364 and advances to S361.

Another embodiment is now described. This embodiment is a simple system completing a system of private information protection by a user terminal such as a browser phone 30 or a personal computer of the user, an IC terminal 19 and a Web site (trader). The difference between this embodiment and the aforementioned embodiment resides in that an E-mail address of a trap type VP is identical to an E-mail address for the real name of a VP. Therefore, a financial institution 7 may not transfer an E-mail addressed to the trap type VP. Further, the trap type VP employs a name created by encrypting the name of a site (trader) accessed by the trap type VP with a secret key employed for the real name of the VP. The trap type VP also employs an account number and a credit number identical to an account number and a credit number employed by the VP with his/her real name.

FIG. 40(*a*) is a diagram showing information stored in a trap type RFID storage area of an EEPROM 26 of an IC terminal 19V for the VP. This trap type RFID storage area stores only the real name B13P of the VP as the VP name, while storing no trap type VP name. The name of the trap type VP is created by encrypting the site (trader) accessed by the trap type VP with the secret key KSB of the VP of the real name. The count of this encryption is not restricted to one but may be a certain set count of at least twice. When storing only the name of the site (trader) accessed by the trap type VP, therefore, the name of the trap type VP corresponding to the site name (trader name) can be calculated according to an operation formula of $E_{KSB}$(site name) every time at need without storing the same. A secret key for the trap type VP is created by decoding the site name (trader name) corresponding to the trap type VP with the secret key KSB of the VP of the real name. Therefore, it is not necessary to minutely store a public key and the secret key in the IC terminal 19V for the VP in correspondence to the trap type VP but the same can be calculated according to an operation formula secret key=$D_{KSB}$(trader name) every time at need. Therefore, an XML store 50 may not store “encryption count”.

FIG. 40(*b*) is a flow chart showing a subroutine program of trap type VP processing. This subroutine program is another embodiment of the trap type VP processing shown in FIG. 37. The IC terminal determines whether or not a request for generation of a new trap type VP has been received from the browser phone 30 through S960 and the control advances to S959 if the request has been received for issuing an input request for the name of the accessed site (trader) to the browser phone 30. When the browser phone 30 transmits the name of the accessed site (trader), the control advances to S957 for performing processing of encrypting the transmitted site name (trader name) with a secret key KSB of the real name B13P of the VP and calculating $E_{KSB}$(trader name) which is a new trap type VP name. Then, the control advances to S956 for performing processing of outputting the calculated new trap type VP name to the browser phone 30, and performs processing of storing the input site name (trader name) in a trap type RFID storage area through S954.

S953 to S948 are the same control as S623 to S628 shown in FIG. 37, and hence redundant description is omitted.

FIG. 40(*c*) is a flow chart showing a subroutine program of private information circulation check performed by the IC terminal 19V for the VP. The IC terminal determines whether or not an E-mail has been received through S970 and terminates this subroutine program if no E-mail has been received. If receiving an E-mail addressed to the trap type VP, the browser phone 30 inputs the E-mail data in the IC terminal for the VP. Then, the control advances to S969 for performing an operation of $D_{KPB}$(addressee) by decoding the addressee of the input E-mail with a public key KPB employed for the real name of the VP and determining whether or not the result of the operation accords with the name of the sender of the E-mail.

The addressee of the E-mail is the trap type VP name, and this trap type VP name has been created by encrypting the name of the site (trader) accessed by the trap type VP with the secret key KSB of the VP. When the site (trader) accessed by the trap type VP with this name has transmitted the E-mail to the trap type VP, therefore, the IC terminal must make a determination of YES through S969. In this case, the IC terminal outputs properness to the browser phone 30 through S968, and a display part 76 of the browser phone 30 displays this purport. When a site (trader) other than the site (trader) accessed by the trap type VP with the name transmits an E-mail addressed to the trap type VP name, on the other hand, the IC terminal makes a determination of NO through S969 and the control advances to S967. At S967, the IC terminal performs processing of decoding the addressee of the E-mail with the public key KPB of the VP of the real name. Consequently, it follows that the trap type VP name which is the addressee of the E-mail is decoded with the public key KPB and a site name (trader name) of a plaintext is calculated. This site name (trader name) is the name of the site (trader) accessed with the VP name employed for the addressee of the E-mail, and it is conceivable that the accessed site (trader) has illegally circulated private information to the sender of the E-mail. Therefore, the IC terminal outputs the purport that $D_{KPB}$ (addressee) has been illegally circulated and illegally obtained by the trader having the name of the sender through S967. The browser phone 30 displays this purport on the display part 76.

FIG. 41 is a block diagram showing a structure formed by respective traders necessary for making service utilizing RFIDs transmitted from RFID tags affixed to purchased articles. The service utilizing RFIDs (hereinafter referred to as "RFID service") is providable by an article maker 300 which is one of the aforementioned supplier group S, an intermediate distribution trader 301 which is one of the company group 45, an article information service trader 302 which is another one of the company group 45 and a retail store 20*b* which is one of the member store group 6.

A Web server 303 and a Web database 304 are set in the article maker 300. A Web server 305 and a Web database 306 are set in the intermediate distribution trader 301. A Web server 307 and a Web database 308 are set in the article information service trader 302. A Web server 309 and a Web database 310 are set in the retail store 20*b*. These respective Web servers 303, 305, 307, 309 etc. are rendered communicable through the broadband/large capacity relay network 43 respectively. Further, the house 47 of the personal user receiving the RFID service is connected to the broadband/large capacity relay network 43.

FIG. 42 is a diagram showing the contents of data stored in the Web database 308 of the article information service trader 302. The Web database 308 is provided with an area storing RFIDs transmitted from RFID tags manufactured by an RFID tag maker, an area storing the URLs of the article maker 300 and producers such as a farmhouse producing farm products, an area storing the URL of the intermediate distribution trader 301, an area storing the URL of the retail store 20*b* and an area storing a page dedicated to the personal user (purchaser).

In the case of FIG. 42, 892013960 to 892014990 are registered as the RFIDs transmitted from the RFID tags manufactured by the RFID tag maker. Among these, 892013960 to 892014560 are allocated as the RFID tags affixed to the respective products of a producer having a URL http//www.sato. The RFIDs shown in FIG. 42 are allotted also to a producer of hppt//www.isida and a producer of http//www.kato.

Products from the producer of http//www.sato and the producer of hhtp//www.isida are delivered to an intermediate distribution trader of http//www.kanei. In the delivered stage, the URL of the intermedia distribution trader http//www.kanei is recorded in association with the RFIDs 892013960 to 892014801 transmitted from the RFID tags affixed to the products of both producers. The products from the producer of http//www.kato are similarly delivered also to an intermediate distribution trader of http//www.mitui, and stored in the area corresponding to the RFIDs 892014802 to 892014990 corresponding to the products.

When articles are delivered from any intermediate distribution trader to any retail store, the URL of the retail store is stored as illustrated in association with RFIDs corresponding to RFID tags affixed to the delivered articles. In relation to the RFIDs 892014802 to 89201490, no URLs are stored in storage areas of the retail stores. This is because the articles to which the RFID tags transmitting these RFIDs are affixed are in a distribution stage not yet delivered to the retail stores.

The purchaser page stores VP information such as the VP names B13P, NPXA, IQX3 etc. of the purchasers purchasing the articles to which the RFID tags are affixed and various information written by VPs in association therewith. IPv6 is employed in this embodiment.

FIG. 43 is a flow chart showing the control operation of the Web server 307 of the article information service trader 302. A determination is made as to whether or not a search formula has been received through SR1. This search formula is a search formula which the personal user inputs through the browser phone 30 or the like and transmits to the Web server 307 in order to retrieve an article. The control advances to SR2 if no search formula has been transmitted, for determining whether or not a registration request for a new RFID has been received. When the maker of the RFID tags manufactures a new RFID tag and transmits a registration request to the Web server 307 in order to register the RFID in the Web database of the article information service trader 302, a determination of YES is made through SR2 to advance to SR10, for performing processing of registering the transmitted new RFID in the Web database 308.

A determination as to whether or not offers have been received from the article maker 300 or the producer producing farm products for allocation of RFIDs of RFID tags affixed to its products through SR3 to advance to SR11 if the offers have been received for performing processing of allocating and issuing RFIDs to the producer by the number of the offers for allocation. Then, the control advances to SR12 for performing registration processing by storing the URL of the producer in the Web database in association with the allocated RFIDs. Thus, it follows that the stored URL of the producer is listed and displayed on the article homepage shown in FIG. 42.

A determination is made as to whether or not an offer for RFIDs has been received from the intermediate distribution trader 301 through SR4. If the products produced by the producer are delivered to the intermediate distribution trader 301, the intermediate distribution trader 301 reads the RFIDs of the RFID tags affixed to the delivered products and transmits the RFIDs to the Web server 307 of the article information service trader 302. Then, a determination of YES is made through SR4 to advance to SR13, so that the intermediate distribution trader performs processing of storing and registering the URL of 301 in the database 308 in association with the transmitted RFIDs. Consequently, it follows that the URL of the intermediate distribution trader is listed and displayed on the article homepage shown in FIG. 42.

A determination is made as to whether or not an offer for RFIDs has been received form the retail store 20*b* through SR5. When articles are delivered from the intermediate distribution trader 301 to the retail store 20*b* and the retail store 20*b* reads the RFIDs of the RFID tags affixed to the delivered articles and transmits the RFIDs to the Web server 307, a determination of YES is made through SR5 to advance to SR14, for performing processing of registering the URL of the retail store in the Web database 308 in association with the transmitted RFIDs. Consequently, it follows that the URL of the retail store is listed and displayed on the article homepage of FIG. 42.

The control advances to SR6 of FIG. 44 if a determination of NO is made through SR5. A determination is made as to whether or not a write request has been received from the purchaser through SR6. If the write request has been received, the control advances to SR15 for performing legal period proof processing. The details of this legal period proof processing are shown in FIG. 24(*b*). Then, the control advances to SR16 for performing person in question confirmation processing. The details of this person in question confirmation processing are processing similar to S412 to S417 of FIG. 18, for example. Then, the control advances to SR17 for determining whether or not correctness has been confirmable as a result of the person confirmation processing, so that rejection processing is performed through SR18 and the control thereafter returns to SR1 if no correctness is confirmable. If correct confirmation has been performable, the control advances to SR19 for performing processing of transmitting a transmission request for an RFID to the browser phone 30 of the personal user. The personal user reads the RFID from the RFID tag affixed to the article purchased by him/her and transmits the same to the Web server 307 from the browser phone 30. Then, a determination of YES is made through SR20 to advance to SR21, for performing processing of creating a purchaser page corresponding to the transmitted RFID and listing the same on the article homepage while allowing writing of a message or the like by the personal user in a portion corresponding to the created purchaser page. The personal user can write VP information such as his/her VP name, the address of the VP (address of the convenience store), the E-mail address of the VP etc. As others, his/her impression after usage of the purchased article corresponding to the RFID, a message indicating that he/she intends to sell the article as a secondhand article, a message indicating that he/she intends to barter the article for an article of another personal user etc. are conceivable. The impression after usage is so written that other general consumers can make determinations with reference to the impression when purchasing articles, while the maker of the article can develop articles with reference to the impression when developing next articles. As still another example, the purchaser of the article conceivably utilizes the purchaser page as a substitute for a memorandum related to the article. If the quantity of water was slightly excessive when the purchaser cooked rice seasoned with soy sauce an boiled with meat or seafood and savory vegetables with a rice cooker, he/she writes the purport that "While I cooked rice seasoned with soy sauce an boiled with meat or seafood and savory vegetables with rice and water at the ratio of 4:5, the quantity of water was slightly excessive" in the column of the purchaser page of the RFID corresponding to the rice cooker, so that this can be referred to when he/she cooks rice seasoned with soy sauce an boiled with meat or seafood and savory vegetables next time.

As a further different example, the purchaser page may be store information such as the instruction manual of the article, a contract, a warranty etc. and the corresponding RFID.

The control advances to SR23 when a determination of NO is made through SR6, for determining whether or not a request for writing additional information has been received from the producer. In relation to the sold article, the producer lists new-version information thereof, shipment information of appendix articles, defect notifying information in a case where the maker discovers a defect etc. on the homepage of the producer itself as the additional information. In order to make the article homepage of FIG. 42 carry that it has carried the additional information of the product on its homepage, the producer transmits a write request for the additional information to the Web server 307. Then, a determination of YES is made through SR23 to advance to SR24, for performing processing of carrying the purport that the additional information has been carried on the article homepage. When the article is software for a personal computer, for example, new-version information of the software or a revised version of the software may be carried on the homepage to be downloadable with or without charge.

When a consumer transmits a request for perusing the article homepage to the Web server 307, a determination of YES is made through SR7 to advance to SR22 for performing processing of displaying the article homepage shown in FIG. 42. The consumer perusing the article homepage clicks the producer URL http//www.sato when he/she intends to obtain article information from the producer as to the article of the RFID 892013960 shown in FIG. 42, for example. Then, he/she can automatically access the homepage of the producer, and is enabled to peruse various article information related to the article corresponding to the RFID 892013960. When the article is a foodstuff such as a farm product, for example, he/she can peruse various cooking methods, nutrition and calories of the foodstuff, efficacy on the body, the producing farmhouse, used agricultural chemicals, a message from the producing farmhouse etc. The producing farmhouse carries the charge for rice-planting and plans for events such as grape collecting and pear collecting experiences in a fruit farm etc. so that the consumer can peruse the same.

When the personal user inputs a search formula for article retrieval from the browser phone 30 and transmits the same to the Web server 307 in order to retrieve the article, a determination of YES is made through SR1 to advance to SR8 for performing processing of searching the Web database 308 according to the transmitted search formula, and processing of sending back the retrieval result to the browser phone 30 of the personal user is performed through SR9. The search formula transmitted from the browser phone 30 is that specifying specification of the article type, specification of the article producer, specification of the performance (function) etc., for example, and the article satisfying these conditions is inferred through SR8 according to the search formula so that article information thereof and the RFID corresponding to the article etc. are sent back through SR9. In relation to the retrieval of the article, the impression of the article purchaser after usage written in the purchaser page (see FIG. 42) is also utilized as information for the article retrieval. Further, the transmitted search formula also includes data specifying the retail store selling or planning to sell the article. All RFIDs of articles satisfying the conditions of the search formula are sent back to the browser phone 30 of the personal user.

FIG. 45 is a flow chart showing a program for retrieving and purchasing an article with the browser phone 30 of the personal user. A determination is made as to whether or not the personal user has performed an article retrieval operation from the browser phone 30 through SQ1. When he/she has performed the operation, the control advances to SQ2 for performing input accept processing for a search formula for retrieving the article. The personal user inputs the article search formula by operating keys of the browser phone 30. Then, the control advances to SQ4 for determining whether or not the retrieval result has been sent back from the Web server 307, and waiting until the same is sent back.

The control advances to SQ5 when the retrieval result is sent back by the Web server 307, for performing processing of displaying the retrieval result with the browser phone 30. Then, the control advances to SQ6, for determining whether or not the personal user has performed a re-retrieval operation. The personal user observes the sent-back retrieval result, and performs the re-retrieval operation by re-changing the search formula or the like when he/she is not satisfied by the same. Then, it follows that the processing from SQ2 to Q5 is repetitively performed.

Then, the control advances to SQ7, for determining whether or not an operation for making the browser phone 30 store any of RFIDs included in the sent-back retrieval result has been performed. When the personal user finds a favorite one in the sent-back articles and the article is sold or planed to be sold at a retail store (near retail store or the like) desired by himself/herself, he/she performs an operation of making the browser phone 30 store the RFID corresponding to the article. Then, the control advances to SQ8, for performing such processing that the browser phone stores the specified RFID in the EEPROM 194. Then, the personal user goes to the retail store selling the article, finds out the article to which an RFID tag transmitting an RFID according with the RFID stored in the browser phone 30 is affixed and purchases the same. As a method of finding out the article in the retail store on the basis of the RFID, the stored RFID is transmitted to the Web server 309 of the retail store 20*b* for inferring the place displaying the article corresponding to the RFID by the Web server 309 and notifying the place to the personal user. Then, such a method that the personal user goes to the place, reads the RFID of the article displayed there, collates the same with the stored RFID and determines whether or not the RFIDs accord with each other is employed.

When the personal user likes any of the articles included in the sent-back retrieval result and intends to directly purchase the article from the producer of the product, on the other hand, he/she performs a direct purchase operation with the browser phone 30. Then, a determination of YES is made through SQ9 to advance to SQ10, for performing processing of accessing the homepage of the producer of the article. Then, the control advances to SQ11, for performing legal period check processing. The details of this legal period check processing are described later on the basis of FIG. 50(*a*). Then, the control advances to SQ12, for determining whether or not $D_{KP}(L)$ calculated with the public key KP in the electronic certificate receiving the random number R transmitted from the producer of the article accords as a result of the legal period check processing. When it does not accord, a warning of the purport that this is not a legal period is displayed on the browser phone 30 through SQ14. When it accords, on the other hand, person in question proof processing is performed through SQ13 and the control thereafter advances to SQ15. The details of this person in question proof processing are shown in FIG. 35(*c*), for example.

At SQ15, processing of transmitting the VP information of the personal user to the Web server 303 of the producer (article maker) 300 is performed. This VP information is the VP name/address, the E-mail address of the VP etc. stored in the EEPROM 26 of the IC terminal 19*b* for the VP attached to the browser phone 30. Then, the control advances to SQ16, for transmitting information of the purport that he/she offers direct purchase by specifying the RFID corresponding to the article to be purchased to the Web server 303. Then, the control advances to SQ17, for performing VP settlement processing. The details of this VP settlement processing are shown in FIG. 53. After this settlement processing is ended, the producer of the article delivers the article specified through the RFID to the VP (address of the convenience store). The personal user goes to the convenience store and receives the article as the VP.

When the sent-back retrieval result includes a favorite article and he/she intends to reserve/purchase the article, the personal user performs a purchase reserving operation by specifying the RFID with the browser phone 30. This purchase reserving is for previously reserving purchase of the article to the producer (article maker) 300 of the article. The control advances to SQ20 when the purchase reserving operation has been performed, for determining whether or not a retail store specifying operation has been performed and waiting until the operation is made. When the personal user performs an operation of specifying the retail store (near retail store or the like) at which he/she intends to purchase the article, the control advances to SQ21 for performing processing of accessing the homepage of the producer of the desired article. Then, processing of checking a legal period similar to the above through SQ22 to SQ25 is performed. The control advances to SQ26 after person in question proof processing through SQ24 is performed, for performing processing of transmitting the retail store or the like to which the RFID to be purchased/reserved has been specified to the Web server 303 of the producer (article maker) 300. Then, the control advances to SQ27 for determining whether or not the price at the specified retail store has been received and waiting until the same is received. When receiving the RFID to be purchased/reserved and the purchase-desired retail store, the Web server 303 of the article maker 300 infers the selling price at the retail store and sends back the same to the browser phone 30, as described later. Then, the control advances to SQ28 for performing processing of displaying the received price with the browser phone 30, a determination is made as to whether or a purchase OK operation has been performed through SQ29, a determination is made as to whether or not a purchase cancel operation has been performed through SQ33 if no operation has been performed, and the control returns to SQ29 if no operation has been performed. When the personal user performs a purchase OK operation with the browser phone 30 in an intermediate stage of circulation of this loop of SQ29 and SQ30, the control advances to SQ31 for performing processing of storing the RFID specified in the purchaser reserving in the EEPROM 194 of the browser phone 30. The personal user can recognize whether or not the desired article has been delivered to the specified retail store by perusing the article homepage of FIG. 42. The Web server 307 of the article information service trader 302 may transmit information indicating that the article is delivered to the retail store to the browser phone 30 of the personal user to notify this to the personal user at the point of time when the article specified through the RFID is delivered to the specified retail store. When the personal user performs a purchase cancel operation with the browser phone 30, on the other hand, this subroutine program is ended without performing SQ31.

When the personal user desires to obtain a secondhand article and performs an operation of this purport with the browser phone 30, a determination of YES is made through SQ19 to advance to SQ32, for performing processing of accessing the corresponding purchaser page (see FIG. 42). Then, the control advances to SQ33, for performing an operation as to whether or not he/she desires barter with the browser phone 30. In the case of barter, the control advances to SQ35 for performing processing of reading the RFID of the possessed article to be bartered with the browser phone 30 and transmitting the same. The personal user receiving the RFID transmits the RFID to the Web server 307 for searching the article homepage, and obtains article information by accessing the homepage of the corresponding producer or the like. Then, he/she sends back whether or not to barter. In a case of barter, i.e., when transaction holds, a determination of YES is made through SQ36 for performing barter through SQ37.

When not barter but purchase of a secondhand article with charge is input with the browser phone 30, on the other hand, a determination of NO is made through SQ33 to advance to SQ34, for performing purchase processing with charge.

FIG. 47 is a flow chart showing the control operation of the Web server 303 of the producer (article maker) 300. A determination is made as to whether or not access has been made through SS1. The homepage is displayed when access has been made. Then, the control advances to SS3, for determining whether or not a reservation purchase request has been received. The control advances to SS4 if no request has been received, for determining whether or not a direct purchase request has been received. The control advances to SS20 if no request has been received, for performing other processing.

When the aforementioned request for reservation purchase through SQ18 is transmitted from the browser phone 30, the control advances to SS5 for performing legal period proof processing similar to the above, and the control thereafter advances to SS6 for performing person in question confirmation processing similar to the above, and a determination is made as to whether or not is it correct as a result of the person in question confirmation through SS7. Rejection processing is performed through SS8 when it is not correct. If it is correct, on the other hand, the control advances to SS9, for determining whether or not the RFID and the retail store have been received and waiting until receiving the same. When the browser phone 30 transmits the aforementioned RFID to be purchased/reserved and the purchase-desired retail store through SQ26, the control advances to SS10 for determining whether or not a direct shipment number to the retail store is reached. When the number of articles shipped to the retail store reaches a certain degree of quantity, articles can be directly shipped from the article maker 300 to the retail store without through the intermediate distribution trader. The determination as to whether or not the direct shipment number is reached is made through this SS10. The control advances to SS11 if the number is reached, for sending back the price based on the direct shipment to the retail store without through the intermediate distribution trader. When it is determined that the direct shipment number is not reached through SS10, on the other hand, the control advances to SS12 for sending back a reservation number necessary for omitting the intermediate distribution trader, the current reservation number, the price omitting the intermediate distribution trader and the price not omitting the same to the browser phone 30.

When the aforementioned direct purchase request according to SQ9 is transmitted from the browser phone 30, legal institution certificate processing through SS13 similar to the above is performed, person in question confirmation processing through SS14 is performed, a determination is made as to whether or not it is correct through SS15, rejection processing through SS16 is performed if it is not correct, and the control advances to SS17 if it is correct.

At SS17, a determination is made as to whether or not VP information and the RFID have been received, for waiting until the same are received. When the aforementioned VP information through SQ15 is transmitted and the RFID through SQ16 is transmitted from the browser phone 30, the control advances to SS18 for performing settlement processing of the article corresponding to the transmitted RFID. Then, processing for delivering the article to the address of the VP (address of the convenience store) is performed through SS19.

FIG. 48 is a flow chart showing a subroutine program for the address, name and E-mail address transmission processing shown through S585. This processing is executed when a transmission request for VP information is received from the trader in the aforementioned automatic settlement processing (see FIG. 31). A determination is made as to whether or not a transmission request for the address, the name and the E-mail address has been received from the trader through S700, and this subroutine program is ended if no request has been received. The control advances to S701 if the request has been received, for performing processing of transmitting the name, the address of the E-mail address of the VP used for the trader. In the case of the example shown in FIG. 9, for example, the VP name used for the trader MTT is E(B13P), and hence this name E(B13P) is transmitted. The address is the address of B13P, i.e., □Δ○ (see FIG. 3). As to the E-mail address, the E-mail address ΔΔΔΔΔ the financial institution 7 opens as the trap type VP is transmitted.

FIG. 49 is a flow chart showing a subroutine program of the VP birth request processing shown in S101. This VP birth request is processing for making a request for newly bearing a PV to the VP management server 9. The browser phone determines whether or not the identification number has been checked through S140, for advancing to S141 if the proper identification number has been checked while terminating this subroutine program if the proper identification number has not yet been checked. If the proper identification number has been checked, the browser phone advances to S141 for determining whether or not a V birth request operation has been made. If the user manipulates the keyboard of the browser phone 30 and makes the VP birth request operation, the control advances to S142 for performing processing of transmitting the VP birth request to the VP management server 9 of the financial institution 7. Then, the browser phone advances to S143 for performing legal institution check processing. This legal institution check processing is employed for checking whether or not the institution (the financial institution 7 in this case) of the other party is a legal institution for preventing illegal action of pretending to be the financial institution 7, and FIG. 50(*a*) shows a subroutine program thereof.

The subroutine program of the legal institution check processing is first described with reference to FIG. 50(*a*). This legal institution check processing is a check side program corresponding to the legal institution proof processing shown in FIG. 24(*b*). First, the browser phone determines whether or not an electronic certificate has been received through S160, and waits until receiving the same. In the legal institution proof processing, the electronic certificate is transmitted through S90 as shown in FIG. 24(*b*). If this electronic certificate is transmitted, the control advances to S161 for performing processing of generating and transmitting a random number R. Then, the institution performs processing of encrypting the received random number R with the secret key SK of this institution, calculating L and transmitting the same through S92, as shown in FIG. 24(*b*). When the browser phone 30 receives this encrypted data L of R, the control advances to S163 for performing processing of decoding L with the public key KP in the received electronic certificate, i.e., processing of calculating DKP(L).

The browser phone advances to S144 in FIG. 49, for determining whether or not R is equal to $D_{KP}(L)$. R must be equal to $D_{KP}(L)$ if this is a legal institution and the browser phone advances to S146 in this case, while the browser phone makes a determination of NO through S144 if others pretend to be the financial institution 7 and advances to S145 so that the browser phone 30 displays a warning about no legal institution and terminates this subroutine program.

When confirming that this is a legal institution, the browser phone advances to S146 for determining whether or not a request for input of the name and the address of the RP has been received and waits until receiving the same. As hereinabove described, the VP management server 9 transmits the input request for the name and the address of the RP when receiving the VP birth request (see S2), and the browser phone 30 makes a determination of YES through S146 when receiving the input request for the name and the address of the RP and the control advances to S147.

At S147, the browser phone 30 performs processing of displaying an instruction for input of the name and the address of the RP on the display thereof and waits until receiving the input (S148). The browser phone advances to S149 in a stage of receiving the input and performs processing of transmitting the input data to the VP management server 9 of the financial institution 7.

Then, the browser phone advances to S150 for performing person in question proof processing. This person in question proof processing is processing for proving whether or not the user making the VP birth request is the person in question him/herself, and FIG. 54(*a*) shows a subroutine program thereof. The subroutine program of the person in question certificate is now described with reference to FIG. 54(*a*).

This person in question proof processing is performed in order to prove the person in question when the random number R is transmitted on the basis of the aforementioned S4, S62 or the like, on the basis of the random number. The browser phone determines whether or not the random number R has been received through S125 and waits until receiving the same. When receiving the random number R, the browser phone advances to S216 for performing processing of transmitting the received random number R to the IC terminal 19R or 19V. The IC terminal performs processing of encrypting the random number R with the stored authentication key KN or the public key KP for generating and outputting response data I as described later. When the response data I is output, the browser phone makes a determination of YES through S217 and advances to S218 for performing processing of transmitting the I to the VP management server 9.

When performing the VP birth request processing shown in FIG. 29, the IC terminal 19V for the VP is connected to the USB port 18 of the browser phone 30. In the person in question proof processing at the time of the VP birth request processing, the browser phone performs processing of encrypting the random number R with the authentication key KN of the RP stored in the IC terminal 19V for the VP. This is described later.

Consequently, the browser phone proves that this is the RP in the person in question proof at the time of the VP birth request processing of S150 in FIG. 49.

Then, the browser phone advances to S151 for determining whether or not access rejection has been received, and advances to S152 when receiving the access rejection, for displaying the access rejection. When access is allowed, on the other hand, the browser phone advances to S153 for determining whether or not the convenience store 2 desired by the user making the VP birth request is input. The address of the born VP is set to the address of the convenience store 2, and hence the user inputs information specifying the convenience store 2 from the keyboard of the browser phone 30 if there a convenience store 2 desired by him/her. If the information is input, the browser phone transmits the data of the desired convenience store 2 to the VP management server 9 through S154. If no input of the desired convenience store 2 has been received, the address of the convenience store 2 nearest to the address of the RP defines the address of the born VP.

Then, the browser phone advances to S155 for determining whether or not a transmission request for the public key of the VP has been received and waits until receiving the same. As hereinabove described, the VP management server 9 outputs a transmission request for the public key of the VP when receiving the birth request for the VP (see S30). When the browser phone 30 receives the transmission request, the control advances to S156 for outputting a public key output request to the IC terminal 19V for the VP. Then, the IC terminal 19V for the VP outputs the stored public key KP of the VP. If receiving this output, the control advances to S158 for transmitting the output public key KP to the VP management server 9 of the financial institution 7.

FIG. 50(*b*) is a flow chart showing a subroutine program of the electronic certificate issuance request processing shown in S105. The browser phone determines whether or not a proper identification number has been checked through S165 and terminates this subroutine program if the same has not yet been checked. If the proper identification number has been checked, on the other hand, the browser phone advances to S166 for determining whether or not an issuance request operation for an electronic certificate for the RP has been made. If the user has manipulated the keyboard of the browser phone 30 for making the issuance request, the control advances to S167 for displaying an instruction for input of the address and the name of the RP. If the user inputs the same from the keyboard, the control advances to S169 for performing processing of calling the public key KP from the IC terminal 19R for the RP. When performing this electronic certificate issuance request processing, the user must connect his/her IC terminal 19R for the RP to the USB port 18 of the browser phone 30. When the processing of S169 has been performed, the public key KP for the RP stored by the connected IC terminal 19R for the RP is output to the browser phone 30, which in turn transmits the output public key KP and the input address and name of the RP to the authentication server 11 of the financial institution 7 through S170.

FIG. 51(*a*) shows a subroutine program of the input processing for the VP shown in S102, and FIG. 51(*b*) is a flow chart showing a subroutine program of the input processing for the RP shown in S106.

When performing the input processing for the VP, the IC terminal 19V for the VP must be connected to the USB port 18 of the browser phone 30. The browser phone determines whether or not the proper identification number has been checked through S175, and terminates this subroutine program if the proper identification number has not yet been checked. If the proper identification number has been checked, the browser phone advances to S176 for determining whether or not an input operation for the VP has been made. The IC terminal 19I storing the name and the address (the address of the convenience store 2) of the born VP, the name of the convenience store 2, the E-mail address and the electronic certificate is sent if the VP management server 9 of the financial institution 7 has performed the VP birth processing as hereinabove described, and when the user inserts the IC terminal 19I in the browser phone 30, the browser phone makes a determination of YES through S176 and advances to S178 for reading the data recorded in the IC terminal 19I and transmitting the same to the connected IC terminal 19V for the VP.

When the user makes an input operation of knowledge data of the user agent for the VP from the keyboard of the browser phone 30, the browser phone makes a determination of YES through S177 and advances to S179 for performing processing of transmitting the input knowledge data to the IC terminal 19V for the VP.

When the user partially remits funds from his/her account of the financial institution 7, the remitted sum G is transmitted to the browser phone 30 (see S69). If the remitted sum G is input in the browser phone 30, the browser phone makes a determination of YES through S180 and advances to S181 for performing processing of transferring the remitted sum G to the IC terminal 19V for the VP and adding/storing the same as a reload sum.

When performing the input processing for the RP, the IC terminal 19R for the RP must be connected to the USB port 18 of the browser phone 30. First, the browser phone determines whether or not the proper identification number has been checked through S185, and advances to S186 if the same has been checked for determining whether or not an electronic certificate for the RP has been received. If the user makes an issuance request for the electronic certificate for the RP to the authentication server, the electronic certificate for the RP is created and transmitted to the browser phone 30 as described above (see S28). When the electronic certificate is transmitted, the browser phone makes a determination of YES through S186 and advances to S187 for performing processing of transmitting the received electronic certificate to the IC terminal 19R for the RP and storing the same in the IC terminal for the RP.

When the user manipulates the keyboard of the browser phone 30 and makes an input operation of the knowledge data of the user agent for the RP, the browser phone makes a determination of YES through S188 and advances to S189 for performing processing of transmitting the input knowledge data to the IC terminal 19R for the RP so that the IC terminal 19R for the RP stores the input knowledge data.

When the user makes a payment request for partially remitting the funds in his/her account to the settlement server 10, the settlement server 10 transmits G which is the remitted sum to the browser phone 30 of the user as described above. Then, the browser phone makes a determination of YES through S190 and advances to S191 for performing processing of transmitting the remitted sum G to the IC terminal 19R for the RP and adding/updating G as a reload sum.

FIG. 52 is a diagram showing the overall schematic system in a case where the user (the RP and the VP are present) makes payment with the credit card for settling accounts according to SET. When a card member performs an issuance procedure for a credit card, a server set in the credit card issuing company 4 determines that credit issuance has been applied and issues a credit card number to this card member. When the card member requests issuance of a credit card for the VP, the server of the credit card issuing company 4 asks him/her to input data of the name, the address etc. of the VP, and enquires whether or not he/she is a VP registered in the financial institution or the like to the financial institution 7 on the basis of the data. On condition that it has been confirmed that he/she is a normal VP stored in the database 12 of the financial institution 7, the server of the credit card issuing company 4 performs processing of issuing the credit number to the VP.

In other words, the server of the credit card issuing company 4 includes a credit number issuance step of issuing a credit number for a virtual person. The server also includes credit number issuance means issuing a credit number for a virtual person. Further, this credit number issuance step or credit number issuance means issues said credit number on condition that it has been confirmed that the virtual person for whom the credit number is to be issued is a normal virtual person registered in said prescribed institution. The user possessing credit cards (two types for the RP and the VP are present) issued by the credit card issuing company 4 issues a member registration request for making transaction according to SET to the authentication server 11. The authentication server 11 issues a request for authentication as to whether or not the user is a credit member of the credit card issuing company 4 to the credit card issuing company 4. If the credit card issuing company 4 sends back an answer of authentication indicating that the user is a credit card member to the authentication server 11, the authentication server 11 creates an electronic certificate for SET and sends the same to the card member.

In order to enable the member store 6 such as an electronic mail to make transaction according to SET, the member store first issues a member registration request for the transaction according to SET to the authentication server 11. The authentication server 11 transmits a request for authentication as to whether or not this member store 6 is a legal contract company to the member store contract company (acquirer) 5 under contract with the member store 6. When the member store contract company 5 sends back an answer of a legal member store, the authentication server 11 creates an electronic certificate for SET for the member store 6 and issues the same to the member store 6.

When the card member makes electronic shopping on the member store 6 and makes transaction according to SET in this state, the card member first transmits a purchase request for an article or a service to the member store 6. The member store 6 transmits an approval request as to whether or not the purchase request may be approved to the credit card issuing company 4 from a payment approval part 33 through a payment gateway 27. When the credit card issuing company 4 sends back an answer of approval to the member store 6 through the payment gateway 27, the member store 6 transmits approval of the purchase to the card member. Further, the member store 6 transmits a payment request to the payment gateway 27 from a payment request part 34. The payment gateway 27 transmits a settlement request responsive to the payment request to the credit card issuing company 4 while sending back a payment answer to the member store 6.

Between the card member and the member store 6, confirmation of a legal person in question is performed by transmitting electronic certificates thereof to each other when making purchase transaction for an article or a service.

When the credit card issuing company 4 issues a credit card to the RP as the user, card information of the credit card number etc. is input and stored in this user's IC terminal 19 for the RP. When the user receives issuance of a credit card from the credit card issuing company 4 as the VP, on the other hand, he/she must transit an electronic certificate issued for the VP to the credit card issuing company 4 for asking the financial institution 7 to prove his/her identity. When the credit card issuing company 4 thereafter issues a credit card, card information of the credit card such as the card number is input and stored in this user's IC terminal 19V for the VP.

The aforementioned electronic certificates for SET are also issued in two types of cases for the RP and the VP. The respectively issued electronic certificates for SET are input and stored in the respective IC terminals 19R and 19V.

FIG. 53 is a flow chart showing a subroutine program of the settlement processing for the VP shown in S103. First, the browser phone determines whether or not the proper identification number has been checked through S195 for terminating this subroutine program if the same has not yet been checked while advancing to S196 if the proper identification number has been checked.

This settlement processing for the VP has processing of partially withdrawing funds in the user's bank account in the financial institution 7 and reloading money to the IC terminal 19V for the VP, processing of settling accounts with a debit card, processing of settling accounts with a credit card and a case of settling accounts with the reload sum reloaded in the IC terminal 19V for the VP.

When the user performs an operation of partially withdrawing the funds in his/her bank account and reloading money to the IC terminal for the VP, the browser phone transmits a payment request therefor to the settlement server 10 of the financial institution 7 through S197. Then, the browser phone advances to S198 for performing legal institution check processing (see FIG. 30A).

Then, the browser phone advances to S199 for determining whether or not R is equal to $D_{KP}(L)$ and makes a determination of NO through S199 if this is not a legal institution for advancing to S200 and displaying a warning about no legal institution. If this it a legal institution, on the other hand, R is equal to $D_{KP}$(L) and hence the control advances to S201 for determining whether or not an input request for the name has been received and waits until receiving the same. As hereinabove described, the settlement server 10 transmits an input request for the name when receiving a request for payment to the IC terminal (see S60). When this input request for the name is transmitted, the browser phone makes a determination of YES through S201 and advances to S202 for performing processing of calling the name of the VP from the IC terminal 19V for the VP and transmitting the same to the settlement server 10. Then, the browser phone advances to S203 for performing person in question proof processing (see FIG. 34A).

Then, the browser phone advances to S204 for determining whether or not an input request for a charged sum has been received, advances to S205 if no input request has been received for determining whether or not improperness has been sent back and returns to S204 if no improperness has been sent back. If the settlement server 10 determines that legality of the user cannot be confirmed in the process of the cycle of this loop of 204 and 205, the server sends back improperness (see S79). Consequently, the browser phone makes a determination of YES through S205 and advances to S207 for displaying improperness on the display of the browse phone 30 If the settlement server 10 determines that this is the legal person in question as a result of person in question authentication, on the other hand, the server transmits an input request for the charged sum to the browser phone 30 (see S87). Then, the browser phone makes a determination of YES through S204 and advances to S206.

At S206, the browser phone 30 performs processing of displaying an instruction for input of the charged sum on the display thereof. When the user inputs the charged sum from the keyboard, the browser phone makes a determination of YES through S208 and advances to S209 for performing processing of transmitting the input charged sum G to the settlement server 10. The settlement server 10 receiving the charged sum G performs processing of subtracting G from the account of the VP and transmitting G (see S89). Consequently, the browser phone makes a determination of YES through S210 and advances to S211 for performing processing of transmitting the paid sum G to the IC terminal 19V for the VP and adding/updating G to the reload sum.

When making a determination of NO through S196, the browser phone advances to S220 in FIG. 54(*b*) for determining whether or not a debit card use operation has been made. If the debit card use operation has been made, the browser phone advances to S235 for performing processing of transmitting a debit card use request to the settlement server 10. Then, the browser phone advances to S221 for performing legal institution check processing (see FIG. 50(*a*)). Then, the browser phone advances to S222 for determining whether or not R is equal $D_{KP}$(L). If this is not a legal institution, the browser phone makes a determination of NO and advances to S223 for displaying a warning about no legal institution. If this is a legal institution, on the other hand, the control advances to S224 for determining whether or not an input request for the identification number of the debit card and card information has been received and waits until receiving the same. The settlement server 10 transmits an input request for the identification number and the card information to the browser phone 30 when receiving the debit card use request (see S70). When receiving transmission thereof, the control advances to S225 for displaying an instruction for input of the identification number on the display part 76 of the browser phone 30. When the user inputs the identification number of the debit card from the keyboard, the browser phone makes a determination of YES through S226 and advances to S227 for performing processing of reading the card information from the IC card 19V for the VP and transmitting the same to the settlement server 10 with the identification number.

Then, the browser phone advances to S228, for determining whether or not improperness has been sent back. The settlement server 10 receiving the identification number and the card information determines whether or not the same are proper (S72), and sends back improperness if the same are not proper (see S79). If improperness is sent back, the browser phone makes a determination of YES through S228 and advances to S229 for displaying improperness. If no improperness is sent back, on the other hand, the control advances to S230 for displaying an instruction for input of a used sum on the display of the personal computer. When the user inputs the used sum from the keyboard, the browser phone makes a determination of YES through S231 and advances to S232 for performing processing of transmitting the input used sum G to the settlement server 10.

The settlement server 10 receiving the used sum G performs processing of retrieving the bank account corresponding to the user, subtracting the used sum G and sending back the used sum G to the browser phone 30, as hereinabove described (S74).

Consequently, the browser phone makes a determination of YES through S233 and advances to S234 for performing processing of displaying completion of settlement on the display part 76 of the browser phone 30.

When making a determination of NO through S220, the control advances to S238. At S238, the browser phone determines whether or not a credit card use operation has been made. When the user manipulates the keyboard 77 of the browser phone 30 and inputs use of the credit card, the control advances to S237 for performing processing of transmitting a request for settlement with the credit card to the member store 6. This member store is a store from which the user tries to purchase an article or a service. Then, the control advances to S239 for performing legal institution check processing. This legal institution check processing is that shown in FIG. 50(*a*). The member store 6 transmits an electronic certificate of this member store to the browser phone 30 of the customer in response to this legal institution check processing and encrypts the random number with its secret key KS when receiving the random number R, for transmitting the result L of encryption to the browser phone 30 of the customer.

The control advances to S240 for determining whether or not R is equal to $D_{KP}$(L). If this is not a legal store (member store), the browser phone makes a determination of NO through S240 and advances to S241 for displaying a warning about no legal store. If this is a legal store (member store), on the other hand, the browser phone advances to S242 for creating order information OI and a payment instruction PI. The order information OI is information for specifying the object of purchase such as the article or the service and the number of the purchased articles or the like. The payment instruction PI is an instruction for making credit payment with a credit card of a certain credit number, for example.

Then, the browser phone advances to S243 for performing processing of calculating a double digest MD formed by coupling message digests for the order information OI and the payment instruction PI. Then, the browser phone advances to S244 for transmitting the double digest MD and the name of the VP using the credit card to the IC terminal 19V for the VP and issuing an instruction for a signature while issuing an output request for an electronic certificate for the VP.

The IC terminal 19V for the VP receiving the name of the VP using the credit card, the instruction for the signature and the output request for the electronic certificate collates the input name of the VP with the trap type RFID storage area to deduce how may times the real name 13P (see FIG. 9) of the VP has been encrypted for the VP name. The IC terminal encrypts the secret key with the secret key by this number of times and decodes the input MD with the encrypted secret key (KS) for generating the so-called double signature. This double signature is expressed as D(KS)(MD) for convenience. The IC terminal 19V for this VP outputs the D(KS)(MD) to the browser phone 30.

If the VP name input according to S244 has been the real name B13P of the VP, the IC terminal 19V for the VP storing the electronic certificate for this real name outputs the stored electronic certificate to the browser phone 30. If the VP name input according to S244 has been the trap type VP name, on the other hand, the IC terminal 19V for the VP stores no electronic certificate for the trap type VP name. The electronic certificate for the trap type VP name is stored in the XML store 50, as hereinabove described. In this case, therefore, the IC terminal 19V for the VP outputs an instruction for ordering the electronic certificate to the XML store 50 to the browser phone 30.

When receiving some answerback from the IC terminal 19V for the VP after outputting the request of S244 to the IC terminal 19V for the VP, the browser phone makes a determination of YES through S245 and the control advances to S605. At S605, the browser phone determines whether or not this has been the instruction for ordering the electronic certificate to the XML store 50 for advancing to S246 if this has not been the order instruction, while the control advances to S606 if this has been the order instruction. At S606, the browser phone accesses the XML store 50 for retrieving the electronic certificate corresponding to the trap type VP name and advances to S246 for performing processing of transmitting the order information OI, the payment instruction PI, the output D(KS)(MD) as the signature and the electronic certificate for the VP to the member store 6. The member store 6 confirms the information and transmits a purchase approval answer for approving the purchase request of the user to the browser phone 30 of the user. Then, the browser phone makes a determination of YES through S247 and advances to S248 for displaying completion of transaction.

When making determination of NO through S238, the browser phone advances to S249 for determining whether or not a reload sum use operation has been made. If the user makes a keyboard operation for using the reload sum stored in the IC terminal 19V for the VP, the control advances to S250 for displaying an instruction for input of the used sum on the display of the browser phone 30. When the user inputs the used sum from the keyboard, the browser phone makes a determination of YES through S251 and advances to S252 for performing processing of transmitting a payment request for the input used sum G to the IC terminal 19V for the VP.

When receiving the payment request, the IC terminal 19V for the VP subtracts/updates the reload sum by the used sum G and sends back a signal indicating completion of payment to the browser phone 30, as described later. Then, the browser phone makes a determination of YES through S252*a* and advances to S252*b* for performing G payment processing.

The settlement processing for the RP is processing having contents substantially identical to those of the aforementioned settlement processing for the VP, and hence illustration and redundant description are omitted.

FIG. 56 is a flow chart showing a subroutine program of another example of the RFID exchange processing shown in FIG. 27. In the RFID exchange processing of FIG. 56, RFIDs are exchanged by making a telephone call with the browser phone 30. The same step numbers are allotted to steps performing processing identical to FIG. 27, and a different point is mainly described here. A determination is made as to whether or not a telephone call has been made with the browser phone 30 through SS1. The control advances to SE3 if a telephone call has been made, for performing the RFID exchange processing following SE4 on condition that it is not a partner (browser phone 30) already exchanged today.

FIG. 57 is a flow chart showing a subroutine program of still another example of the RFID exchange processing shown in FIG. 27. In the RFID exchange processing of FIG. 57, RFIDs are exchanged by transmitting/receiving electronic mails. A determination is made as to whether or not an E-mail (electronic mail) has been transmitted through ST1. The control advances to ST2 if no electronic mail has been transmitted, for determining whether or not an E-mail has been received. If no E-mail has been received, this subroutine program is ended.

When transmitting an E-mail, a determination of YES is made through ST1, and a determination is made as to whether or not it is a partner (browser phone 30) already exchanging RFIDs today through SE3. If it is the partner already exchanging RFIDs, this subroutine program is ended. If not yet exchanging RFIDs, the control advances to SE4, for determining whether or not a pseudo RFID is stored. If the EEPROM 194 of the browser phone 30 stores a pseudo RFID, the control advances to ST3 for transmitting the stored pseudo RFID to the browser phone 30 of the partner along with an E-mail. If the EEPROM 194 stores absolutely no pseudo RFID, on the other hand, processing of generating a pseudo RFID and transmitting the same to the partner following SE5 is performed.

When receiving an E-mail, the control advances to ST8, for receiving a pseudo RFID transmitted from the partner of the E-mail. Then, the control advances to SE9, for performing processing of shifting pseudo RFIDs already stored in the EEPROM 194 one by one to an old storage area and erasing the oldest pseudo RFID exceeding the upper limit of storage. Then, the control advances to SE10, for performing processing of storing the received pseudo RFID in the newest storage area.

The RFID exchange processing shown in FIG. 56 or 57 may not be employed in place of the RFID exchange processing shown in FIG. 26 but may be employed in further addition to the RFID exchange processing shown in FIG. 26. Further, the personal user may be enabled to properly select and use arbitrary one or at least two of the RFID exchange processing of FIGS. 26, 56 and 57 by operating the browser phone 30.

While the pseudonym (trap type VP name) has been employed in the aforementioned embodiment as the information allowing specification of the identification information, employed for specifying the trader the user has accessed to provide his/her private information, which is the identification information to be included in the mail when the person obtaining the said private information transmits a mail (an E-mail or a direct mail) to the user who possesses the private information, a plurality of E-mail addresses used every trader or an address (address of the convenience store or a post-office box) for direct mails may be employed in place thereof or in addition thereto. In other words, it may simply be the following private information protector:

A private information protector protecting private information through a computer system, including identification information storage means (database 12*a*, EEPROM 26) storing information, which allows specification of identification information employed by a user for specifying a trader to which he/she has provided his/her private information and which is information (trap type VP name as pseudonym, KSB and site name of FIG. 44(*a*), E-mail address used every site or address for direct mail) allowing specification of identification information to be included, when a person obtaining the said private information transmits a mail (E-mail or direct mail) to the user possessing the private information, in this mail and monitor means (S516, S522, S523) monitoring a distribution state of the private information of the said user by determining whether or not the said trader specified on the basis of the said identification information included in the mail (E-mail or direct mail) sent by the person obtaining the said private information to the user possessing the private information and the sender of the said mail accord with each other.

In the aforementioned embodiment, that performing inference of an illegal leaker of private information through the trap type VP and an illegal obtainer of the leaked private information through the name of the trap type VP has been shown. In another embodiment, the purport that the E-mail address of the trap type VP may vary with every trap type VP has been shown. As in this other embodiment, the E-mail address of the trap type VP may be utilized in place of the name of the trap type VP, for inferring the aforementioned illegal private information seller and the illegal obtainer of the leaked private information. In other words, an E-mail address varying with every trap type VPs is registered for inferring, when an E-mail is transmitted to the trap type VP, the E-mail address of the trap type VP according with the E-mail address to which the E-mail is transmitted, inferring the trader (trader to which the E-mail address of the trap type VP is notified) corresponding to the inferred E-mail address, performing according property check as to whether or not the inferred trader and the sender transmitting the E-mail accord with each other, and performing the aforementioned abnormal case processing of S519 to S521 when the same do not accord with each other.

Such according property check based on the E-mail address may not be performed restrictively to the trap type VP but may be performed by the RP. In other words, the RP may possess a plurality of his/her E-mail addresses for inferring an illegal distributor and an illegal obtainer of the private information by notifying a different E-mail every site (trader) while registering which E-mail address has been notified to which trader in the VP management server 9 or a mail server 80 described later, inferring the trader (site) to which the E-mail address has been notified from the E-mail address of the sendee of the transmitted E-mail address and performing according property check as to whether or not the inferred trader and the sender of the E-mail accord with each other.

A monitoring system inferring an illegal distributor (illegal leaker) and an illegal obtainer of private information by according property check through an E-mail address is now described.

FIG. 58 is a diagram showing the mail server 80 and data stored in its database 81. This mail server 80 is connected to the broadband/large capacity relay network 43, the Internet I, the portable telephone network 54 etc. of FIG. 1, for transmitting an E-mail transmitted from a mail client such as the browser phone 30 to a mail box of a sendee corresponding to the sendee E-mail address and storing the same. As shown in FIG. 58, the database 81 stores data such as key specifying numbers, common keys (KN) and E-mail addresses, and is provided with mail boxes corresponding to the E-mail addresses. The common keys (KN), which are the aforementioned authentication keys KN, are not restricted to the authentication keys KN but may be keys dedicated to E-mails for a common key encryption system registered by the personal user (including both of the RP and the VP) to the mail server 80.

The key specifying numbers are numbers for specifying common keys registered in the mail server 80. Corresponding common keys are retrieved from among a plurality of common keys registered according to these numbers. The E-mail addresses are the E-mail addresses of the user registered in the mail server 80. A certain user may register a plurality of E-mail addresses in the mail server 80, and in this case, it follows that, when a single common key of the user is specified with a single key specifying number, for example, there are a plurality of E-mails corresponding to the single common key.

FIG. 59 is a flow chart showing a subroutine program of E-mail address notification processing performed with the browser phone 30. FIG. 59(*b*) is a flow chart showing a subroutine program of E-mail address generation processing performed with the IC terminal 19R or 19V.

Referring to FIG. 59(*a*), a determination is made as to whether or not an E-mail address generation operation has been performed through SU1, and this subroutine program is ended if no operation has been performed. When the personal user performs the E-mail address generation operation by operating the browser phone 30, a determination of YES is made through SU1 to advance to SU2, for performing control of displaying a message for inputting notified partner specifying information which is information specifying the partner to which an E-mail address is notified with the browser phone 30. This notified partner specifying information is the trader name of the notified partner and the E-mail address of the notified partner, as described later. Then, a determination is made as to whether or not the notified partner specifying information has been input, for waiting until the same is input. When the personal user inputs the notified partner specifying information (the trader name of the notified partner and the E-mail address of the notified partner) by operating the browser phone 30, the control advances to SU4 for performing control of inputting the notified partner specifying information in the IC terminal (19R or 19V) connected to the browser phone 30.

Then, a determination is made as to whether or not an E-mail address for notification has been output from the connected IC terminal through SU5, for waiting until the same is output. When the same is output, the control advances to SU6 for performing control of making the browser phone 30 display the output E-mail address for notification. A determination is made as to whether or not an operation for transmitting the displayed E-mail address for notification to the notified partner has been performed through SU6*a*. In a case of notifying the E-mail address for notification to the notified partner through the Internet or radio waves of Blue tooth or the like, this operation is performed with the browser phone 30. Then, the control advances to SU7, and it follows that the E-mail address for notification is transmitted to the notified partner.

Referring to FIG. 59(*b*), a determination is made as to whether or not the notified partner specifying operation has been input from the browser phone 30 through S1000, and this subroutine program is ended when no operation has been input. The control advances to S1001 when the operation has been input, for performing processing of encrypting data including the input notified partner specifying information and the E-mail address of the personal user with the common key KN. Then, the control advances to S1002, for generating an E-mail address for notification by dispersing/inserting a key specifying number into the data of the encryption result. Processing of outputting the generated E-mail address for notification to the browser phone 30 is performed through S103.

When the E-mail address for notification is output through S1003, the browser phone 30 makes a determination of YES through SU5 as described above and executes processing following SU16.

FIG. 60 is a flow chart showing the control operation of the mail server 80. A determination is made as to whether or not registration of an E-mail address has been requested through SV1. The control advances to SV2 if no registration has been requested, for determining whether or not an E-mail has been received, and the control advances to SV3 if no E-mail has been received, for performing other processing and returning to SV1. When the user requests registration of an E-mail in an intermediate stage of circulation looping this SV1→SV3, the control advances to SV4 for performing processing of registering an E-mail address transmitted from the user in the database 80. When a common key of the user or a key specifying number for specifying the common key have not yet been registered in the database 80 at this time, the mail server 80 generates a common key for the user and a key specifying number corresponding thereto and registers the same in the database 81.

When receiving an E-mail, a determination of YES is made through SV2 to advance to SV5, for performing processing of extracting the key specifying number from the E-mail address (E-mail address for notification transmitted through SU7) of the received E-mail. As hereinabove described, the key specifying number of the user is dispersed/inserted into the E-mail address for notification (refer to S1002), and the dispersed/inserted key specifying number is extracted through this SV5. Then, the control advances to SV6, for inferring the common key KN corresponding to the extracted key specifying number by searching the database 81, and performing operation of regarding data left by extracting the key specifying number from the received E-mail address for notification as DP and decoding this DP with the common key KN retrieved through SV6 through SV7.

Then, a mail header part is read through SV8, the read mail header part is analyzed through SV9, and the name and the E-mail address of the sender of the received E-mail are extracted through SV10.

Then, processing of checking whether or not the trader name and the E-mail address of the notified partner specified through the notified partner specifying information included in operation result data through SV7 and the name and the E-mail address of the sender (sender) extracted through SV10 accord with each other through S11 is performed. When the received E-mail shows no name of the sender (sender) but shows only the E-mail address of the sender (sender), this accord determination is made by determining only by whether or not the E-mail address and the E-mail address specified through the notified partner specifying information included in the data of the operation result through SV7 accord with each other. A determination is made through SV12 as to whether or not the same accord with each other as a result of checking through SV11, to advance to SV13 when the same accord with each other, for performing processing of storing the received E-mail in the mail box (see FIG. 58) corresponding to the E-mail address in the operation result data.

When a determination is made as to whether the same do not accord with each other through SV11, on the other hand, the control advances to SV14 for adding/updating an illegally obtained value of the private information by "1", while an illegally distributed value of an illegal distributor of the private information is added/updated by "1" in association with the specified notified partner through SV15, and processing of storing a leakage report of the private information in the mail box corresponding to the E-mail address in the operation result data is performed through SV16. The personal user can peruse a detailed report as to an illegal obtainer of the private information, the illegal distributor of the private information, the contents of the transmitted E-mail etc. by calling the leakage report of the private information stored in his/her mail box. Further, the mail server 80 announces results of collection through SV14 and SV15. In place of the processing of S16 or in addition to the processing of SV16, the leakage report of the private information may be transmitted to the aforementioned illegal sender of the private information and further to a prescribed private information protective institution (the post in charge in the National Police Agency or the like).

When transmitting the corresponding RFID to the trader previously selectively specified through the aforementioned SG13, the name of the previously selectively specified trader and the trader name of the sendee to which the RFID is transmitted may be associated with each other and stored in the browser phone 30 or the like, while the name of the previously selectively specified trader and the trader name of the sendee to which the RFID is transmitted may also be transmitted to the mail server 80 etc. so that the same are associated with each other and stored. Thus, when the illegal obtainer of the private information and the illegal distributor of the private information accord with stored information of the name of the previously selectively specified trader and the trader name of the sendee to which the RFID is transmitted, there is a high possibility that the aforementioned illegal obtainer of the private information is the person illegally obtaining the private information by making bad use of the trap type RFID transmitted through SG13.

FIG. 61 is an explanatory diagram for intelligibly illustrating the control contents shown in FIGS. 59 and 60. When the personal user notifies his/her E-mail address to the trader as a customer or a user, he/she attaches the IC terminal 19 to the browser phone 30 as a personal user terminal and generates the E-mail address for notification. As to the IC terminal 19, the personal user employs the IC terminal 19V for the VP when he/she notifies the E-mail address as the VP, while he/she employs the IC terminal 19R for the RP when he/she notifies the E-mail address as the RP. In order to generate the E-mail address for notification, he/she first makes a trader terminal 82 transmit notified partner specifying information MTT//○ΔXXΔ formed by the trader name MTT and an E-mail address ○ΔXXΔ of the notified partner. The browser phone 30 and the IC terminal 19 receiving the notified partner specifying information generate #e¥8%3&@t*c by encrypting the received notified partner specifying information (MTT//○ΔXXΔ) and an E-mail address (○□XΔX) of the personal user (VP or RP) with the common key KNI, i.e., by operating $E_{KNI}$(MTT//○ΔXXΔ//○□XΔX), as hereinabove described. A key specifying number (92103) is dispersed/inserted into this encrypted data according to a predetermined format. In the case of this embodiment, the respective numerical values of the key specifying number (92103) are dispersed/inserted one by one between the second one and the third one, between the fourth one and the fifth one, between the sixth one and the seventh one, between the seventh one and the eighth one and between the eighth one and the ninth one from the left. Then, the finished #e9¥82%31&0@3t*c is transmitted to the trader terminal 82 as the E-mail address for notification.

Thereafter it follows that the trader transmits an E-mail to the personal user with the E-mail address of #e9¥82%31&0@3t*c. When the trader MTT creates an E-mail 85 through the trader terminal 82 and transmits the E-mail 85 to the sendee E-mail address of #e9¥82%31&0@3t*c, this E-mail 85 is transmitted to the mail server 80. The mail server 80 extracts the key specifying number dispersed/inserted into the sendee E-mail address of #e9¥82%31&0@3t*c according to the aforementioned key specifying number insertion format. It infers the corresponding key KNI by searching the database 81 on the basis of the extracted key specifying number 92103. Then, it calculates MTT//○ΔXXΔ//○□XΔX by performing operation of decoding the remaining data #e¥8%3&@t*c left by extracting the key specifying number from the sendee E-mail address, i.e., $D_{KNI}$(#e¥8%3&@t*c). MTT//○ΔXXΔ in this calculated data is the notified partner specifying information, and must essentially accord with the name and the E-mail address of the sender of the received E-mail 85. This MTT//○ΔXXΔ which is the notified partner specifying information and the name and the E-mail address of the sender of the received E-mail 85 are compared with each other, for storing the received E-mail in the mail box corresponding to ○□XΔX which is the sender E-mail address in the calculated MTT//○ΔXXΔ//○□XΔX. Consequently, the personal user can download and peruse the received E-mail by accessing his/her mail box.

When MTT//○ΔXXΔ which is the notified partner specifying information and the name and the E-mail address of the sender of the received E-mail 85 are compared with each other and do not accord with each other (when the name of the sender is MEC or the like, for example), on the other hand, the aforementioned abnormal case processing of SV14 to SV16 is performed since it is assumed that the private information including the E-mail address of the personal user has been leaked from the notified partner trader MTT and the person (MEC, for example) illegally obtained the leaked E-mail address has transmitted the E-mail to the E-mail address.

The aforementioned monitoring system cannot monitor illegality when the person (MEC, for example) illegally obtaining the private information transmits an E-mail with the trader name (MTT, for example) or the E-mail address of the illegal distributor of the private information without using its trader name or its E-mail address. However, the person (MEC, for example) illegally obtaining the private information transmits the E-mail as means of business activities for selling or publicizing its products, and no business activities for selling or publicizing its products can be achieved if it uses the trader name (MTT, for example) or the E-mail address of another company as the sender of the E-mail. Thus, it is an effective monitoring system with respect to transmission of an E-mail as business activities of the illegal obtainer of the private information.

The aforementioned comparison/determination of MTT//○ΔXXΔ which is the notified partner specifying information and the name and the E-mail address of the sender of the received E-mail 85 may be determined depending on whether or not the same completely accord with each other, while properness may be determined when at least the E-mail addresses accord with each other. Further, there may be either the sender name or the sender E-mail address as sender specifying information included in the received E-mail. In this case, properness may be determined when either sender specifying information and the notified partner specifying information accord with each other. In addition, the notified partner specifying information may be only the E-mail address of the notified partner.

The case where only the receiver of the E-mail address employs the encrypted E-mail address has been shown with reference to the aforementioned monitoring system inferring the illegal distributor (illegal leaker) and the illegal obtainer of the private information by according property check utilizing the E-mail addresses. A case where both of the receiver and the sender of the E-mail employ encrypted E-mail addresses is now described. First, both transmit the mutual E-mail addresses ○□XΔX and ○ΔXXΔ and generate E-mail addresses for notification through the received E-mail addresses of the partners by a method similar to the above for sending back and notifying the same to the partners. When the trader MTT transmits an E-mail to the personal user, it creates the E-mail 85 having #e9¥82%31&0@3t*c as the sender E-mail address, MTT as the name of the sender and ○ΔXXΔ as the E-mail address of the sender and transmits the same, similarly to the above. According property check in the mail server 80 is also performed in a method similar to the above. In place of transmitting the mutual E-mail addresses ○□XΔX and ○ΔXXΔ and generating the E-mail addresses for notification, both may transmit the mutual E-mail addresses ○□XΔX and ○ΔXXΔ to the mail server 80 or the like for making the mail server 80 or the like generate mutual E-mail addresses for notification and notify the same to the partners.

When the personal user receiving the E-mail 85 sends back an E-mail, it does not reach the trader MTT if he/she sends back the same to the E-mail address ○ΔXXΔ of the sender shown in the E-mail 85. He/she must send back the E-mail to the E-mail address for notification notified from the trader MTT, i.e., the E-mail address for notification generated by dispersing/inserting the key specifying number into the data obtained by encrypting the personal user name and the E-mail address ○□XΔX of the personal user with the common key (KN1, for example) of the trader. In order to enable this, the browser phone 30 of the personal user stores the E-mail address for notification notified from the trader MTT and the E-mail address ○ΔXXΔ of the trader MTT in association with each other, and is so formed that the E-mail address for notification of the trader MTT can be retrieved and output by inputting the E-mail address ○ΔXXΔ. Also the terminal 82 of the trader MTT similarly stores the E-mail address for notification notified from the personal user and the E-mail address ○□XΔX of the personal user in association with each other, and is so formed that the E-mail address for notification of the personal user can be retrieved and output by inputting the E-mail address ○□XΔX.

As a method of eliminating such inconvenience that the E-mail cannot be sent back by using the sender E-mail address of the transmitted E-mail as such, the following modified system may be employed: While a point of mutually exchanging E-mail addresses, generating and sending back an E-mail address for notification with the E-mail address of the partner and transmitting the E-mail 85 to the E-mail address for notification of the partner is identical to the above, the E-mail address of the sender of the E-mail 85 is set to the E-mail address for notification of the sender notified to the partner. Thus, when the person receiving the E-mail 85 sends back an E-mail to the E-mail address for notification of the sender shown in the E-mail 85 as such, this E-mail reaches the sender. The mail server 80 does not directly compare the E-mail address ○ΔXXΔ in the notified partner specifying information calculated from the sender E-mail address #e9¥82%31&0@3t*c and the E-mail address for notification of the sender shown in the E-mail 85 with each other but calculates the E-mail address ○ΔXXΔ by decoding the E-mail address for notification according to the aforementioned operation procedure, and compares/determines the calculated E-mail address and the E-mail address in the notified partner specifying information calculated from the sender E-mail address. Also in this case, both may transmit the mutual E-mail addresses ○□XΔX and ○ΔXXΔ to the mail server 80 or the like for making the mail server 80 or the like generate mutual E-mail addresses for notification and notify the same to the partners in place of transmitting the mutual E-mail addresses ○□XΔX and ○ΔXXΔ and generating the E-mail addresses for notification.

The E-mail address (#e9¥82%31&0@3t*c, for example) may be formed by combination of symbols not apparently distinguishable as compared with a normal E-mail address (○□XΔX, for example). Thus, there is such an advantage that the illegal obtainer of the private information regards the E-mail address for notification in the illegally obtained private information as a normal E-mail address, transmits an E-mail to the E-mail address for notification without any doubt and can be easily entrapped.

In place of generating the E-mail for notification by encryption, further, a dedicated E-mail address may be generated every notified partner for registering the dedicated E-mail and the notified partner corresponding thereto in the mail server 80 and the browser phone 30 etc. in association with each other. Then, the notified partner corresponding to the dedicated E-mail address which is a sender E-mail address of a transmitted E-mail is retrieved and inferred from registered notified partners for performing according property check as to whether or not the inferred notified partner and the sender of the transmitted E-mail accord with each other. "Encryption" in the present invention is a wide concept including all those converting data according to a prescribed algorithm. Further, "decoding" is a wide concept including all those recovering encrypted data to original data according to a prescribed algorithm.

The aforementioned monitoring system inferring the illegal distributor (illegal leaker) and the illegal obtainer of the private information also has an advantage capable of preventing receiving of an E-mail from a person other than the partner to which the user has notified his/her mail address (E-mail address for notification) by himself thereby effectively preventing a junk mail (spam). While that transmitting/receiving E-mails between the personal user and the trader has been shown, the present invention is not restricted to this but may be that transmitting/receiving E-mails between personal users or between traders. The monitoring system inferring the illegal distributor (illegal leaker) and the illegal obtainer of the private information and the invention of the monitoring system for a junk mail (spam) are now described together.

While a large number of techniques preventing leakage of private information are present in general, there has been no technique effective for inferring a main body of leakage as to from which trader or the like it has been leaked. Further, there has been no technique effective for finding out a person illegally obtaining the leaked private information. There has been a technique of, when a junk mail (spam) is transmitted, registering the sender, the transmission path etc. of the junk mail (spam) in a mail server or the like for preventing a junk mail (spam) transmitted from the same sender, the same transmission path etc. from the next time. However, receipt of an unregistered, i.e., initial junk mail (spam) cannot be prevented while the user must deliberately register the sender, the transmission path etc. of the junk mail (spam) in the mail server or the like, and it has been troublesome.

An object of the invention of this monitoring system is to enable an operation of finding out a main body of leakage of private information. Further, it is to enable an operation of finding out a person illegally obtaining the leaked private information. In addition, it is to be capable of preventing receipt of an initial junk mail (spam), and to prevent receipt of a junk mail (spam) without forcing the user into a complicated operation of registering the sender, the transmission path etc. of the junk mail (spam) in a mail server or the like.

In order to attain these objects, the invention of this monitoring system employs the following means. Specific examples of the respective means are inserted and shown with parentheses.

(1) A monitoring system monitoring leakage of private information, including:

partner specifying mail address generation processing means, which is means generating an proper mail address to be used for a specific mail partner for exchanging electronic mails, performing processing for generating a partner specifying mail address (#e9¥82%31&0@3t*c in FIG. 61, for example) allowing inference of information specifying the said mail partner; and monitor means (SV5 to SV16 in FIG. 60, for example) inferring, when the mail address of a sendee of an electronic mail (E-mail 85 in FIG. 61, for example) transmitted from a sender (MTT in FIG. 61, for example) is the said partner specifying mail address generated by the said partner specifying mail address generation processing means, information (MTT//○ΔXXΔ in FIG. 61, for example) specifying the said mail partner corresponding to the said partner specifying mail address and monitoring whether or not the said inferred information specifying the mail partner and information of the sender of the said electronic mail accord with each other.

According to this structure, when the private information of the partner specifying mail address is leaked from the mail partner and the person illegally obtaining the private information transmits an electronic mail to the partner specifying mail address as the private information, the information specifying the mail partner inferred from the partner specifying mail address of this electronic mail and the information of the sender of this electronic mail are so compared with each other that it is provable that both do not accord with each other, and it is possible to find out that there is a high possibility that the private information has been leaked from the inferred mail partner and that there is a high possibility that the sender of this electronic mail has illegally obtained the leaked private information.

(2) The monitoring system described in (1), wherein the said partner specifying mail address generation processing means performs processing for generating the said partner specifying mail address by encrypting data including mail partner specifying information (MTT//○ΔXXΔ in FIG. 61, for example) for specifying the said mail partner (encrypting the data through S1001 in FIG. 59 and generating the address by dispersing/inserting the key specifying number through S1002, for example) and the said monitor means monitors whether or not the said mail partner specifying information and the information of the sender of the said electronic mail accord with each other (SV8 to SV12 in FIG. 60, for example) by decoding the said partner specifying mail address (inferring the common key KN through SV5 and SV6 in FIG. 60 and decoding the same with the key KN through SV7, for example) and extracting the said mail partner specifying information.

According to this structure, the mail partner specifying information can be inferred from the data of the partner specifying mail address itself, and it is possible to prevent such inconvenience that the quantity of registration data of mail partner specifying information in a case of notifying the partner specifying mail address to a large number of partners respectively becomes enormous as compared with a method of registering corresponding mail partner specifying information every partner specifying mail address, for example.

(3) The monitoring system described in (2), wherein the said partner specifying mail address generation processing means performs processing of generating the said partner specifying mail address by encrypting data (○□XΔX in FIG. 61, for example) specifying the mail address of the person in question intending to exchange electronic mails with the said mail partner and data (trader mail address ○ΔXXΔ) specifying the mail address of the said mail partner, and the said monitor means performs processing of specifying the mail address of the said mail partner by decoding the said partner specifying mail address (SV7 in FIG. 60, for example) and monitoring whether or not the said mail address and the mail address of the sender of the said electronic mail accord with each other (SV11 and SN12 in FIG. 60, for example) for storing the said electronic mail in a mail box corresponding to the said mail address of the person in question specified by decoding the said partner specifying mail address (SV13 in FIG. 60, for example) when the mail addresses accord with each other as a result of monitoring (when determination of YES is made through SV11 in FIG. 60, for example).

According to this structure, the mail address of the person in question can also be extracted by decoding the partner specifying mail address for monitoring, whereby convenience is improved.

(4) A monitoring system for monitoring and preventing a spam, including:

partner specifying mail address generation processing means (S1000 to S1003 in FIG. 59, for example), which is means generating an proper mail address to be used for a specific mail partner for exchanging electronic mails, performing processing for generating a partner specifying mail address (#e9¥82%31&0@3t*c in FIG. 61, for example) allowing inference of information specifying the said mail partner; and monitor means (SV5 to SV16 in FIG. 60, for example) inferring, when the mail address of a sendee of an electronic mail (E-mail 85 in FIG. 61, for example) transmitted from a sender (MTT in FIG. 61, for example) is the said partner specifying mail address generated by the said partner specifying mail address generation processing means, information (MTT//○ΔXXΔ in FIG. 61, for example) specifying the said mail partner corresponding to the said partner specifying mail address and monitoring whether or not the said inferred information specifying the mail partner and information of the sender of the said electronic mail accord with each other.

According to this structure, the information specifying the mail partner inferred from the partner specifying mail address of the electronic mail and the information of the sender of the electronic mail are so compared with each other that it is confirmable that both do not accord with each other when a person other than the mail partner to which the partner specifying mail address has been notified transmits the electronic mail to the partner specifying mail address, for preventing transmission of the improper electronic mail.

(5) The monitoring system according to described in (4), wherein the said partner specifying mail address generation processing means performs processing for generating the said partner specifying mail address by encrypting data including mail partner specifying information (MTT//○ΔXXΔ in FIG. 61, for example) for specifying the said mail partner (encrypting the data through S1001 of FIG. 59 and generating the address by dispersing/inserting the key specifying number though S1002, for example), and the said monitor means monitors whether or not the said mail partner specifying information and the information of the sender of the said electronic mail accord with each other by decoding the said partner specifying mail address (inferring the common key KN through SV5 and SV6 in FIG. 60 and decoding the address with the key KN through SV7, for example) and extracting the said mail partner specifying information (SV8 to SV12 in FIG. 60, for example).

According to this structure, the mail partner specifying information can be inferred from the data of the partner specifying mail address itself, and it is possible to prevent such inconvenience that the quantity of registration data of mail partner specifying information in a case of notifying the partner specifying mail address to a large number of partners respectively becomes enormous as compared with a method of registering corresponding mail partner specifying information every partner specifying mail address, for example.

(6) The monitoring system described in (5), wherein the said partner specifying mail address generation processing means performs processing of generating the said partner specifying mail address by encrypting data (○□XΔX in FIG. 61, for example) specifying the mail address of the person in question intending to exchange electronic mails with the said mail partner and data (trader E-mail mail address ○ΔXXΔ) specifying the mail address of the said mail partner, and the said monitor means performs processing of specifying the mail address of the said mail partner by decoding the said partner specifying mail address (SV7 in FIG. 60, for example) and monitoring whether or not the said mail address and the mail address of the sender of the said electronic mail accord with each other (SV11 and SN12 in FIG. 60, for example) for storing the said electronic mail in a mail box corresponding to the said mail address of the person in question specified by decoding the said partner specifying mail address when the mail addresses accord with each other as a result of monitoring (when determination of YES is made through SV11 in FIG. 60, for example).

According to this structure, the mail address of the person in question can also be extracted by decoding the partner specifying mail address for monitoring, whereby convenience is improved.

(7) The monitoring system described in any of (4) to (6), further including prevention means (SV14 to SV16 in FIG. 60, for example) preventing transmission of the said electronic mail when the said inferred mail partner specifying information and the information of the sender of the said electronic mail do not accord with each other as a result of monitoring by the said monitor means (when determination of NO is made through S12 in FIG. 60, for example).

According to this structure, receipt of a junk mail can be reliably prevented by the prevention means.

Another embodiment of the pseudo mode processing and the RFID exchange processing shown in FIGS. 26 and 27 is now described.

In this other embodiment, such a case is assumed that all or part of RFID tags affixed to belongings (portables) purchased and worn by a personal user cannot be switched to a transmission stop mode transmitting no RFID.

FIG. 62 is a flow chart showing a subroutine program of the pseudo mode processing in another embodiment. Different points from FIG. 26 are mainly described. Referring to FIG. 62, both steps of SD6 and SD7 shown in FIG. 26 are deleted from this subroutine program. Then, a determination is made as to whether or not an RFID has been received through SD9 after a step of SD8. When there are no RFID tags affixed to belongings worn by the personal user, the purport that there is no RFID is displayed through SD11. When RFIDs are transmitted from the RFID tags affixed to belongings worn by the personal user, a determination of YES is made through SD9 and the control advances to SD9*a*. At SD9*a*, processing of storing the received RFID in a storage area 410 (see FIG. 64) of the RAM 196 is performed. Then, the control advances to SD10, for performing RFID exchange processing.

In other words, the processing step for bringing the transmission stop mode (guard mode) shown in FIG. 26 is deleted since the RFID tags affixed to the belongings worn by the personal user cannot be switched to the transmission stop mode (guard mode). Alternatively, RFIDs transmitted from the RFID tags affixed to the belongings purchased and worn by the personal user are stored in the RAM 196 of the browser phone 30, and the same are effectively utilized as pseudo RFIDs as described later.

FIG. 26 shows the state of this control through SD8 and SD9*a*. FIG. 62 shows three personal users, i.e., Alice, Susan and Bob, and the respective personal users wear belongings (wristwatches and clothes, for example) to which RFID tags 401*a* to 401*f* are affixed.

For example, the RFID tag 401*a* affixed to one of belongings of Alice transmits an RFID of a code a, and the RFID tag 401*b* affixed to another one of the belongings of Alice transmits an RFID of a code b. A browser phone 30 possessed by Alice stores both RFIDs in an RFID storage area 410 of a read RAM 196*a*. Susan and Bob also store RFIDs transmitted from RFIDs of their belongings in RFID storage areas 410 of RAMS 196*s* and 196*b* of respective browser phones, similarly to Alice.

FIG. 63 is a flow chart showing a subroutine program of the RFID exchange processing shown in SD10 of FIG. 62. This subroutine program is another embodiment of the RFID exchange processing shown in FIG. 27, and different points from FIG. 27 are mainly described. First, a determination is made as to whether or not it is a pseudo mode through SE0. The subroutine program is ended if it is not the pseudo mode, while the control advances to SE1 if it is the pseudo mode. Control up to SE1 to SE3 is identical to that shown in FIG. 27. When a determination of NO is made through SE3, the control advances to SE4, for determining whether or not any RFID is stored. The RFID through SE4 is the RFID transmitted from the RFID tag affixed to any of belongings of each personal user and stored in the RAM 196 through the aforementioned SD9*a*. If no RFID is stored, processing of each step of SE5 and SE6 is performed. This processing of each step is identical to that of FIG. 27. At SE7, processing of receiving an RFID from a partner and regarding both of the RFID stored in the RFID storage area 410 and the received RFID as pseudo RFIDs is performed, and the control thereafter advances to SE10.

When a determination of YES is made through SE4, the control advances to SE8 for performing processing of transmitting the stored RFID and receiving the RFID transmitted from the browser phone 30 of the partner.

Then, the control advances to SE8*a*, for performing processing of regarding both of the received RFID and the stored RFID stored in the RFID storage area 410 of the RAM 196 as pseudo RFIDs. Then, the control advances to SE9, for performing processing of RFIDs already stored in pseudo RFID storage areas 411 to 414 of the RFID 196 one by one toward the old storage area (toward 414) and erasing the oldest pseudo RFID exceeding the upper limit of storage ("4" in FIG. 64). Then, the process advances to SE10, for performing processing of storing new pseudo RFIDs (newly regarded as the pseudo RFIDs through SE8*a*) in the newest RFID storage area 411.

FIG. 64 shows a specific example of the processing through SE8 to SE10. 400 in FIG. 64 denotes an exchangeable exchange area (refer to SE2) in a case of performing RFID exchange processing with the browser phones 30. FIG. 64 shows such a state that the three persons, i.e., Alice, Susan and Bob are in this exchange area 400. The browser phones 30 of Alice, Susan and Bob in this exchange area 400 transmit exchange desire waves and transmit/receive RFIDs of their belongings stored in the RFI storage areas 411 of the RAMs 196*a*, 196*s* and 196*b*. For example, Alice transmits the RFIDs a and b of her belongings to the browser phones 30 of Susan and Bob. Susan transmits RFIDs c and d of her belongings to the browser phones 30 of Alice and Bob. Bob transmits RFIDs e and f of his belongings to the browser phones 30 of Alice and Susan.

When receiving the RFIDs transmitted from the browser phones 30 of strangers, the browser phones 30 shift the pseudo RFID storage areas 411 to 414 in the RAMs 196*a*, 196*b* and 196*s* one by one toward the oldest storage areas (toward 414) and erase pseudo RFIDs stored in the oldest storage areas 414. In this state, the newest storage areas 411 become free areas, and hence RFIDs received from strangers are stored in the free areas 411.

For example, the browser phone 30 of Alice receives the RFIDs c and d from Susan while receiving the RFIDs e and f from Bob, thereby storing c, d, e and f in the aforementioned free area 411 as pseudo RFIDS. Similarly, Susan stores the RFIDs a, b, e and f. Bob stores a, b, c and d.

When the browser phones 30 receive RFID transmission instructions from RFID tag readers in this state, it follows that the pseudo RFIDs stored in the pseudo RFID storage areas 411 to 414 of the RAMs 196*a*, 196*b* and 196*c* are transmitted according to the aforementioned SG9. The pseudo RFIDs stored in the pseudo RFID storage areas 411 are transmitted in first transmission after performing the RFID exchange processing, the pseudo RFIDs stored in the pseudo RFID storage areas 412 are transmitted in second transmission, the pseudo RFIDs stored in the pseudo RFID storage areas 413 are transmitted in third transmission, the pseudo RFIDs stored in the pseudo RFID storage areas 414 are transmitted in fourth transmission, and the pseudo RFIDs stored in the pseudo RFID storage areas 411 are transmitted from the start in fifth transmission.

In the first transmission, the browser phone 30 of Alice, for example, transmits the pseudo RFIDs c, d, e and f while the RFID tags 401*a* and *b* affixed to the belongings of Alice transmit the RFIDs a and b respectively. Consequently, it follows that Alice transmits the RFIDs a, b, c, d, e and f in total.

Similarly, the browser phone 39 of Susan transmits the pseudo RFIDs a, b, e and f, and it follows that the RFID tags 401*c* and 401*d* affixed to the belongings of Susan transmit the RFIDs c and d respectively. Consequently, it follows that Susan transmits the RFIDs a, b, c, d, e and f in total. Similarly, it follows that Bob transmits the RFIDs a, b, c, d, e and f in total. Thus, it follows that the persons mutually exchanging the RFIDs in the exchange area 400 transmit the same RFIDs according to the RFID transmission instructions from the tag readers, to result in the different person identical RFID transmission phenomenon.

While the aforementioned other embodiment is on the premise of that all of the RFID tags affixed to the belongings of the personal users cannot be switched to the transmission stop mode (guard mode), the present invention is not restricted to this but only one of persons mutually exchanging RFIDs may be unswitchable to the RFID transmission stop mode (guard mode). For example, when two persons of Alice and Susan are in the exchange area 400, the RFID tags 401*a* and 401*b* affixed to the belongings of Susan are switchable to the transmission stop mode (guard mode) and hence switched to the transmission stop mode (guard mode) and they mutually exchange the RFIDs in this state, the browser phone 30 of Alice transmits the RFIDs a and b to the browser phone 30 of Susan while the browser phone 30 of Susan transmits a pseudo RFID s generated at random to the browser phone of Alice.

Consequently, the pseudo RFID storage area 411 of the browser phone 30 of Susan stores the pseudo RFIDs a and b while the pseudo RFID storage area 411 of the browser phone 30 of Alice stores the pseudo RFID s. According to RFID transmission instructions, Susan transmits the pseudo RFIDs a and b of the browser phone 30 and the aforementioned pseudo RFID s while Alice transmits the RFIDs a and b from the RFID tags 401*a* and 401*b* of the belongings respectively and transmits the pseudo RFID s of the browser phone 30. Thus, such a different person identical RFID transmission phenomenon is caused that Alice and Susan transmit the same RFIDs a and b.

Control may be so performed as to perform exchange processing of RFIDs through browser phones in the exchange area only when personal users switch the browser phones 30 to an RFID exchange mode and the browser phones are in the RFID exchange mode so that the RFID exchange mode is automatically ended in such a state that new pseudo RFIDs are stored and accumulated in the RAMS 196 to some extent.

Modifications and characteristic points in the aforementioned embodiments are now listed.

(1) The term "person" employed in the present invention is a wide concept including not only a natural person but also a corporate body. The term "pseudonym" employed in the present invention denotes the name of the virtual person (VP), and the name of the virtual person and the pseudonym of the real person denote the same concept. Therefore, it follows that the name, the E-mail address and the electronic certificate of the virtual person are an address, an E-mail address and an electronic certificate for the real person acting on the network with the pseudonym.

The term "private information protector" employed in the present invention is a wide concept including not only a single apparatus but also a system so constructed that a plurality of apparatuses cooperatively operate in order to attain a certain object.

(2) while the financial institution 7 is provided with the VP management function, the settlement function and the authentication function in this embodiment as shown in FIG. 1, the VP management function may be independently separated from the financial institution 7 so that another prescribed institution having the duty of confidentiality other than the financial institution substitutionally takes charge of the VP management function. The substitutional prescribed institution may be a public institution such as a public agency. Further, the electronic certificate issuing function of issuing electronic certificates to the RP and the VP may be independently separated from the financial institution 7 so that a dedicated authentication station substitutionally takes charge of this function.

While this embodiment employs the address of the convenience store 2 as the address of the VP, a place of collection and delivery for goods in a post office or a distribution trader, for example, may substitutionally be employed as the address of the VP. Further, a dedicated institution defining the address of the VP may be newly set.

While the financial institution 7 serving as an exemplary prescribed institution performs the processing of creating the VP in this embodiment, the present invention is not restricted to this but the user him/herself may create (bear) the VP with his/her terminal (browser phone 30 or the like) for registering VP information such as the name, the address, the public key, the account number and the E-mail address of the created VP to the prescribed institution such as the financial institution 7.

The created VP may not necessarily be registered in the prescribed institution.

(3) The IC terminal 19R or 19V serving as an exemplary processor may be constituted by a portable terminal such as an IC card, a portable telephone or a PHS or a PDA (Personal digital Assistant). When constituting the IC terminal by such a portable terminal, two types of terminals including a portable terminal for the VP and a portable terminal for the RP may be prepared, while the portable terminal may be constituted to be switchable to a VP mode or an RP mode so that a single type of portable terminal is sufficient.

In place of installment of the application software by the IC terminal 19I shown in FIG. 7, this application software may be downloaded to the browser phone 30 or the like from a supplier of this application software through the network.

(4) While this embodiment is so constituted as to automatically create and issue the electronic certificate for the VP in creation of the VP as shown in FIG. 17, the electronic certificate for the VP may alternatively be first created/issued when receiving an issuance request for the electronic certificate from the user.

While this embodiment employs the authentication key KN of the RP when performing person in question authentication of the RP as shown in FIG. 23 etc., person in question authentication of the RP may alternatively be performed with the public key in the electronic certificate if the RP has received issuance of the electronic certificate.

(5) The browser phone 30 may be replaced with a personal computer.

The E-mail address ΔΔΔΔΔ opened by the financial institution 7 for the trap type VP may not be only a single type E-mail address but may be prepared in a plurality of types for using the same every trap type VP name. S620 to S622 or S960 to S956 constitute new pseudonym generation means generating a pseudonym not theretofore used when receiving a request for generating a new pseudonym (trap type VP name). S431 to S441 or S954 constitutes pseudonym registration means registering the pseudonym when a pseudonym registration institution (financial institution 7 or EEPROM 26) registering the pseudonym generated by said new pseudonym generation means receives a request for registering a newly generated pseudonym.

The aforementioned S450 to S460 constitute private information transmission means transmitting private information corresponding to a user to this user when the user makes a request for confirming his/her private information to a registration institution registering the private information of the user on condition that the user has been confirmed as the person in question as a result of person in question authentication by person in question authentication means (S452 to S458) performing person in question authentication of the user.

The trap type VP name shown in FIG. 40(*a*) may be created by compositing the site name (trader name) with the secret key KSB of the VP.

In other words, the trap type VP name may be generated by performing an operation of DKSB(trader name) through S957. In this case, it follows that a determination is made according to an operational formula EKPB(addressee of E-mail)=name of sender through S969. Processing of outputting that EKPB(addressee of E-mail) has been illegally distributed and illegally obtained by the trader having the name of the sender is performed at S967.

(6) The aforementioned legal institution proof processing, legal institution check processing, person in question proof processing, person in question check processing through S4 to S7 etc. constitute person in question authentication means for confirming the person in question and preventing pretending.

S13 to S16 constitute virtual person electronic certificate issuance means creating and issuing an electronic certificate for the virtual person (virtual person). S25 to S28 constitute real person electronic certificate issuance means creating and issuing an electronic certificate for the real person (real person) existing in the actual world.

S39 to S45 constitute bank account creation processing means performing processing for creating a bank account for the virtual person (virtual person).

S40 to S49 constitute debit card issuance processing means performing processing for issuing a debit card for the real person (real person) or the virtual person (virtual person). S55 to S69 constitute fund withdrawal processing means performing processing for partially withdrawing funds in the bank account of the virtual person (virtual person) with respect to the processor (IC terminal 19V for VP) carried by the virtual person (virtual person).

S57 to S74 constitute debit card settlement processing means performing processing for settling accounts with the debit card of the virtual person (virtual person). S57 to S78 constitute credit card settlement processing means performing processing for settling accounts with the credit card of the virtual person (virtual person). This credit cared settlement processing means settles accounts according to Secure Electronic Transaction (SET).

(7) S140 to S158 constitute birth request processing means for performing processing for the user for making a birth request for his/her virtual person (virtual person). S9 to S12 constitute address decision processing means performing processing for deciding an address which is the address of the born virtual person (virtual person) and different from the address of the real person (real person) who is the birth requester. This address decision processing means decides the address of a convenience store as the address of the virtual person (virtual person). Further, this address decision processing means can decide the address of a convenience store desired by the real person (real person) who is the birth requester as the address of the virtual person (virtual person). In addition, this address decision processing means can decide the address of a convenience store near to the address of the real person (real person) who is the birth requester as the address of the virtual person (virtual person).

S305 to s312 constitute private information automatic output means provided in said processor (IC terminal 19R for RP, IC terminal 19V for VP) carried by the user and capable of performing processing of choosing corresponding virtual information from stored private information and outputting the same when receiving a transmission request for private information of the user possessing this processor as the real person (real person) or private information as the virtual person (virtual person). This private information automatic output means includes automatic determination processing means (S307, 308, 310, 311) performing processing for automatically determining whether or not the target private information for the transmission request may be transmitted. The user can previously input/set what type of private information may be output, and this automatic determination processing means makes an automatic determination according to the input setting. When no automatic determination can be made, this automatic determination processing means performs processing of outputting the requested private information and a transmitted privacy policy for requiring approval for transmission to the user (S309).

The convenience store 2 constitutes an article keeping place keeping an article purchased by the virtual person (virtual person) on the network when this article is delivered. The database 17 constitutes virtual person registration means registering the virtual person (virtual person) for whom the article is kept in said article keeping place. This virtual person registration means stores keep specification information classified every virtual person (virtual person) for specifying whether or not an article is kept. The means further stores settlement specification information for specifying whether or not settlement of this article has been completed. The means makes classification every said virtual person (virtual person) and stores the E-mail address of this virtual person (virtual person).

S323 constitutes E-mail transmission processing means provided on said article keeping place for performing processing for transmitting an E-mail stating that the article has been kept to the E-mail address of the virtual person (virtual person) for whom the article is kept. S317 to S340 constitute article delivery processing means provided on said article keeping place for performing processing for delivering the corresponding article to the user when the user comes to receive the article as the virtual person (virtual person). This article delivery means performs delivery processing on condition that it has been possible to confirm that the virtual person (virtual person) of the user coming to receive the article is the person in question. Said article delivery processing means determines whether or not the delivered article has already been settled and performs article delivery processing on condition that settlement has been made if the same has not yet been settled.

(8) The service provision server 13 of said life support center 8 constitutes life support means collecting private information of the user and supporting the life of the user on the basis of the private information. This life support means performs recommendation processing in order from superordination to subordination for recommending superordinate items (dreams and life design of user, for example) forming the basis of the life of the user, then recommending subordinate items (type of occupation, course etc., for example) and then recommending further subordinate items (hobbies, for example). Further, the life support processing means performs processing of recommending consumption support traders (member stores such as new middlemen) related to the recommended items. In this recommendation, the means provides collected private information of the user to said recommended consumption support traders.

(9) The variable type identifier generation means (SD10 in FIG. 26, SE1 to SE10, SG6 to SG9 in FIG. 29, the RFID exchange processing in FIG. 56, the RFID exchange processing in FIG. 57 or the like) generates identifiers (pseudo RFIDs or the like) in the range of identifiers transmitted from the respective ones of radio identifier transmitters (RFID tags) affixed to already sold articles respectively. The browser phone 30 may also comprise the function of generating the common identifiers (common pseudo RFIDs or the like) and the function of generating a prescribed number of (for example, one) identifier (pseudo RFID or the like) and identifiers (pseudo RFIDs or the like) of a number larger than the prescribed number shown in FIG. 12.

(10) The identifier transmitter for security may be provided (sold) to the personal user in the state of the RFID tag 1*a*, in place of the portable (ID ring) 1 in the form of a ring or the like. In this case, the personal user himself/herself bonds the RFID tag 1$a$ to the corresponding one of his/her belongings or the like.

(11) The capacitor 110 of FIG. 10 constitutes electricity storage means provided on the identifier transmitter for security getting operable by receiving the external electric waves for the power source for storing electricity resulting from the received electric waves for the power source. SA6 to SA10$a$ of FIG. 11 constitute numeric data update means updating numeric data through the power supplied from the said electricity storage means also after the external electric waves for power source stop. In other words, SA6 to SA10$a$ of FIG. 11 constitute random number generation means generating a random number through the power supplied from the said electricity storage means also after the external electric waves for the power source stop. SA4 of FIG. 11 constitutes identifier generation means generating an identifier through numeric data extracted from the said numeric data update means. In other words, SA4 of FIG. 11 constitutes identifier generation means generating an identifier through a random number generated by the said random number generation means. Since electric energy stored in the electricity storage means is irregular every time and hence a conducting period of the electricity storage means also gets irregular so that the identifier is generated through random numeric data (random number) generated through the irregular period, a random identifier can be generated.

The identifier storage means (SE7, SE9 and SE10 of FIG. 27, FIG. 56, FIG. 57, FIG. 63, EEPROM 194 or the like) storing the identifiers is capable of storing a plurality of exchanged identifiers. Further, it is capable of a plurality exchanged identifiers in the order of this exchange, and erases the oldest identifier in storage b exchanging identifiers in a state storing an upper limit number of identifiers (SE9). SG9 of FIG. 29 constitutes identifier selection means, which is means selecting a transmitted identifier from the plurality of identifiers stored in the said identifier storage means, capable of selecting an identifier different from a precedently selected identifier. SG2 of FIG. 29 constitutes identifier transmission request informing means informing, when an identifier transmission request is received, this purport.

(12) As described on the basis of FIGS. 41 to 47, various information related to the article is provided to the personal user through the proper identifier (RFID) transmitted from the proper identifier transmitter (RFID tag) affixed to the purchased article. This information providing system is constituted of the server and the database of the article maker 300, the server and the database of the article information service trader 302, the server and the database of the intermediate distribution trader 301, the server and the database of an article sales store formed by the retail store 20$b$ and the communication network (broadband/large capacity relay network 43) making communication between these servers.

The database of the article information service trader 302 stores the respective URLs of the producer, the intermediate distribution trader and the retail store in association with the respective ones of the proper identifiers (RFIDs) shown in FIG. 42. In association with the proper identifier (RFID) transmitted from the proper transmitter (RFID tag) affixed to any purchased article, further, information of the purchaser purchasing the corresponding article is rendered storable. The purchaser transmits the proper identification information (RFID) to the server of the article information service trader 302 and accesses the server, so that an information recording area (purchaser page) of this purchaser is provided in association with the transmitted proper identification information. The information recording area (purchaser page) is enabled to store the pseudonym (VP name), the VP address, the E-mail address etc. of the purchaser. The purchaser page is so formed that the purchaser can write a memorandum related to the purchased article or the like therein, so that the purchaser can write various information related to the article, transmit the proper identification information (RFID) to the server of the article information service trader 302 and retrieve and peruse written information corresponding thereto.

SQ26 of FIG. 46 constitutes purchase reservation means performing purchaser reservation by specifying an article to be purchased with the proper identification information corresponding to this article and transmitting the same to the retail store. SQ33 and SQ35 of FIG. 46 constitute barter means performing barter between personal users. SQ34 of FIG. 46 constitutes secondhand article sales means with which the personal user sells a secondhand article possessed by him/her. SS3 to SS12 of FIG. 47 constitute reservation purchase acceptance processing means for accepting and processing a reservation purchase from the personal user. The "identifier" in the present invention is not restricted to the RFID, but is a wide concept including all identifiers on the basis of which privacy may be invaded.

The invention consisting of the following various structures is described in the aforementioned embodiments:

(1) A privacy protection method for preventing an invasion of privacy performed by reading an proper identifier (RFID or the like, for example) and on the basis of the proper identifier, including:

an identifier guard step (SB1, SB3 to SB7 etc. of FIG. 15) of bringing an proper identifier of a radio identifier transmitter (RFID tag or the like) affixed to an article (a wristwatch, glasses or clothes, for example) purchased and thereby possessed by a personal user into an identifier guard state not readable by a stranger according to the intention of the personal user;

an identifier generation step (SA1 to SA4 of FIG. 11, or SD2, SD10 and SD12 of FIG. 26 and FIG. 27, SE1 to SE10 of FIG. 63 and SG3, SG3$a$, SG3$b$ and SG5 to SG9 of FIG. 29, FIG. 56, FIG. 57 or the like) of generating an identifier (pseudo RFID or the like) for disturbing a privacy invader with a privacy protection identifier transmitter (RFID tag 1$a$ for security, browser phone 30 or the like) possessed by the said personal user;

a transmission step (SA5 and SA10 of FIG. 11 or SG7 and SG9 or the like) of transmitting the said identifier generated through the said identifier generation step from the said privacy protection identifier transmitter when receiving an identifier transmission request (when determination of YES is made through SA1 of FIG. 11 or SG3 of FIG. 29); and a reading step (SB2, SB8 and SB9 to SB13 of FIG. 15) of rendering the identifier of the said radio identifier transmitter in the identifier guard state readable according to the intension of the personal user, wherein the said identifier generation step includes a variable type identifier generation step (SD10 of FIG. 26, FIG. 27, SE1 to SE10 of FIG. 63, SG6 to SG9 of FIG. 29, the RFID exchange processing of FIG. 56, the RFID exchange processing of FIG. 57 or the like) capable of generating an identifier different from a precedently transmitted identifier.

According to this structure, the proper identifier of the radio identifier transmitter affixed to the article purchased and thereby possessed by the personal user can be brought into the identifier guard state not readable by a stranger according to the intention of the personal user, and it is possible to prevent such inconvenience that the proper identifier of the radio identifier transmitter affixed to the purchased article is read by the stranger and an invasion of privacy is caused on the basis thereof to the utmost. Further, the identifier of the radio identifier transmitter in the identifier guard state is rendered readable according to the intention of the personal user, whereby it is possible to read the proper identifier of the radio identifier transmitter affixed to the purchased article at a necessary time when the personal user intends to receive service etc. through the identifier for enjoying the service etc.

When an identifier transmission request is received, in addition, it is possible to generate and transmit an identifier with the privacy protection identifier transmitter possessed by the personal user and a variable type identifier capable of generating an identifier different from a precedently transmitted identifier can be generated, whereby respective radio identifier readers etc. can be brought into states reading different identifiers also when the identifier transmitted from the same person is read by the respective ones of radio identifier readers etc. set in a plurality of places, so that it is possible to camouflage that this is the same person and an invasion of privacy can be prevented to the utmost.

(2) A privacy protection method for preventing an invasion of privacy performed by reading an proper identifier of a radio identifier transmitter (RFID, for example) affixed to an article (a wristwatch, glasses or clothes, for example) purchased and thereby possessed by a personal user and on the basis of the proper identifier, including:

an identifier generation step (SA1 to SA4 of FIG. 11, or SD2, SD10 and SD12 of FIG. 26 and FIG. 27, SE1 to SE10 of FIG. 63 and SG3, SG3*a*, SG3*b* and SG5 to SG9 of FIG. 29, FIG. 56, FIG. 57, FIG. 62, FIG. 63 or the like) of generating an identifier (pseudo RFID or the like) for disturbing a privacy invader with a privacy protection identifier transmitter possessed by the said personal user; and a transmission step (SA5 and SA10 of FIG. 11 or SG7 and SG9) of transmitting the said identifier generated through the said identifier generation step from the said privacy protection identifier transmitter when receiving an identifier transmission request (when determination of YES is made through SA1 of FIG. 11 or SG3 of FIG. 29), wherein the said identifier generation step includes an adjusted identifier generation step (capable of generating RFIDs of the column belonging to the area where R is 0 to 39 in FIG. 12, or capable of generating pseudo RFIDs mutually exchanged in the RFID exchange processing of FIG. 26, FIG. 56, FIG. 57 or FIG. 63) for generating an adjusted identifier so adjusted that an identifier transmitted from the said personal user possessing the said privacy protection identifier transmitter is identical to an identifier transmitted from a stranger in response to the identifier transmission request, for causing such a different person identical identifier transmission phenomenon (different person identical RFID transmission phenomenon, for example) that identical identifiers are transmitted even in case of transmission from different persons.

According to this structure, the common identifier so adjusted that the identifier transmitted from the said personal user possessing the said privacy protection identifier transmitter is identical to an identifier transmitted from a certain stranger other than this personal user is generated in response to an identifier transmission request, and the different person identical identifier transmission phenomenon can be caused so that identical identifiers are transmitted even in case of transmission from different persons. When the privacy protection identifier transmitter capable of causing such a different person identical identifier transmission phenomenon is widespread among personal users, such reliability of determination that the sender of an identical identifier is the same person when the identical identifier is received cannot be kept for a malicious privacy invader determining that it is the same person upon according between an identifier read at a certain spot and another identifier read at another spot and intending to illegally collect and make bad use of private information of the same person. Thus, a privacy invading action based on the determination of the same person can be upset from the premise, and it is possible to effectively protect the privacy of the personal user.

Even if a great majority of personal users walk outdoors or the like while possessing purchased articles and keeping the same in a state transmitting proper identifiers from radio identifier transmitters affixed thereto, further, a disturbing effect capable of, even if the same identifier transmitted from the radio identifier transmitter affixed to an article possessed by the same person is read by the malicious privacy invader in a plurality of places, reducing such reliability that it is the same person is expectable due to spreading of this privacy protection identifier transmitter capable of transmitting the adjusted identifier among partial users, and it is possible to also protect the privacy of a personal user not possessing this privacy protection identifier transmitter to the utmost.

(3) A privacy protection method for preventing an invasion of privacy performed by reading an proper identifier (RFID or the like) and on the basis of the proper identifier, including:

a provision step (FIG. 13 or the like) of providing privacy protection identifier transmitters (RFID tags 1*a* for security or browser phones 30) to a plurality of personal users, wherein the said privacy protection identifier transmitters include:

identifier generation means (SA1 to SA4 of FIG. 11 or SD2, SD10, SD12 of FIG. 26 and SE1 to SE1 of FIG. 27 and SG3, SG3*a*, SG3*b*, SG5 to SG9 of FIG. 29, FIG. 56, FIG. 57 or the like) generating an identifier (pseudo RFID or the like) for disturbing a privacy invader; and transmission means (SA5 and SA10 of FIG. 11, SG7 and SG9 of FIG. 29 or the like) transmitting the said identifier generated by the said identifier generation means when receiving an identifier transmission request (when determination of YES is made through SA1 of FIG. 11 or SG3 of FIG. 29), the said identifier generation means includes variable type identifier generation means (SD10 of FIG. 26, SE1 to SE10 of FIG. 27, SG6 to SG9 of FIG. 29, RFID exchange processing of FIG. 56, RFID exchange processing of FIG. 57 or the like) capable of generating an identifier different from a precedently transmitted identifier, the said variable type identifier generation means is capable of generating a common identifier (common pseudo RFID of FIG. 13 or the like) according with an identifier transmitted from the said privacy protection identifier transmitter possessed by a person different from persons possessing the said privacy protection identifier transmitters generating and transmitting identifiers with the said variable type identifier generation means (FIG. 12, FIG. 13 and SA3 and SA4 of FIG. 11, or SD10 of FIG. 26, SE1 to SE10 of FIG. 27, RFID exchange processing of FIG. 56, RFID exchange processing of FIG. 57 or the like), the said plurality of privacy protection identifier transmitters are classified into a plurality of groups formed by privacy protection identifier transmitters transmitting the said common identifier in a higher frequency as compared with an identifier of a stranger and having the said common identifier varying with groups (classified into groups every area sold with specification the respective areas of Chiyoda-Ku, Shinjuku-Ku, Shibuya-Ku etc. of FIG. 13), and the said provision step specifies an area every group and provides the said privacy protection identifier transmitters belonging to the said group to the personal users (provides the same to the personal users with specification of the respective areas of FIG. 13).

According to this structure, the privacy protection identifier transmitters are provided to the plurality of personal users, and the privacy protection identifier transmitters are capable of generating variable type identifiers capable of generating identifiers different from precedently transmitted identifiers, and are so formed that variable type identifiers transmitted from privacy protection identifier transmitters possessed by persons different from each other respectively include common identifiers according with each other. Consequently, such a phenomenon (different person identical identifier transmission phenomenon) can be caused that the said common identifiers, which are identifiers transmitted from different persons, i.e., identifiers according with each other are transmitted. When the privacy protection identifier transmitters capable of causing this different person identical identifier transmission phenomenon are widespread among personal users, such reliability of determination that the sender of an identical identifier is the same person when the identical identifier is received cannot be kept for a malicious privacy invader determining that it is the same person upon according between an identifier read at a certain spot and another identifier read at another spot and intending to illegally collect and make bad use of private information of the same person. Thus, a privacy invading action based on the determination of the same person can be upset from the premise, and it is possible to effectively protect the privacy of the personal user.

Even if a great majority of personal users walk outdoors or the like while possessing purchased articles and keeping the same in a state transmitting proper identifiers from radio identifier transmitters affixed thereto, further, a disturbing effect capable of, even if the same identifier transmitted from the radio identifier transmitter affixed to an article possessed by the same person is read by the malicious privacy invader in a plurality of places, reducing such reliability that it is the same person is expectable due to spreading of this privacy protection identifier transmitter capable of transmitting the common identifier among partial users, and it is possible to also protect the privacy of a personal user not possessing this privacy protection identifier transmitter to the utmost.

In addition, the plurality of privacy protection identifier transmitters are classified into the groups which are groups of the privacy protection identifier transmitters transmitting the said common identifiers in a higher frequency as compared with other identifiers and having the common identifiers varying with the groups, and the privacy protection identifier transmitters belonging to each group are provided to personal users while specifying an area every group. Consequently, such a tendency results that persons in each area generate and transmit common identifiers, the aforementioned different person identical identifier transmission phenomenon can be caused between the personal users in each area to the utmost, and the aforementioned disturbing effect on the malicious privacy invader can be more effectively attained.

(4) A privacy protection method for preventing an invasion of privacy performed by reading an proper identifier (RFID or the like) and on the basis of the proper identifier, including:

a provision step (FIG. 13 or the like) of providing a privacy protection identifier transmitter (RFID tag 1*a* for security, browser phone 30 or the like) to a plurality of personal users, wherein the said privacy protection identifier transmitter includes:

identifier generation means (SA1 to SA4 of FIG. 11 or SD2, SD10 and SD12 of FIG. 26 and SE1 to SE10 of FIG. 27 and SG3, SG3*a*, SG3*b* and SG5 to SG9 of FIG. 29, FIG. 56, FIG. 57 or the like) generating an identifier for disturbing a privacy invader, and transmission means (SA5 and SA10 of FIG. 11, SG7 and SG9 of FIG. 29 or the like) transmitting the said identifier generated by the said identifier generation means when receiving an identifier transmission request (when determination of YES is made through SA1 of FIG. 11 or SG1 of FIG. 29), the said identifier generation means includes variable type identifier generation means capable of generating an identifier different from a precedently transmitted identifier, and the said variable type identifier generation means is capable of generating a common identifier (code data of RFIDs of the column of the area where R is 0 to 39 in FIG. 12, the common pseudo RFID in FIG. 13, pseudo RFIDs exchanged through FIGS. 27, 56 and 57 or the like) according with an identifier transmitted from a privacy protection identifier transmitter possessed by a person different from a person possessing the privacy protection identifier transmitter generating the identifier with the said variable type identifier generation means, for simultaneously transmitting a previously set prescribed number (one, for example) of identifiers from a privacy protection transmitter (RFID tag 1*a* storing table of FIG. 12(*a*) or the like) provided to a certain personal user through the said provision step (SA4 and SA5 of FIG. 11, RFID of FIG. 12(*a*) or the like), and simultaneously transmitting a plurality of identifiers (RFIDs 1 to 4 of FIGS. 12(*b*) and (*c*)) of a number larger (four, for example) than the said prescribed number (one, for example) from a privacy protection identifier transmitter (RFID tag 1*a* storing tables of FIGS. 12(*b*) and (*c*)) provided to another personal user different from the said certain personal user through the said provision step and generating another identifier (RFIDs 2 to 4 of FIGS. 12(*a*) and (*c*)), excluding the said prescribed number of identifiers, included in the said plurality of identifiers as the said common identifier.

According to this structure, the privacy protection identifier transmitter is provided to the plurality of personal users, and the privacy protection identifier transmitter is capable of generating a variable type identifier capable of generating an identifier different from a precedently transmitted identifier and is so formed that variable type identifiers transmitted from privacy protection identifier transmitters possessed by persons different from each other respectively include common identifiers according with each other. Consequently, such a phenomenon (different person identical identifier transmission phenomenon) can be caused that the said common identifiers, which are identifiers transmitted from different persons, i.e., identifiers according with each other are transmitted. When the privacy protection identifier transmitters capable of causing this different person identical identifier transmission phenomenon are widespread among personal users, such reliability of determination that the sender of an identical identifier is the same person when the identical identifier is received cannot be kept for a malicious privacy invader determining that it is the same person upon according between an identifier read at a certain spot and another identifier read at another spot and intending to illegally collect and make bad use of private information of the same person. Thus, a privacy invading action based on the determination of the same person can be upset from the premise, and it is possible to effectively protect the privacy of the personal user.

Even if a great majority of personal users walk outdoors or the like while possessing purchased articles and keeping the same in a state transmitting proper identifiers from radio identifier transmitters affixed thereto, further, a disturbing effect capable of, even if the same identifier transmitted from the radio identifier transmitter affixed to an article possessed by the same person is read by the malicious privacy invader in a plurality of places, reducing such reliability that it is the same person is expectable due to spreading of this privacy protection identifier transmitter capable of transmitting the common identifier among partial users, and it is possible to also protect the privacy of a personal user not possessing this privacy protection identifier transmitter to the utmost.

In addition, a privacy protection identifier transmitter provided to a certain personal user simultaneously transmits a previously set prescribed number of identifiers while a privacy protection identifier transmitter provided to another personal user different from the said certain personal user simultaneously transmits a plurality of identifiers of a number larger than the aforementioned prescribed number, and another identifier, excluding the prescribed number of identifiers, included in the plurality of identifiers is generated and transmitted as the aforementioned common identifier. Consequently, even if a radio identifier transmitter affixed to a purchased article carried by a personal user is in a state regularly transiting an identifier, the aforementioned different person identical identifier transmission phenomenon can be caused.

In other words, when a personal user in such a state that radio identifier transmitters affixed to purchased belongings transmit proper identifiers possesses a privacy protection identifier transmitter transmitting an identifier, it follows that both of the radio identifier transmitters affixed to the purchased belongings and the privacy protection identifier transmitter transmit identifiers to result in a state simultaneously transmitting a plurality of identifiers. A part of the plurality of identifiers is a variable type, and another part becomes an unchanging fixed type. In other words, such a phenomenon (prescribed number in multiple identifier variable type phenomenon) is caused that only a prescribed number of ones among a plurality of identifiers read respectively become different variable type identifiers while others become genuine proper identifiers transmitted from radio identifier transmitters affixed to carried articles and become identical identifiers when identifiers are read in a plurality of places. Consequently, such inconvenience results that it is found out that this is the same person when this prescribed number in multiple identifier variable type phenomenon is caused.

Therefore, the present invention provides a minority identifier transmission type privacy protection identifier transmitter simultaneously transmitting the said prescribed number of identifiers to a personal user in such a state that radio identifier transmitters affixed to purchased belongings transmit proper identifiers, and provides a majority identifier transmission type privacy protection identifier transmitter simultaneously transmitting a plurality of identifiers of a number larger than the said prescribed number to a personal user in such a state that no proper identifier is read by a stranger from purchased belongings, for example. Consequently, it follows that the former personal user simultaneously transmits the prescribed number of identifiers and the proper identifiers transmitted from the radio identifier transmitters of the carried purchased belongings while the latter personal user simultaneously transmits identifiers larger in number than the identifiers transmitted from the former personal user, and another identifier, excluding the number (prescribed number) of identifiers transmitted from the former personal user, included in the large number of identifiers is generated and transmitted as the aforementioned common identifier. Thus, in the case of the former personal user, such a phenomenon (prescribed number in multiple identifier variable type phenomenon) is caused that only the said prescribed number of ones among a plurality of identifiers read respectively become different variable type identifiers while others become genuine proper identifiers transmitted from radio identifier transmitters affixed to carried articles and become identical identifiers when identifiers are read in a plurality of places. In the latter user possessing the majority identifier transmission type privacy protection identifier transmitter, on the other hand, the prescribed number in multiple identifier variable type phenomenon is caused as well since another identifier, excluding the said prescribed number of identifiers, included in the plurality of transmitted identifiers is generated and transmittable as the aforementioned common identifier. Further, this phenomenon is caused between different persons.

Thus, even if the aforementioned prescribed number in multiple identifier variable type phenomenon is caused, this is not necessarily caused in the same person but is caused also between different persons, so that it is possible to reduce reliability of the assumption that it is the same person by the malicious privacy invader based on the prescribed number in multiple identifier variable type phenomenon and privacy can be protected to the utmost.

(5) A device (RFID tag 1*a* for security, browser phone 30 or the like) for transmitting an identifier for privacy protection for preventing an invasion of privacy performed by reading an proper identifier (RFID or the like) and on the basis of the proper identifier, including:

variable type identifier generation means (SA1 to SA4 of FIG. 11, or SD2, SD10 and SD12 of FIG. 26 and FIG. 27, SE1 to SE10 of FIG. 63 and SG3, SG3*a*, SG3*b* and SG5 to SG9 of FIG. 29, FIG. 56, FIG. 57 or the like), which is means disturbing a privacy invader and generating an identifier for privacy protection, capable of generating an identifier different from a precedently transmitted identifier; and transmission means (SA5 and SA10 of FIG. 11 or SG7 and SG9 or the like) transmitting an identifier generated by the said variable type identifier generation means when receiving an identifier transmission request (when determination of YES is made through SA1 of FIG. 11 or SG3 of FIG. 29).

According to this structure, the privacy protection identifier transmitter possessed by the personal user can generate and transmit an identifier when receiving an identifier transmission request while the same can generate a variable type identifier capable of generating an identifier different from a precedently transmitted identifier, whereby each radio identifier reader or the like can be brought into a state reading a different identifier even if an identifier transmitted from the same person is read by the respective ones of radio identifier readers or the like set in a plurality of places, so that it is possible to camouflage that this is the same person and an invasion of privacy can be prevented to the utmost.

(6) The device for transmitting an identifier for privacy protection described in (5), wherein the said variable type identifier generation means generates the said identifier in the range of identifiers transmitted by the respective ones of radio identifier transmitters (RFID tags or the like) affixed to the respective ones of already sold articles.

According to this structure, a variable type identifier is generated and transmitted in the range of identifiers transmitted from the respective ones of radio identifier transmitters affixed to the respective ones of already sold articles, whereby the transmitted identifier cannot be distinguished from an identifier transmitted from a radio identifier transmitter affixed to an already purchased article of a consumer and it is possible to prevent such inconvenience that the transmitted identifier is found out as an identifier for disturbing a privacy invader to the utmost.

(7) The device for transmitting an identifier for privacy protection described in (5) or (6), wherein the said transmission means transmits the same identifier as a precedently transmitted identifier when receiving an identifier transmission request again within a prescribed time (within 5 seconds, for example) from precedent identifier transmission (SA2 and SA10 of FIG. 11, SG3*a* and SG3*b* of FIG. 29 or the like).

According to this structure, the transmission means transmits the same identifier as the precedently transmitted identifier when receiving an identifier transmission request again within a prescribed time from precedent identifier transmission, whereby the same identifier is transmitted even if a system of continuously transmitting an identifier transmission request a plurality of times and continuously reading the identifier a plurality of times is employed for improving reliability of a reading system in an identifier reader or the like so that inconvenience resulting from different identifiers continuously read a plurality of times can be prevented to the utmost. Even if an operation of continuously transmitting an identifier transmission request a plurality of times and continuously reading the identifier is performed similarly to the above in order to check whether it is a variable type identifier or an proper identifier transmitted from a genuine radio identifier transmitter, further, it is possible to prevent such inconvenience that it is found out that this is a variable type identifier to the utmost.

(8) The device for transmitting an identifier for privacy protection described in any of (5) to (7), wherein the said variable type identifier generation means is capable of generating an identifier so adjusted that an identifier transmitted from a person possessing the privacy protection identifier transmitter generating the identifier with the said variable type identifier generation means accords with an identifier transmitted from a stranger, who is a person different from the said person, possessing a privacy protection identifier transmitter (capable of generating RFIDs of the column of the area where R is 0 to 39 in FIG. 12, or pseudo RFIDs exchanged through RFID exchange processing of FIG. 27, 56, 57 or 63).

According to this structure, such a phenomenon (different person identical identifier transmission phenomenon) can be caused that mutually according identifiers which are identifiers transmitted from different persons are transmitted. When the privacy protection identifier transmitter capable of causing this different person identical identifier transmission phenomenon is widespread among personal users, such reliability of determination that the sender of an identical identifier is the same person when the identical identifier is received cannot be kept for a malicious privacy invader determining that it is the same person upon according between an identifier read at a certain spot and another identifier read at another spot and intending to illegally collect and make bad use of private information of the same person. Thus, a privacy invading action based on the determination of the same person can be upset from the premise, and it is possible to effectively protect the privacy of the personal user.

Even if a great majority of personal users walk outdoors or the like while possessing purchased articles and keeping the same in a state transmitting proper identifiers from radio identifier transmitters affixed thereto, further, a disturbing effect capable of, even if the same identifier transmitted from the radio identifier transmitter affixed to an article possessed by the same person is read by the malicious privacy invader in a plurality of places, reducing such reliability that it is the same person is expectable due to spreading of this privacy protection identifier transmitter capable of transmitting the common identifier among partial users, and it is possible to also protect the privacy of a personal user not possessing this privacy protection identifier transmitter to the utmost.

(9) The device for transmitting an identifier for privacy protection described in (8), further including communication means (RFID exchange processing of FIG. 27, 56, 57 or 63) communicating with a privacy protection identifier transmitter (browser phone 30 or the like) of a stranger, wherein the said variable type identifier generation means includes identifier storage means (FIG. 27, FIG. 56, FIG. 57, SE9 and SE10, EEPROM 194 of FIG. 63 or the like) storing an identifier, the said communication means communicates with the said privacy protection identifier transmitter of the stranger (direct wave communication of FIGS. 27 and 63, telephone communication of FIG. 56, electronic mail communication of FIG. 57 or the like) and transmits the said identifier stored in the said identifier storage means to the said privacy protection identifier transmitter of the stranger ((FIG. 27, SE6 and SE8 of FIG. 63 or SS8, SE9 and SE10 of FIG. 56, SE6 and ST3 of FIG. 57 or the like), receives an identifier transmitted from the said privacy protection identifier transmitter of the stranger, stores the same in the said identifier storage means (SE7 to SE10 of FIG. 27, or SE7 and S8 of FIG. 56, or ST8, SE9 and SE10 of FIG. 57, SE7 to SE10 of FIG. 63 or the like), and exchanges stored mutual identifiers, and the said variable type identifier generation means generates the said identifier (SG9 of FIG. 29 or the like) adjusted to accord with the identifier transmitted from the stranger by reading the exchanged identifier stored in the said identifier storage means when receiving an identifier transmission request (when determination of YES is made through SG3 of FIG. 29).

According to this structure, privacy protection identifier transmitters make communication, mutually transmit/receive stored identifiers and exchange mutual identifiers. When an identifier transmission request is received, the aforementioned exchanged identifier is generated and transmitted as the aforementioned common identifier. Consequently, the aforementioned different person identical identifier transmission phenomenon can be caused by generating and transmitting the common identifier in a relatively reliable method of mutually making communication and transmitting/receiving identifiers.

While a plurality of simultaneously transmitted identifiers may be so exchanged that all of the plurality of identifiers are simultaneously transmitted when receiving an identifier transmission request, conversion means converting a prescribed number of ones among the plurality of identifiers to other identifiers (random identifiers generated through random numbers, for example) may be provided to transmit a plurality of identifiers in a converted state for causing the aforementioned prescribed number in multiple identifier variable type phenomenon between different persons.

(10) The device for transmitting an identifier for privacy protection described in (9), wherein the said communication means, whose communicable communication limit range for transmitting/receiving and exchanging mutual identifiers is set within 20 meters, communicates with the privacy protection identifier transmitter of the stranger entering the area of the said communicable communication limit range and exchanges mutual identifiers with each other (FIG. 27, SE1 and SE2 of FIG. 63 or the like).

According to this structure, the communicable communication limit range for transmitting/receiving and exchanging mutual identifiers is set within 20 meters for mutually making communication with a privacy protection identifier transmitter entering the area of the communicable communication limit range and exchanging identifiers, whereby it follows that mutual identifiers are exchanged between personal users positioned in the relatively short distance range within 20 meters, persons positioned relatively approximate to each other enter a state capable of sharing and transmitting common identifiers, the aforementioned different person identical identifier transmission phenomenon can be caused between personal users positioned in the short distance range to the utmost, and the aforementioned disturbing effect on the malicious privacy invader can be more effectively attained.

(11) The device for transmitting an identifier for privacy protection described in (9) or (10), wherein the said communication means has inhibition means (FIG. 27 FIG., FIG. 56, FIG. 57, SE3 of FIG. 63 or the like) inhibiting performance of exchange of the said identifiers with the privacy protection identifier transmitter of a stranger with whom communication has been already made for transmitting/receiving and exchanging the said identifiers again within a prescribed period (within one day, for example).

According to this structure, re-exchange of identifiers with a privacy protection identifier transmitter of a stranger already making communication and exchanging identifiers within a prescribed period can be prevented, and it is possible to prevent waste of re-exchanging identifiers with a partner already exchanging identifiers within a prescribed period.

(12) The device for transmitting an identifier for privacy protection described in any of (9) to (11), wherein the said communication means has a telephone function (communication function through browser phone 30) and exchanges mutual identifiers with the privacy protection identifier transmitter of a stranger making communication by telephone (RFID exchange processing of FIG. 56 or the like), and the said variable type identifier generation means generates an identifier adjusted to accord with an identifier transmitted from the said stranger by reading an exchanged identifier stored in the said identifier storage means when receiving an identifier transmission request (SG9 of FIG. 29).

According to this structure, the communication means has the telephone function and exchanges mutual identifiers with a privacy protection identifier transmitter of a stranger making communication by telephone, whereby identifiers can be shared by a relatively reliable method and the aforementioned different person identical identifier transmission phenomenon can be caused.

(13) The device for transmitting an identifier for privacy protection described in any of (9) to (12), wherein the said communication means has an electronic mail function (E-mail function through browser phone 30 or the like), transmits an identifier stored in the said identifier storage means to the privacy protection identifier transmitter of the stranger along with transmission of an electronic mail (SE5, SE6 and ST3 of FIG. 57 or the like), and receives an identifier transmitted from the privacy protection identifier transmitter of the stranger along with receiving of an electronic mail and stores the same in the said identifier storage means (ST8, SE9 and SE10 of FIG. 57 or the like), and the said variable type identifier generation means generates an identifier adjusted to accord with the identifier transmitted from the said stranger by reading the identifier, transmitted from the privacy protection identifier transmitter of the stranger, stored in the said identifier storage means when receiving an identifier transmission request (SG9 of FIG. 28).

According to this structure, the communication means has the electronic mail function for exchanging mutual identifiers by transmitting the identifier stored in the identifier storage means to the privacy protection identifier transmitter of the stranger along with transmission of the electronic mail and receiving the identifier transmitted from the privacy protection identifier transmitter of the stranger along with receiving of the electronic mail and storing the same in the identifier storage means, whereby the aforementioned different person identical identifier transmission phenomenon can be caused by sharing the common identifier by a relatively reliable method.

(14) The device for transmitting an identifier for privacy protection described in any of (5) to (13), wherein the said transmission means is capable of simultaneously transmitting a plurality of identifiers of a number larger than a prescribed number (one, for example) of identifiers simultaneously transmitted from the privacy protection identifier transmitter (RFID tag 1*a* storing table of FIG. 12(*a*) or the like) of a stranger (four RFIDs 1 to 4 of FIGS. 12(*b*) and (*c*), AS4 and AS5 of FIG. 11 or the like), and the said variable type identifier generation means generates an identifier, excluding the said prescribed number of identifiers, included in the said plurality of identifiers as the said common identifier (generates RFIDs 2 to 4 of FIGS. 12(*a*) and (*c*) as common pseudo RFIDs.

According to this structure, the privacy protection identifier transmitter provided to the certain personal user simultaneously transmits the previously set prescribed number of identifiers while the privacy protection identifier transmitter provided to another personal user different from the said certain personal user simultaneously transmits the plurality of identifiers of the number larger than the said prescribed number, and another identifier, excluding the said prescribed number of identifiers, included in the plurality of identifiers is generated and transmitted as the said common identifier. Consequently, the aforementioned different person identical identifier transmission phenomenon can be caused even in such a state that a stranger can read an proper identifier from a purchased article possessed by a personal user.

In other words, when a personal user in such a state that radio identifier transmitters affixed to purchased belongings transmit proper identifiers possesses a privacy protection identifier transmitter transmitting an identifier, it follows that both of the radio identifier transmitters affixed to the purchased belongings and the privacy protection identifier transmitter transmit identifiers to result in a state simultaneously transmitting a plurality of identifiers. A part of the plurality of identifiers is a variable type, and another part becomes an unchanging fixed type. In other words, such a phenomenon (prescribed number in multiple identifier variable type phenomenon) is caused that only a prescribed number of ones among a plurality of identifiers read respectively become different variable type identifiers while others become genuine proper identifiers transmitted from radio identifier transmitters affixed to carried articles and become identical identifiers when identifiers are read in a plurality of places. Consequently, such inconvenience results that it is found out that this is the same person when this prescribed number in multiple identifier variable type phenomenon is caused.

Therefore, the present invention provides a minority identifier transmission type privacy protection identifier transmitter simultaneously transmitting the said prescribed number of identifiers to a personal user in such a state that radio identifier transmitters affixed to purchased belongings transmit proper identifiers, and provides a majority identifier transmission type privacy protection identifier transmitter simultaneously transmitting a plurality of identifiers of a number larger than the said prescribed number to a personal user in such a state that no proper identifier is read by a stranger from purchased belongings, for example. Consequently, it follows that the former personal user simultaneously transmits the prescribed number of identifiers and the proper identifiers transmitted from the radio identifier transmitters of the carried purchased belongings while the latter personal user simultaneously transmits identifiers larger in number than the identifiers transmitted from the former personal user, and another identifier, excluding the number (prescribed number) of identifiers transmitted from the former personal user, included in the large number of identifiers is generated and transmitted as the aforementioned common identifier. Thus, in the case of the former personal user, such a phenomenon (prescribed number in multiple identifier variable type phenomenon) is caused that only the said prescribed number of ones among a plurality of identifiers read respectively become different variable type identifiers while others become genuine proper identifiers transmitted from radio identifier transmitters affixed to carried articles and become identical identifiers when identifiers are read in a plurality of places. In the latter user possessing the majority identifier transmission type privacy protection identifier transmitter, on the other hand, the prescribed number in multiple identifier variable type phenomenon is caused as well since another identifier, excluding the said prescribed number of identifiers, included in the plurality of transmitted identifiers is generated and transmittable as the aforementioned common identifier. Further, this phenomenon is caused between different persons.

Thus, even if the aforementioned prescribed number in multiple identifier variable type phenomenon is caused, this is not necessarily caused in the same person but is caused also between different persons, so that it is possible to reduce reliability of the assumption that it is the same person by the malicious privacy invader based on the prescribed number in multiple identifier variable type phenomenon and privacy can be protected to the utmost.

(15) The device for transmitting an identifier for privacy protection described in any of (5) to (14), further including:

identifier guard means (SB1 and SB3 to SB7 of FIG. 15 or the like) bringing an proper identifier (RFID or the like) of a radio identifier transmitter (RFID tag or the like) affixed to an article (wristwatch, glasses, clothes or the like, for example) purchased and thereby possessed by a personal user into an identifier guard state not readable by a stranger according to the intention of the said personal user, and read means (SB2, SB8 and SB9 to SB13 of FIG. 15) rendering the identifier of the said radio identifier transmitter in the identifier guard state readable according to the intention of the personal user.

According to this structure, the proper identifier of the radio identifier transmitter affixed to the article purchased and thereby possessed by the personal user can be brought into the identifier guard state not readable by a stranger according to the intention of this personal user, for preventing such inconvenience that the proper identifier of the radio identifier transmitter affixed to the purchased article is read by the stranger to result in privacy invasion based on the same to the utmost. Further, the identifier of the radio identifier transmitter in the identifier guard state is rendered readable according to the intention of the personal user, whereby it is possible to read the proper identifier of the radio identifier transmitter affixed to the purchased article at a necessary time when the personal user intends to receive service etc. through the identifier for enjoying the service etc.

(16) The device for transmitting an identifier for privacy protection described in (15), wherein the said identifier guard means transmits proper identification information (password, for example) for person in question authentication, lets the said radio identifier transmitter authenticate the same and switches to an identifier transmission stop state transmitting no identifier unless the person in question is confirmable (SB3 to SB8 of FIG. 15 or the like), and the said read means brings an identifier into a transmittable state after transmitting the said proper identification information and making the said radio identifier transmitter perform the person in question authentication (SB8 and SB9 to SB13 of FIG. 15 or the like).

According to this structure, the identifier guard means transmits the proper identification information for the person in question authentication, lets the radio identifier transmitter authenticate the same and switches to the identifier transmission stop state transmitting no identifier unless the person in question is confirmable and the read means brings the identifier into the transmittable state after transmitting the proper identification information and making the radio identifier transmitter perform the person in question authentication, whereby the identifier of the radio identifier transmitter can be reliably brought into a guarded state and only the person in question subjected to the person in question authentication can bring the radio identifier transmitter into the identifier transmittable state for improving security.

(17) A privacy protection method for preventing an invasion of privacy performed by reading an proper identifier (RFID or the like) and on the basis of the said proper identifier, including:

a registration processing step (S15 of FIG. 17, S440 of FIG. 19 or the like) of performing processing of registering information allowing specification of correspondence between a pseudonym (E(B13P) or the like) created for acting as an anonymous user (trap type virtual person) by giving the pseudonym (trap type virtual person E(B13P) or the like) in order to protect the privacy of a personal user and the said personal user in a prescribed institution (financial institution 7 or the like) having the duty of confidentiality;

an electronic certificate issuing step (S17 of FIG. 17, S441 of FIG. 19 or the like) of issuing an electronic certificate for the said anonymous user;

an address setting step (S9 to S12 of FIG. 17 or the like) for setting the address of the said anonymous user to an address different from that of the personal user corresponding to the said pseudonym;

a user registration step (SJ1 to SJ8 of FIG. 32(*b*), SK2, SK21 to SK24 and SK18 to SK20 of FIG. 33 or the like) of registering as the said anonymous user by registering information of the said pseudonym when performing user registration to a prescribed trader (article sales trader such as department store, for example) (when performing customer registration in new issuance of point card, for example);

a transmission step (SG3 to S13 of FIG. 29 or the like) of transmitting an identifier from a privacy protection identifier transmitter (browser phone 30 or the like) possessed by the said personal user when receiving an identifier transmission request (when determination of YES is made through SG3 of FIG. 29); and pseudonym identifier storage means (SJ8 of FIG. 32, FIG. 9, EEPROM 26 or the like) storing a pseudonym identifier corresponding to the said trader registering the said pseudonym through the said user registration step, for reading the said pseudonym identifier corresponding to the said trader from the said pseudonym identifier storage means and transmitting the same in the said transmission step when transmitting the said identifier to the said trader registering the said pseudonym (SG4, SG10 to SG12 of FIG. 29 or the like).

According to this structure, the electronic certificate for the anonymous user creating the pseudonym and acting with the pseudonym is issued for protecting the privacy of the personal user, whereby the anonymous user can become the subject of transaction such as purchase and sale by presenting the issued electronic certificate. Further, the address of the anonymous user is set to the address different from that of the personal user corresponding to this pseudonym, whereby it is also possible to prevent such inconvenience that which personal user corresponds to which anonymous user is found out through the address to the utmost. In addition, anonymous information is registered as the anonymous user when performing user registration to the prescribed trader, whereby it is possible to act as the anonymous user by giving the pseudonym to the trader for performing transaction such as purchase and sale with the trader while protecting the privacy of the personal user himself/herself and enjoying service etc. by the user registration.

When the trader reads the identifier transmitted from the anonymous user while he/she acts as the anonymous user with respect to the trader registering the pseudonym, on the other hand, there is such a possibility that the trader stores the identifier in association with the anonymous information of the anonymous user. Thus, the trader has an advantage of reading identification information transmitted from a moving anonymous user on important positions, collecting/analyzing the locus of movement and storing customer information thereby effectuating marketing or the like, for example. If the user transmits the same identifier when acting as the anonymous user and also when acting as a normal personal user, however, there is such a possibility that which anonymous user is which normal personal user is found out through the identifier. According to the present invention, the pseudonym identifier storage means stores the pseudonym identifier corresponding to the trader registering the pseudonym so that the pseudonym identifier corresponding to the trader is read from the pseudonym identifier storage means and transmitted when the identifier is transmitted to the trader registering the pseudonym, whereby the pseudonym identifier can be distinguished from the identifier transmitted from the normal personal user, and such inconvenience that which anonymous user is which normal personal user is found out through the identifier can be prevented to the utmost.

(18) The privacy protection method described in (17), reading the said pseudonym identifier from the said pseudonym identifier storage means and transmitting the same when receiving an operation of the personal user for transmitting the said pseudonym identifier (when determination of YES is made through SF7*a* of FIG. 28 and selective specification of trader is stored through SF7*b*) also when it is not the case of transmitting the said identifier to the said trader registering the said pseudonym (also when determination of NO is made through S10 of FIG. 29) (SG13 of FIG. 29 or the like).

According to this structure, the pseudonym identifier can be read from the pseudonym identifier storage means and transmitted when receiving an operation of the personal user for transmitting the pseudonym identifier also when it is not the case of transmitting the identifier to the trader registering the pseudonym. Consequently, when a direct mail or an electronic mail is sent from the trader receiving the pseudonym identifier to the pseudonym corresponding to the pseudonym identifier, it is provable that the anonymous information has been illegally sold to the trader having sent the mail from the trader user-registering the pseudonym, and it is possible to monitor illegal selling of the private information.

(19) A privacy protection system for preventing an invasion of privacy performed by reading an proper identifier.(RFID or the like) and on the basis of the said proper identifier, including:

registration processing means (S15 of FIG. 17, S440 of FIG. 19 or the like) performing processing of registering information allowing specification of correspondence between a pseudonym (E(B13P) or the like) created for acting as an anonymous user (trap type virtual person) by giving the pseudonym (trap type virtual person E(B13P) or the like) in order to protect the privacy of a personal user and the said personal user in a prescribed institution (financial institution 7 or the like) having the duty of confidentiality;

user registration means (SJ1 to SJ8 of FIG. 32(*b*), SK2, SK21 to SK24 and SK18 to SK20 of FIG. 33 or the like) for registering as the said anonymous user by registering information of the said pseudonym when performing user registration (in customer registration in new issuance of point card, for example) to a prescribed trader (article sales trader such as department store, for example);

transmission means (SG3 to SG13 of FIG. 29 or the like) transmitting an identifier from a privacy protection identifier transmitter (browser phone 30 or the like) possessed by the said personal user when receiving an identifier transmission request (when determination of YES is made through SG3 of FIG. 29); and pseudonym identifier storage means (SJ8 of FIG. 32, FIG. 9, EEPROM 26 or the like) storing a pseudonym identifier corresponding to the said trader registering the said pseudonym through the said user registration means, wherein the said transmission means reads the said pseudonym identifier corresponding to the said trader from the said pseudonym identifier storage means and transmits the same when transmitting the said identifier to the said trader registering the said pseudonym (SG4 and SG10 to SG12 of FIG. 29 or the like).

According to this structure, the anonymous information is registered as the anonymous user when performing user registration to the prescribed trader, whereby it is possible to act as the anonymous user by giving the pseudonym to the trader, for enjoying service etc. by the user registration while protecting the privacy of the personal user himself/herself.

When the trader reads the identifier transmitted from the anonymous user while he/she acts as the anonymous user with respect to the trader registering the pseudonym, on the other hand, there is such a possibility that the trader stores the identifier in association with the anonymous information of the anonymous user. Thus, the trader has an advantage of reading identification information transmitted from a moving anonymous user on important positions, collecting/analyzing the locus of movement and storing customer information thereby effectuating marketing or the like, for example. If the user transmits the same identifier when acting as the anonymous user and also when acting as a normal personal user, however, there is such a possibility that which anonymous user is which normal personal user is found out through the identifier. According to the present invention, the pseudonym identifier storage means stores the pseudonym identifier corresponding to the trader registering the pseudonym so that the pseudonym identifier corresponding to the trader is read from the pseudonym identifier storage means and transmitted when the identifier is transmitted to the trader registering the pseudonym, whereby the pseudonym identifier can be distinguished from the identifier transmitted from the normal personal user, and such inconvenience that which anonymous user is which normal personal user is found out through the identifier can be prevented to the utmost.

(20) A device (browser phone 30 or the like) for transmitting an identifier for privacy protection for preventing an invasion of privacy performed by reading an proper identifier (RFID) and on the basis of the said proper identifier, including:

pseudonym identifier storage means (SJ8 of FIG. 32, FIG. 9, EEPROM 26 or the like) storing, when a personal user acts as an anonymous user (trap type virtual person) by giving a pseudonym (trap type virtual person E(B13P) or the like) to a prescribed trader (article sales trader or the like, for example), a pseudonym identifier corresponding to the said trader; and transmission means (SG4 and SG10 to SG12 of FIG. 29 or the like), which is means transmitting an identifier when receiving an identifier transmission request (when determination of YES is made through S3 of FIG. 29), reading the said pseudonym identifier corresponding to the said trader from the said pseudonym identifier storage means and transmitting the same when transmitting the said identifier to the said trader.

According to this structure, the pseudonym identifier storage means stores the pseudonym identifier corresponding to the said trader when the personal user acts as the anonymous user by giving the pseudonym to the prescribed trader, so that the pseudonym identifier corresponding to the trader is read from the pseudonym identifier storage means and transmitted in the case of transmitting the identifier to the said trader when receiving an identifier transmission request. When the trader reads the identifier transmitted from the anonymous user acting as the anonymous user to the trader, there is such a possibility that the trader stores the identifier in association with the anonymous information of the anonymous user. Thus, the trader has an advantage of reading identification information transmitted from a moving anonymous user on important positions, collecting/analyzing the locus of movement and storing customer information thereby effectuating marketing or the like, for example. If the user transmits the same identifier when acting as the anonymous user and also when acting as a normal personal user, however, there is such a possibility that which anonymous user is which normal personal user is found out through the identifier. According to the present invention, the pseudonym identifier storage means stores the pseudonym identifier corresponding to the said trader so that the pseudonym identifier corresponding to the trader is read from the pseudonym identifier storage means and transmitted when the identifier is transmitted to the said trader, whereby the pseudonym identifier can be distinguished from the identifier transmitted from the normal personal user, and such inconvenience that which anonymous user is which normal personal user is found out through the identifier can be prevented to the utmost.

(21) The device for transmitting an identifier for privacy protection described in (20), wherein the said transmission means reads the said pseudonym identifier from the said pseudonym identifier storage means and transmits the same (SG13 of FIG. 29 or the like) when receiving an operation of the personal user for transmitting the said pseudonym identifier (when determination of YES is made through SF7*a* of FIG. 28 and selective specification of trader is stored through SF7*b*) also when it is not the case where the personal user transmits the said identifier to the said trader to which the pseudonym is given (also when determination of NO is made through SG10 of FIG. 29).

According to this structure, the pseudonym identifier can be read from the pseudonym identifier storage means and transmitted when receiving an operation of the personal user for transmitting the pseudonym identifier also in such a case that the personal user does not transmit the said identifier to the trader to which the pseudonym is given. Consequently, when a direct mail or an electronic mail is sent from the trader receiving the pseudonym identifier to the pseudonym corresponding to the pseudonym identifier, it is provable that the anonymous information has been illegally sold to the trader having sent the mail from the trader to which the pseudonym is given by the personal user, and it is possible to monitor illegal selling of the private information.

(22) The device for transmitting an identifier for privacy protection described in (20) or (21), wherein the said prescribed trader is a store (department store 206 of FIG. 30 or the like) selling articles, the said pseudonym identifier storage means stores a pseudonym identifier corresponding to the said store registered as an anonymous user in user registration following issuance of a point card in the said store (refer to SJ8 of FIG. 32 and FIG. 9), and the said transmission means reads the said pseudonym identifier from the said pseudonym identifier storage means and transmits the same (SG4 and SG10 to SG12 of FIG. 29 or the like) when receiving an identifier transmission request for reading, at a time of performing automatic settlement for paying for the price of an article inferred through an proper identifier transmitted from a radio identifier transmitter affixed to the said article purchased in the said store (when performing automatic settlement processing of FIG. 31), the said proper identifier of the said radio identifier transmitter (when determination of YES is made through SG10 of FIG. 29).

According to this structure, it is possible to act as the anonymous user for performing article purchase or the like at the store by registering at the store as the anonymous user in the user registration following issuance of the point card, for enjoying service of point provision while protecting the privacy of the personal user. Further, the pseudonym identifier is read from the pseudonym identifier storage means and transmitted when receiving an identifier transmission request for reading the said proper identifier of the radio identifier transmitter at the time of performing automatic settlement for paying for the price of the article inferred through the proper identifier transmitted from the radio identifier transmitter affixed to the article purchased at the store, whereby it is possible to prevent such inconvenience that which anonymous user is which normal personal user is found out through the identifier to the utmost while being capable of performing automatic settlement.

(23) The device for transmitting an identifier for privacy protection described in any of (20) to (22), wherein the said pseudonym identifier storage means stores different pseudonym identifiers (abc, mtt, mec and the like, for example) in correspondence to a plurality of the said traders (ABC, MTT, MEC and the like, for example) respectively, and the said transmission means selects, in response to the one to which the pseudonym is given by the personal user among the said plurality of traders, the said pseudonym identifier corresponding to the said trader to which the pseudonym is given from the said pseudonym identifier storage means and transmits the same (SG11 and SG12 of FIG. 29 or the like).

According to this structure, the pseudonym identifier storage means stores the pseudonym identifiers different from each other in correspondence to the plurality of said traders respectively and the transmission means selects the pseudonym identifier corresponding to the trader to which the pseudonym is given from the pseudonym identifier storage means and transmits the same in response to the one to which the pseudonym is given by the personal user among the plurality of traders, whereby it is possible to use pseudonym identifiers varying with traders.

(24) A program for preventing an invasion of privacy performed by reading an proper identifier (RFID or the like) and on the basis of the said proper identifier, for making a computer (logic 100, ROM 101, RAM 102, EEPROM 103, or LSI chip 20 or the like) provided on an RFID tag 1*a*, a browser phone 30 or the like) for privacy protection identifier transmitter security function as:

variable type identifier generation means (SA1 to SA4 of FIG. 11, or SD2, SD10 and SD12 of FIG. 26 and FIG. 27, SE1 to SE10 of FIG. 63 and SG3, SG3*a*, SG3*b* and SG5 to SG9 of FIG. 29, FIG. 56, FIG. 57 or the like), which is means generating a privacy protection identifier, capable of generating an identifier different from a precedently transmitted identifier; and transmission means (SA5 and SA10 of FIG. 11, or SG7 and SG9 or the like) transmitting the identifier generated by the said variable type identifier generation means when receiving an identifier transmission request (when determination of YES is made through SA1 of FIG. 11 or SG3 of FIG. 29).

According to this structure, the privacy protection identifier transmitter possessed by the personal user can generate and transmit the identifier when receiving an identifier transmission request while it is possible to generate the variable type identifier capable of generating an identifier different from a precedently transmitted identifier, whereby respective radio identifier readers etc. can be brought into states reading different identifiers also when the identifier transmitted from the same person is read by the respective ones of radio identifier readers etc. set in a plurality of places, so that it is possible to camouflage that this is the same person and an invasion of privacy can be prevented to the utmost.

(25) The program described in (24), wherein the said variable type identifier generation means generates the said identifier in the range of identifiers transmitted from the respective ones of radio identifier transmitters (RFID tags or the like) affixed to already sold articles respectively.

According to this structure, the variable type identifier is generated and transmitted in the range of the identifiers transmitted from the respective ones of the radio identifier transmitters affixed to the respective ones of the already sold articles, whereby the transmitted identifier cannot be distinguished from an identifier transmitted from a radio identifier transmitter affixed to an already purchased article of a consumer and it is possible to prevent such inconvenience that the transmitted identifier is found out as a pseudo to the utmost.

(26) The program described in (24) or (25), wherein the said transmission means transmits the same identifier as a precedently transmitted identifier when receiving an identifier transmission request again within a prescribed time (within 5 seconds, for example) from precedent identifier transmission (SA2 and SA10 of FIG. 11, or SG3*a* and SG3*b* of FIG. 29 or the like).

According to this structure, the transmission means transmits the same identifier as the precedently transmitted identifier when receiving an identifier transmission request again within the prescribed time from the precedent identifier transmission, whereby the same identifier is transmitted even if a system of continuously transmitting an identifier transmission request a plurality of times and continuously reading the identifier a plurality of times is employed for improving reliability of a reading system in an identifier reader or the like so that inconvenience resulting from different identifiers continuously read a plurality of times can be prevented to the utmost. Even if an operation of continuously transmitting an identifier transmission request a plurality of times and continuously reading the identifier is performed similarly to the above in order to check whether it is a variable type identifier or an proper identifier transmitted from a genuine radio identifier transmitter, further, it is possible to prevent such inconvenience that it is found out that this is a variable type identifier to the utmost.

(27) The program described in any of (24) to (26), wherein the said variable type identifier generation means is capable of generating an identifier so adjusted that an identifier transmitted from a person possessing the privacy protection identifier transmitter generating an identifier with the said variable type identifier generation means accords with an identifier transmitted from a stranger, who is a person different from the said person, possessing a privacy protection identifier transmitter (capable of generating RFIDs of the column belonging to the area where R is 0 to 39 in FIG. 12, or capable of generating pseudo RFIDs mutually exchanged in the RFID exchange processing of FIG. 27, FIG. 56, FIG. 57 or FIG. 63).

According to this structure, such a phenomenon (different person identical identifier transmission phenomenon) can be caused that identifiers, which are identifiers transmitted from different persons, according with each other are transmitted. When the privacy protection identifier transmitters capable of causing this different person identical identifier transmission phenomenon are widespread among personal users, such reliability of determination that the sender of an identical identifier is the same person when the identical identifier is received cannot be kept for a malicious privacy invader determining that it is the same person upon according between an identifier read at a certain spot and another identifier read at another spot and intending to illegally collect and make bad use of private information of the same person. Thus, a privacy invading action based on the determination of the same person can be upset from the premise, and it is possible to effectively protect the privacy of the personal user.

Even if a great majority of personal users walk outdoors or the like while possessing purchased articles and keeping the same in a state transmitting proper identifiers from radio identifier transmitters affixed thereto, further, a disturbing effect capable of, even if the same identifier transmitted from the radio identifier transmitter affixed to an article possessed by the same person is read by the malicious privacy invader in a plurality of places, reducing such reliability that it is the same person is expectable due to spreading of this privacy protection identifier transmitter capable of transmitting the common identifier among partial users, and it is possible to also protect the privacy of a personal user not possessing this privacy protection identifier transmitter to the utmost.

(28) The program described in (27), wherein the said variable type identifier generation means includes identifier storage means (FIG. 27, FIG. 56, FIG. 57, SE9 and SE10 of FIG. 63 and EEPROM 194 or the like) storing an identifier, for communicating with the said other privacy protection identifier transmitter (direct wave communication of FIG. 27, telephone communication of FIG. 56, electronic mail communication of FIG. 57 or the like) and making the said other privacy protection identifier transmitter transmit the said identifier stored in the said identifier storage means (FIG. 27, SE6 and SE8 of FIG. 63, or SS8, SE9 and SE10 of FIG. 56, or SE6 and ST3 of FIG. 57, or the like) while receiving the identifier transmitted from the said other privacy protection identifier transmitter and making the said identifier storage means store the same (FIG. 27, SE7 to SE10 of FIG. 63, or SE7 and SE8 of FIG. 56, or ST8, SE9 and SE10 of FIG. 57, or the like) for sharing the same identifier as the said stranger, and the said variable type identifier generation means generates an identifier adjusted to accord with the said identifier transmitted from the stranger (SG9 of FIG. 29 or the like) by reading the said shared identifier stored in the said identifier storage means when receiving an identifier transmission request (when determination ofYES is made through SG3 of FIG. 29).

According to this structure, privacy protection identifier transmitters make communication for transmitting/receiving mutually stored identifiers and exchanging the mutual identifiers. When receiving an identifier transmission request, the aforementioned exchanged identifiers are generated and transmitted as identifiers adjusted to accord with the aforementioned identifiers transmitted from a stranger. Consequently, the aforementioned different person identical identifier transmission phenomenon can be caused by the relatively reliable method of mutually making communication and exchanging identifiers.

(29) The program described in (27) or (28), making the computer function as inhibition means (FIG. 27 FIG., FIG. 56, FIG. 57, SE3 of FIG. 63 or the like) inhibiting re-performance of exchange of the said identifier with a privacy protection identifier transmitter of a stranger with whom communication has been already made for transmitting/receiving and exchanging the said identifier within a prescribed period (within one day, for example).

According to this structure, identifiers can be exchanged again with the other privacy protection identifier transmitter already making communication and exchanging identifiers within the prescribed period, and it is possible to prevent waste of re-exchanging identifiers with a partner already exchanging identifiers within a prescribed period.

(30) The program described in any of (27) to (29), exchanging mutual identifiers (RFID exchange processing of FIG. 56 or the like) with a privacy protection identifier transmitter of a stranger making communication by telephone (communication by browser phone 30), wherein the said variable type identifier generation means generates an identifier adjusted to accord with an identifier transmitted from the said stranger (SG9 of FIG. 29) by reading an exchanged identifier stored in the said identifier storage means when receiving an identifier transmission request.

According to this structure, the communication means has the telephone function for exchanging mutual identifiers with the other privacy protection identifier transmitter making communication by telephone, whereby the aforementioned different person identical identifier transmission phenomenon can be caused by sharing the identifier by a relatively reliable method.

(31) The device for transmitting an identifier for privacy protection described in any of (27) to (30), transmitting the identifier stored in the said identifier storage means to a privacy protection identifier transmitter of a stranger (SE5, SE6 and ST3 of FIG. 57 or the like) along with transmission of an electronic mail (E-mail through browser phone 30) while receiving an identifier transmitted from the privacy protection identifier transmitter of the stranger along with receiving of an electronic mail and letting the said identifier storage means store the same (ST8, SE9 and SE10 of FIG. 57 or the like), wherein the said variable type identifier generation means generates an identifier adjusted to accord with the said identifier transmitted from the stranger by reading the identifier transmitted from the privacy protection identifier of the stranger stored in the said identifier storage means when receiving an identifier transmission request (SG9 of FIG. 29).

According to this structure, the communication means has the electronic mail function for exchanging mutual identifiers by transmitting the identifier stored in the identifier storage means to the other privacy protection identifier transmitter along with transmission of the electronic mail and receiving the identifier transmitted from the other privacy protection identifier transmitter along with receiving of the electronic mail and storing the same in the identifier storage means, whereby the aforementioned different person identical identifier transmission phenomenon can be caused by sharing the identifier by a relatively reliable method.

(32) The program described in any of (24) to (31), wherein the said transmission means is capable of simultaneously transmitting a plurality of identifiers of a number larger than a prescribed number one, for example) of identifiers simultaneously transmitted from the other privacy protection identifier transmitter (RFID tag 1*a* storing table of FIG. 12(*a*) or the like) (four RFIDs 1 to 4 of FIGS. 12(*b*) and (*c*), AS4 and AS5 of FIG. 11 or the like), and the said variable type identifier generation means generates another identifier, excluding the said prescribed number of identifiers, included in the said plurality of identifiers as the said identifier adjusted to accord with the said identifier transmitted from the stranger (generates RFIDs 2 to 4 of FIGS. 12(*a*) and (*c*) as common pseudo RFIDs).

According to this structure, the privacy protection identifier transmitter provided to the certain personal user simultaneously transmits the previously set prescribed number of identifiers while the privacy protection identifier transmitter provided to another personal user different from the said certain personal user simultaneously transmits the plurality of identifiers of the number larger than the said prescribed number, and another identifier, excluding the said prescribed number of identifiers, included in the plurality of identifiers is generated and transmitted as the said common identifier. Consequently, the aforementioned different person identical identifier transmission phenomenon can be caused even in such a state that a stranger can read an proper identifier from a purchased article possessed by a personal user.

In other words, when a personal user in such a state that radio identifier transmitters affixed to purchased belongings transmit proper identifiers possesses a privacy protection identifier transmitter transmitting an identifier, it follows that both of the radio identifier transmitters affixed to the purchased belongings and the privacy protection identifier transmitter transmit identifiers to result in a state simultaneously transmitting a plurality of identifiers. A part of the plurality of identifiers is a variable type, and another part becomes an unchanging fixed type. In other words, such a phenomenon (prescribed number in multiple identifier variable type phenomenon) is caused that only a prescribed number of ones among a plurality of identifiers read respectively become different variable type identifiers while others become genuine proper identifiers transmitted from radio identifier transmitters affixed to carried articles and become identical identifiers when identifiers are read in a plurality of places. Consequently, such inconvenience results that it is found out that this is the same person when this prescribed number in multiple identifier variable type phenomenon is caused.

Therefore, the present invention provides a minority identifier transmission type privacy protection identifier transmitter simultaneously transmitting the said prescribed number of identifiers to a personal user in such a state that radio identifier transmitters affixed to purchased belongings transmit proper identifiers, and provides a majority identifier transmission type privacy protection identifier transmitter simultaneously transmitting a plurality of identifiers of a number larger than the said prescribed number to a personal user in such a state that no proper identifier is read by a stranger from purchased belongings, for example. Consequently, it follows that the former personal user simultaneously transmits the prescribed number of identifiers and the proper identifiers transmitted from the radio identifier transmitters of the carried purchased belongings while the latter personal user simultaneously transmits identifiers larger in number than the identifiers transmitted from the former personal user, and another identifier, excluding the number (prescribed number) of identifiers transmitted from the former personal user, included in the large number of identifiers is generated and transmitted as the aforementioned common identifier. Thus, in the case of the former personal user, such a phenomenon (prescribed number in multiple identifier variable type phenomenon) is caused that only the said prescribed number of ones among a plurality of identifiers read respectively become different variable type identifiers while others become genuine proper identifiers transmitted from radio identifier transmitters affixed to carried articles and become identical identifiers when identifiers are read in a plurality of places. In the latter user possessing the majority identifier transmission type privacy protection identifier transmitter, on the other hand, the prescribed number in multiple identifier variable type phenomenon is caused as well since another identifier, excluding the said prescribed number of identifiers, included in the plurality of transmitted identifiers is generated and transmittable as the aforementioned common identifier. Further, this phenomenon is caused between different persons.

Thus, even if the aforementioned prescribed number in multiple identifier variable type phenomenon is caused, this is not necessarily caused in the same person but is caused also between different persons, so that it is possible reduce reliability of the assumption that it is the same person by the malicious privacy invader based on the prescribed number in multiple identifier variable type phenomenon and privacy can be protected to the utmost.

(33) The program described in any of (24) to (32), further including a program making the computer function as:

identifier guard means (SB1 and SB3 to SB7 of FIG. 15 or the like) bringing an proper identifier (RFID or the like) of a radio identifier transmitter (RFID tag or the like) affixed to an article (wristwatch, glasses, clothes or the like, for example) purchased and thereby possessed by a personal user into an identifier guard state not readable by a stranger according to the intension of the said personal user; and read means (SB2, SB8 and SB9 to SB1 of FIG. 15) rendering the identifier of the said radio identifier transmitter in the identifier guard state readable according to the intention of the personal user.

According to this structure, the proper identifier of the radio identifier transmitter affixed to the article purchased and thereby possessed by the personal user can be brought into the identifier guard state not readable by a stranger according to the intention of this personal user, for preventing such inconvenience that the proper identifier of the radio identifier transmitter affixed to the purchased article is read by the stranger to result in privacy invasion based on the same to the utmost. Further, the identifier of the radio identifier transmitter in the identifier guard state is rendered readable according to the intention of the personal user, whereby it is possible to read the proper identifier of the radio identifier transmitter affixed to the purchased article at a necessary time when the personal user intends to receive service etc. through the identifier for enjoying the service etc.

(34) The program described in (33), wherein the said identifier guard means transmits proper identification information (password, for example) for person in question authentication, lets the said radio identifier transmitter authenticate the same and switches to an identifier transmission stop state transmitting no identifier unless the person in question is confirmable (SB3 to SB8 of FIG. 15), and the said read means brings an identifier into a transmittable state after transmitting the said proper identification information and making the said radio identifier transmitter perform the person in question authentication (SB8 and SB9 to SB13 of FIG. 15 or the like).

According to this structure, the identifier guard means transmits the proper identification information for the person in question authentication, lets the said radio identifier transmitter authenticate the same and switches to the identifier transmission stop state transmitting no identifier unless the person in question is confirmable and the read means brings the identifier into the transmittable state after transmitting the proper identification information and making the radio identifier transmitter perform the person in question authentication, whereby the identifier of the radio identifier transmitter can be reliably brought into a guarded state and only the person in question subjected to the person in question authentication can bring the radio identifier transmitter into the identifier transmittable state for improving security.

[Correspondence Between Structure and Embodiments]

The correspondence between the structure of the present invention and the embodiments is shown by parenthesizing the contents disclosed in the embodiments and inserting the same into the structure of the present invention.

(1) A privacy protection method for monitoring an invasion of privacy performed by reading an proper identifier (RFID, for example) related to a personal user and on the basis of the proper identifier, including:

an identifier guard step (SB1 to SB8 of FIG. 15, for example) of bringing an proper identifier of a radio identifier transmitter (RFID tag, for example) affixed to an article (glasses, clothes, wristwatch or the like, for example) purchased and thereby possessed by the personal user into an identifier guard state not readable by a stranger according to the intension of the said personal user;

a mail address notification processing step (SU1 to SU7 and S1000 to S1003 of FIG. 59, for example) of performing, when the said personal user notifies his/her mail address to a prescribed trader (MTT, department store 206 or the like, for example) as a customer or a user, processing of generating a notification mail address (#e9¥82%31&0@3t*c of FIG. 61, for example), which is a new notification mail address for the said trader, allowing inference of information specifying the said trader and notifying the same to the said trader;

a notified trader identifier generation step (S273 to S279 of FIG. 35, for example) of generating a notified trader identifier corresponding to the notified trader to which the said notification mail address is notified through the said mail address notification processing step;

a transmission step (SF7*a* and SF7*b* of FIG. 28 or SG10 to S13 of FIG. 29, for example) of transmitting the said notified trader identifier, identical every time, generated through the said notified trader identifier generation step when transmitting an identifier to the said notified trader in response to an identifier transmission request while transmitting the said notified trader identifier when receiving an operation of the personal user for transmitting the said notified trader identifier also in a case of transmitting an identifier to a person other than the said notified trader;

an electronic mail transmission step (S514 to S521 of FIG. 20 or SV2 and SV5 to SV16 of FIG. 60) for transmitting an electronic mail transmitted from a sender to a sendee according to a specified mail address; and a monitoring step (SV5 to S12 of FIG. 60, for example) of inferring information specifying the said notified trader corresponding to the said notification mail address when the mail address of the sendee of the electronic mail transmitted through the said electronic mail transmission step is the said notification mail address notified through the said mail address notification processing step for monitoring whether or not the said inferred information specifying the notified trader and the information of the sender of the said electronic mail accord with each other.

(2) A privacy protection system for monitoring an invasion of privacy performed by reading an proper identifier related to a personal user and on the basis of the proper identifier, including:

mail address notification processing means (SU1 to SU7 and S1000 to S1003 of FIG. 59, for example) performing, when the said personal user notifies his/her mail address to a prescribed trader (MTT, department store 206 or the like, for example) as a customer or a user, processing of generating a notification mail address (#e9¥82%31&0@3t*c of FIG. 61, for example), which is a new notification mail address for the said trader, allowing inference of information specifying the said trader and notifying the same to the said trader;

notified trader identifier generation means (S273 to S279 of FIG. 35, for example) generating a notified trader identifier corresponding to the notified trader to which the said notification mail address is notified through the said mail address notification processing means;

transmission means (SF7*a* and SF7*b* of FIG. 28 or SG4 and SG10 to SG13 of FIG. 29, for example) transmitting the said notified trader identifier, identical every time, generated by the said notified trader identifier generation means when transmitting an identifier to the said notified trader in response to an identifier transmission request while transmitting the said notified trader identifier when receiving an operation of the personal user for transmitting the said notified trader identifier also in a case of transmitting an identifier to a person other than the said notified trader; and monitor means (SV5 to SV12 of FIG. 60, for example) inferring information specifying the said notified trader corresponding to the said notification mail address when the mail address of a sendee of an electronic mail transmitted from a sender is the said notification mail address notified through the said mail address notification processing means for monitoring whether or not the said inferred information specifying the notified trader and the information of the sender of the said electronic mail accord with each other.

(3) The privacy protection system according to claim 2, wherein the said mail address notification processing means includes encryption generation means (S1001 and S1002 of FIG. 59, for example) generating the said notification mail address by encrypting data including notified trader specifying information for specifying a notified trader to which the mail address is notified, and the said monitor means includes:

decoding means (SV5 to SV7 of FIG. 60, for example) decoding the notification mail address of the electronic mail transmitted from the sender, and determination means (SV8 to SV12 of FIG. 60, for example) determining whether or not the said notified trader specifying information included in data decoded by the said decoding means and information of the sender of the said electronic mail accord with each other.

(4) The privacy protection system according to claim 2 or 3, wherein the said notified trader is a store (department store 206, for example) selling articles, the said mail address notification processing means performs processing of generating a notification mail address corresponding to the said store in user registration following issuance of a point card in the said store and notifying the same (SJ1 to SJ9 of FIG. 32, for example), and the said transmission means transmits the said notified trader identifier corresponding to the said store (advances to SG10→SG11→SG12 of FIG. 29 in response to store signal of sales trader received through SH2 of FIG. 31 and transmits trap type RFID corresponding to received trader, for example) at a time of performing automatic settlement (for example,) according to a price of an article inferred through an proper identifier transmitted from a radio identifier transmitter affixed to the said article purchased in the said store when receiving an identifier transmission request for reading the said proper identifier of the said radio identifier transmitter (in automatic settlement by automatic settlement processing of FIG. 31, for example).

(5) A device for transmitting an identifier for privacy protection for preventing an invasion of privacy performed by reading an proper identifier related to a personal user and on the basis of the proper identifier, including:

notified trader identifier generation means (S273 to S279 of FIG. 35, for example) generating a notified trader identifier corresponding to a notified trader, for which prescribed trader the said personal user generates a new notification mail address as a customer or a user for notifying the same to the said trader; and transmission means (SF7*a* and SF7*b* of FIG. 28 or SG4 and S10 to S13 of FIG. 29, for example) transmitting the said notified trader identifier, identical every time, generated by the said notified trader identifier generation means when transmitting an identifier to the said notified trader in response to an identifier transmission request while transmitting the said notified trader identifier when receiving an operation of the personal user for transmitting the said notified trader identifier also in a case of transmitting an identifier to a person other than the said notified trader.

The embodiments disclosed this time must be considered as illustrative in all points and not restrictive. The scope of the present invention is shown not by the above description but by the scope of claim for patent, and it is intended that all modifications within the meaning and range equivalent to the scope of claim for patent are included.

BRIEF DESCRIPTION OF THE DRAWINGS

[FIG. 2] An explanatory diagram showing various data stored in a database set in a financial institution.

[FIG. 3] An explanatory diagram showing various data stored in the database set in the financial institution.

[FIG. 4] An explanatory diagram showing various data stored in the database set in the financial institution.

[FIG. 12] A table stored in the RFID tag for security

[FIG. 13] An explanatory diagram illustrating a sales method for the RFID tag for security with specification of an area.

[FIG. 40] (*a*) is trap information stored in the IC terminal for the VP, (*b*) is a flow chart showing a subroutine program of trap type VP processing, and (*c*) is a flow chart showing a control operation of the IC terminal for the VP.

[FIG. 42] An explanatory diagram showing an article homepage stored in a Web database of an article information service trader.

[FIG. 51] (*a*) is a flow chart showing a subroutine program of input processing for the VP, and (*b*) is a flow chart showing a subroutine program of input processing for an RP.

DESCRIPTION OF REFERENCE NUMERALS

Figure 1:
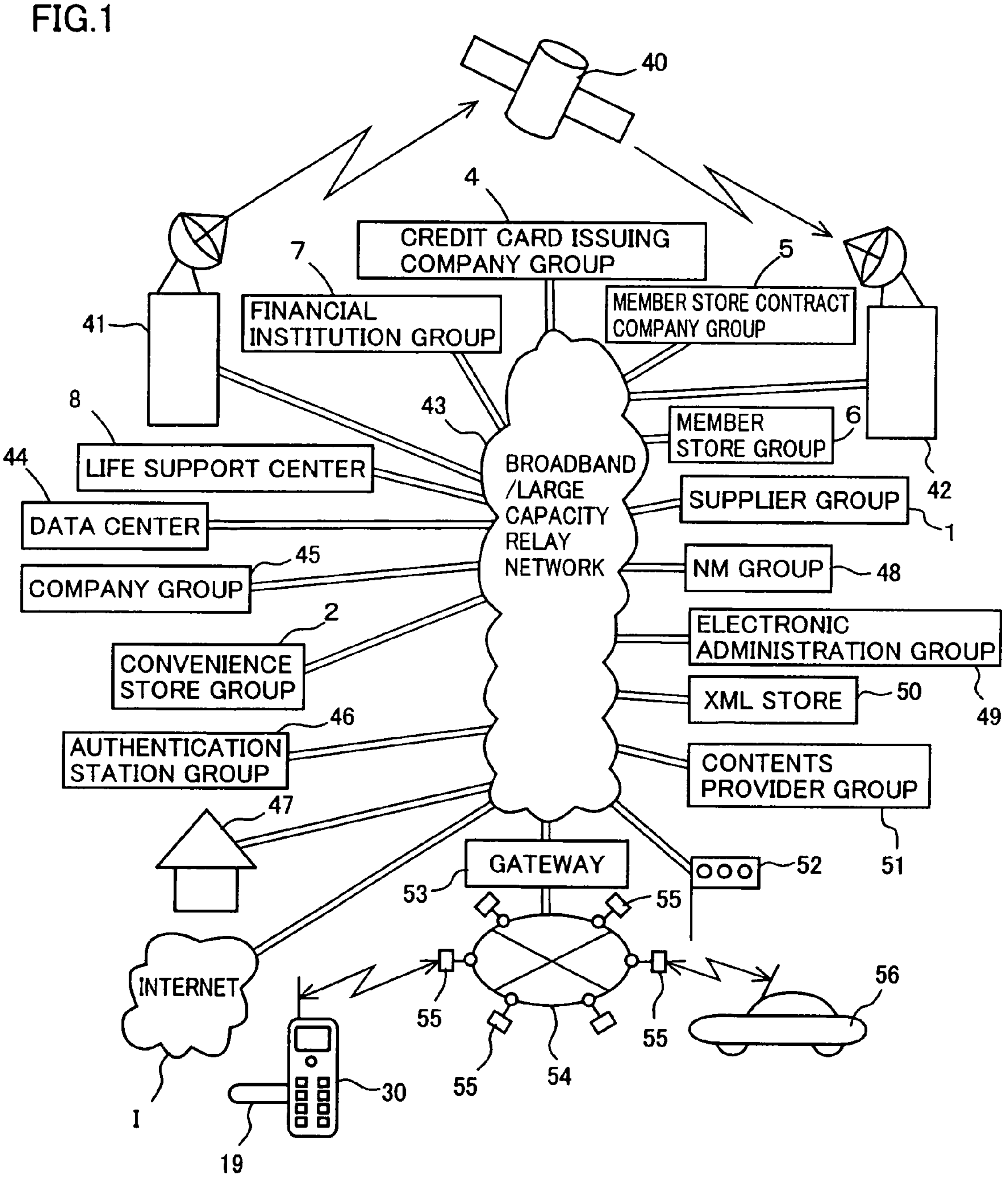
[FIG. 1] A schematic system diagram showing the overall structure of a privacy protection system.
Figure 5:
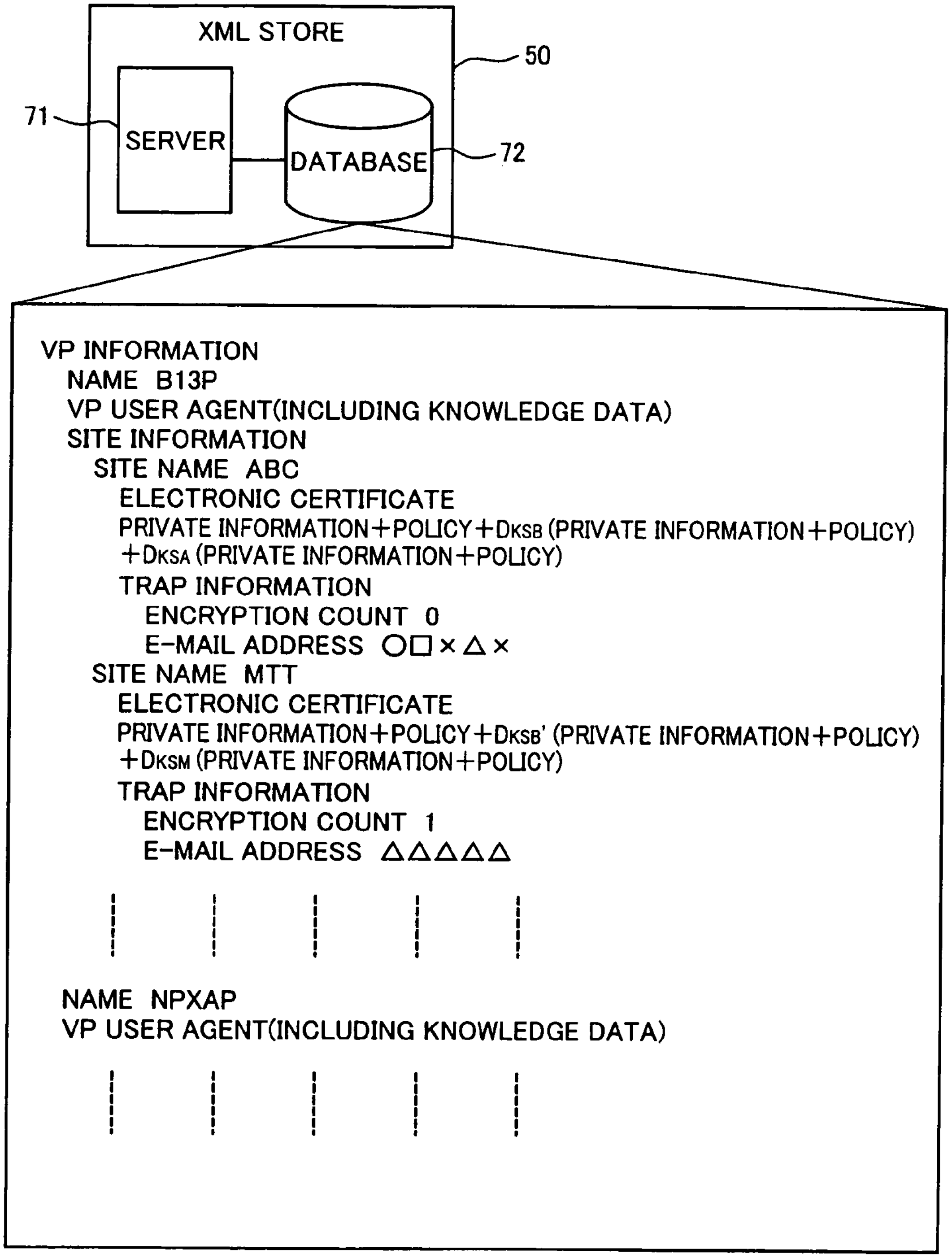
[FIG. 5] An explanatory diagram showing various data stored in a database set in an XML store.
Figure 6:
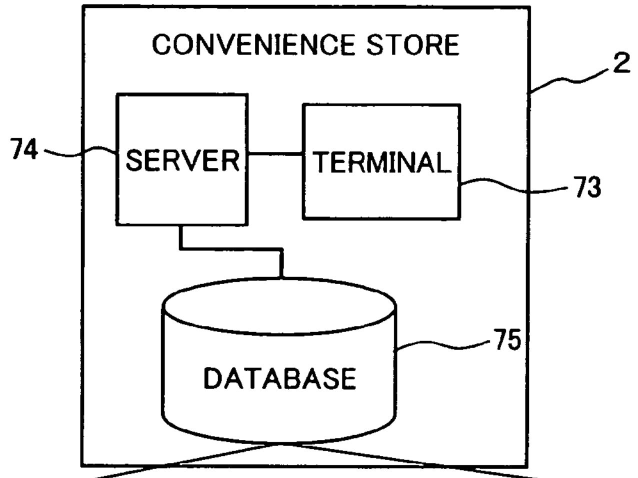
[FIG. 6] An explanatory diagram showing various information stored in a database set in a convenience store.
Figure 7:
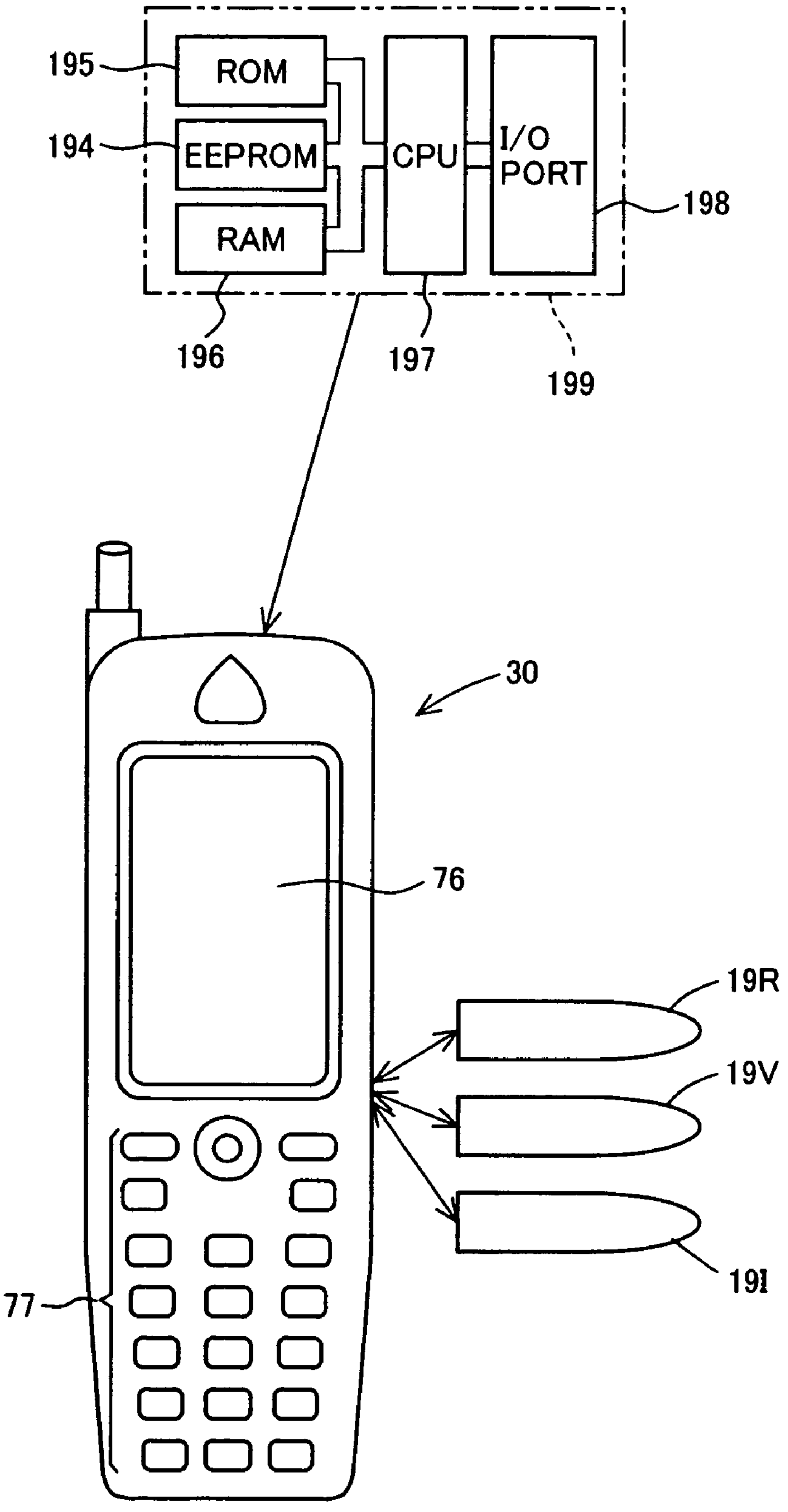
[FIG. 7] A front elevational view showing a browser phone as an exemplary user terminal.
Figure 8:
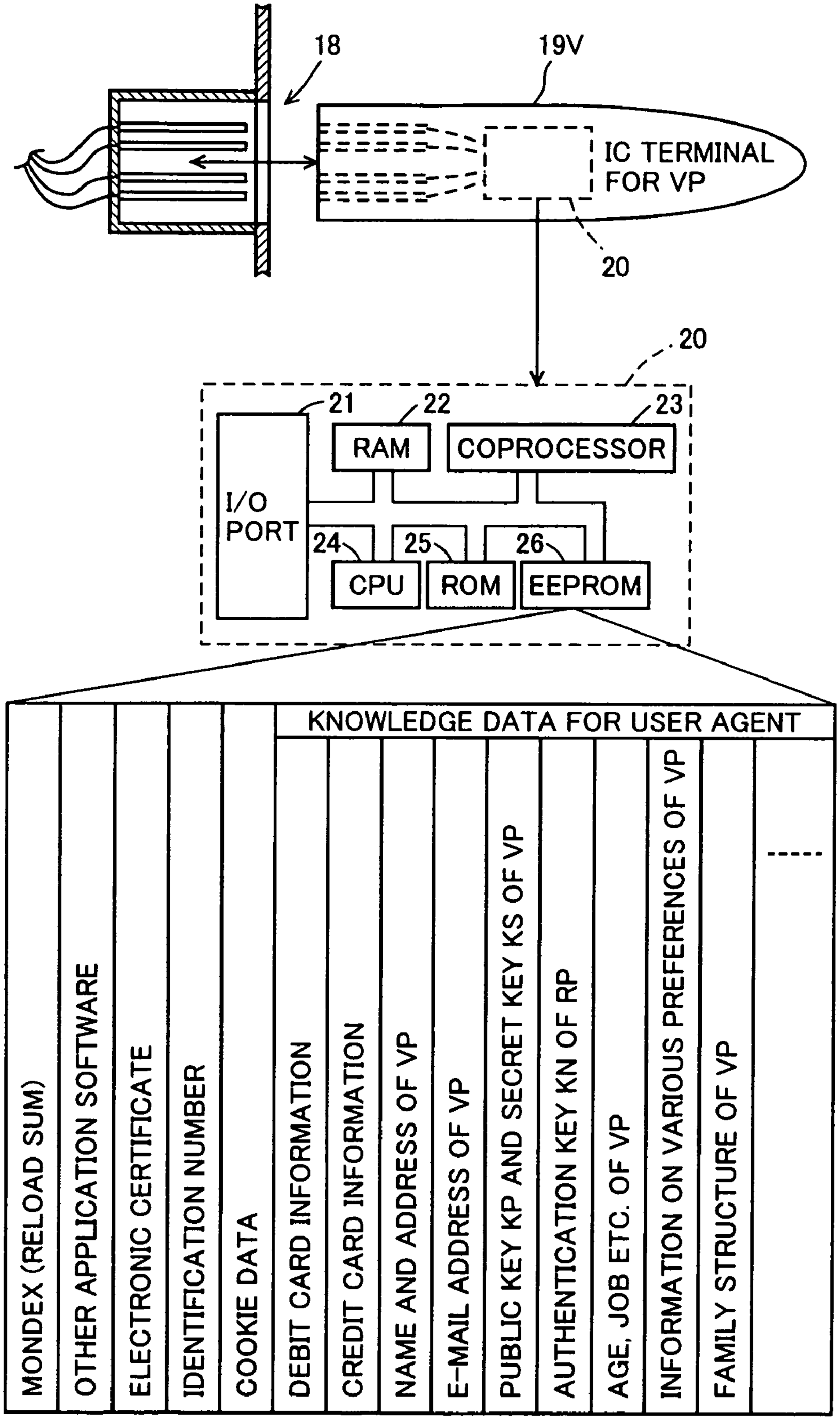
[FIG. 8] Another front elevational view showing the browser phone as the exemplary user terminal.
Figure 9:
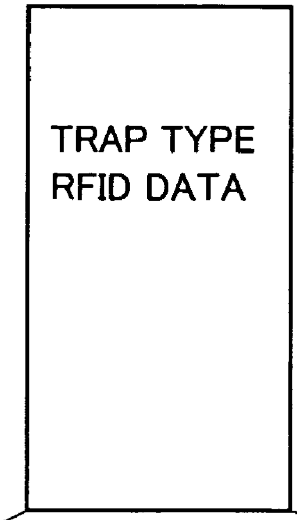
[FIG. 9] A diagram showing the breakdown of trap type RFID data stored in a trap type RFID storage area of a PC terminal for a VP.
Figure 10:
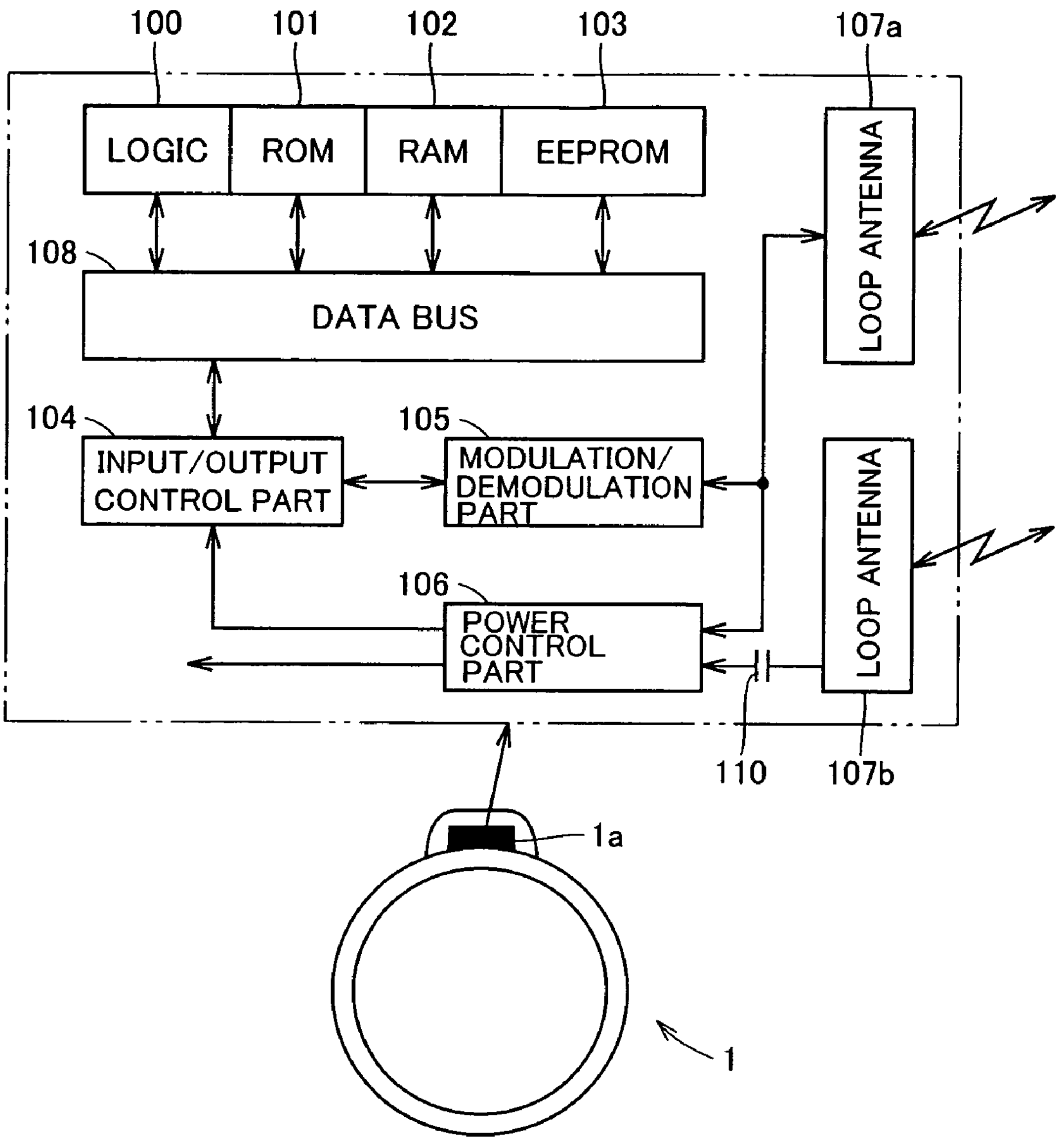
[FIG. 10] An RFID tag for security and a circuit block diagram thereof.
Figure 11:
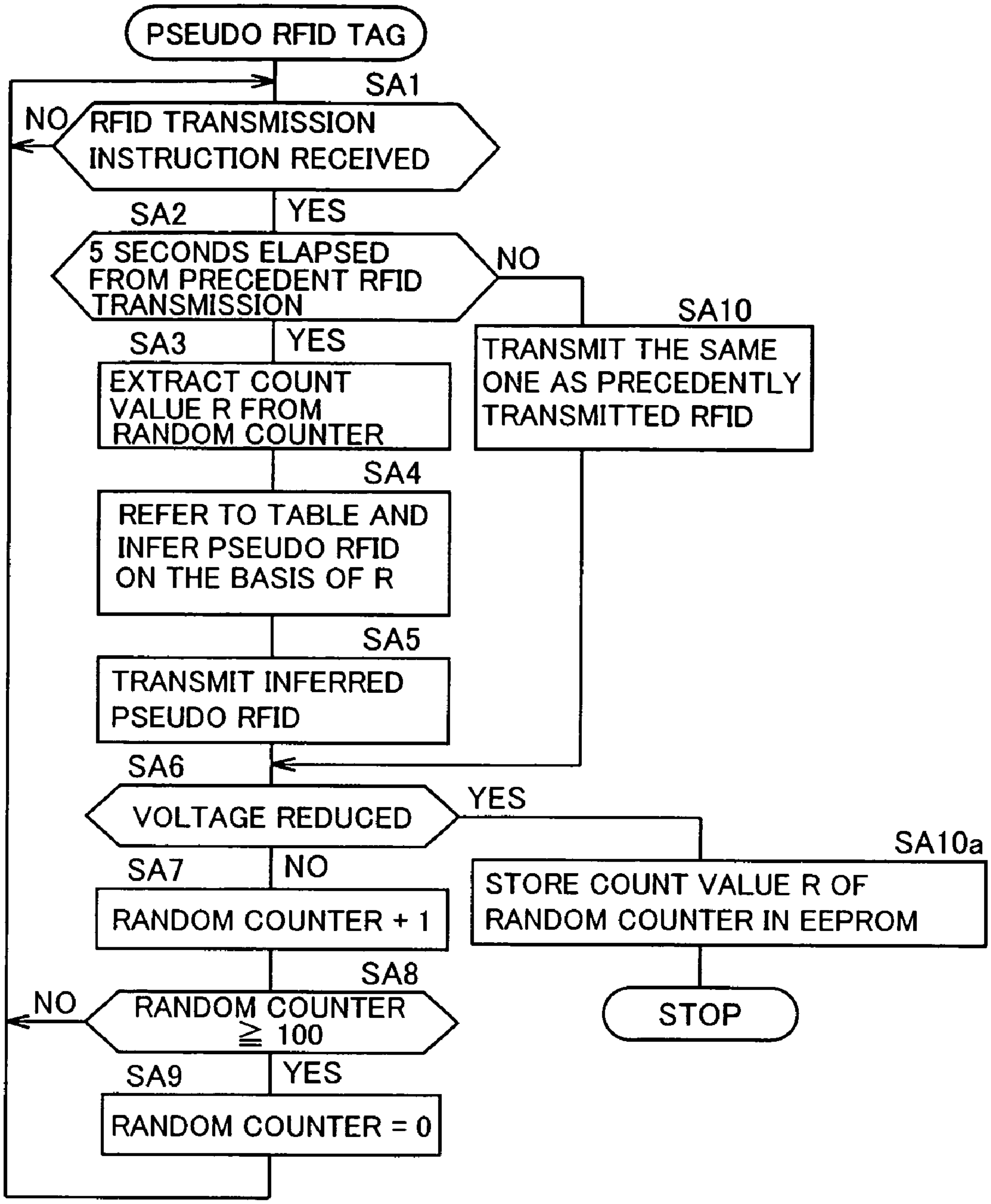
[FIG. 11] A flow chart showing a control program for the RFID tag for security.
Figure 14:
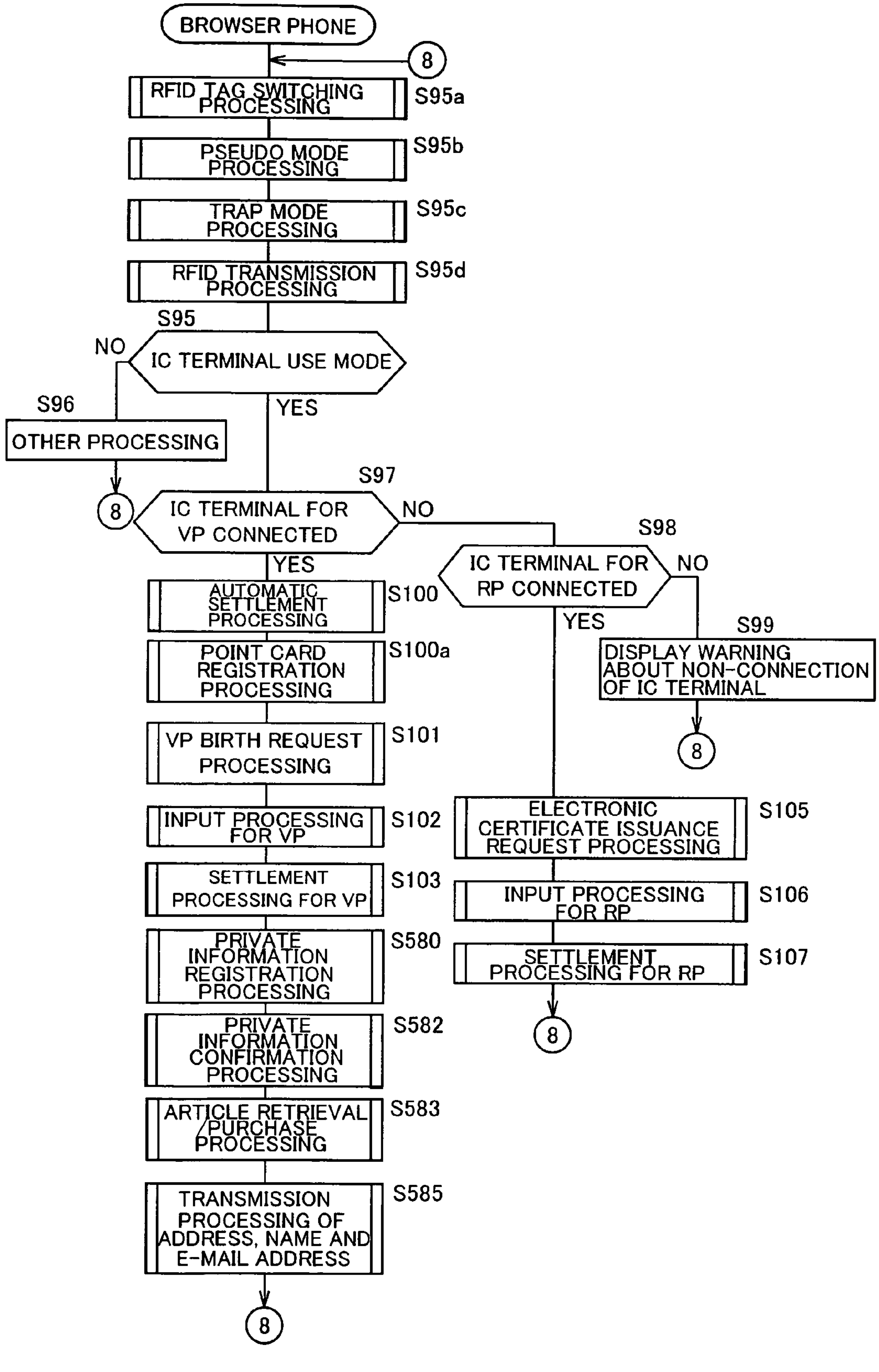
[FIG. 14] A flow chart showing a control program for the browser phone.
Figure 15:
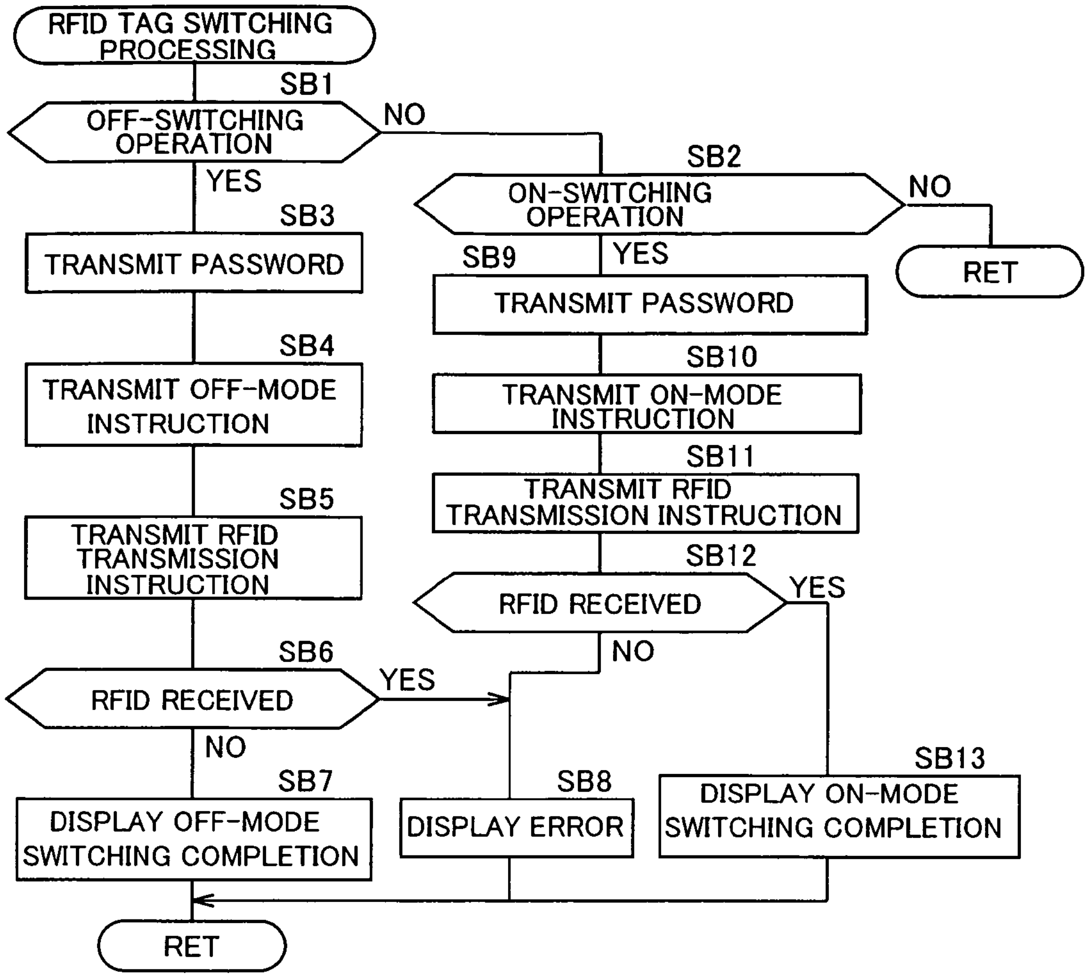
[FIG. 15] A flow chart showing a subroutine program of RFID tag switching processing.
Figure 16:
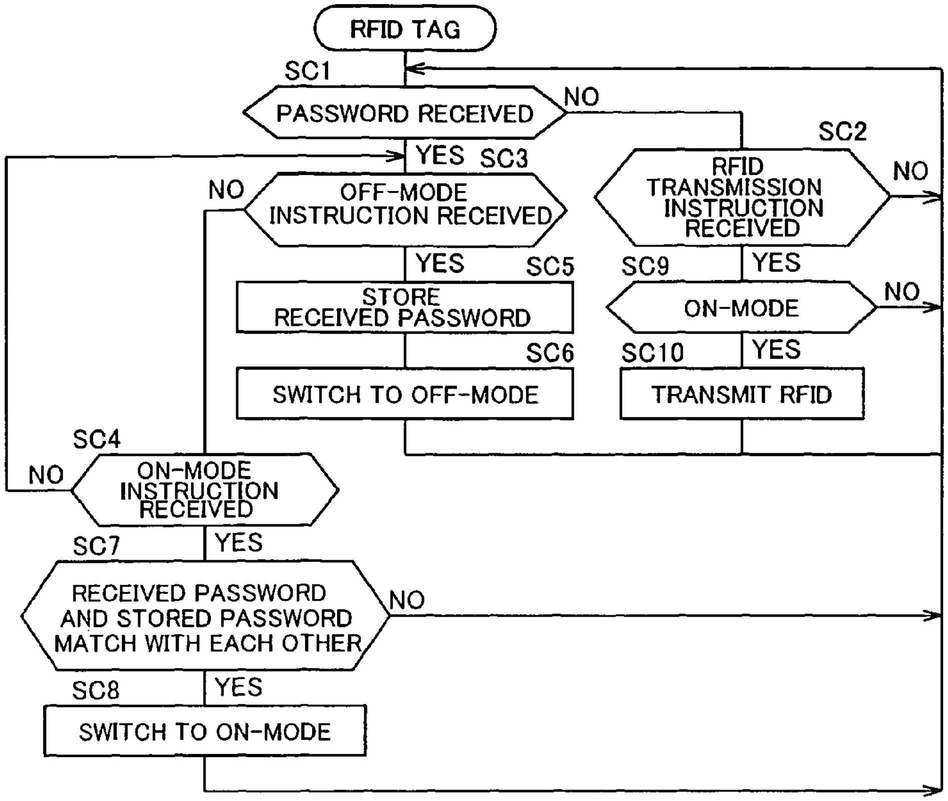
[FIG. 16] A flow tart showing a control program for an RFID tag affixed to a purchased article.
Figure 17:
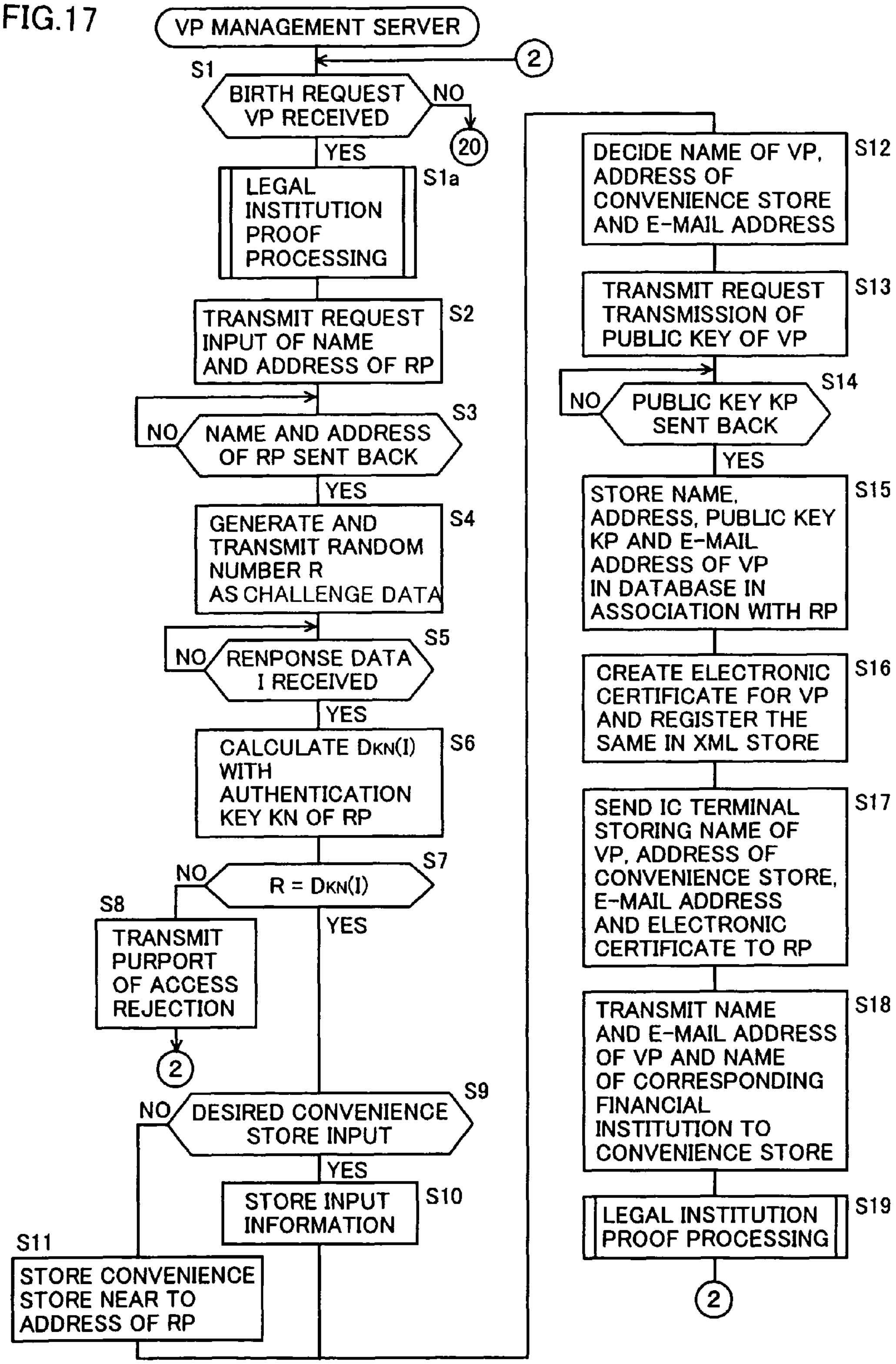
[FIG. 17] A flow chart showing a processing operation of a VP management server.
Figure 18:
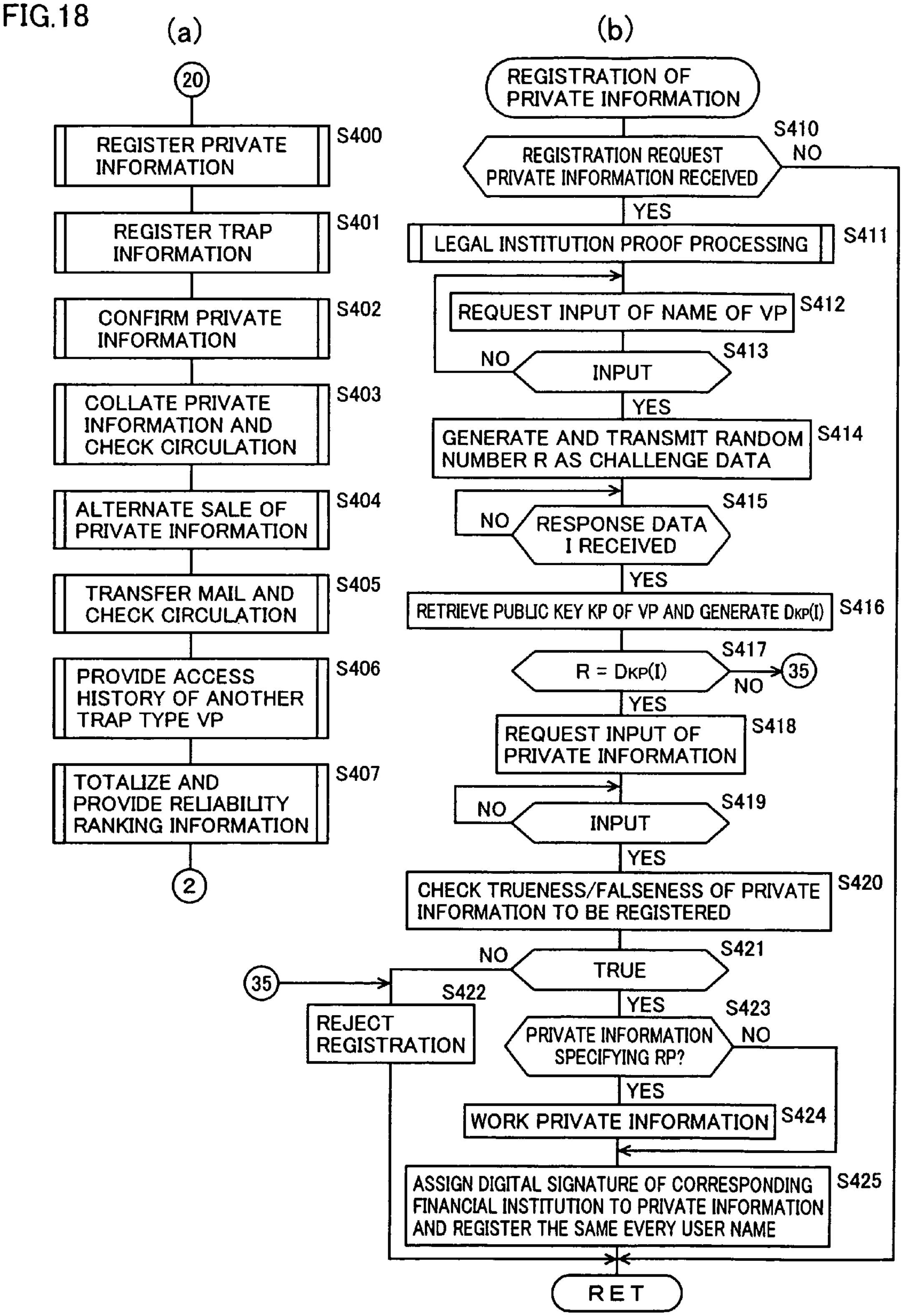
[FIG. 18] (*a*) is a flow chart showing the processing operation of the VP management server, and (*b*) is a flow chart showing a subroutine program of registration processing of private information.
Figure 19:
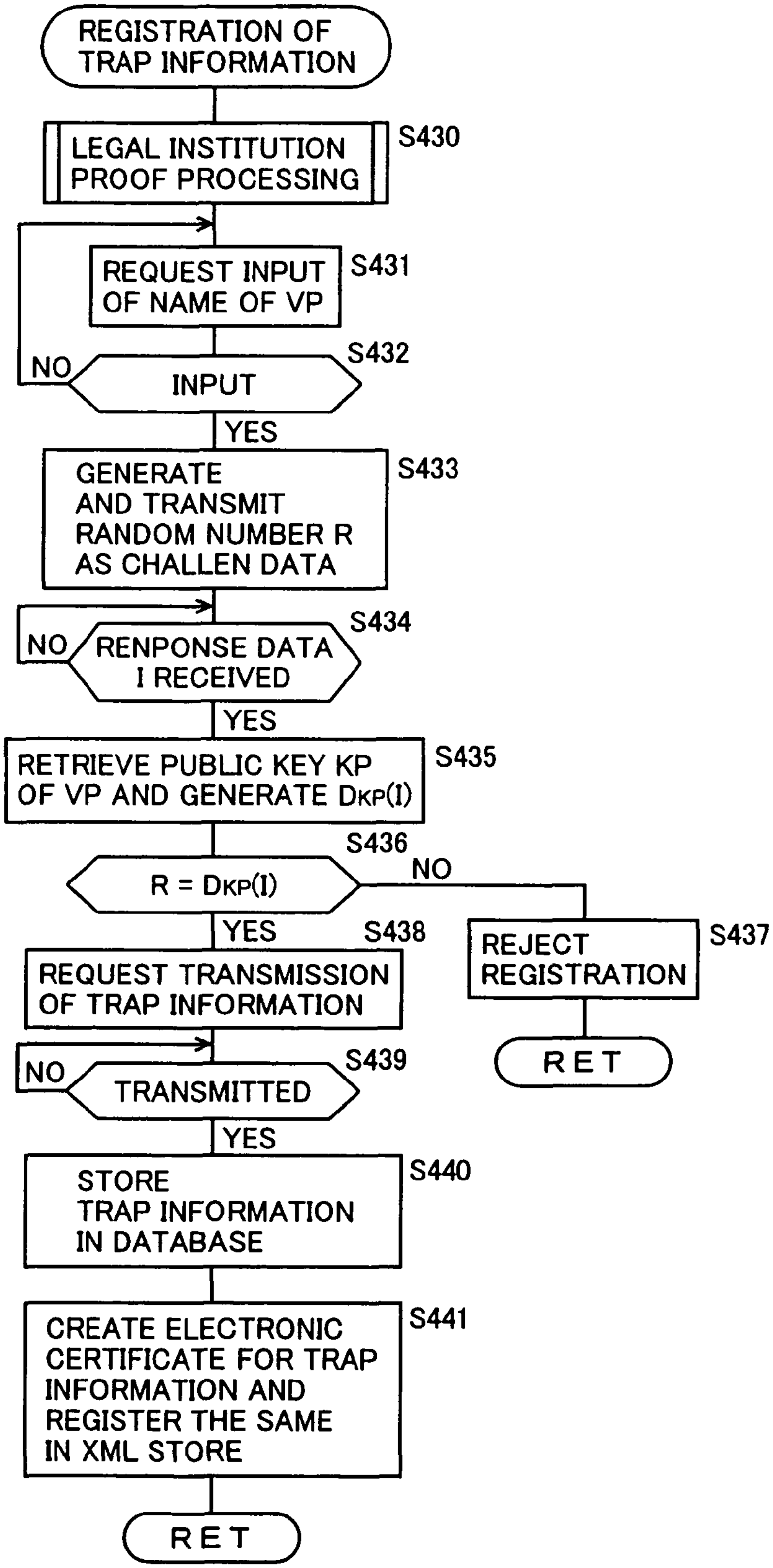
[FIG. 19] A flow chart showing a subroutine program of registration processing of trap information.
Figure 20:
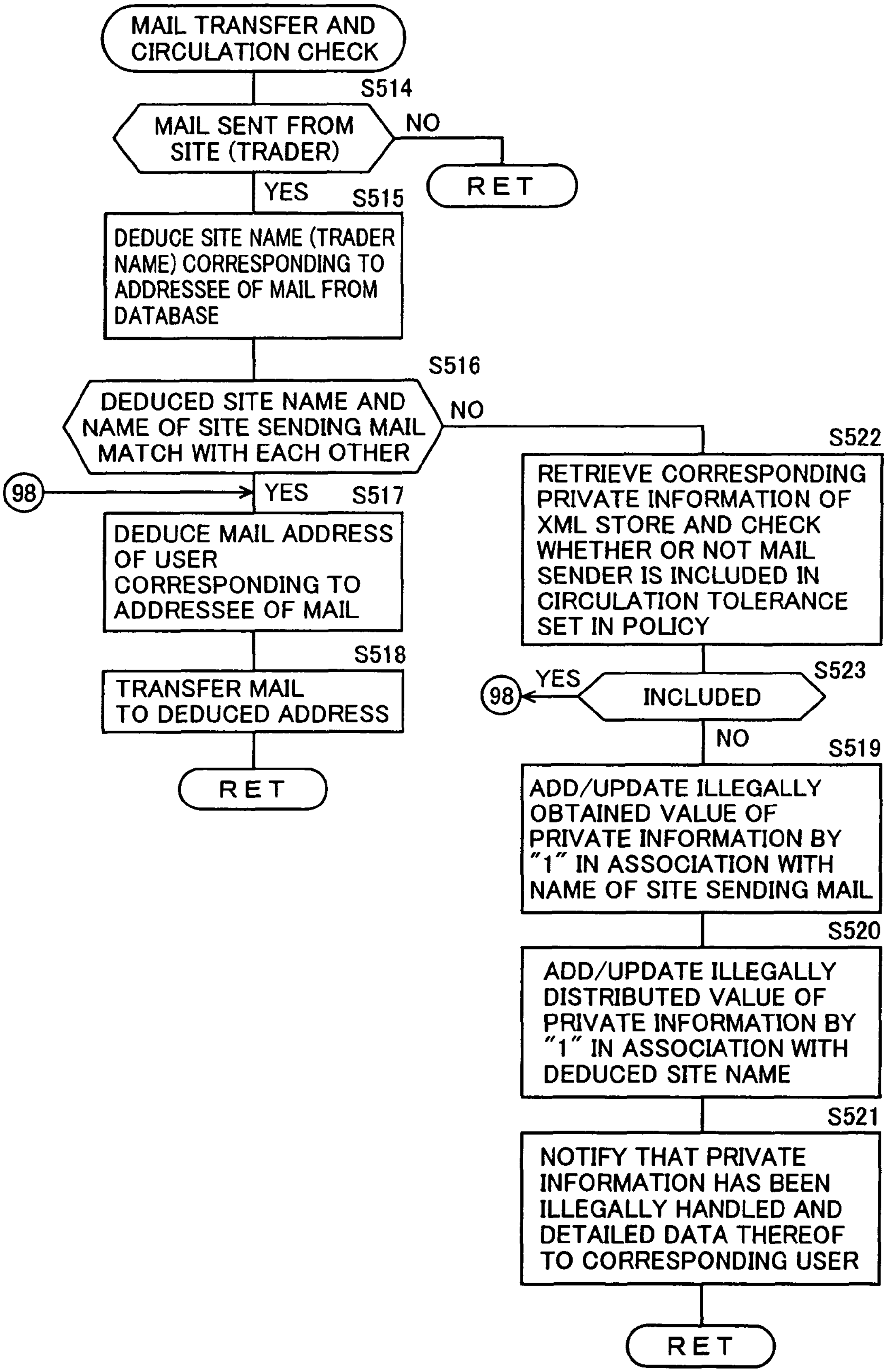
[FIG. 20] A flow chart showing a subroutine program of mail transfer/distribution check.
Figure 21:
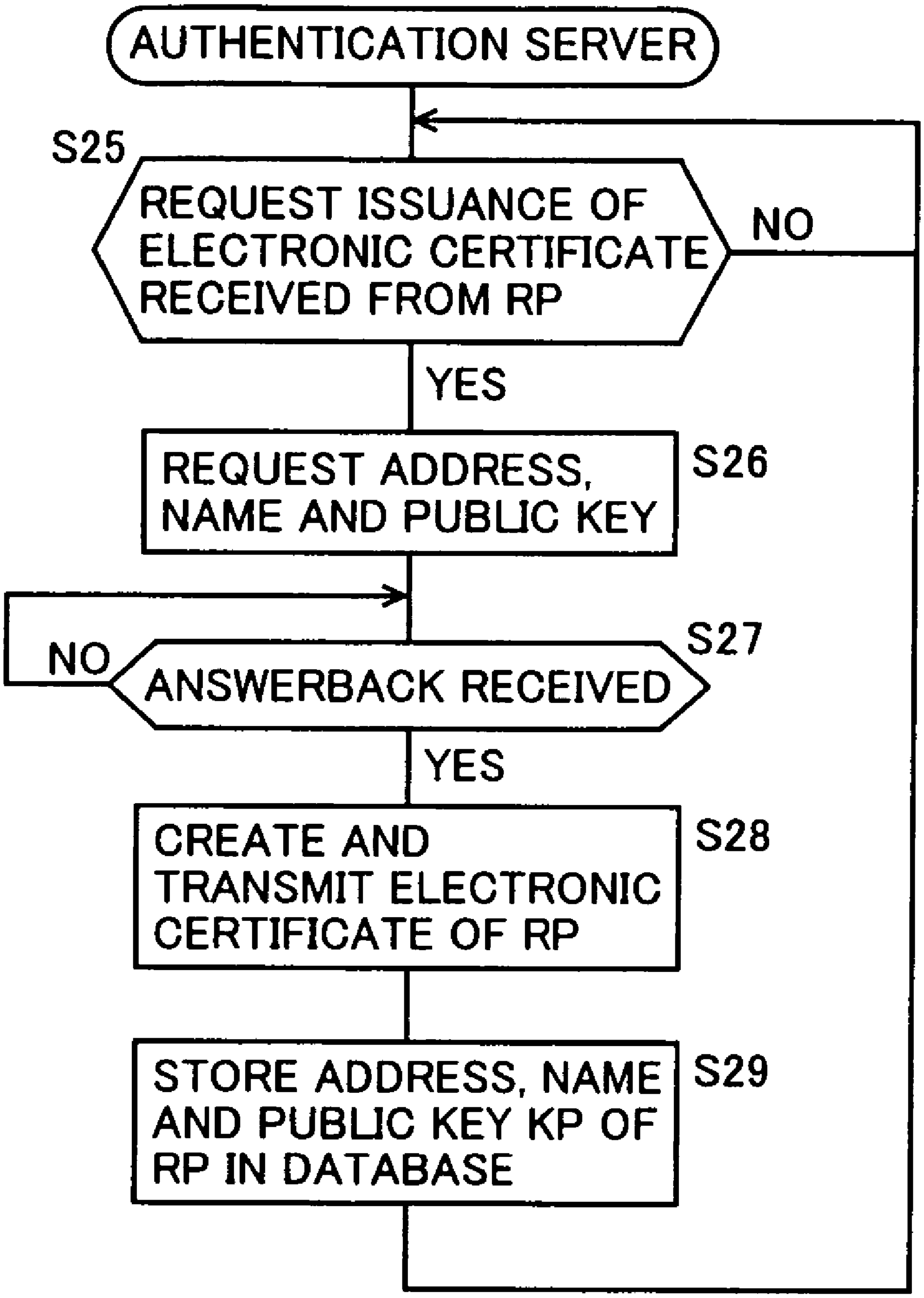
[FIG. 21] A flow chart showing a processing operation of an authentication server.
Figure 22:
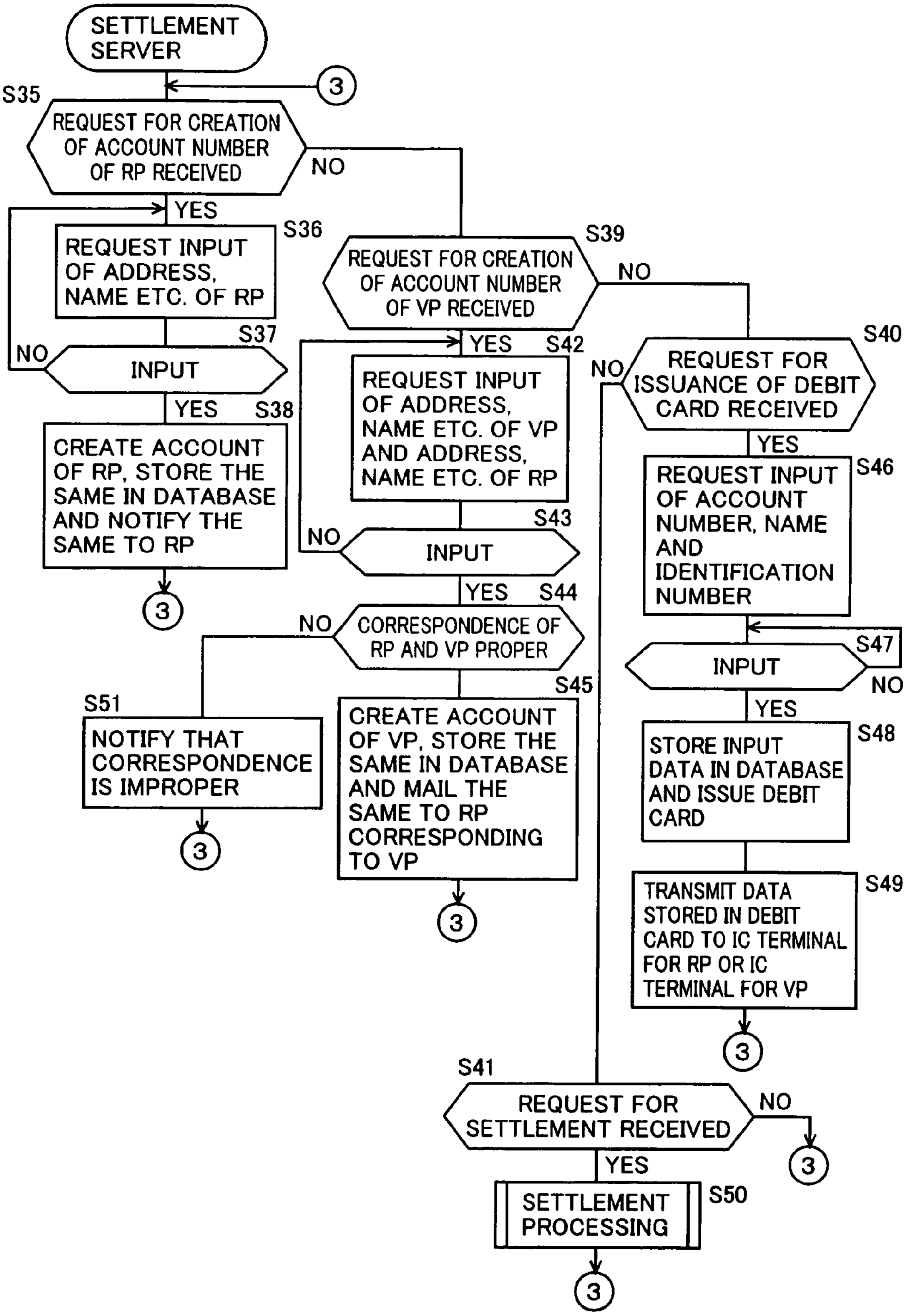
[FIG. 22] A flow chart showing a processing operation of a settlement server.
Figure 23:
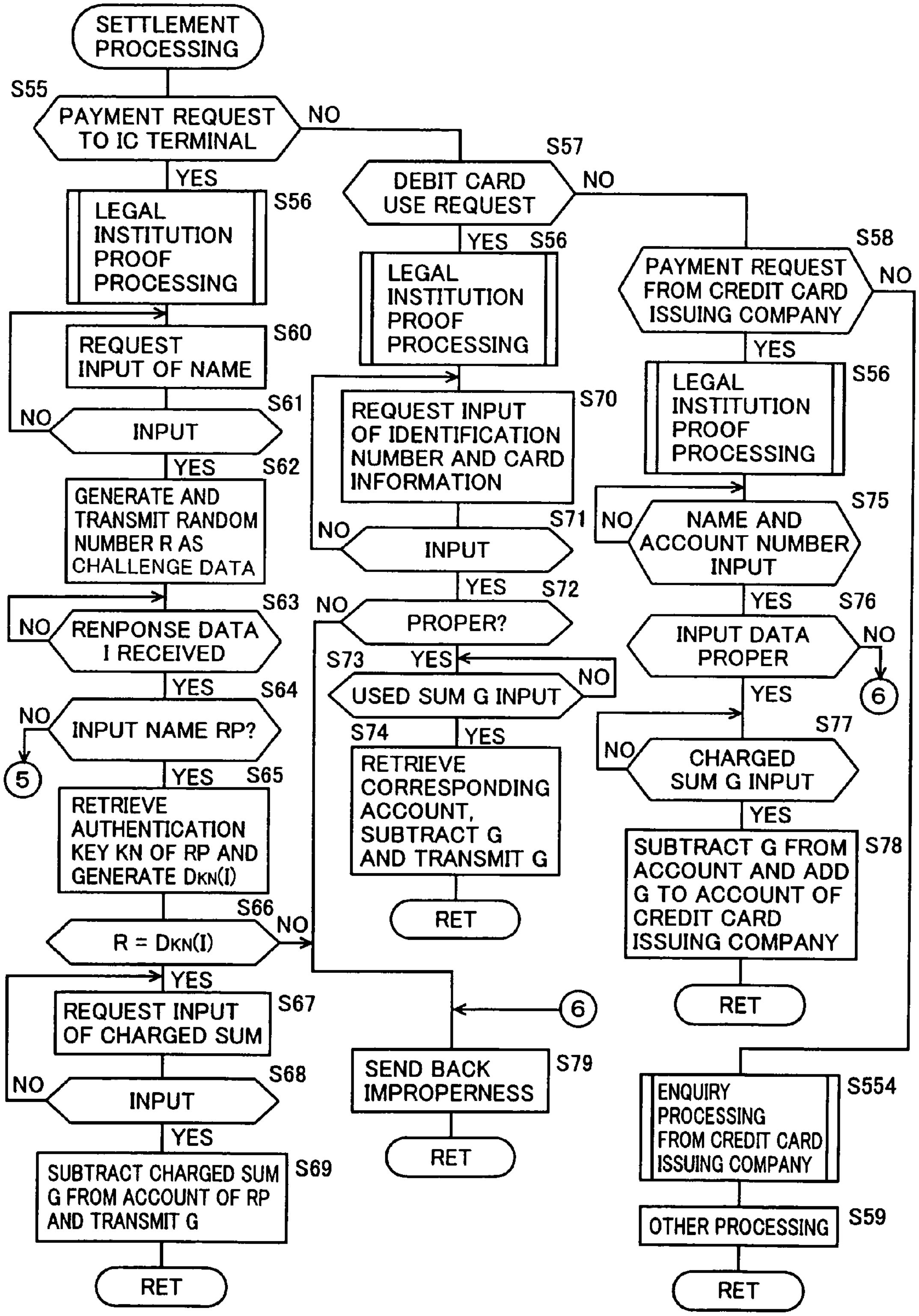
[FIG. 23] A flow chart showing the processing operation of the settlement server.
Figure 24:
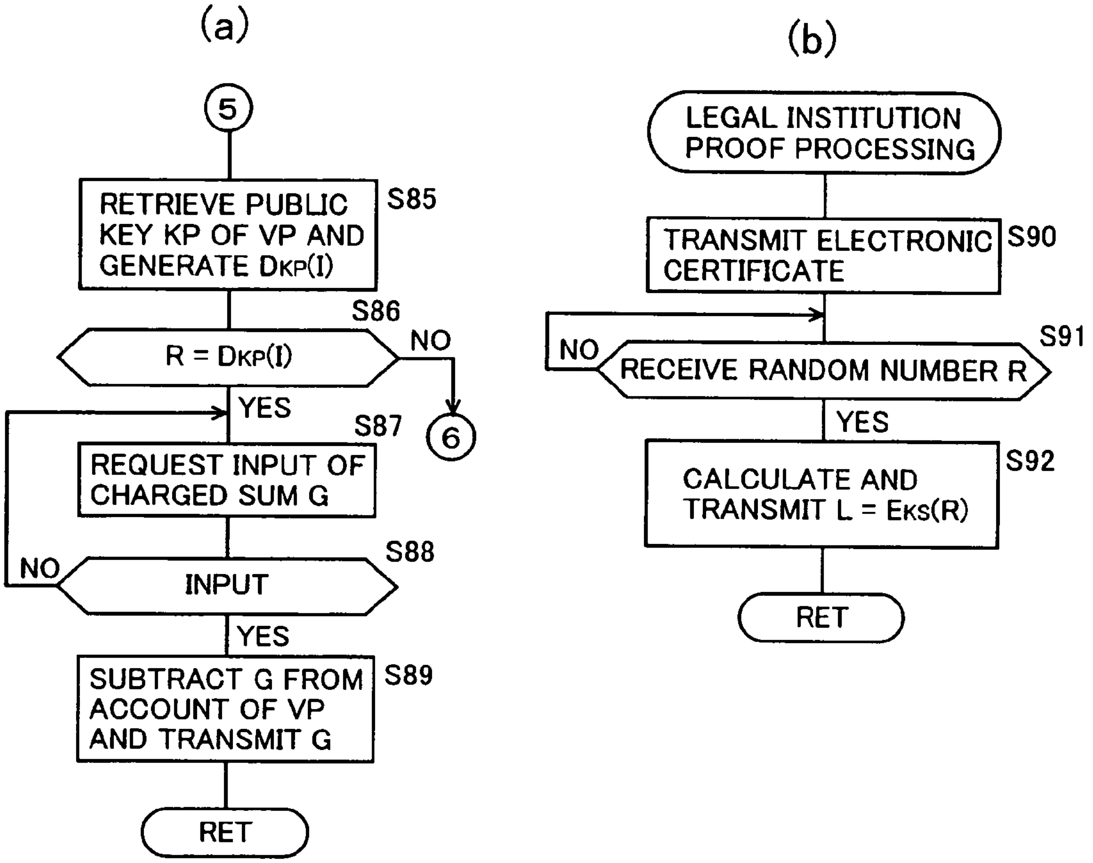
[FIG. 24] (*a*) is a part of a subroutine of settlement processing, and (*b*) is a flow chart showing a subroutine program of legal institution proof processing.
Figure 25:
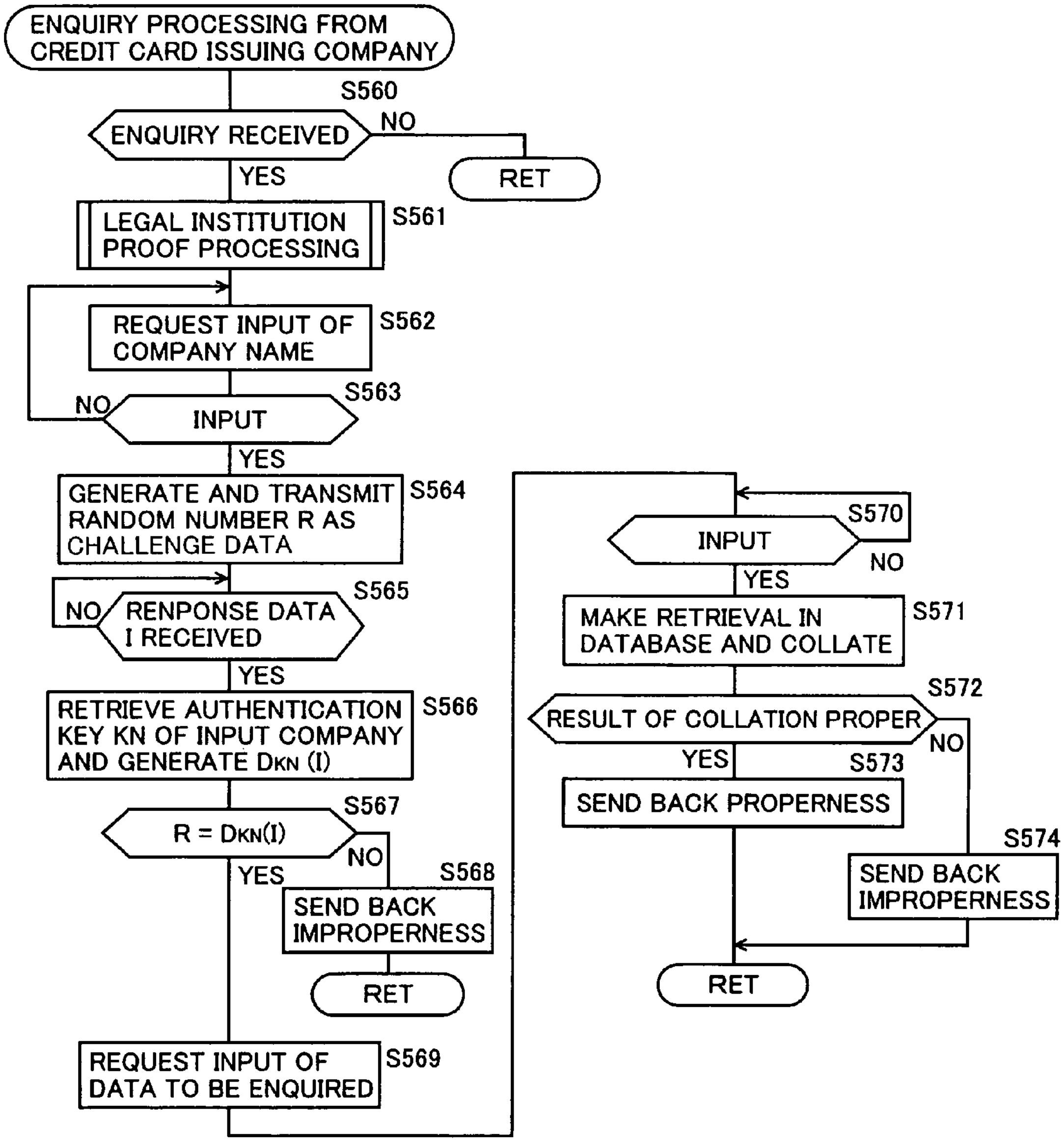
[FIG. 25] A flow chart showing a subroutine program of enquiry processing from a credit card issuing company.
Figure 26:
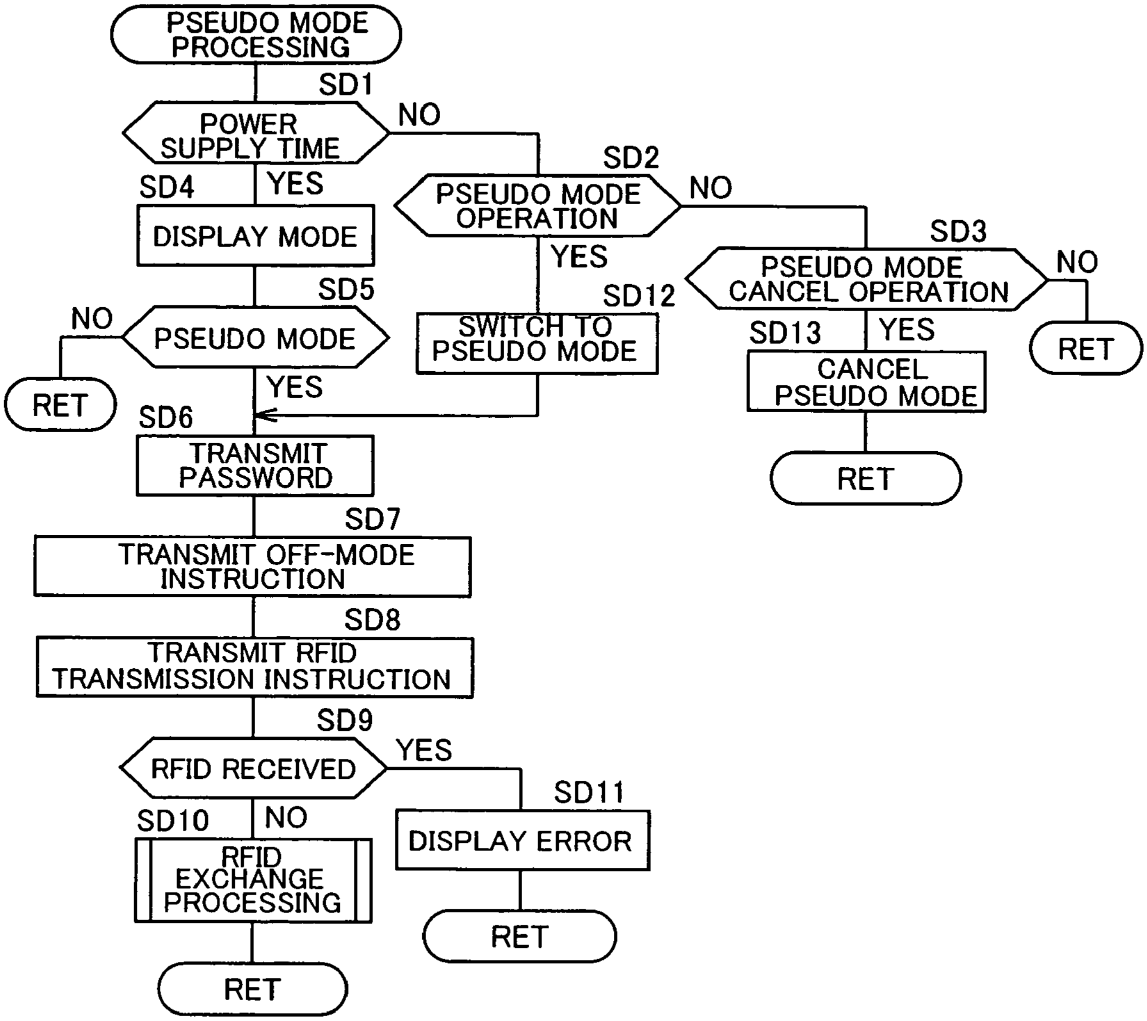
[FIG. 26] A flow chart showing a subroutine program of pseudo mode processing of the browser phone.
Figure 27:
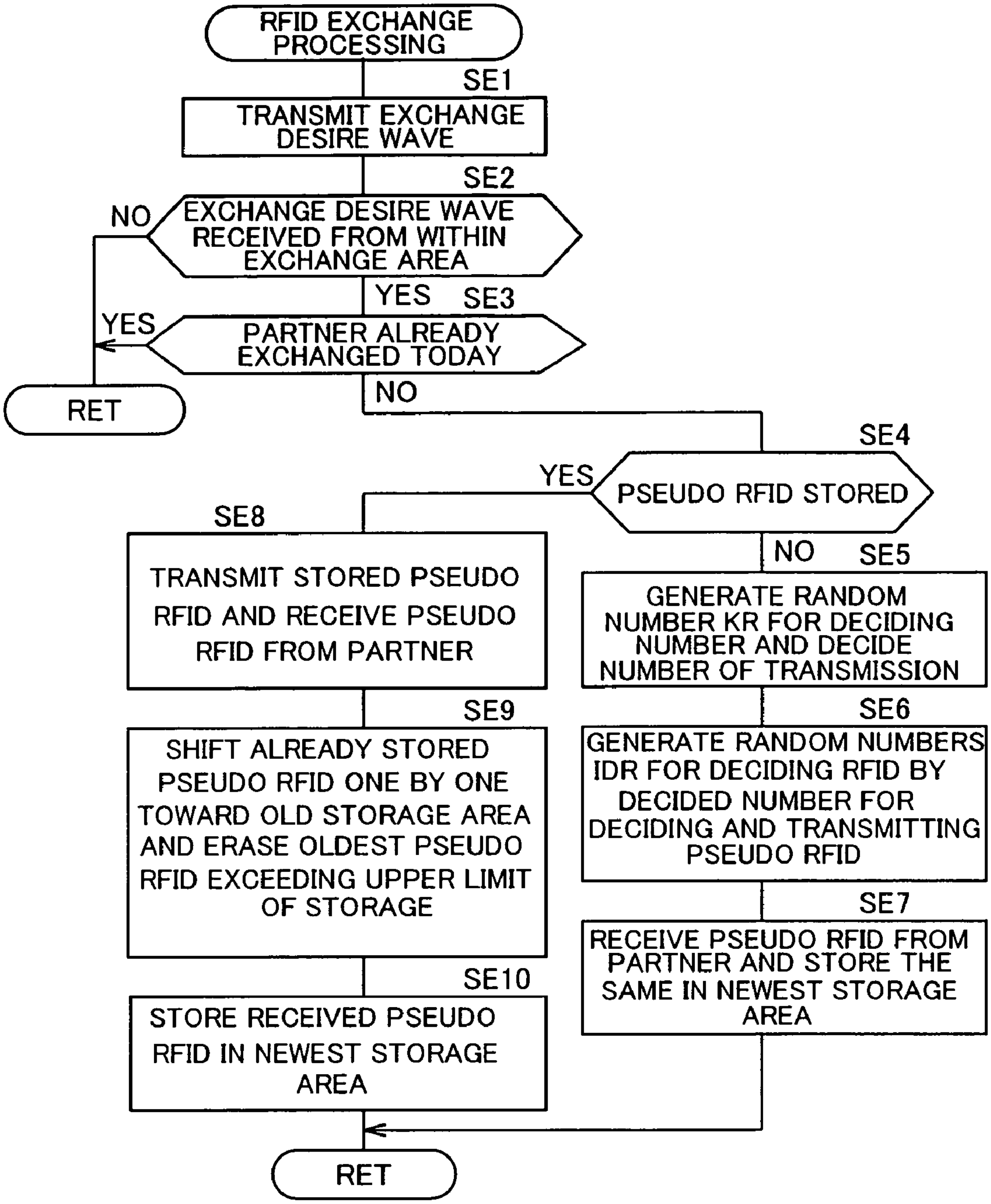
[FIG. 27] A flow chart showing a subroutine program of RFID exchange processing of the browser phone.
Figure 28:
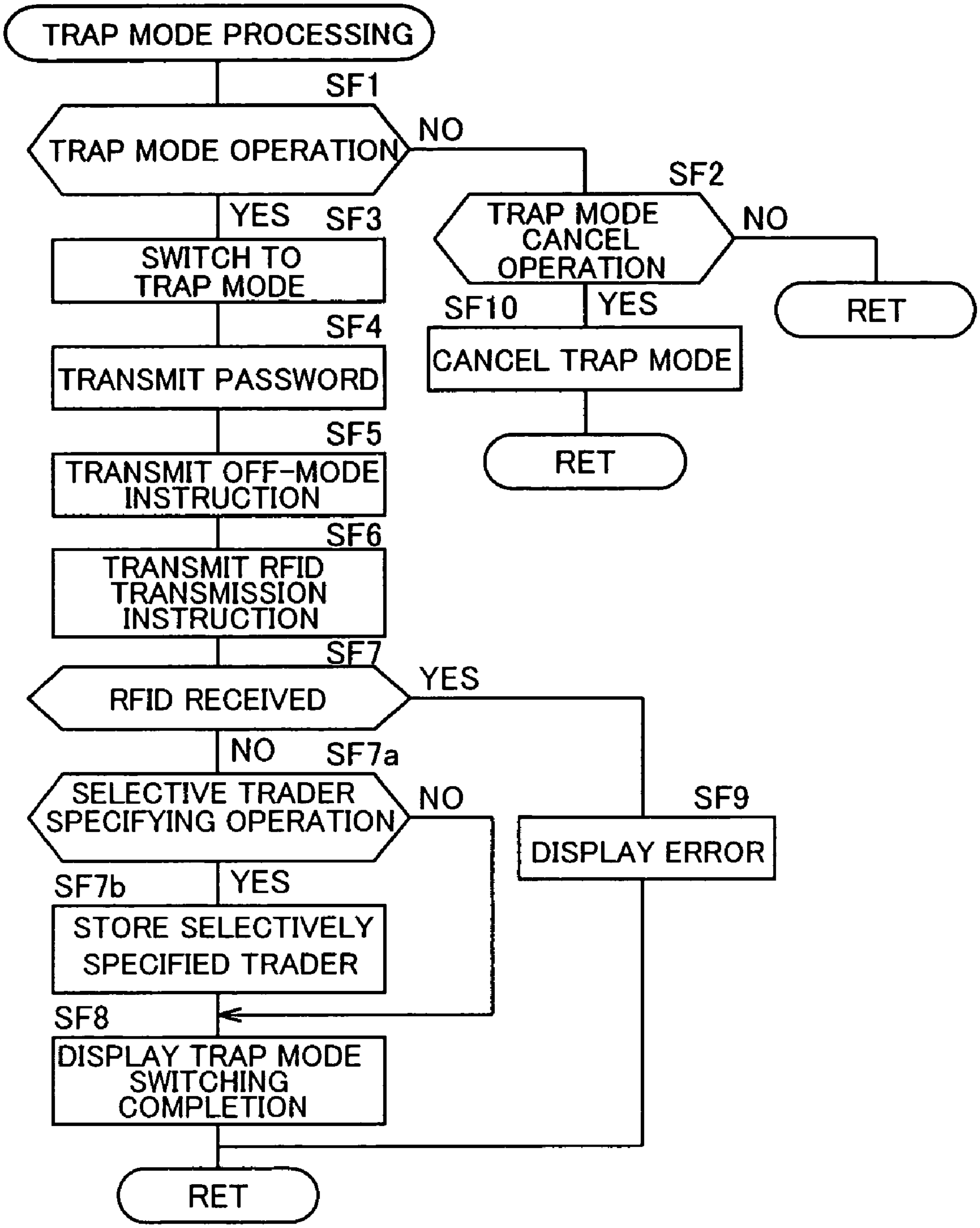
[FIG. 28] A flow chart showing a subroutine program of trap mode processing of the browser phone.
Figure 29:
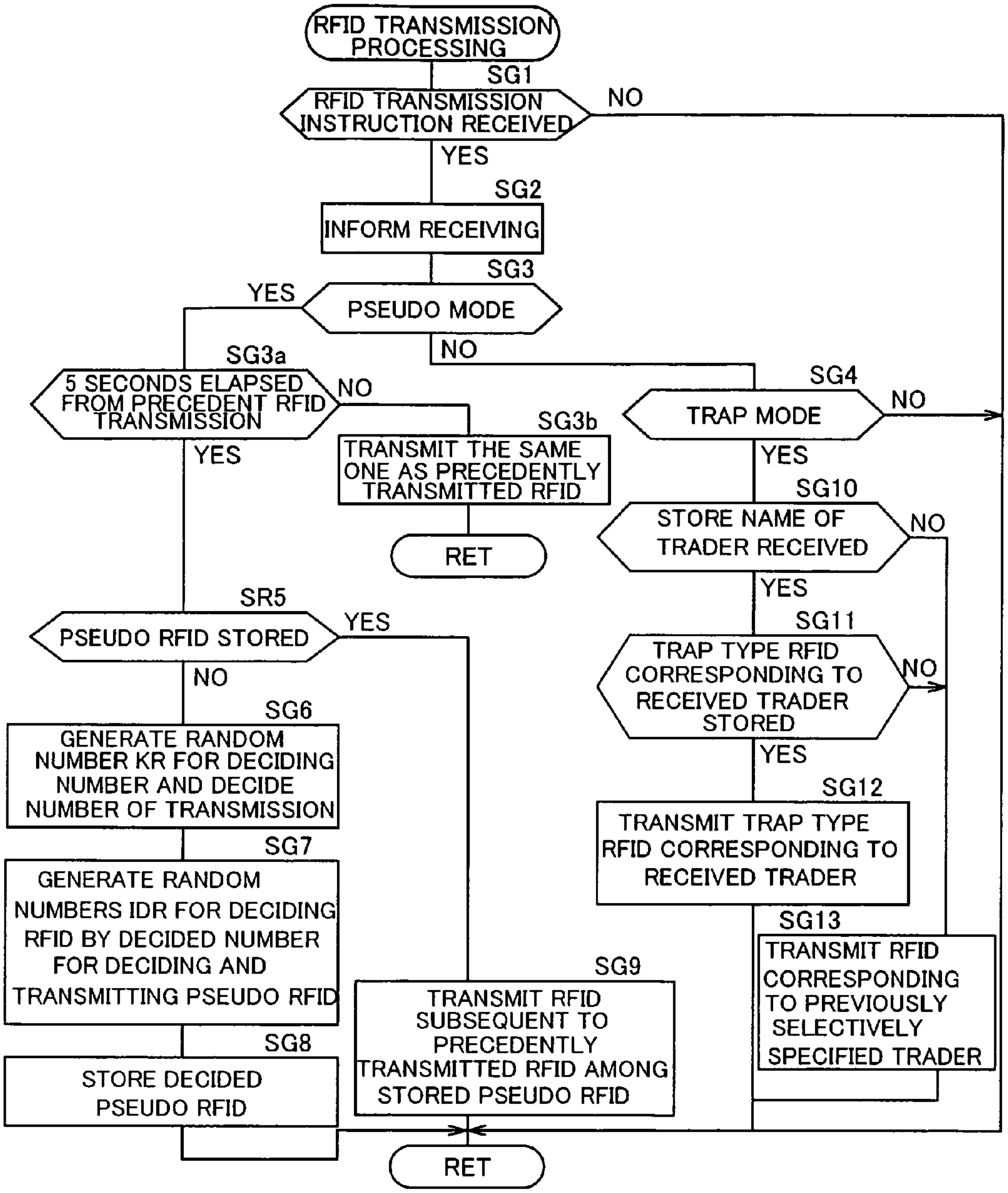
[FIG. 29] A flow chart showing a subroutine program of RFID transmission processing of the browser phone.
Figure 30:
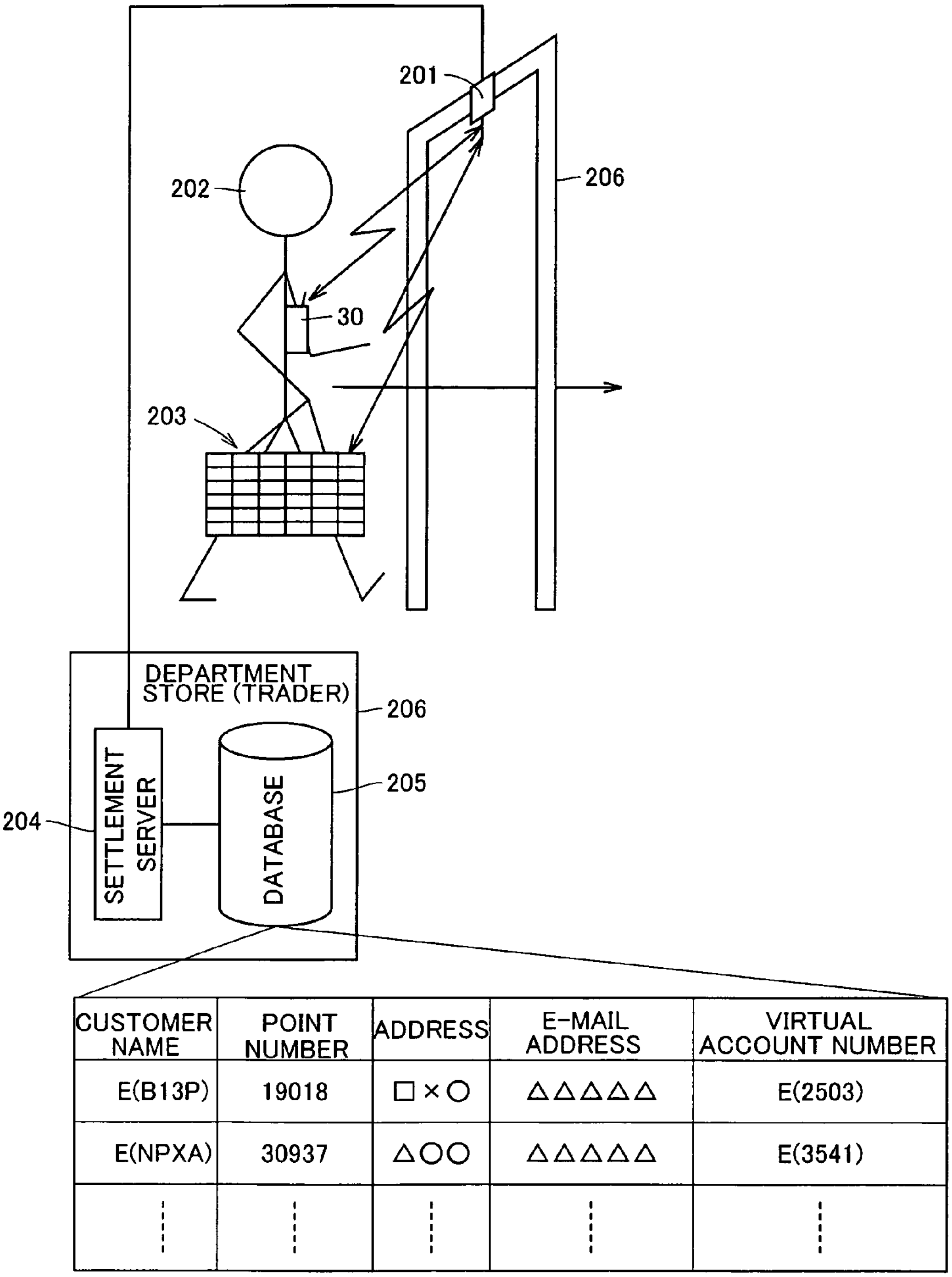
[FIG. 30] An explanatory diagram of automatic settlement at a department store through RFID tags.
Figure 31:
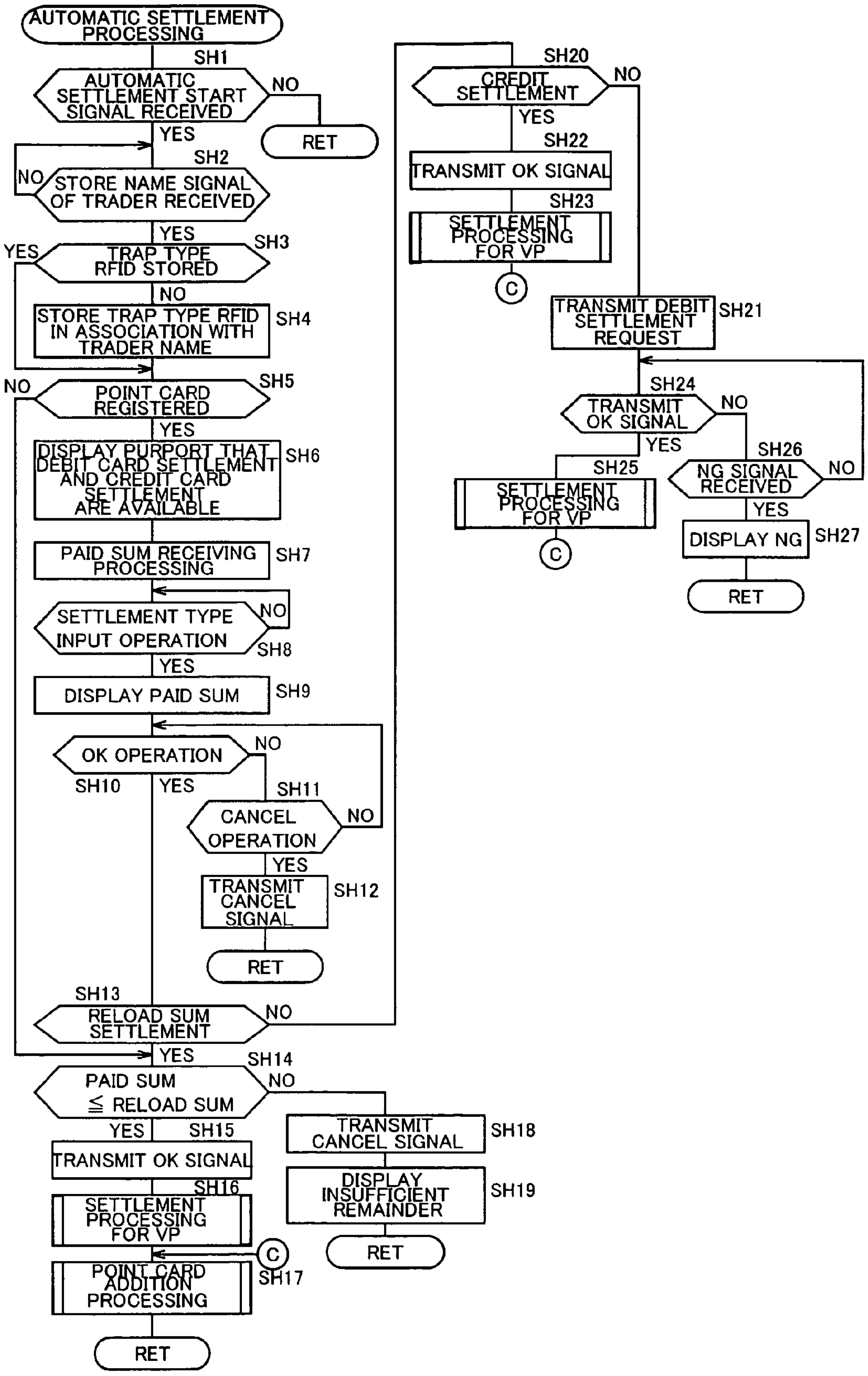
[FIG. 31] A flow chart showing a subroutine program of automatic settlement processing of the browser phone.
Figure 32:
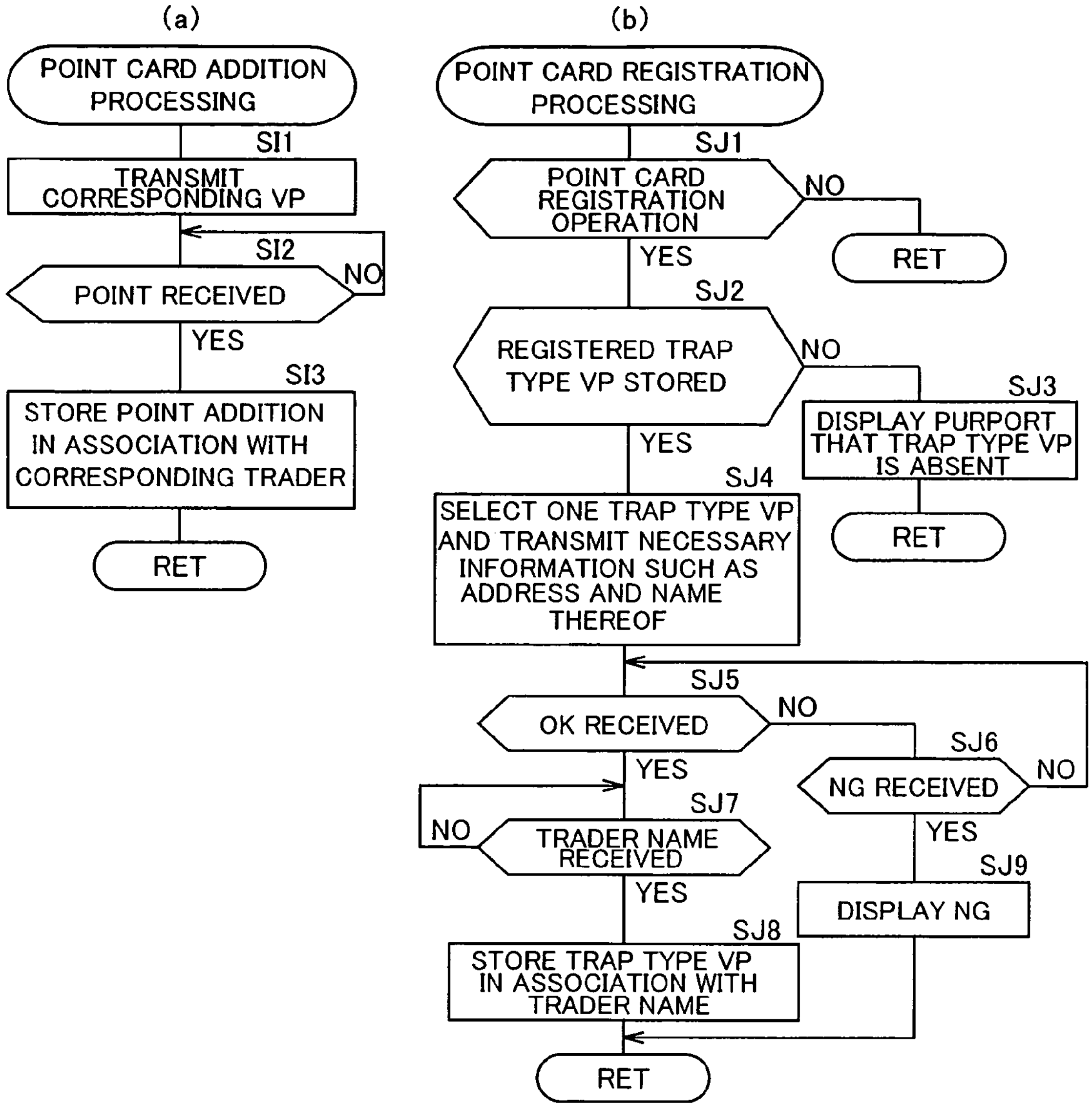
[FIG. 32] (*a*) is a flow chart showing a subroutine program of point card addition processing of the browser phone, and (*b*) is a flow chart showing a subroutine program of point card registration processing of the browser phone.
Figure 33:
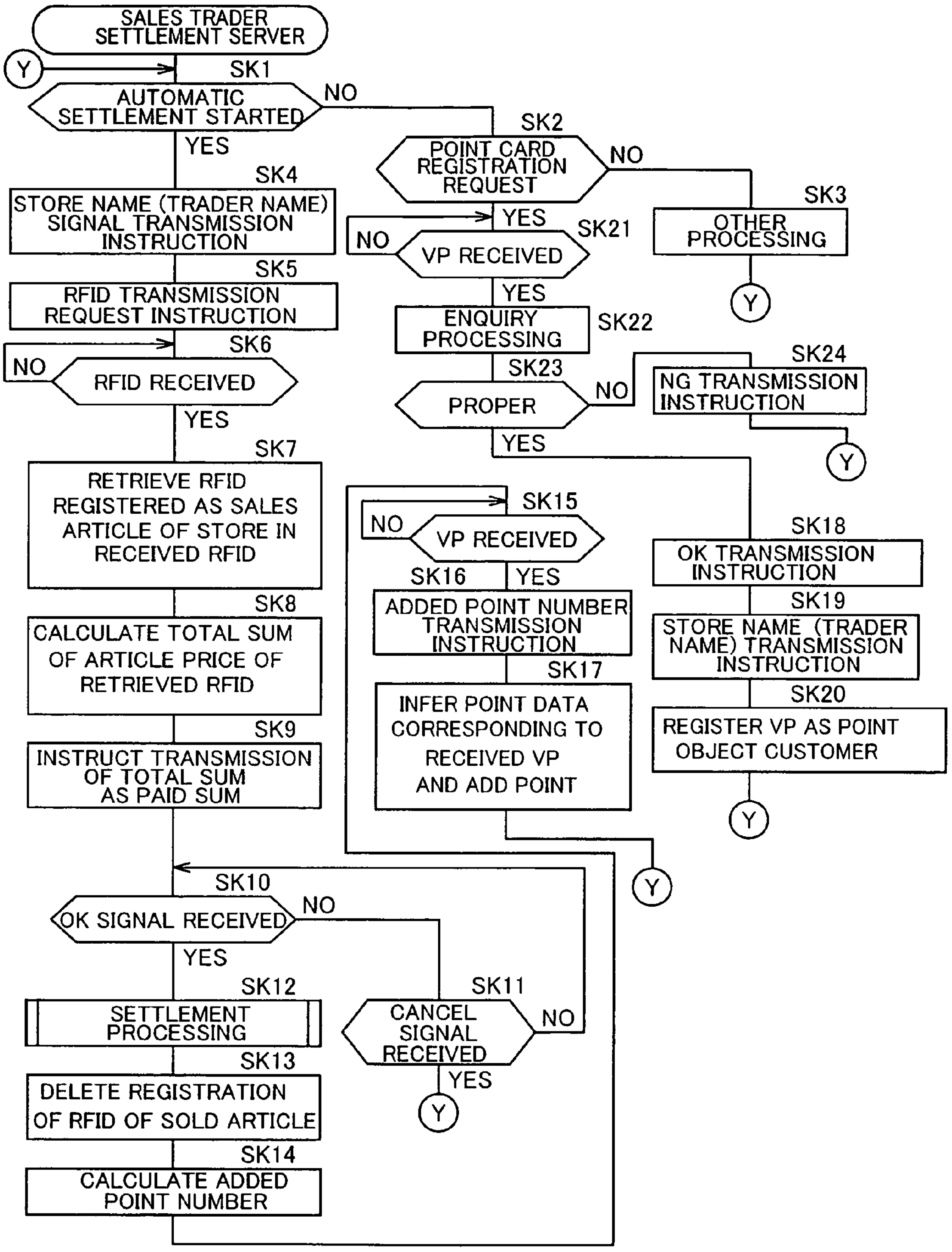
[FIG. 33] A flow chart showing a control program of a sales trader settlement server.
Figure 34:
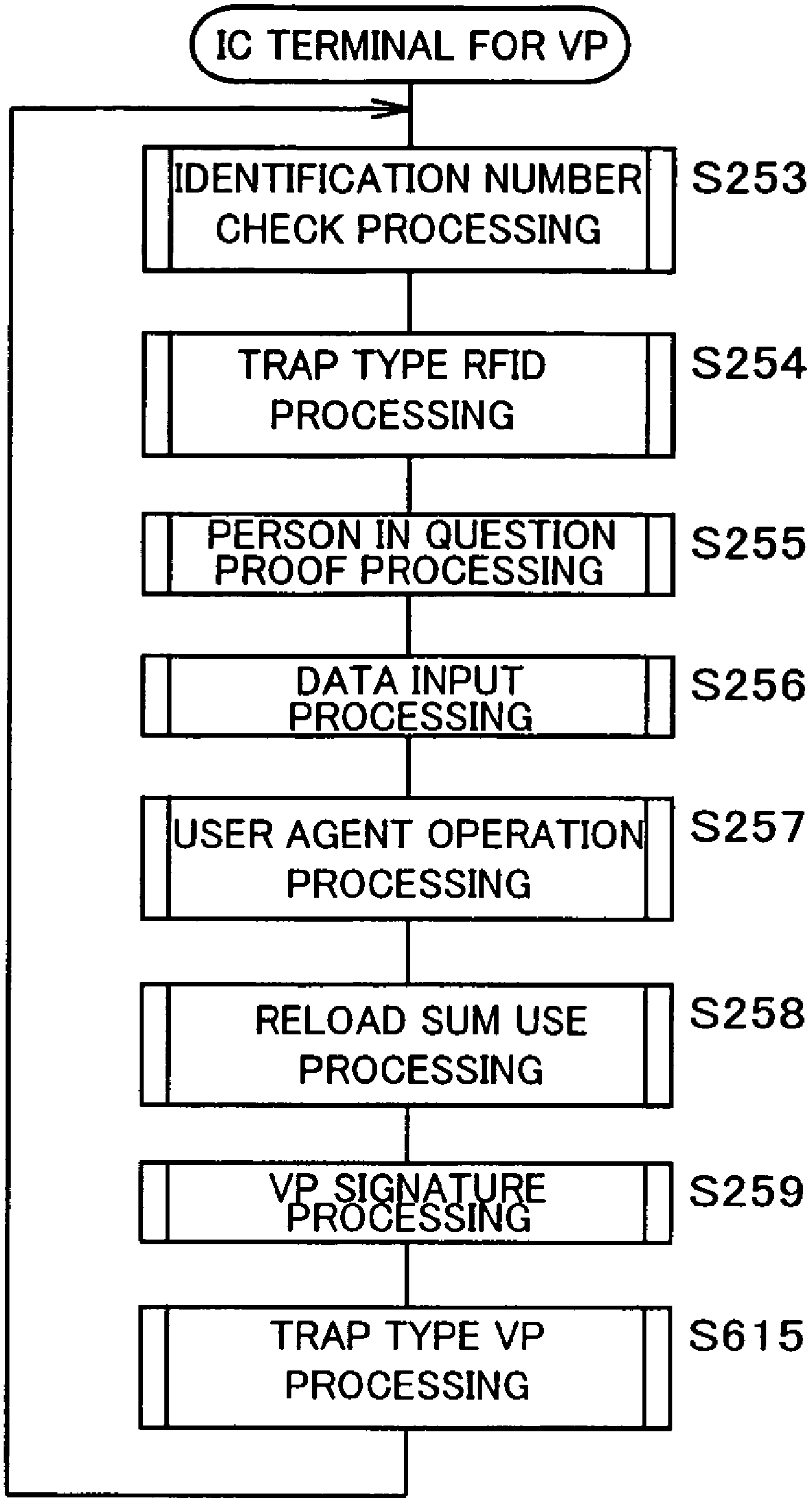
[FIG. 34] A flow chart showing a processing operation of an IC terminal for the VP.
Figure 35:
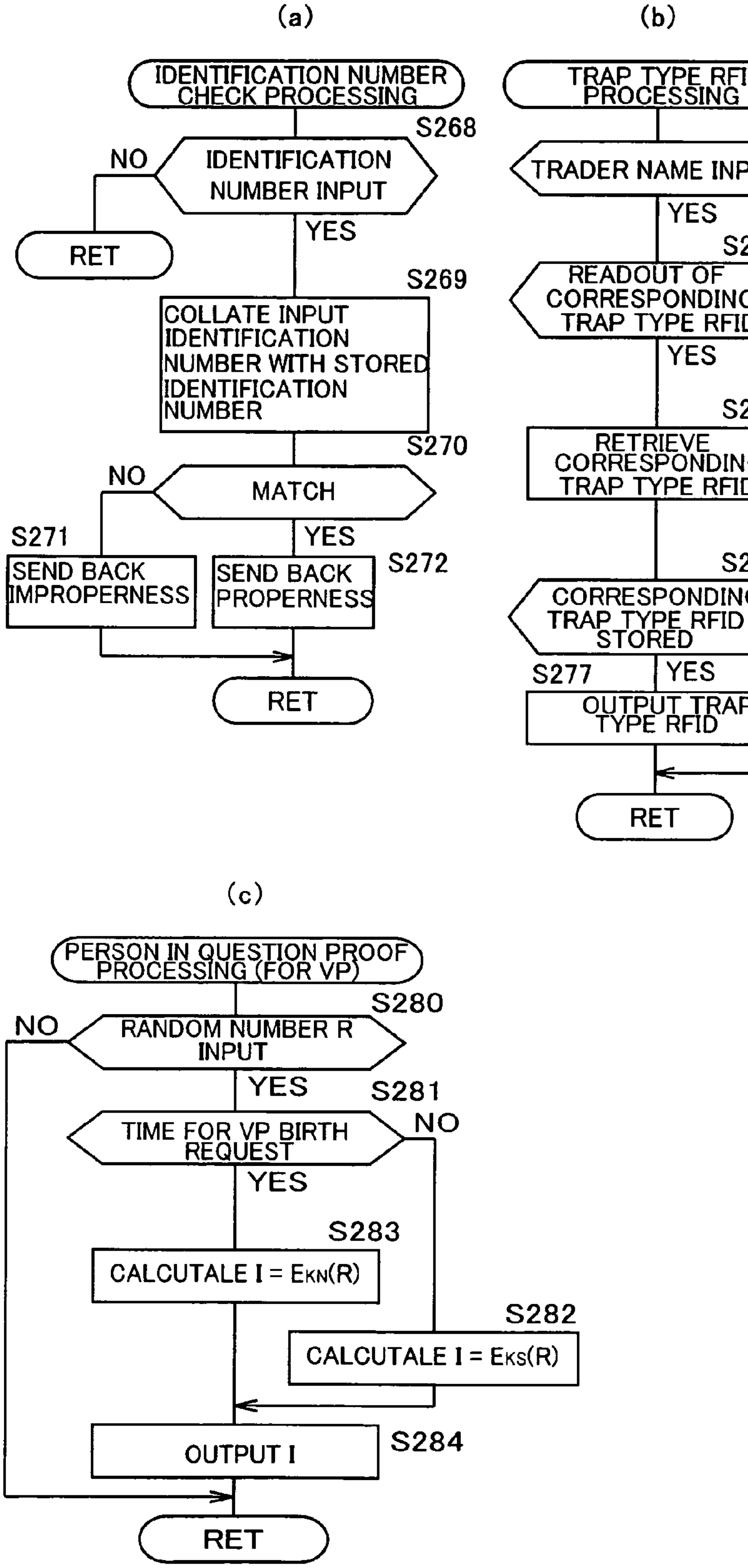
[FIG. 35] (*a*) is a flow chart showing a subroutine program of identification number check processing, (*b*) is a flow chart showing a subroutine program of trap type RFID processing, and (*c*) is a flow chart showing a subroutine program of person in question proof processing (for the VP).
Figure 36:
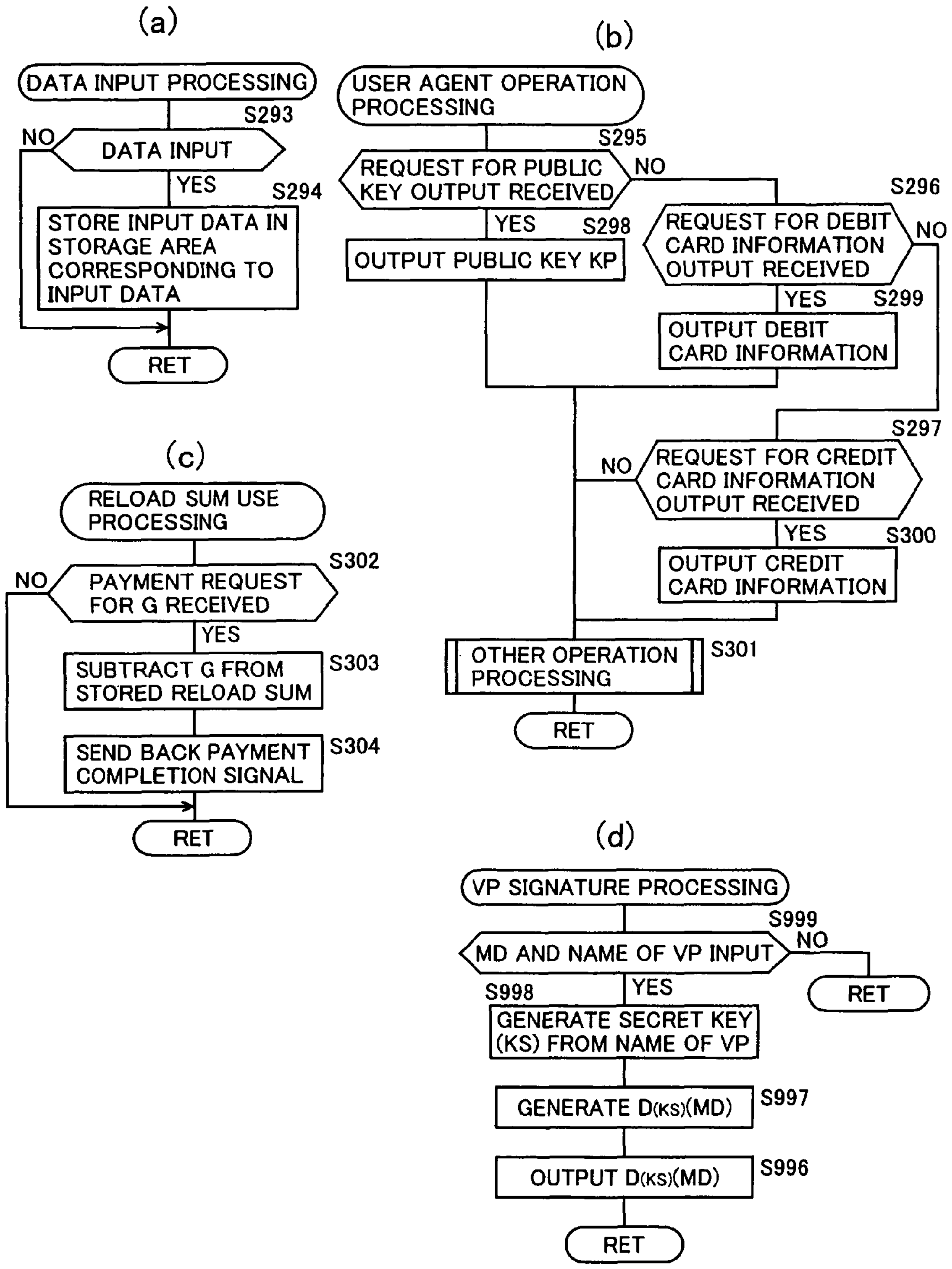
[FIG. 36](*a*) is a flow chart showing a subroutine program of data input processing, (*b*) is a flow chart showing a subroutine program of user agent operation processing, (*c*) is a flow chart showing a subroutine program of reload sum use processing, and (*d*) is a flow chart showing a subroutine program of VP signature processing.
Figure 37:
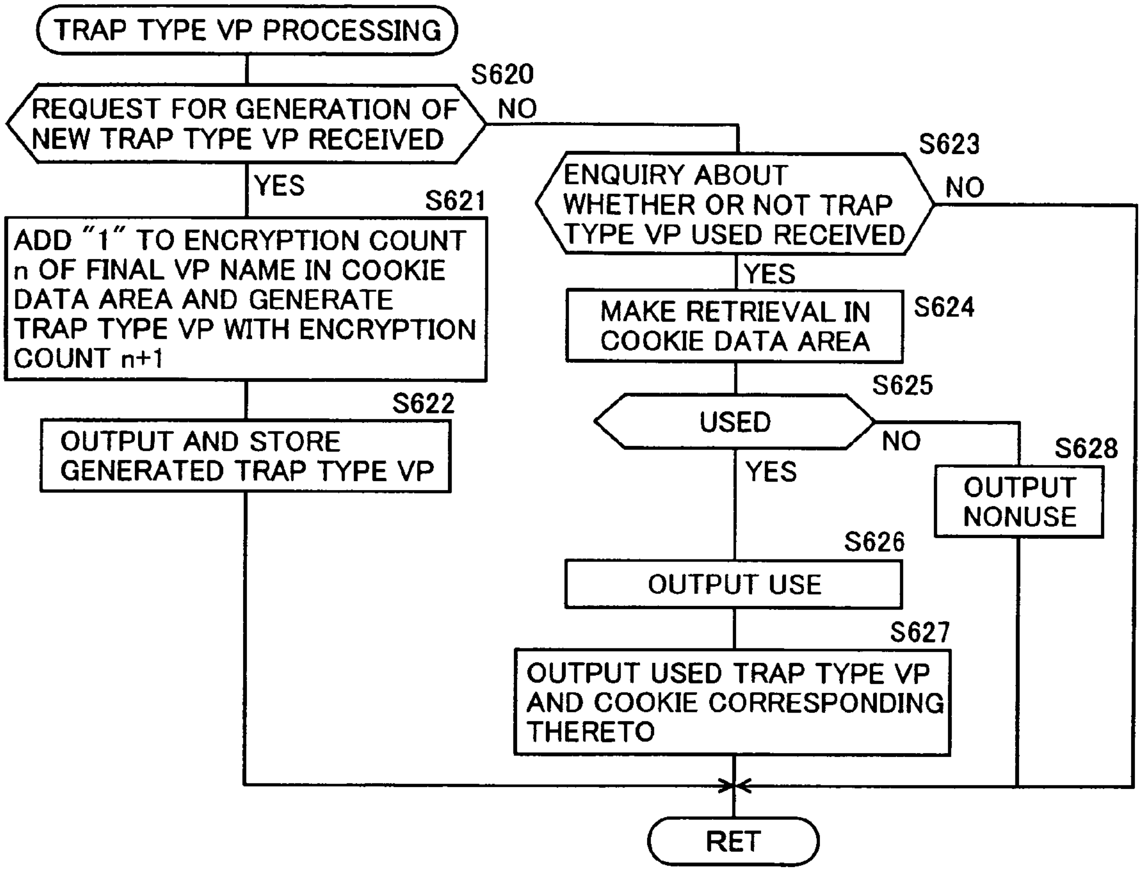
[FIG. 37] A flow chart showing a subroutine program of trap type VP processing.
Figure 38:
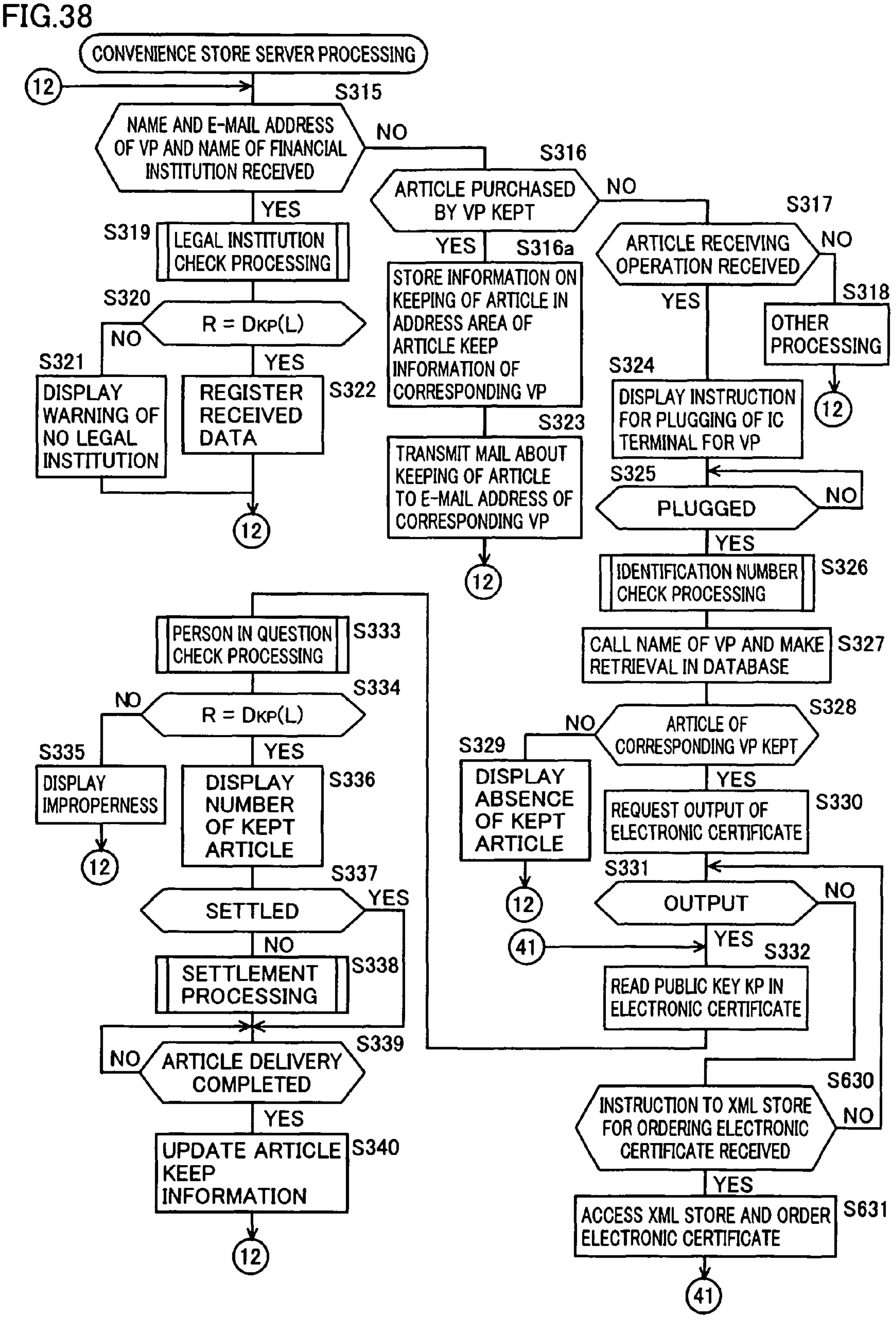
[FIG. 38] A flow chart showing a processing operation of a convenience server.
Figure 39:
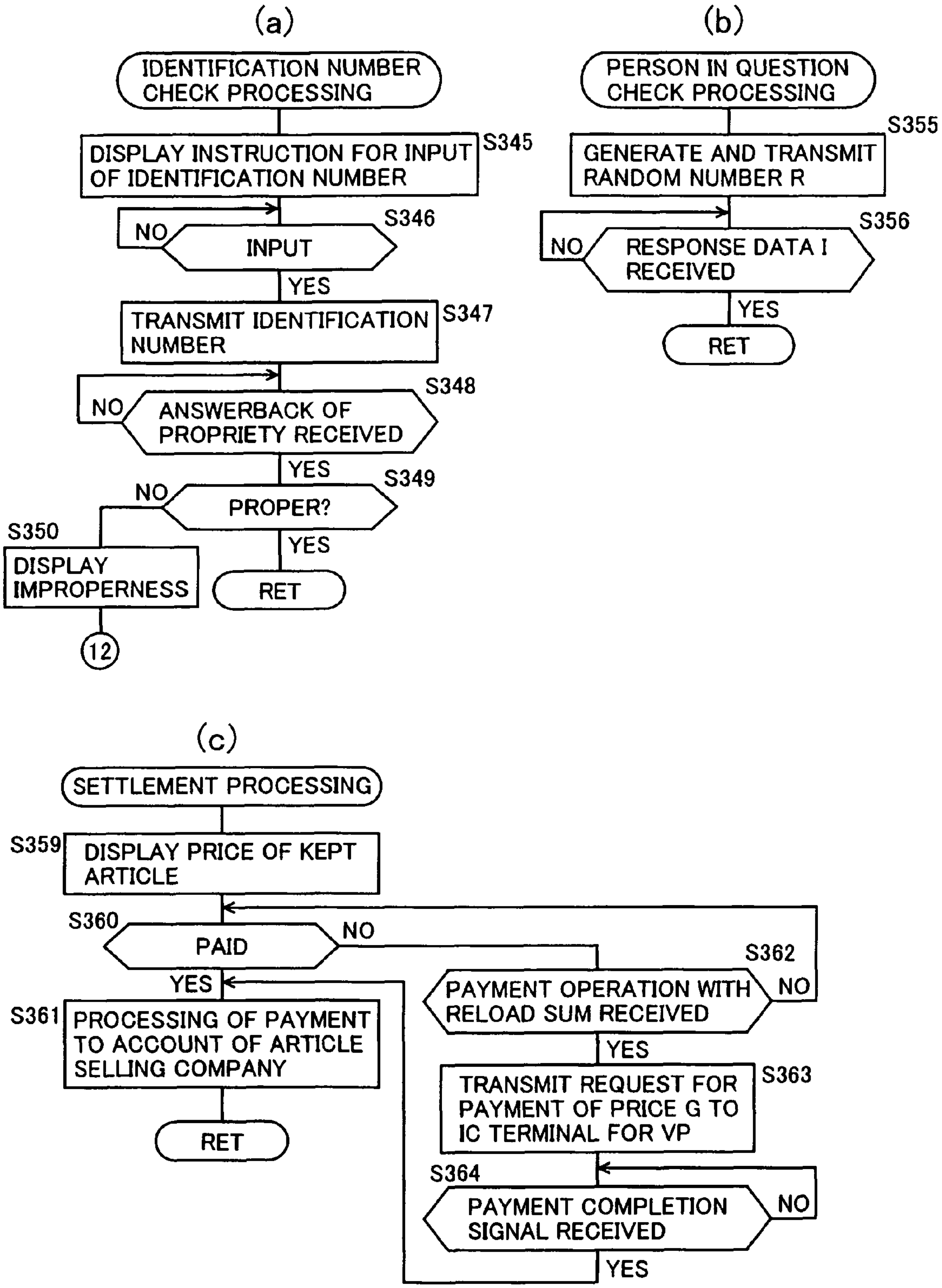
[FIG. 39] Flow charts showing the processing operation of the convenience server, (*a*) is a flow chart showing a subroutine program of identification number check processing, (*b*) is a flow chart showing a subroutine program of person in question check processing, and (*c*) is a flow chart showing a subroutine program of settlement processing.
Figure 41:
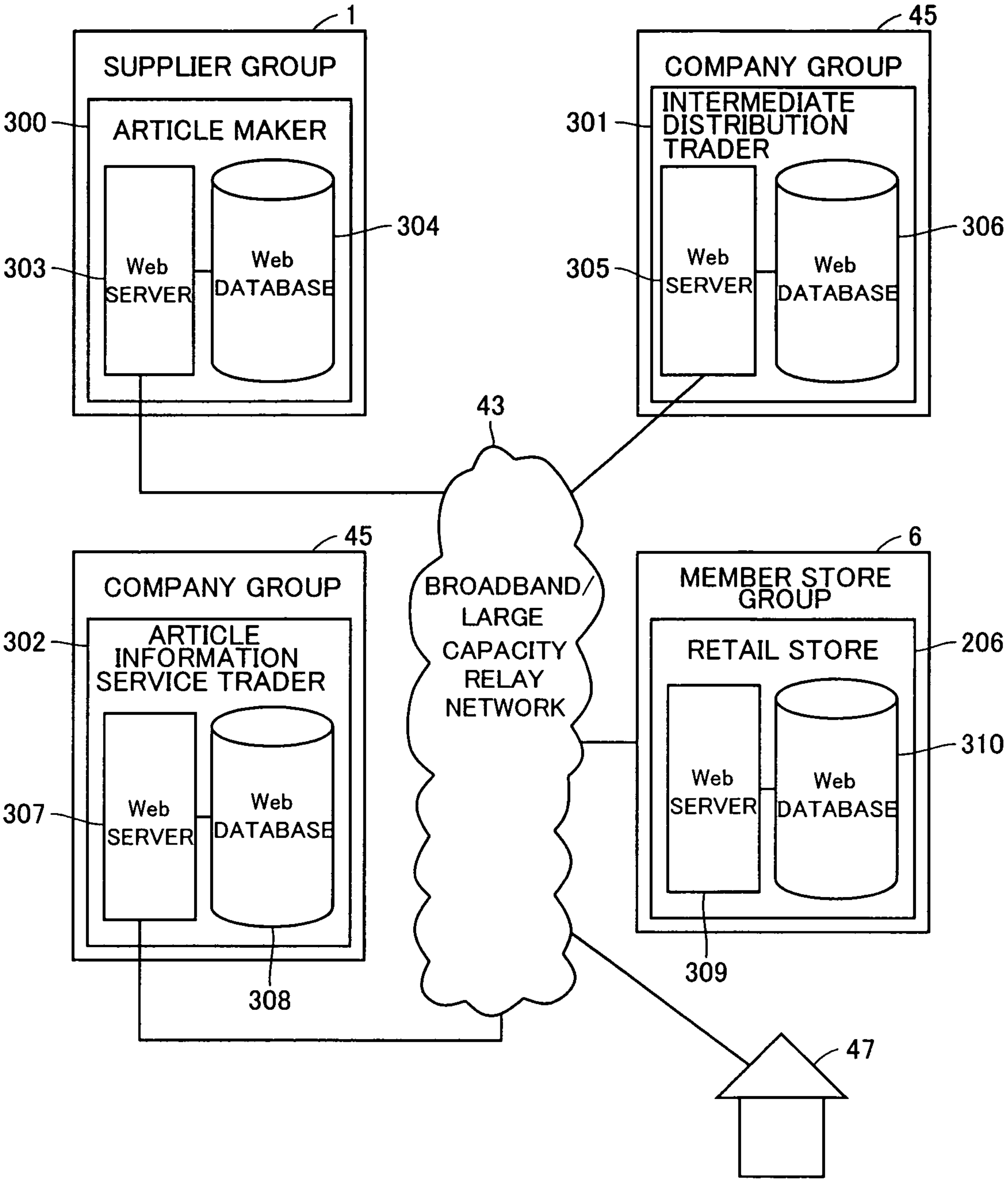
[FIG. 41] A block diagram showing the overall outline of an article information provision service system.
Figure 43:
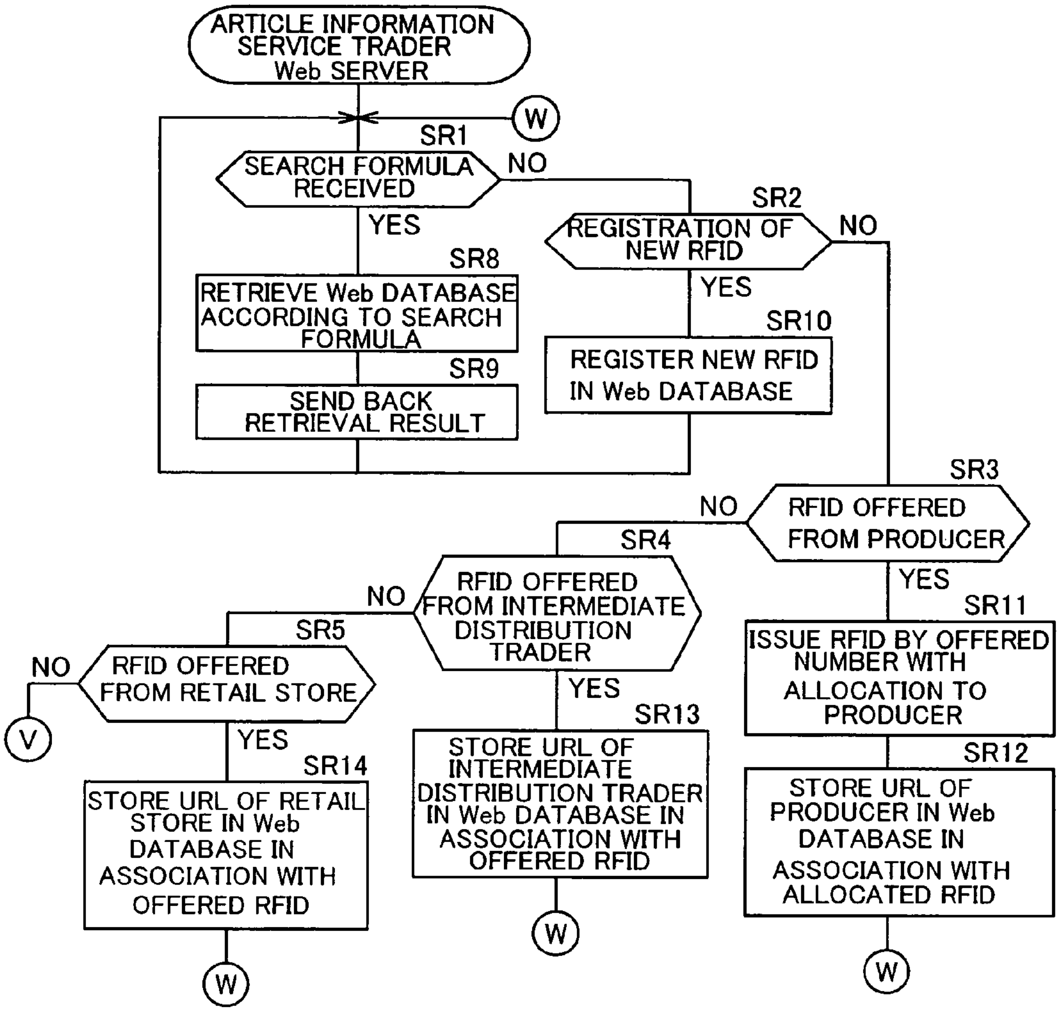
[FIG. 43] A part of a flow chart showing a control program for the Web server of the article information service trader.
Figure 44:
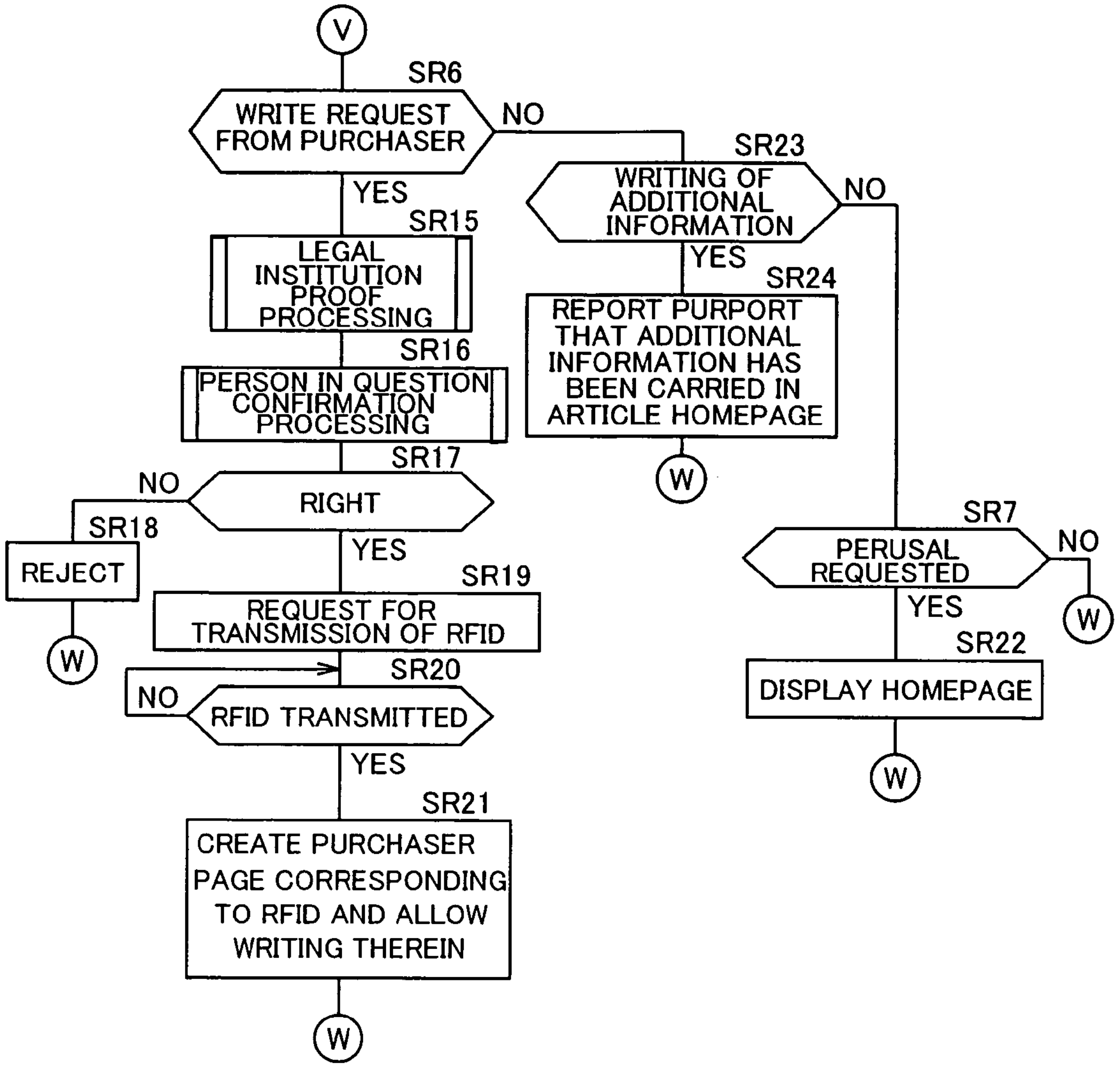
[FIG. 44] Another part of the flow chart showing the control program for the Web server of the article information service trader.
Figure 45:
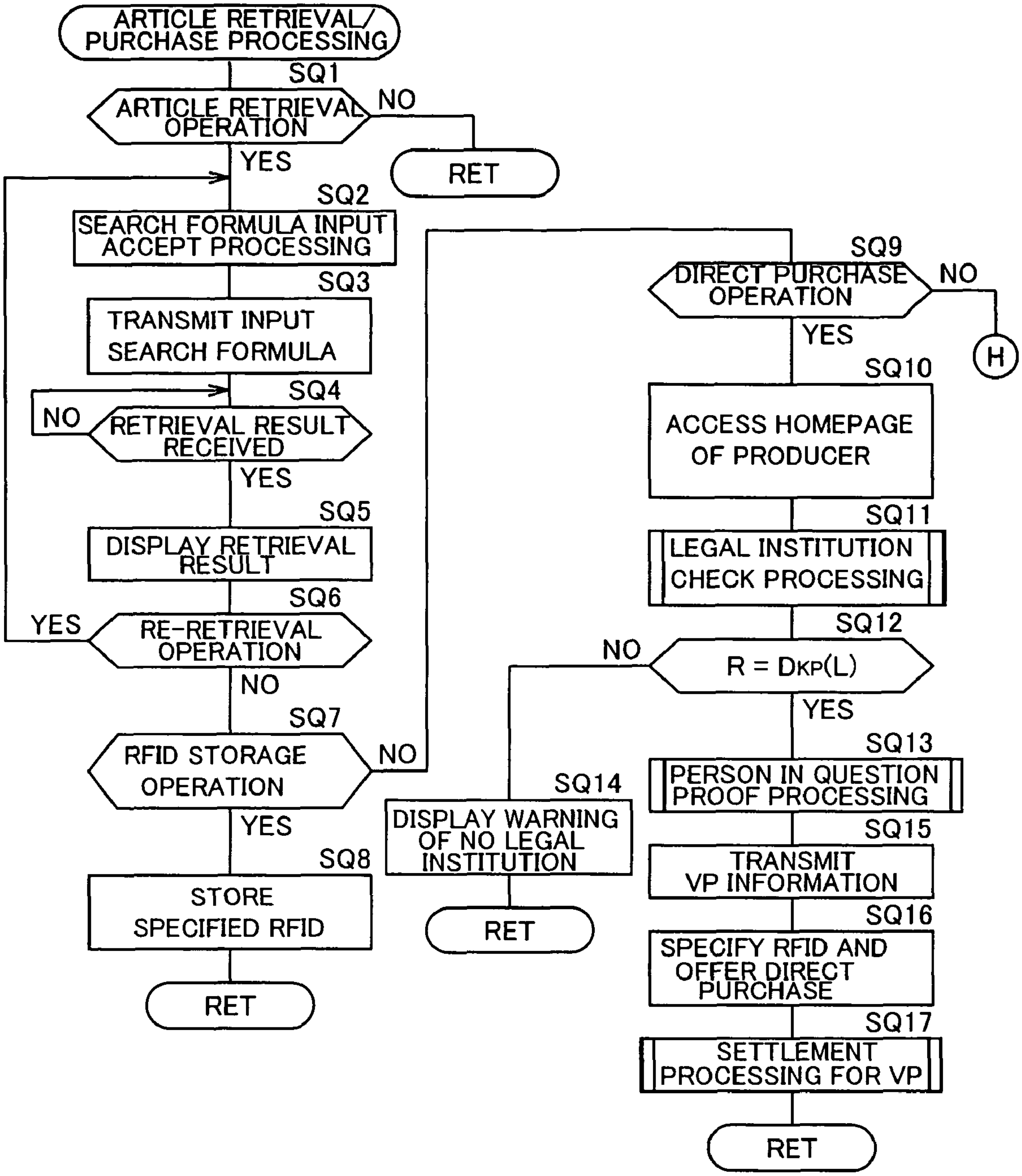
[FIG. 45] A part of a flow chart showing a subroutine program of article retrieval/purchase processing of the browser phone.
Figure 46:
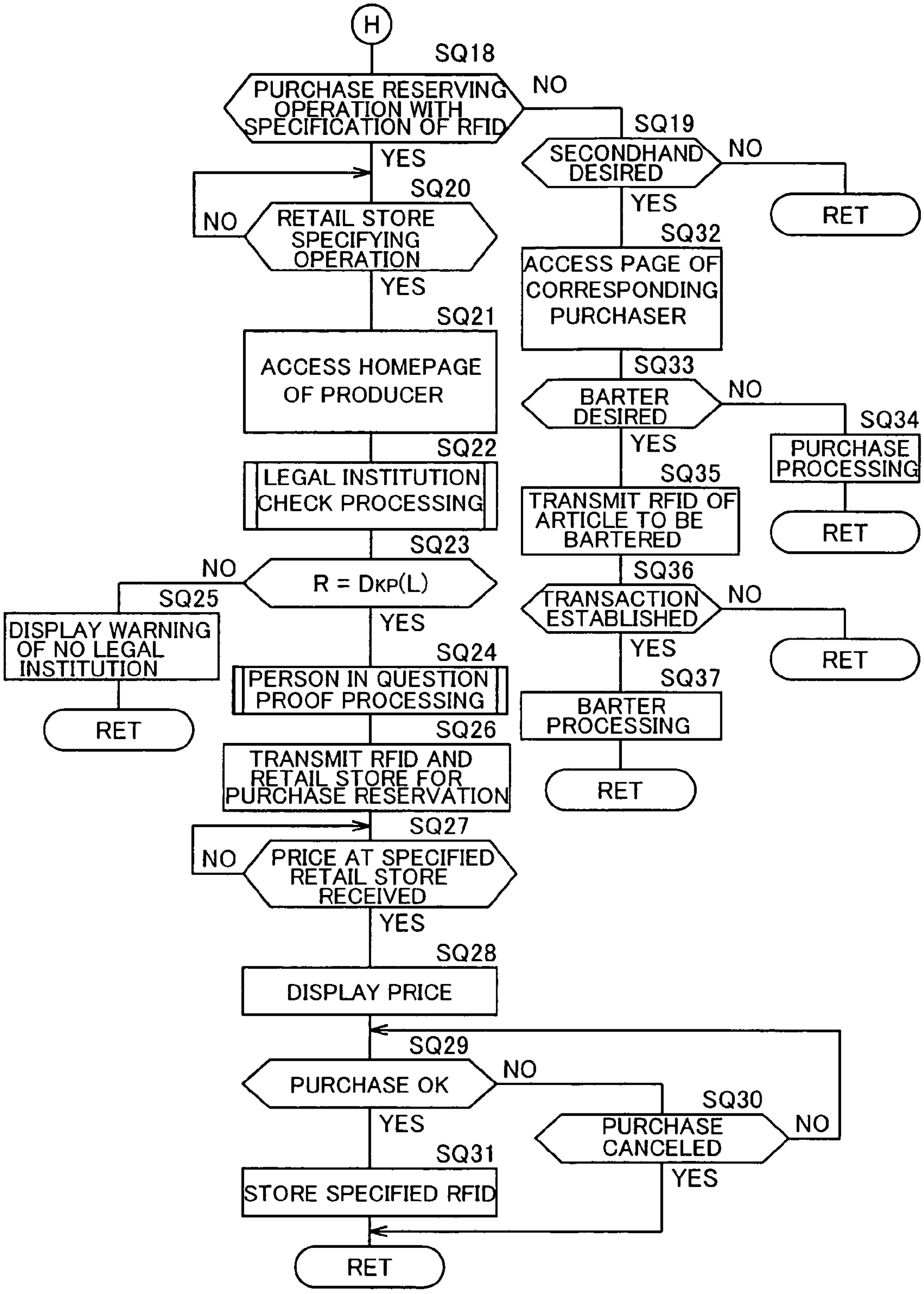
[FIG. 46] Another part of the flow chart showing the subroutine program of article retrieval/purchase processing of the browser phone.
Figure 47:
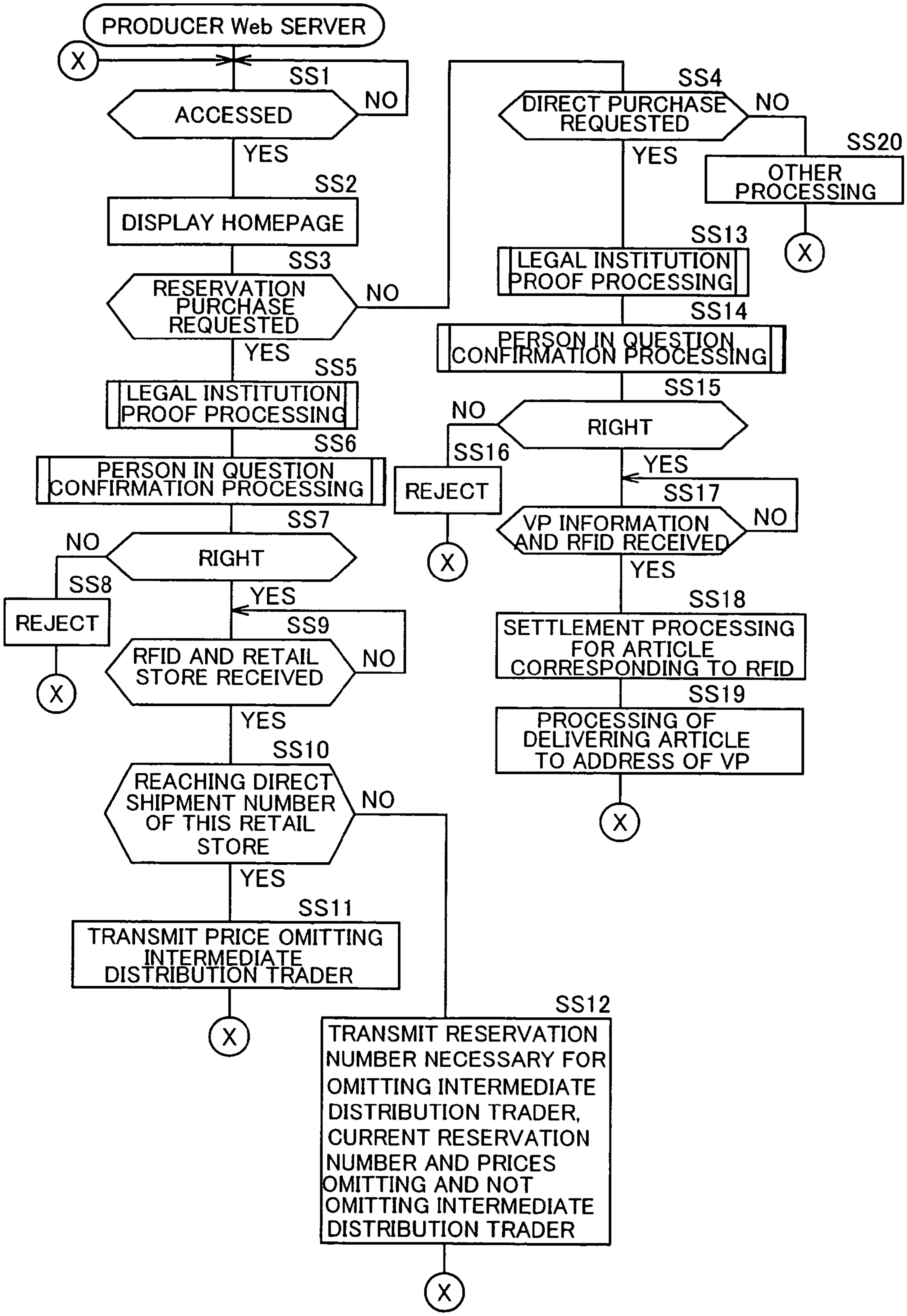
[FIG. 47] A flow chart showing a control program for a Web server of a producer.
Figure 48:
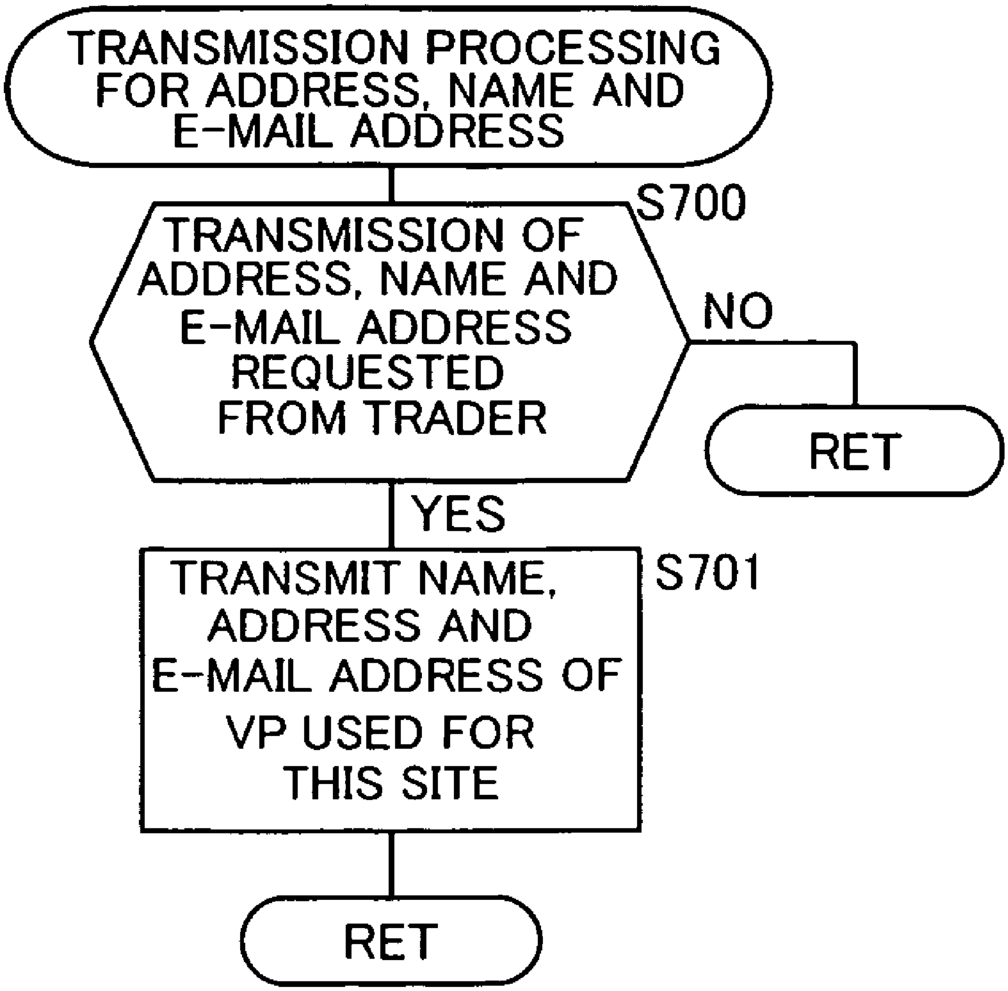
[FIG. 48] A flow chart showing a subroutine program of address, name and E-mail address transmission processing.
Figure 49:
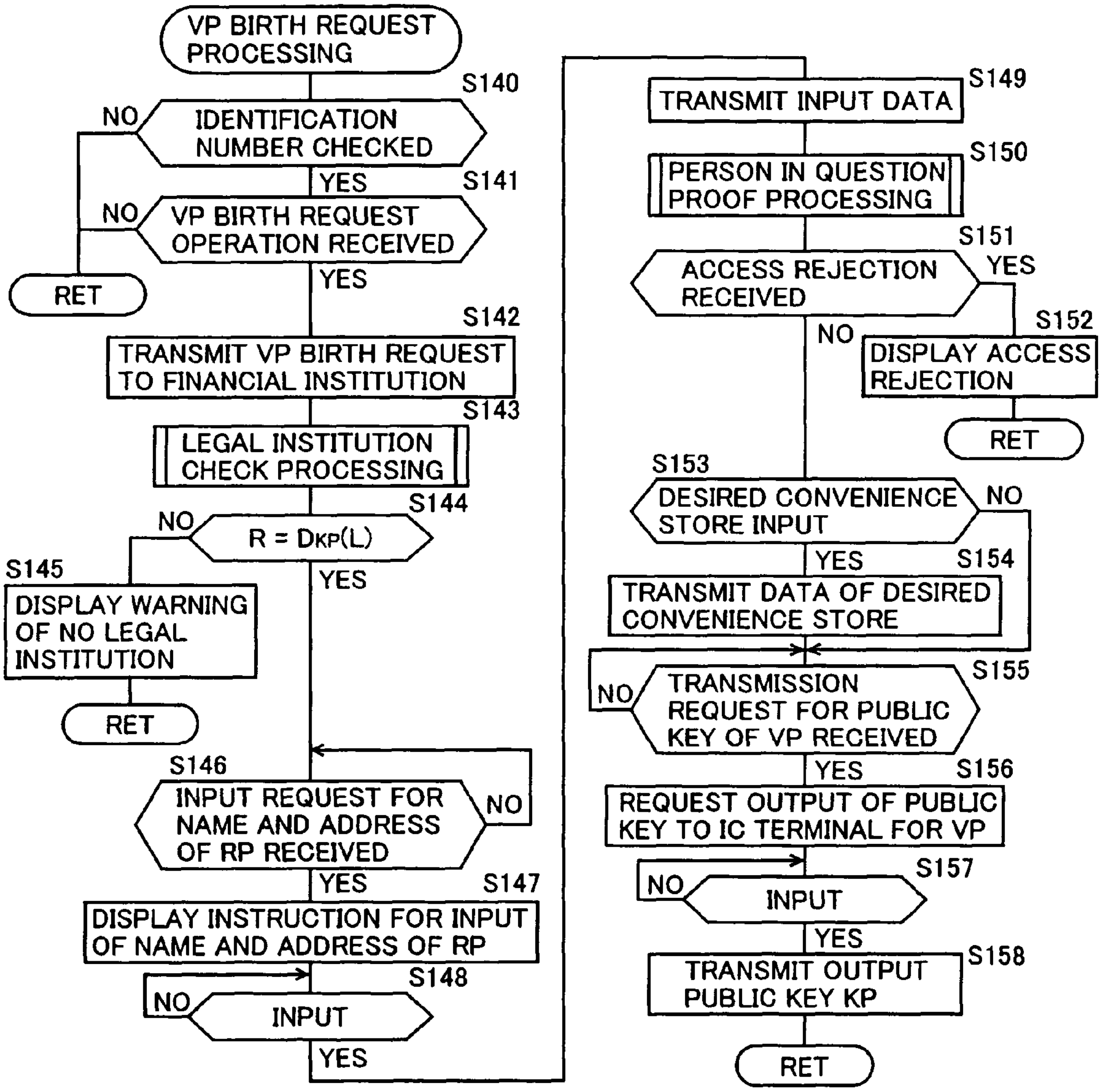
[FIG. 49] A flow chart showing a subroutine program of VP birth request processing.
Figure 50:
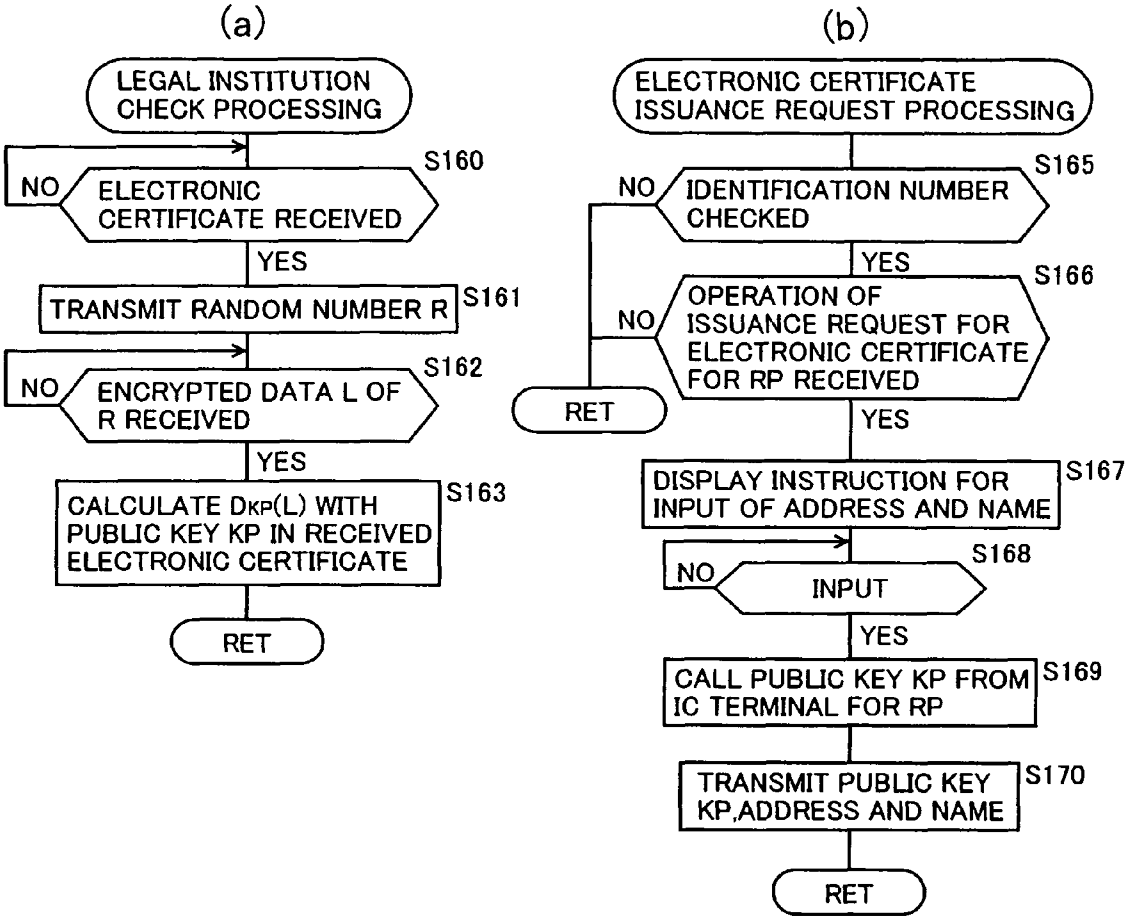
[FIG. 50] (*a*) is a flow chart showing a subroutine program of legal institution check processing, and (*b*) is a flow chart showing a subroutine program of electronic certificate issuance request processing.
Figure 52:
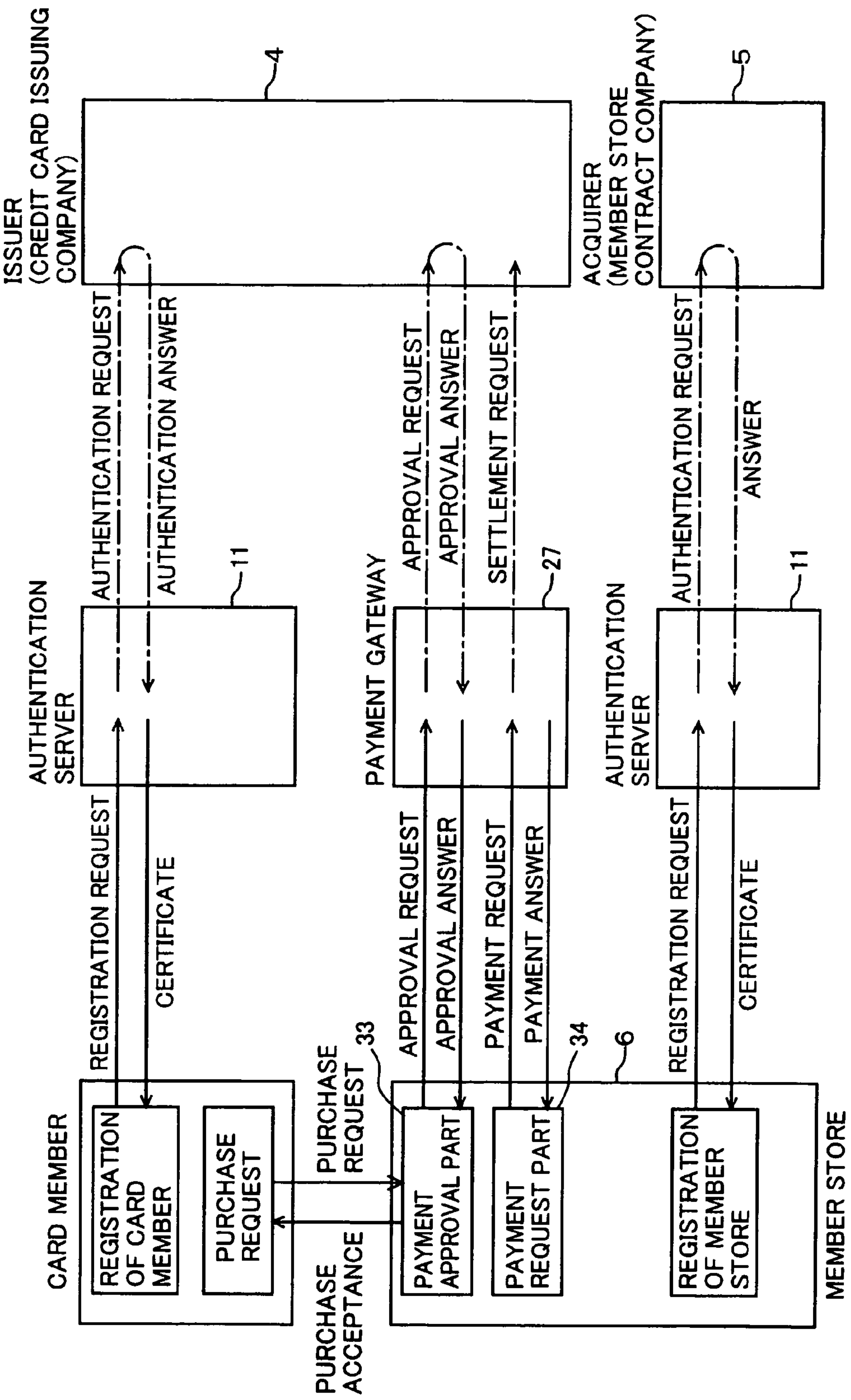
[FIG. 52] An explanatory diagram showing the outline of settlement processing with SET.
Figure 53:
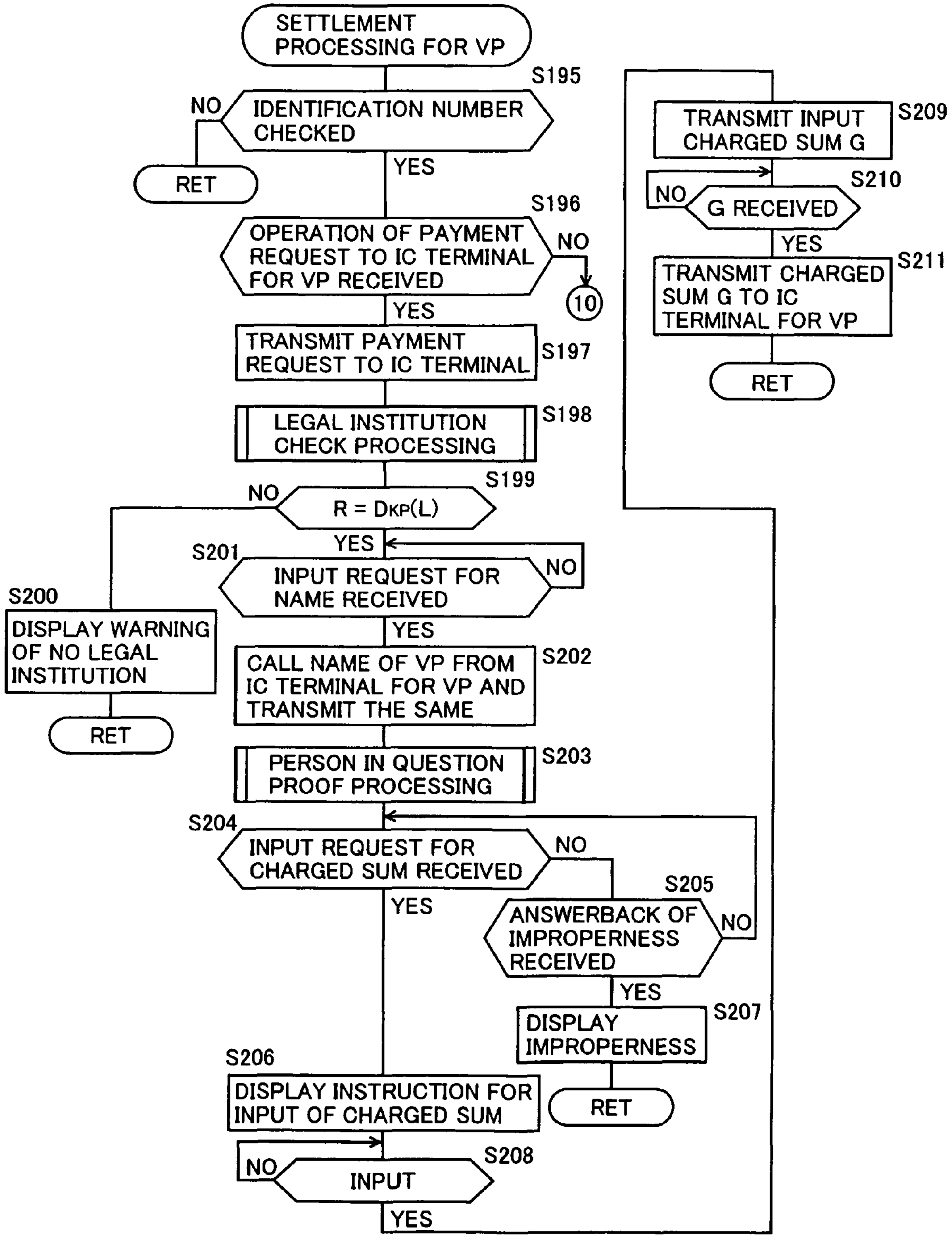
[FIG. 53] A flow chart showing a subroutine program of settlement processing for the VP.
Figure 54:
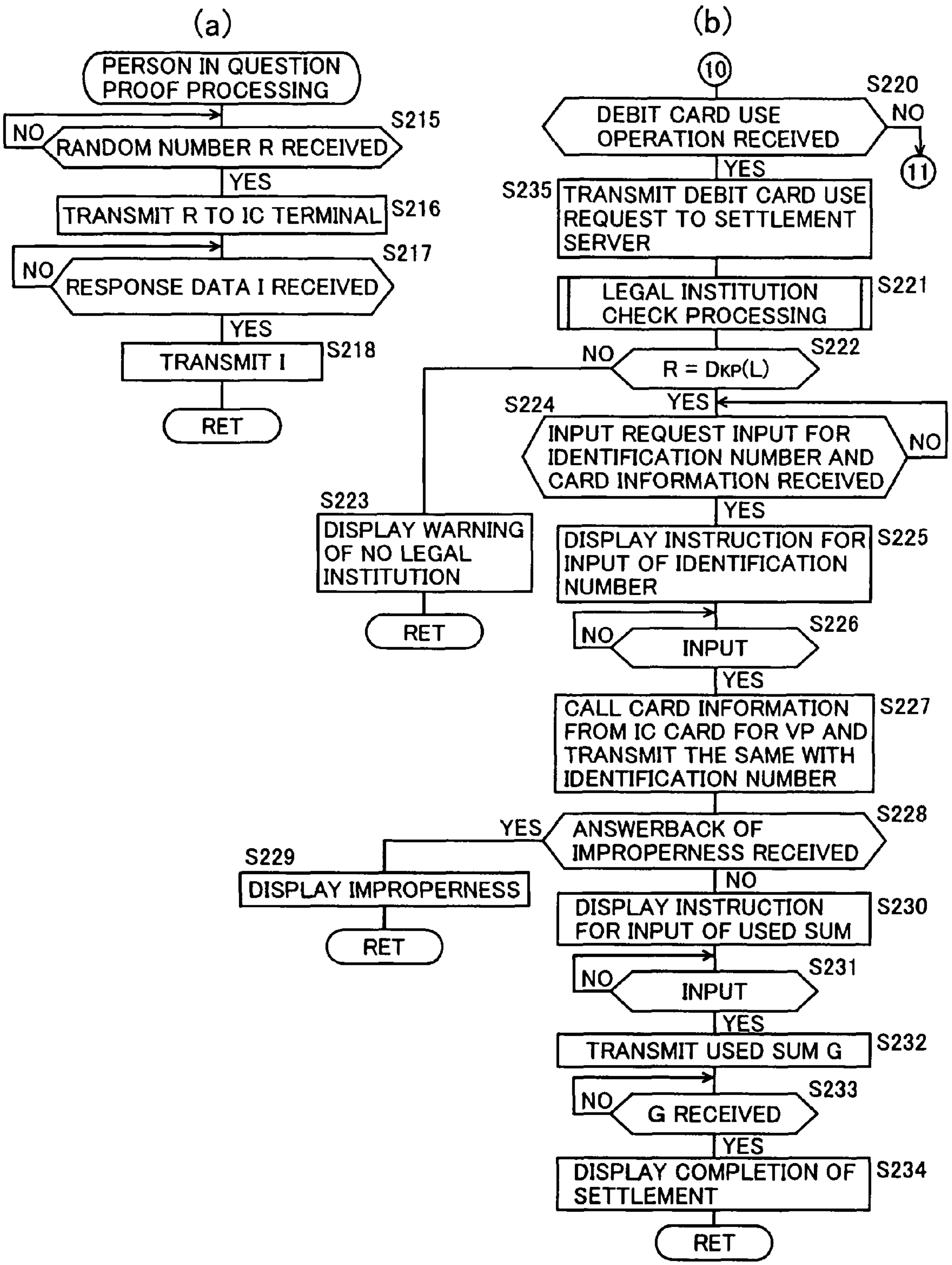
[FIG. 54] (*a*) is a flow chart showing a subroutine program of person in question proof processing, and (*b*) is a flow chart showing a part of the subroutine program of the settlement processing for the VP.
Figure 55:
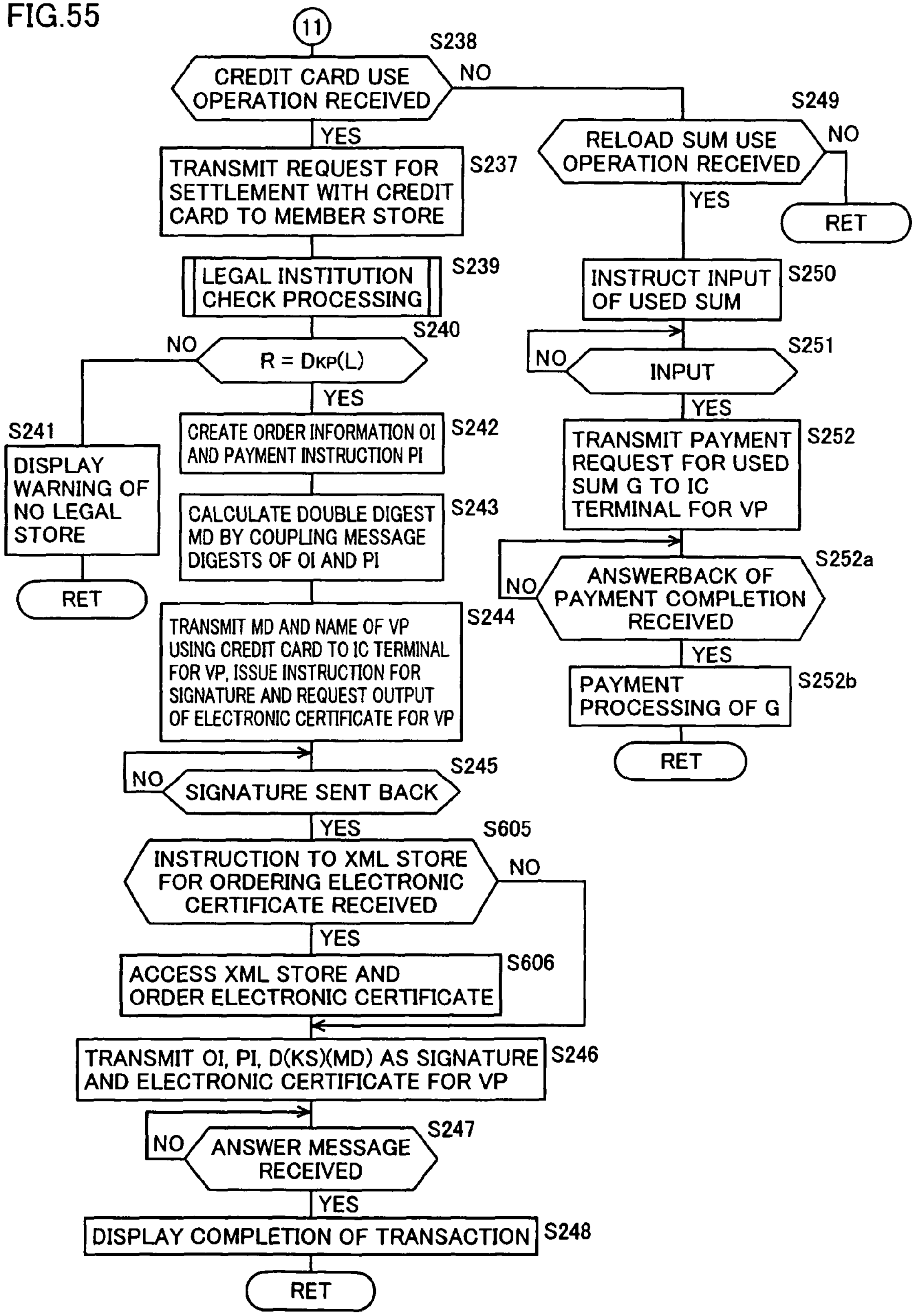
[FIG. 55] A flow chart showing another part of the subroutine program of the settlement processing for the VP.
Figure 56:
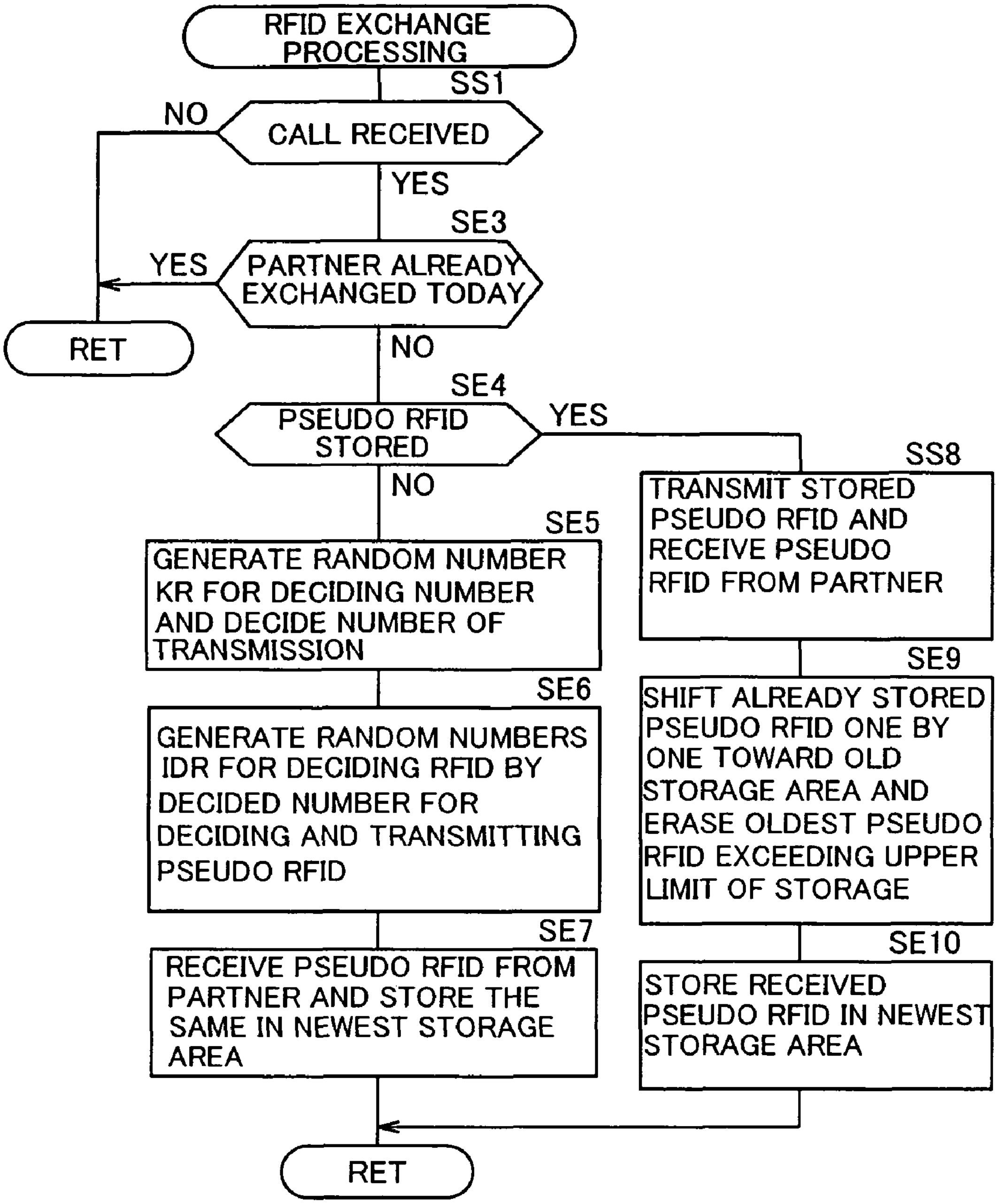
[FIG. 56] A flow chart showing a subroutine program of another RFID exchange processing of a browser phone in another embodiment.
Figure 57:
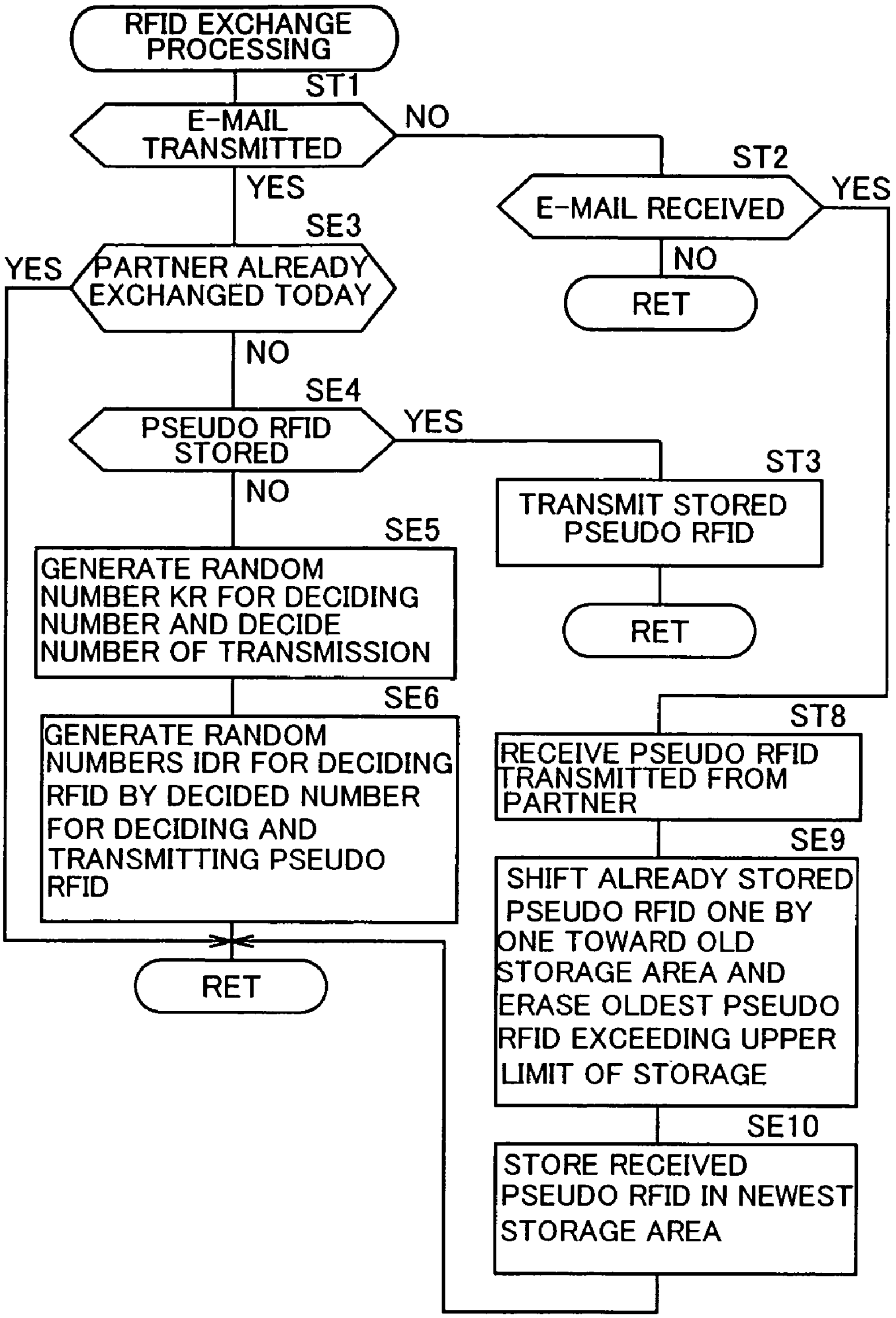
[FIG. 57] A flow chart showing a subroutine program of still another RFID exchange processing of the browser phone in another embodiment.
Figure 58:
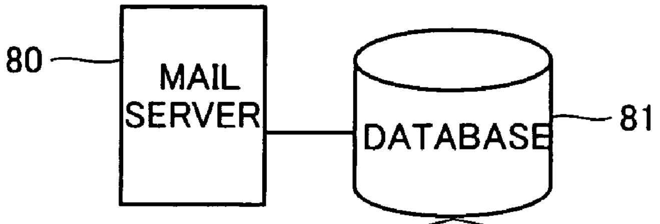
[FIG. 58] An explanatory diagram for illustrating data stored in a database of a mail server.
Figure 59:
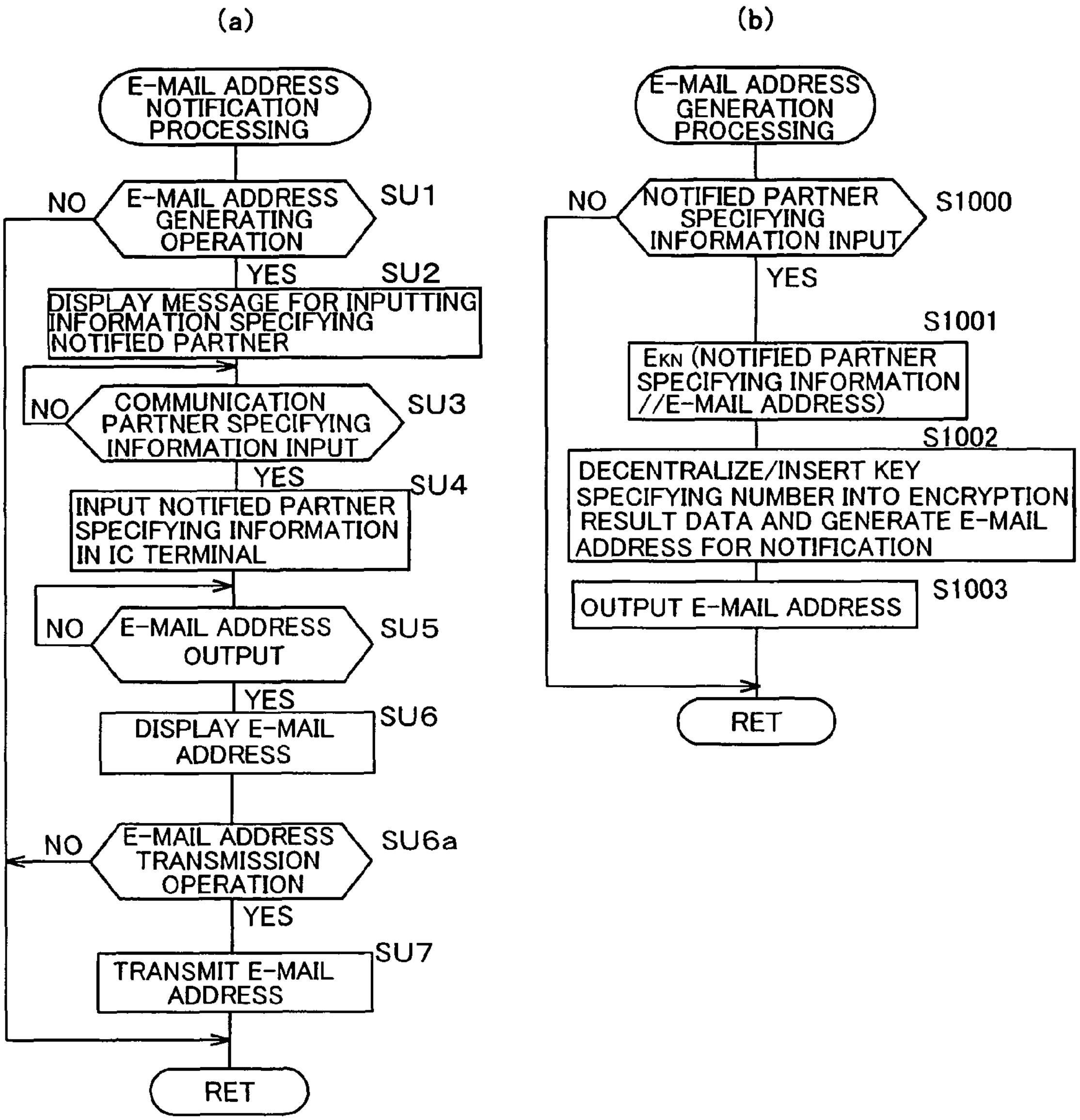
[FIG. 59] (*a*) is a flow chart showing a subroutine program of E-mail address notification processing by the browser phone, and (*b*) is a flow chart showing a subroutine program of E-mail address generation processing by an IC terminal.
Figure 60:
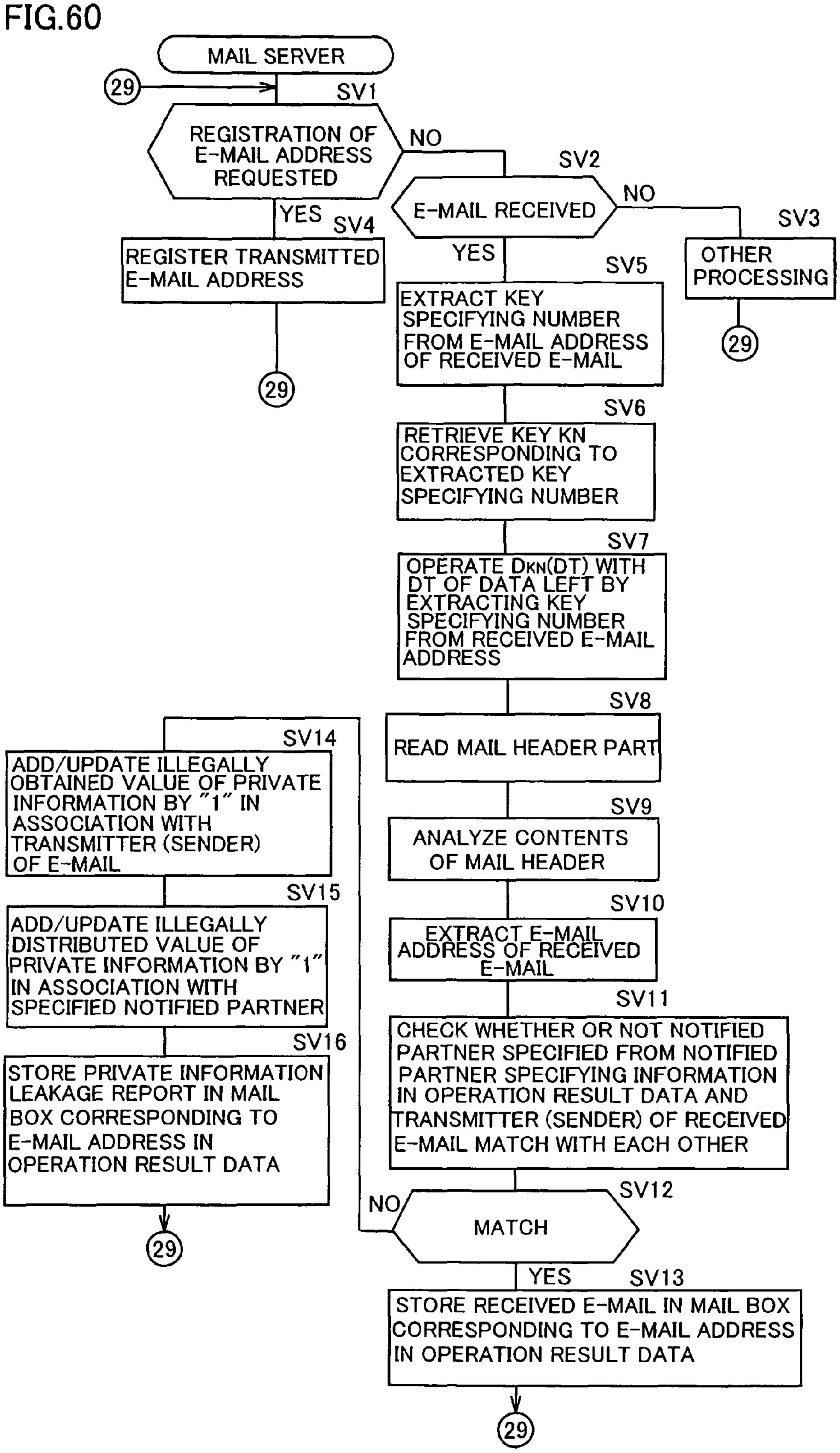
[FIG. 60] A flow chart showing control processing of the mail server.
Figure 61:
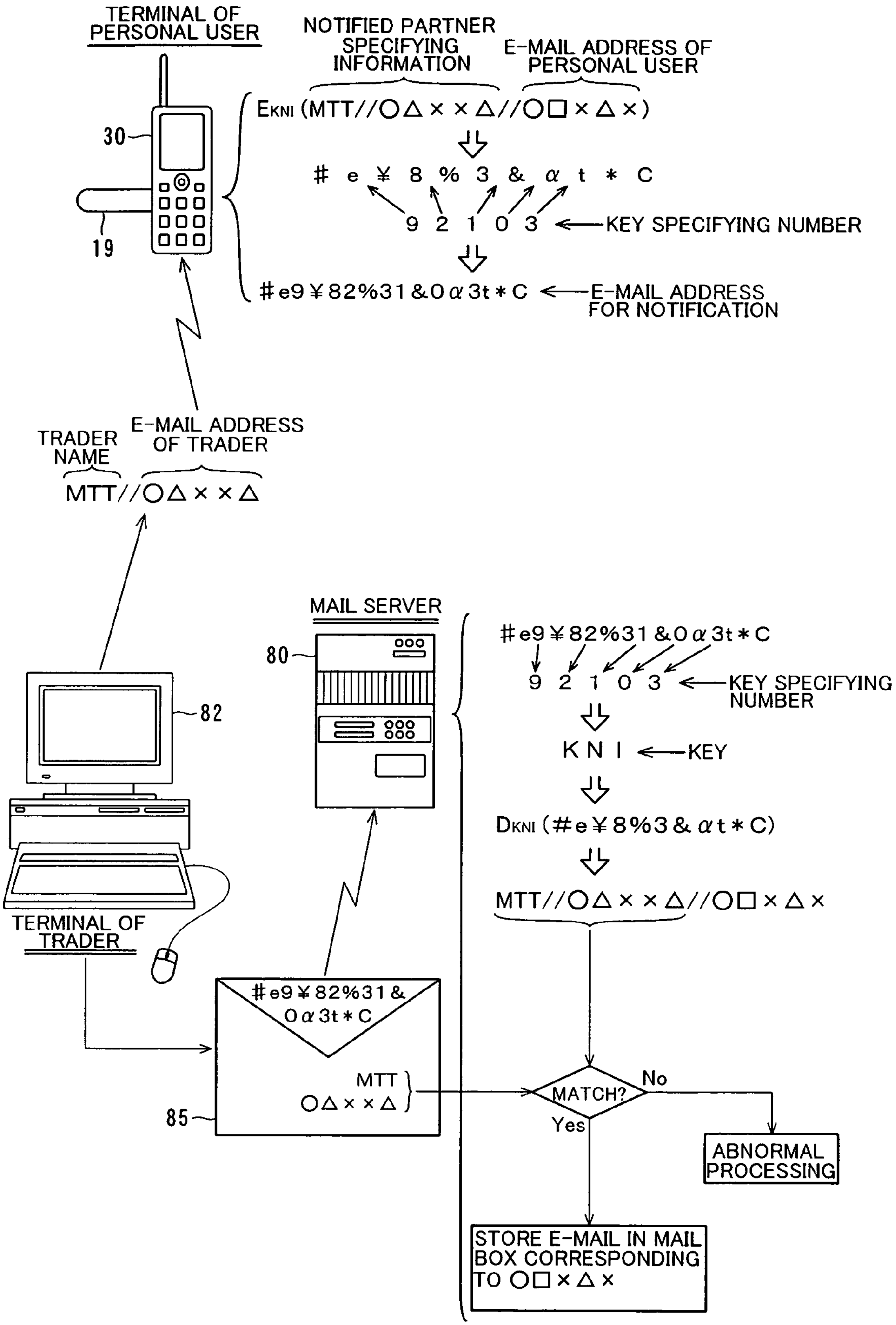
[FIG. 61] An explanatory diagram for intelligibly illustrating control contents shown in FIGS. 59 and 60.
Figure 62:
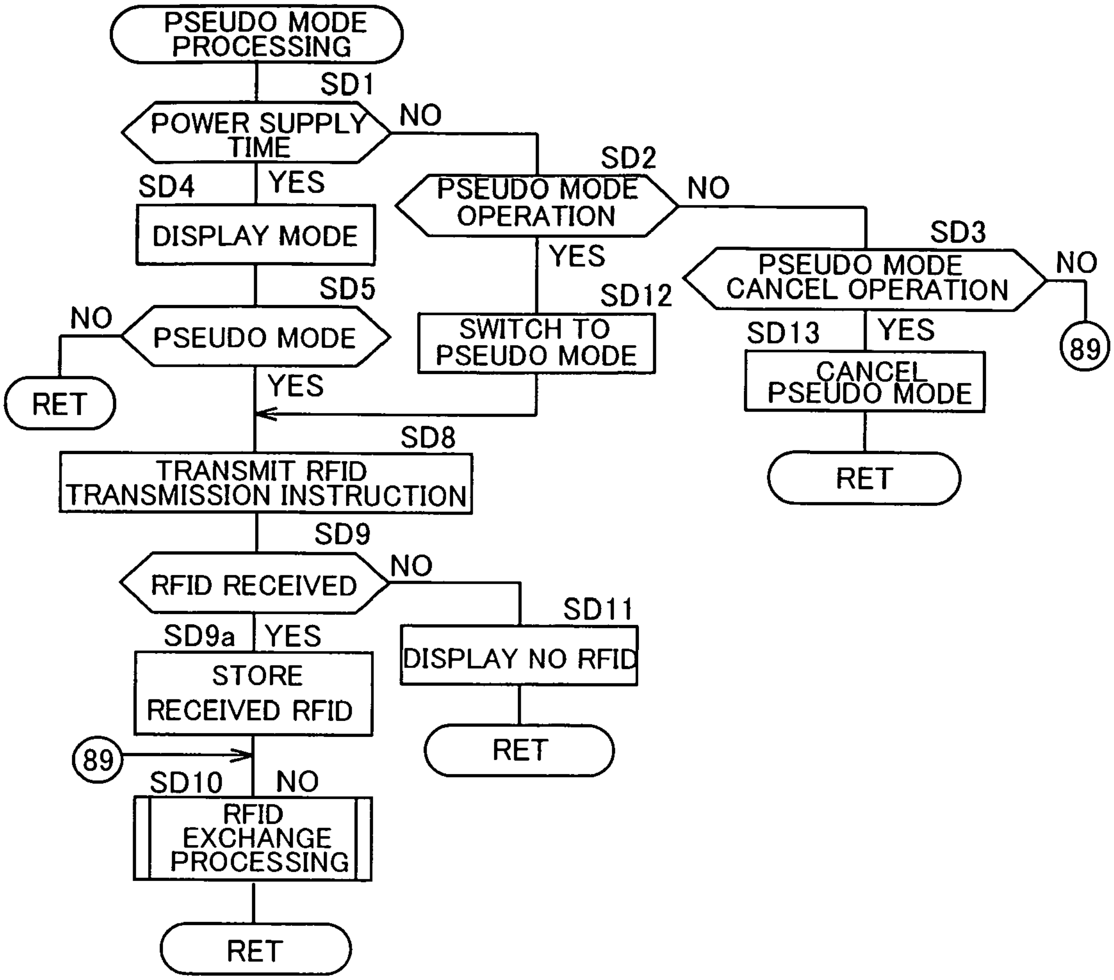
[FIG. 62] A flow chart showing another embodiment of FIG. 26, showing a subroutine program of pseudo mode processing of the browser phone.
Figure 63:
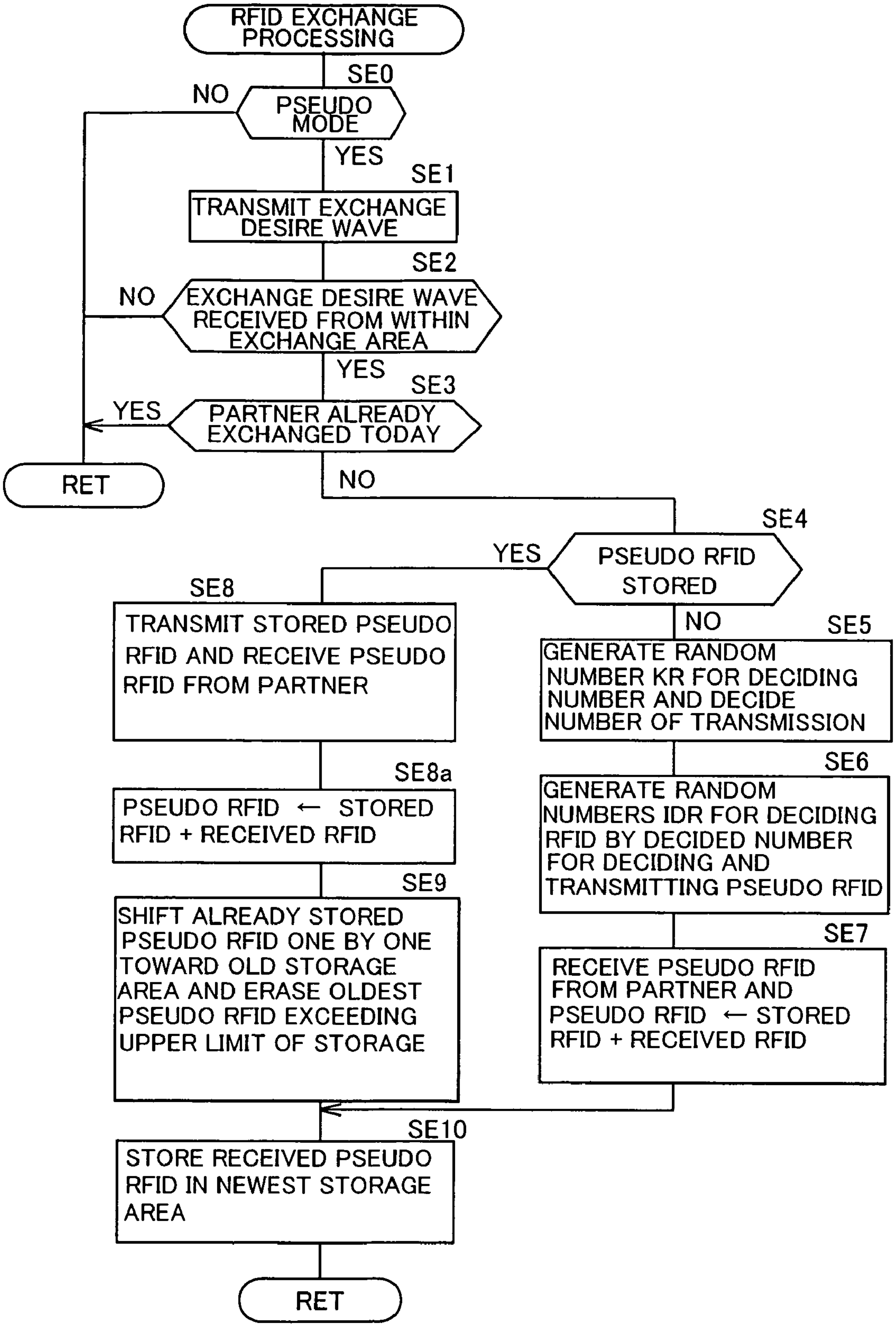
[FIG. 63] A flow chart showing another embodiment of FIG. 27, showing a subroutine program of RFID exchange processing of the browser phone.
Figure 64:
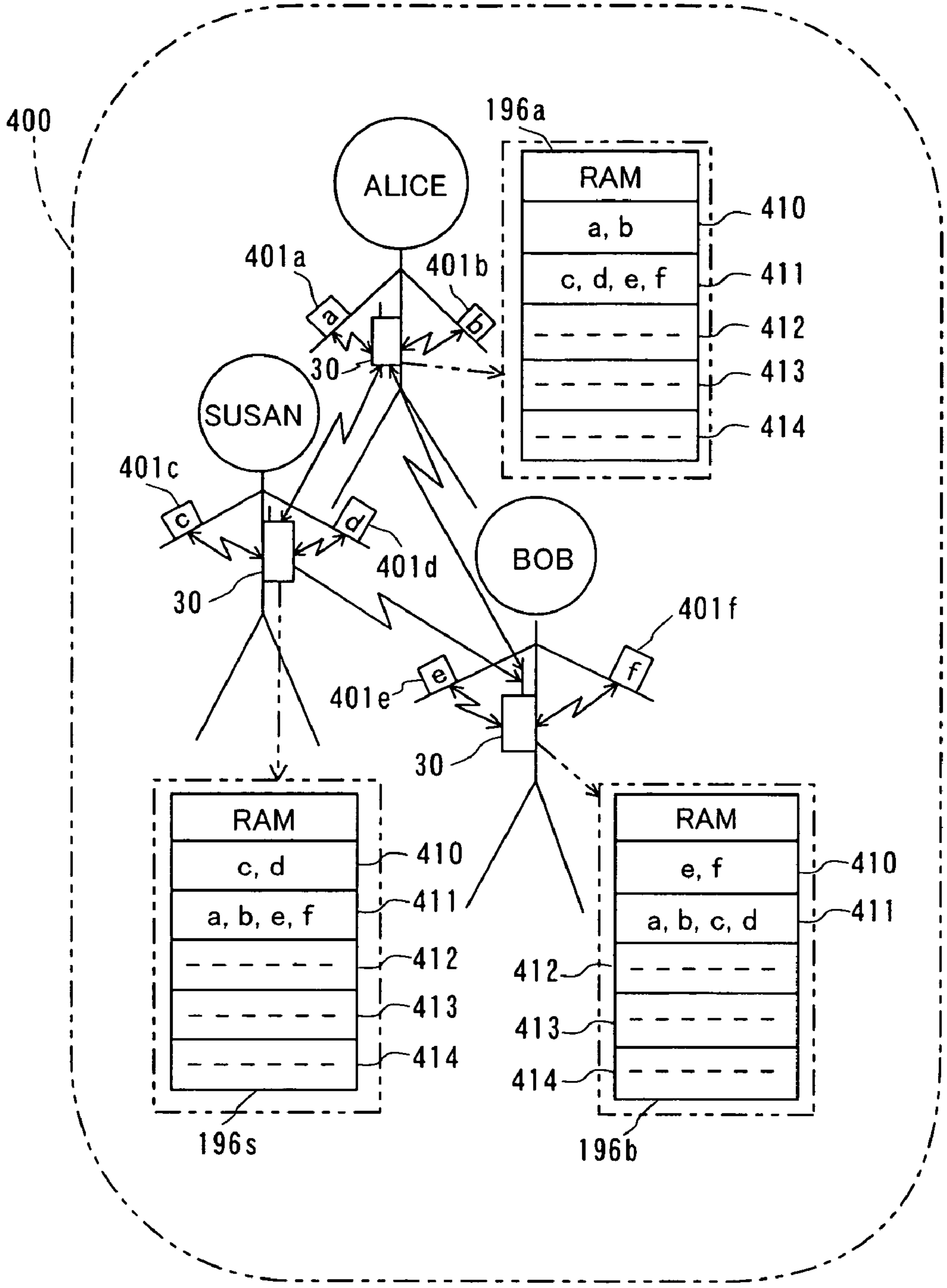
[FIG. 64] An explanatory diagram of another embodiment.

30 browser phone, 7 financial institution, 50 XML store, 12*a* database, 2 convenience store, 19V IC terminal for VP, 26 EEPROM, 194 EEPROM, 1 form apparatus, 1*a* RFID tag for security, 110 capacitor, 206 passage gate for settlement, 80 mail server, 82 trader terminal, 85 E-mail.

The invention claimed is:

1. A privacy protection method for preventing an invasion of privacy performed by reading an proper identifier and on the basis of said proper identifier, including:

an identifier guard step of bringing an proper identifier of a radio identifier transmitter affixed to an article purchased and thereby possessed by a personal user into an identifier guard state not readable by a stranger according to the intention of said personal user;

an identifier generation step of generating an identifier for disturbing a privacy invader with a privacy protection identifier transmitter possessed by said personal user;

a transmission step of transmitting said identifier generated through said identifier generation step from said privacy protection identifier transmitter when receiving an identifier transmission request; and a reading step of rendering the identifier of said radio identifier transmitter in the identifier guard state readable according to the intension of the personal user, wherein said identifier generation step includes a variable identifier generation step capable of generating an identifier different from a precedently transmitted identifier; and said transmission step transmits the same identifier as a precedently transmitted identifier when receiving an identifier transmission request again within a prescribed time from precedent identifier transmission.

2. A privacy protection method for preventing an invasion of privacy performed by reading an proper identifier of a radio identifier transmitter affixed to an article purchased and thereby possessed by a personal user and on the basis of said proper identifier, including:

an identifier generation step of generating an identifier for disturbing a privacy invader with a privacy protection identifier transmitter possessed by said personal user; and a transmission step of transmitting said identifier generated through said identifier generation step from said privacy protection identifier transmitter when receiving an identifier transmission request, wherein said identifier generation step includes an adjusted identifier generation step for generating an adjusted identifier so adjusted that an identifier transmitted from said personal user possessing said privacy protection identifier transmitter is identical to an identifier transmitted from a stranger in response to the identifier transmission request, for causing such a different person identical identifier transmission phenomenon that identical identifiers are transmitted even in case of transmission from different persons.

3. A privacy protection method for preventing an invasion of privacy performed by reading an proper identifier and on the basis of said proper identifier, including:

a provision step of providing privacy protection identifier transmitters to a plurality of personal users, wherein said privacy protection identifier transmitters include:

an identifier generation unit generating an identifier for disturbing a privacy invader; and a transmission unit transmitting said identifier generated by said identifier generation unit when receiving an identifier transmission request, said identifier generation unit includes a variable identifier generation unit capable of generating an identifier different from a precedently transmitted identifier, said variable identifier generation unit is capable of generating a common identifier according with an identifier transmitted from said privacy protection identifier transmitter possessed by a person different from persons possessing said privacy protection identifier transmitters generating and transmitting identifiers with said variable identifier generation unit, said plurality of privacy protection identifier transmitters are classified into a plurality of groups formed by privacy protection identifier transmitters transmitting said common identifier in a higher frequency as compared with an identifier of a stranger and having said common identifier varying with groups, and said provision step specifies an area every said group and provides said privacy protection identifier transmitters belonging to said group to the personal users.

4. A privacy protection method for preventing an invasion of privacy performed by reading an proper identifier and on the basis of said proper identifier, including:

a provision step of providing a privacy protection identifier transmitter to a plurality of personal users, wherein said privacy protection identifier transmitter includes:

an identifier generation unit generating an identifier for disturbing a privacy invader, and a transmission unit transmitting said identifier generated by said identifier generation unit when receiving an identifier transmission request, said identifier generation unit includes a variable identifier generation unit capable of generating an identifier different from a precedently transmitted identifier, and said variable identifier generation unit is capable of generating a common identifier according with an identifier transmitted from a privacy protection identifier transmitter possessed by a person different from a person possessing the privacy protection identifier transmitter generating the identifier with said variable identifier generation unit, for simultaneously transmitting a previously set prescribed number of identifiers from a privacy protection transmitter provided to a certain personal user through said provision step, and simultaneously transmitting a plurality of identifiers of a number larger than said prescribed number from a privacy protection identifier transmitter provided to another personal user different from said certain personal user through said provision step and generating another identifier, excluding said prescribed number of identifiers, included in said plurality of identifiers as said common identifier.

5. A device for transmitting an identifier for privacy protection for preventing an invasion of privacy performed by reading an proper identifier and on the basis of said proper identifier, including:

a variable identifier generation unit, which is a unit disturbing a privacy invader and generating an identifier for privacy protection, capable of generating an identifier different from a precedently transmitted identifier; and a transmission unit transmitting an identifier generated by said variable identifier generation unit when receiving an identifier transmission request, wherein said transmission unit transmits the same identifier as a precedently transmitted identifier when receiving an identifier transmission request again within a prescribed time from precedent identifier transmission.

6. The device for transmitting an identifier for privacy protection according to claim 5, wherein said variable identifier generation unit generates said identifier in the range of identifiers transmitted by the respective ones of radio identifier transmitters affixed to the respective ones of already sold articles.

7. A device for transmitting an identifier for privacy protection for preventing an invasion of privacy performed by reading an proper identifier of a radio identifier transmitter affixed to an article purchased and thereby possessed by a personal user and on the basis of said proper identifier, including:

an identifier generation unit generating an identifier for disturbing a privacy invader; and a transmission unit transmitting said identifier generated by said identifier generation unit when receiving an identifier transmission request, wherein said identifier generation unit includes an adjusted identifier generation unit for generating an adjusted identifier so adjusted that an identifier transmitted from said personal user possessing said privacy protection identifier transmitter is identical to an identifier transmitted from a stranger by communicating with a privacy protection identifier transmitter of said stranger and exchanging information of mutual identifiers, and said transmission unit transmits the adjusted identifier generated by said adjusted identifier generation unit.

8. A device for transmitting an identifier for privacy protection for preventing an invasion of privacy performed by reading an proper identifier of a radio identifier transmitter affixed to an article purchased and thereby possessed by a personal user and on the basis of said proper identifier, including:

an identifier generation unit generating an identifier for disturbing a privacy invader; and a transmission unit transmitting said identifier generated by said identifier generation unit when receiving an identifier transmission request, wherein said identifier generation unit includes an adjusted identifier generation unit for generating an adjusted identifier so adjusted that an identifier transmitted from said personal user possessing said privacy protection identifier transmitter is identical to an identifier transmitted from a stranger, and, said transmission unit transmits the adjusted identifier generated by said adjusted identifier generation unit.

9. The device for transmitting an identifier for privacy protection according to claim 8, further including a communication unit communicating with a privacy protection identifier transmitter of a stranger, wherein a variable identifier generation unit includes an identifier storage unit storing an identifier, said communication unit includes:

a transmission unit communicating with said privacy protection identifier transmitter of the stranger and transmitting said identifier stored in said identifier storage unit to said privacy protection identifier transmitter of the stranger, a receiving unit receiving an identifier transmitted from said privacy protection identifier transmitter of the stranger, and a shared identifier storage unit storing the identifier received by said receiving unit in said identifier storage unit and sharing the same identifier with said stranger, and said adjusted identifier generation unit generates said identifier adjusted to accord with the identifier transmitted from the stranger by reading the shared identifier stored in said identifier storage unit through said shared identifier storage unit when receiving an identifier transmission request, for causing such a different person identical identifier transmission phenomenon that identical identifiers are transmitted even in case of transmission from different persons by transmitting said adjusted identifier from mutual privacy protection identifier transmitters in which information of said identifiers is exchanged.

10. The device for transmitting an identifier for privacy protection according to claim 9, wherein said communication unit, whose communicable communication limit range for transmitting/receiving and exchanging mutual identifiers is set within 20 meters, communicates with the privacy protection identifier transmitter of the stranger entering the area of said communicable communication limit range and exchanges mutual identifiers with each other.

11. The device for transmitting an identifier for privacy protection according to claim 9, wherein said communication unit has an inhibition unit inhibiting performance of exchange of said identifiers with the privacy protection identifier transmitter of a stranger with whom communication has been already made for transmitting/receiving and exchanging said identifiers again within a prescribed period.

12. The device for transmitting an identifier for privacy protection according to any of claims 9 to 11, wherein said communication unit has a telephone function and exchanges mutual identifiers with the privacy protection identifier transmitter of a stranger making communication by telephone, and a variable identifier generation unit generates an identifier adjusted to accord with an identifier transmitted from said stranger by reading an exchanged identifier stored in said identifier storage unit when receiving an identifier transmission request.

13. The device for transmitting an identifier for privacy protection according to any of claims 9 to 11, wherein said communication unit has an electronic mail function, transmits an identifier stored in said identifier storage unit to the privacy protection identifier transmitter of the stranger along with transmission of an electronic mail, and receives an identifier transmitted from the privacy protection identifier transmitter of the stranger along with receiving of an electronic mail and stores the same in said identifier storage unit, and said adjusted identifier generation unit generates an identifier adjusted to accord with the identifier transmitted from said stranger by reading the identifier, transmitted from the privacy protection identifier transmitter of the stranger, stored in said identifier storage unit when receiving an identifier transmission request.

14. The device for transmitting an identifier for privacy protection according to claim 5 or 6, wherein said transmission unit is capable of simultaneously transmitting a plurality of identifiers of a number larger than a prescribed number of identifiers simultaneously transmitted from the privacy protection identifier transmitter of the stranger, and said variable identifier generation unit generates an identifier, excluding said prescribed number of identifiers, included in said plurality of identifiers as said common identifier.

15. The device for transmitting an identifier for privacy protection according to any of claims 5, 6, 9, 10, 11, 7 and 8, further including:

an identifier guard unit bringing an proper identifier of a radio identifier transmitter affixed to an article purchased and thereby possessed by a personal user into an identifier guard state not readable by a stranger according to the intention of said personal user, and a read unit rendering the identifier of said radio identifier transmitter in the identifier guard state readable according to the intention of the personal user.

16. The device for transmitting an identifier for privacy protection according to claim 15, wherein said identifier guard unit transmits proper identification information for person in question authentication, lets said radio identifier transmitter authenticate the same and switches to an identifier transmission stop state transmitting no identifier unless the person in question is confirmable, and said read unit brings an identifier into a transmittable state after transmitting said proper identification information and making said radio identifier transmitter perform the person in question authentication.

17. A device for transmitting an identifier for privacy protection for preventing an invasion of privacy performed by reading an proper identifier of a radio identifier transmitter affixed to an article purchased and thereby possessed by a personal user and on the basis of said proper identifier, including:

a memory; and a processor operating in accordance with a program stored in said memory, wherein said processor executes:

processing of generating an identifier for disturbing a privacy invader; and processing of transmitting said identifier generated through said processing of generating the identifier when receiving an identifier transmission request, wherein said processing of generating the identifier includes adjusted identifier generation processing for generating an adjusted identifier so adjusted that an identifier transmitted from said personal user possessing said privacy protection identifier transmitter is identical to an identifier transmitted from a stranger, and said processing of transmitting said identifier transmits the adjusted identifier generated through said adjusted identifier generation processing.

18. The device for transmitting an identifier for privacy protection according to claim 17, wherein said adjusted identifier generation processing includes identifier storage processing of storing an identifier in said memory, for communicating with a privacy protection identifier transmitter of the stranger and making said privacy protection identifier transmitter of the stranger transmit said identifier stored in said memory while receiving the identifier transmitted from said privacy protection identifier transmitter of the stranger and making said memory store the same through said identifier storage processing for sharing the same identifier as said stranger, and said adjusted identifier generation processing generates an identifier adjusted to accord with said identifier transmitted from the stranger by reading said shared identifier stored in said memory when receiving an identifier transmission request.

19. The device for transmitting an identifier for privacy protection according to claim 18, wherein said processor executes communication processing of communicating with a privacy protection identifier transmitter of a stranger, wherein said communication processing includes:

transmission processing of communicating with said privacy protection identifier transmitter and transmitting said identifier stored in said memory through said identifier storage processing to said privacy protection identifier transmitter of the stranger;

receiving processing of receiving an identifier transmitted from said privacy protection identifier transmitter of the stranger; and shared identifier storage processing of storing the identifier received through said receiving processing in said memory and sharing the same identifier with said stranger, and said adjusted identifier generation processing generates said identifier adjusted to accord with the identifier transmitted from the stranger by reading the shared identifier stored in said memory through said shared identifier storage processing when receiving an identifier transmission request.

20. The device for transmitting an identifier for privacy protection according to claim 19, wherein said communication processing exchanges mutual identifiers with the privacy protection identifier transmitter of a stranger making communication by telephone employing a telephone function, and said adjusted identifier generation processing generates an identifier adjusted to accord with an identifier transmitted from said stranger by reading an exchanged identifier stored in said memory when receiving an identifier transmission request.

21. The device for transmitting an identifier for privacy protection according to claim 19 or 20, wherein said communication processing transmits an identifier stored in said memory through identifier storage processing to the privacy protection identifier transmitter of the stranger along with transmission of an electronic mail employing an electronic mail function, and receives an identifier transmitted from said privacy protection identifier transmitter of the stranger along with receiving of an electronic mail and stores the same in said memory, and said adjusted identifier generation processing generates an identifier adjusted to accord with the identifier transmitted from said stranger by reading the identifier, transmitted from said privacy protection identifier transmitter of the stranger, stored in said memory when receiving an identifier transmission request.

22. A non-transitory storage medium storing a program for preventing an invasion of privacy performed by reading an proper identifier and on the basis of said proper identifier, for making a computer provided on a privacy protection identifier transmitter function as:

identifier generation means generating an identifier for disturbing a privacy invader; and transmission means transmitting said identifier generated by said identifier generation means when receiving an identifier transmission request, wherein said identifier generation means includes adjusted identifier generation means for generating an adjusted identifier so adjusted that an identifier transmitted from said personal user possessing said privacy protection identifier transmitter is identical to an identifier transmitted from a stranger, for making the computer function so that the adjusted identifier generated by said adjusted identifier generation means is transmitted by said transmission means.

23. The non-transitory storage medium storing a program according to claim 22, wherein said adjusted identifier generation means includes identifier storage means storing an identifier, for communicating with a privacy protection identifier transmitter of the stranger and making said privacy protection identifier transmitter of the stranger transmit said identifier stored in said identifier storage means while receiving the identifier transmitted from said privacy protection identifier transmitter of the stranger and making said identifier storage means store the same for sharing the same identifier as said stranger, and said adjusted identifier generation means generates an identifier adjusted to accord with said identifier transmitted from the stranger by reading said shared identifier stored in said identifier storage means when receiving an identifier transmission request.

24. The non-transitory storage medium storing a program according to claim 23, further storing a program for making the computer function as communication means communicating with a privacy protection identifier transmitter of a stranger, wherein said adjusted identifier generation means includes identifier storage means storing an identifier, said communication means includes:

transmission means communicating with said privacy protection identifier transmitter of the stranger and transmitting said identifier stored in said identifier storage means to said privacy protection identifier transmitter of the stranger;

receiving means receiving an identifier transmitted from said privacy protection identifier transmitter of the stranger; and shared identifier storage means storing the identifier received by said receiving means in said identifier storage means and sharing the same identifier with said stranger, and said adjusted identifier generation means generates a identifier an identifier adjusted to accord with the identifier transmitted from said stranger by reading the shared identifier stored in said identifier storage means through said shared identifier storage means when receiving an identifier transmission request.

25. The non-transitory storage medium storing a program according to claim 24, wherein said communication means has a telephone function and exchanges mutual identifiers with a privacy protection identifier transmitter of a stranger making communication y telephone, and said adjusted identifier generation means generates an identifier adjusted to accord with an identifier transmitted from said stranger by reading an exchanged identifier stored in said identifier storage means when receiving an identifier transmission request.

26. The non-transitory storage medium storing a program according to claim 24 or 25, wherein said communication means has an electronic mail function, transmits an identifier stored in said identifier storage means to the privacy protection identifier transmitter of the stranger along with transmission of an electronic mail, and receives an identifier transmitted from said privacy protection identifier transmitter of the stranger along with receiving of an electronic mail and stores the same in said identifier storage means, and said adjusted identifier generation means generates an identifier adjusted to accord with the identifier transmitted from said stranger by reading the identifier, transmitted from said privacy protection identifier transmitter of the stranger, stored in said identifier storage means when receiving an identifier transmission request.

* * * * *